US008628331B1

(12) United States Patent
Wright

(10) Patent No.: US 8,628,331 B1
(45) Date of Patent: Jan. 14, 2014

(54) LEARNING MODEL FOR COMPETENCY BASED PERFORMANCE

(76) Inventor: Beth Ann Wright, St. Louis, MO (US)

( * ) Notice: Subject to any disclaimer, the term of this patent is extended or adjusted under 35 U.S.C. 154(b) by 399 days.

(21) Appl. No.: 12/798,531

(22) Filed: Apr. 6, 2010

(51) Int. Cl.
*G09B 19/00* (2006.01)
(52) U.S. Cl.
USPC ........... 434/236; 434/107; 434/219; 434/247; 434/322; 434/323; 434/365; 600/300; 700/90; 700/91; 700/92; 700/93
(58) Field of Classification Search
USPC ......... 434/107, 219, 247, 236, 322, 323, 365; 600/300; 700/90, 91, 92, 93
See application file for complete search history.

(56) References Cited

U.S. PATENT DOCUMENTS

| | | | |
|---|---|---|---|
| 5,904,485 A | 5/1999 | Siefert | |
| 5,954,510 A | 9/1999 | Merrill | |
| 6,157,808 A | 12/2000 | Hollingsworth | |
| 6,408,309 B1* | 6/2002 | Agarwal | 1/1 |
| 6,514,079 B1 | 2/2003 | McMenimen | |
| 6,629,843 B1* | 10/2003 | Bunting et al. | 434/118 |
| 6,767,211 B2 | 7/2004 | Hall | |
| 7,273,374 B1* | 9/2007 | Abbey | 434/157 |
| 7,558,853 B2* | 7/2009 | Alcorn et al. | 709/225 |
| 8,175,511 B1* | 5/2012 | Sordo et al. | 434/350 |
| 8,200,323 B2* | 6/2012 | DiBenedetto et al. | 600/519 |
| 2003/0187683 A1* | 10/2003 | Kirchhoff et al. | 705/1 |
| 2003/0219710 A1* | 11/2003 | Suiter et al. | 434/350 |
| 2003/0229529 A1* | 12/2003 | Mui et al. | 705/8 |
| 2004/0002050 A1* | 1/2004 | Wagner et al. | 434/362 |
| 2004/0224296 A1 | 11/2004 | Carraccio | |
| 2005/0038776 A1* | 2/2005 | Cyrus et al. | 707/3 |
| 2005/0182641 A1 | 8/2005 | Ing et al. | |
| 2006/0112054 A1* | 5/2006 | Jeanblanc et al. | 706/46 |
| 2006/0115801 A1* | 6/2006 | Ganley et al. | 434/219 |
| 2006/0205564 A1* | 9/2006 | Peterson | 482/8 |
| 2007/0050238 A1* | 3/2007 | Carr et al. | 705/11 |
| 2007/0276203 A1* | 11/2007 | Day | 600/301 |
| 2008/0059292 A1 | 3/2008 | Myers | |
| 2008/0109257 A1* | 5/2008 | Albrecht | 705/2 |
| 2008/0227079 A1* | 9/2008 | Boehme et al. | 434/322 |
| 2008/0235232 A1* | 9/2008 | Moses et al. | 707/9 |
| 2009/0048939 A1* | 2/2009 | Williams | 705/26 |
| 2009/0144080 A1* | 6/2009 | Gray et al. | 705/2 |
| 2010/0057659 A1* | 3/2010 | Phelon et al. | 706/46 |

(Continued)

OTHER PUBLICATIONS www.mindtools.com, "Personal Goal Setting", Mar. 19, 2009, webpage from internet wayback machine, pp. 1-5.*

(Continued)

*Primary Examiner* — Jack Yip
(74) *Attorney, Agent, or Firm* — Senniger Powers LLP

(57) ABSTRACT

A system and method, a machine, and an article of manufacture of an occupational performance system and method for achieving occupational performance of competency based education and work force standards. The occupational performance system and method for achieving occupational performance includes: first, setting competency based goals with a goal setting diagram, to sequentially browse goal element lists, to sequentially select goal elements, to set competency based goals; second, recording in a performance record the competency based goals, goal status updates, progress notes, assessments, and artifacts in the performance record; and third, interacting in a community of practice including community members engaging in community activities, and sharing the performance record, and performing storage, retrieval, and operation of various combinations of occupational performance data fields selected from the competency based goals, performance record, and community of practice to improve occupational performance of the community of practice within the occupational performance system.

98 Claims, 50 Drawing Sheets

(56) References Cited

U.S. PATENT DOCUMENTS

2011/0231779 A1 9/2011 Vaidya et al.
2012/0088220 A1 4/2012 Feng et al.
2012/0245952 A1 9/2012 Halterman et al.

OTHER PUBLICATIONS www.yahoo.com, "The Top 10 Online Goal Setting and Tracking Tools", Aug. 30, 2011, www.yahoo.com, pp. 1-5.*
www.sitepoint.com, "10 Goal Setting and Tracking Tools to Keep You Motivated", Sep. 29, 2010, webpage from internet wayback machine, pp. 1-8.*
goalsontrack.com, webpage from internet wayback machine, Feb. 18, 2009, pp. 1-2.*
goalforit.com, webpage from internet wayback machine, Feb. 21, 2009, pp. 1-2.*
Institute of Medicine, "Crossing the Quality Chasm," 2001, pp. 212-214, National Academy Press, Washington, DC, USA.
Reich, "The Work of Nations," Feb. 1992, pp. 8, 59-61, 264-265 and 312-313, First Vintage Books Ed, Random House, New York, USA.
Sullivan, "Work and Integrity," 2nd Ed. 2005, Jossey-Bass, A Wiley Imprint, San Francisco, USA, 3 pages (Cover of Book and Table of Contents only).
Wright, "Preserving the Social Contract" The Thomas M. Cooley Journal of Practical and Clinical Law, Jul. 27, 2009, vol. 11(1), Western Newspaper Pub., Indianapolis, USA, pp. 17-73.
Wright, "Preserving the Social Contract" The Thomas M. Cooley Journal of Practical and Clinical Law, Jul. 27, 2009, 17-95, vol. 11(1), Western Newspaper Pub., Indianapolis, USA.
Reich, "The Work of Nations," Feb. 1992, pp. 8, 59-61, 264-265, 312-313, First Vintage Books Ed, Random House, New York, USA.
Sullivan, "Work and Integrity," 2nd Ed. 2005, cummulative—see as cited in Preserving the Social Contract, Jossey-Bass, A Wiley Imprint, San Francisco, USA.
Institute of Medicine, "Urossing the Quality Chasm," 2001, pp. 212-214, National Academy Press, Washington, DC, USA.
Dreyfus & Dreyfus, "Mind over Machine," 1986, pp. 19-36, The Free Press, A Division of Macmillan, Inc., New York, USA.

* cited by examiner

| | | | |
|---|---|---|---|
| 500BA | PS.G1.1 | develop questions to initiate research | 500Ba |
| 500BB | PS.G1.7 | conduct research to evaluate ideas | 500Bb |
| 500BC | PS.G1.28 | discover patterns in information | 500Bc |
| 500BD | PS.G1.38 | evaluate relationships in ideas | 500Bd |
| 500BE | PS.G2.6 | deliver a visual presentation for a variety of purposes and audiences | 500Be |
| 500BF | PS.G2.10 | revise communications to improve clarity | 500Bf |
| 500BG | PS.G2.13 | exchange ideas while recognizing the perspectives of others | 500Bg |
| 500BH | PS.G3.14 | reason inductively from a set of specific facts | 500Bh |
| 500BI | PS.G3.20 | assess the benefits of proposed solutions | 500Bi |
| 500BJ | PS.G4.14 | practice honesty and integrity in my academic work | 500Bj |
| 500BK | PS.G4.20 | develop a plan of action to accomplish a goal | 500Bk |

Copyright 2010 Beth Ann Wright

| | | |
|---|---|---|
| K.x | Fill in the blank: _____ | 500Ca |
| K.HC.1.1 | case studies | 500Cb |
| K.HC.1.2 | self-directed learning | 500Cc |
| K.HC.1.3 | simulated skills training | 500Cd |
| K.HC.1.4 | journal club | 500Ce |
| K.HC.1.5 | a team-building activity | 500Cf |
| K.HC.1.6 | an interdisciplinary meeting | 500Cg |
| K.HC.1.7 | mentor meetings | 500Dh |
| K.HC.1.8 | seminars | 500Ci |
| K.HC.1.9 | observation | 500Cj |
| K.DESE.2.1 | the Johnny Appleseed Survey | 500Ck |
| K.DESE.2.2 | the Predicting Motion Parade | 500Cl |
| K.DESE.2.3 | the Profitable Pumpkin Stand Project | 500Cm |
| K.OT.3.1 | adaptive feeding equipment | 500Cn |
| K.OT.3.2 | sensory testing | 500Co |
| K.OT.3.3 | object categorization activities | 500Cp |

(Row labels at left: 500CA, 500CB, 500CC, 500CD, 500CE, 500CF, 500CG, 500CH, 500CI, 500CJ, 500CK, 500CL, 500CM, 500CN, 500CO, 500CP; table reference 400C)

FIG. 6

Copyright 2010 Beth Ann Wright

| | | | |
|---|---|---|---|
| 500DA | M.x | Fill in the blank: _____ | 500Da |
| 500DB | M.1.1 | with 25% accuracy | 500Db |
| 500DC | M.1.2 | with 50% accuracy | 500Dc |
| 500DD | M.1.3 | with 75% accuracy | 500Dd |
| 500DE | M.1.4 | with 90% accuracy | 500De |
| 500DF | M.1.5 | with 100% accuracy | 500Df |
| 500DG | M.2.1 | correctly 3 times out of 10 | 500Dg |
| 500DH | M.2.2 | correctly 5 times out of 10 | 500Dh |
| 500DI | M.2.3 | correctly 7 times out of 10 | 500Di |
| 500DJ | M.2.4 | correctly 9 times out of 10 | 500Dj |
| 500DK | M.2.5 | correctly 10 times out of 10 | 500Dk |
| 500DL | M.3.1 | with maximum assistance | 500Dl |
| 500DM | M.3.2 | with moderate assistance | 500Dm |
| 500DN | M.3.3 | with minimal assistance | 500Dn |
| 500DO | M.3.4 | with supervision | 500Do |
| 500DP | M.3.5 | independently | 500Dp |

Copyright 2010 Beth Ann Wright

| | | | |
|---|---|---|---|
| 500EA | MV.x | Fill in the blank: _____ | 500Ea |
| 500EB | MV.1.1 | I want to be a team player | 500Eb |
| 500EC | MV.1.2 | it interests me | 500Ec |
| 500ED | MV.1.3 | I enjoy it | 500Ed |
| 500EE | MV.1.4 | I want to succeed | 500Ee |
| 500EF | MV.1.5 | I want to master it | 500Ef |
| 500EG | MV.1.6 | it makes me feel good | 500Eg |
| 500EH | MV.1.7 | I want to feel better about myself | 500Eh |
| 500EI | MV.1.8 | I want to know how it works | 500Ei |
| 500EJ | MV.1.9 | I want to beat my best score | 500Ej |
| 500EK | MV.1.10 | I want to solve it | 500Ek |
| 500EL | MV.1.11 | I wonder what will happen | 500El |
| 500EM | MV.1.12 | I want my family to be proud of me | 500Em |
| 500EN | MV.1.13 | I want to see the result | 500En |
| 500EO | MV.1.14 | I want to know the cause | 500Eo |
| 500EP | MV.1.15 | I want to win | 500Ep |

Copyright 2010 Beth Ann Wright

| | | | |
|---|---|---|---|
| 500AaA | CS.ASHAa. 1.1.1 | demonstrate communication skills for effective clinical interactions | 500Aaa |
| 500AaB | CS.ASHAa. 2.3.2 | understand the vocational effects of hearing impairment | 500Aab |
| 500AaC | CS.ASHAa. 2.4.3 | understand the pathophysiology of the auditory system | 500Aac |
| 500AaD | CS.ASHAa. 3.4.1 | screen individuals for hearing impairment | 500Aad |
| 500AaE | CS.ASHAa. 3.6.1 | administer conservation programs designed to reduce the effects of noise exposure | 500Aae |
| 500AaF | CS.ASHAa. 4.8.1 | perform electrodiagnostic test procedures | 500Aaf |
| 500AaG | CS.ASHAa. 4.15.2 | maintain records in a manner consistent with professional standards | 500Aag |
| 500AaH | CS.ASHAa. 5.5.1 | develop culturally sensitive management strategies | 500Aah |
| 500AaI | CS.ASHAa. 5.11.4 | summarize treatment outcomes | 500Aai |

Copyright 2010 Beth Ann Wright

| | | | |
|---|---|---|---|
| 500AbA | CS.NIH.1.3 | define the data that formulate research hypotheses | 500Aba |
| 500AbB | CS.NIH.2.7 | identify gaps in knowledge within a research problem | 500Abb |
| 500AbC | CS.NIH.3.4 | design a research study protocol | 500Abc |
| 500AbD | CS.NIH.5.2 | evaluate the reliability and validity of measures | 500Abd |
| 500AbE | CS.NIH.6.8 | collaborate with biostatisticians in the design, conduct, and analyses of clinical and translational research | 500Abe |
| 500AbF | CS.NIH.7.2 | develop protocols utilizing management of information using computer technology | 500Abf |
| 500AbG | CS.NIH.8.2 | critique a clinical or translational research proposal for risks to human subjects | 500Abg |
| 500AbH | CS.NIH.12.5 | foster innovation and creativity | 500Abh |

Copyright 2010 Beth Ann Wright

| | | | |
|---|---|---|---|
| 500AcA | CS.ADEAp. 1.2 | understand how diagnosis of systemic diseases and conditions can be affected by oral diseases | 500Aca |
| 500AcB | CS.ADEAp. 2.5.3 | assess the patient's ability to understand and comply with treatment recommendations | 500Acb |
| 500AcC | CS.ADEAp. 3.10.1 | value the dentist as part of the health care team | 500Acc |
| 500AcD | CS.ADEAi. 1.5 | understand principles of molecular biology | 500Acd |
| 500AcE | CS.ADEAi. 2.9 | order appropriate laboratory, radiographic, and other diagnostic tests as indicated, including biopsy of suspicious oral lesions | 500Ace |
| 500AcF | CS.ADEAg. 1.1.5 | understand principles of genetic transmission of phenomena of imprinting and anticipation | 500Acf |
| 500AcG | CS.ADEAg. 3.10 | understand the need to reduce public fear and misinformation about genetics | 500Acg |

Copyright 2010 Beth Ann Wright

| | | | |
|---|---|---|---|
| 500AdA | CS.ADAdp. 1.1.1.2 | interpret professional literature to make ethical evidence-based practice decisions | 500Ada |
| 500AdB | CS.ADAdp. 2.3.1.3 | apply established guidelines to a professional practice scenario | 500Adb |
| 500AdC | CS.ADAdp. 3.2.1.1 | apply knowledge of the role of the environment to develop interventions to affect change in diverse individuals and groups | 500Adc |
| 500AdD | CS.ADAdp. 4.3.1 | explain the impact of a public policy position on dietetics practice | 500Add |
| 500AdE | CS.ADAdi. 1.3.2 | justify products using appropriate evidence or data | 500Ade |
| 500AdF | CS.ADAdi. 1.4.1 | evaluate emerging research for application in dietetics practice | 500Adf |
| 500AdG | CS.ADAdi. 2.4.2 | use effective counseling skills to facilitate behavior change | 500Adg |
| 500AdH | CS.ADAdi. 4.1 | use organizational processes and tools to manage human resources | 500Adh |

Copyright 2010 Beth Ann Wright

| | | | |
|---|---|---|---|
| 500AeA | CS.DESE2m .4.2.1 | describe how simple growing patterns are generated | 500Aea |
| 500AeB | CS.DESE2m .8.1.2 | describe attributes and parts of two-dimensional shapes | 500Aeb |
| 500AeC | CS.DESE2m .12.3.1 | tell time to the nearest one fourth (quarter) hour | 500Aec |
| 500AeD | CS.DESE4m .15.1.1 | describe important features of a data set | 500Aed |
| 500AeE | CS.DESE7m .3.4.1 | estimate the results of all operations on rational numbers | 500Aee |
| 500AeF | CS.DESE8m .4.4.1 | identify functions as linear or nonlinear from tables, graphs, and equations | 500Aef |
| 500AeG | CS.DESE7m .13.3.3 | solve problems involving volume of a rectangular prism, triangular prism, and cylinder | 500Aeg |
| 500AeH | CS.DESE8m .13.3.1 | select, create and use appropriate graphical representations of data | 500Aeh |
| 500AeI | CS.DESE6m .17.1.1 | use a model to illustrate the possible outcomes of an event | 500Aei |

Copyright 2010 Beth Ann Wright

| | | | |
|---|---|---|---|
| 500AfA | CS.DESE5s. 4.4.1 | describe how friction affects the amount of force needed to do work over different surfaces | 500Afa |
| 500AfB | CS.DESE2s. 7.4.1 | identify similarities and differences among animal parents and their offspring | 500Afb |
| 500AfC | CS.DESEks. 1.6.1.1.4 | pose questions about events in the environment | 500Afc |
| 500AfD | CS.DESE8s. 20.1.2.2 | describe chemical properties of pure substances using appropriate senses and tools | 500Afd |
| 500AfE | CS.DESE8s. 25.1.1 | describe how the cell membrane helps regulate the transfer of materials in and out of the cell | 500Afe |
| 500AfF | CS.DESE6s. 27.2.3.2 | predict the possible effects of the changes in the types of organisms in an ecosystem on the populations of other organisms within that ecosystem | 500Aff |
| 500AfG | CS.DESE7s. 35.1.4.3 | make suggestions for reasonable extensions of an experiment | 500Afg |

Copyright 2010 Beth Ann Wright

| | | | |
|---|---|---|---|
| 500AgA | CS.DESE7h e.1.5.1 | analyze how aerobic exercise impacts an individual physically, mentally, and emotionally | 500Aga |
| 500AgB | CS.DESE3h e.1.6.2 | identify the cause and effect of lifestyle choices on the respiratory system (e.g. inactivity, tobacco) | 500Agb |
| 500AgC | CS.DESE5h e.2.1.1 | identify how family, friends, and culture can influence personal health practices and decisions | 500Agc |
| 500AgD | CS.DESE9-1 2he.4.1.1 | assess key nutrients and their specific functions and influences on body processes (e.g. disease, prevention) | 500Agd |
| 500AgE | CS.DESE9-1 2he.4.3.1 | apply concepts using food labels to meet dietary needs for a healthy lifestyle | 500Age |
| 500AgF | CS.DESE6h e.9.3.3 | present different opinions and arguments about the effects of tobacco, alcohol, and other drugs on individuals, family, and society | 500Agf |

Copyright 2010 Beth Ann Wright

| | | | |
|---|---|---|---|
| 500AhA | CS.ABETe. 1.3.1 | demonstrate ability to design a system to meet desired needs within realistic constraints | 500Aha |
| 500AhB | CS.ABETe. 1.11.3 | demonstrate ability to use modern engineering tools necessary for engineering practice | 500Ahb |
| 500AhC | CS.ABETe. 2.2.1 | understand orbital mechanics applications in astronautical engineering | 500Ahc |
| 500AhD | CS.ABETe. 4.5.2.1 | understand history leading to architectural design to enhance communication with other design professionals executing building projects | 500Ahd |
| 500AhE | CS.ABETcp. 1.2.2 | demonstrate ability to identify and define the computing requirements appropriate to solve a problem | 500Ahe |
| 500AhF | CS.ABETcp. 2.2.2 | demonstrate ability to apply development principles in the construction of software systems of varying complexity | 500Ahf |

Copyright 2010 Beth Ann Wright

| | | | |
|---|---|---|---|
| 500AiA | CS.ABA. 2.2.1 | understand concepts for formulating relevant legal theories | 500Aia |
| 500AiB | CS.ABA. 2.5.2.2 | demonstrate skills to synthesize legal arguments | 500Aib |
| 500AiC | CS.ABA. 4.2.2 | demonstrate skills to plan a factual investigation | 500Aic |
| 500AiD | CS.ABA. 5.1.1 | understand concepts to assess the perspective of the recipient of communication | 500Aid |
| 500AiE | CS.ABA. 6.5.2.1 | demonstrate skills to ascertain the client's decision | 500Aie |
| 500AiF | CS.ABA. 7.2.1 | understand concepts for conducting a negotiation session | 500Aif |
| 500AiG | CS.ABA. 10.3.1 | understand the process for recognizing ethical dilemmas | 500Aig |
| 500AiH | CS.ABA. 11.1 | show commitment to maintaining a level of competence in my field of practice | 500Aih |
| 500AiI | CS.ABA. 13.2 | show commitment in training and preparing new lawyers to practice | 500Aii |

Copyright 2010 Beth Ann Wright

| | | |
|---|---|---|
| 500AjA — CS.ACGMEai.1.3.1 | provide continuing care to patients with asthma | — 500Aja |
| 500AjB — CS.ACGMEcr.1.1.1 | learn to perform diagnostic colonoscopy | — 500Ajb |
| 500AjC — CS.ACGMEer.1.10.3 | perform emergency stabilization procedures | — 500Ajc |
| 500AjD — CS.ACGMEmg.3.7 | use information technology to optimize learning | — 500Ajd |
| 500AjE — CS.ACGMEns.1.4 | prioritize and stabilize multiple patients simultaneously | — 500Aje |
| 500AjF — CS.ACGMEesn.5.5 | demonstrate respect for patient privacy and autonomy | — 500Ajf |
| 500AjG — CS.ACGMEps.1.1.7 | assist in plastic surgery of the lower extremities | — 500Ajg |
| 500AjH — CS.ACGMEro.1.4 | treat pediatric patients with solid tumors | — 500Ajh |
| 500AjI — CS.ACGMEd.3.6 | locate, appraise, and assimilate evidence from scientific studies related to patients' health problems | — 500Aji |

Copyright 2010 Beth Ann Wright

| | | | |
|---|---|---|---|
| 500AkA → | CS.NONPF.<br>1.12 | differentiate among normal, variations of normal, and abnormal findings | ← 500Aka |
| 500AkB → | CS.NONPFa<br>.1.1.13.1 | assess and evaluate vague or ill-defined symptoms in adolescents | ← 500Akb |
| 500AkC → | CS.NONPFp<br>.1.1.4.2.2 | analyze how prenatal factors affect the child's growth and development | ← 500Akc |
| 500AkD → | CS.NONPFw<br>.1.1.7.1 | assess for evidence of domestic violence | ← 500Akd |
| 500AkE → | CS.NONPFg<br>.1.1.10.2 | assess sexual well-being in older adults | ← 500Ake |
| 500AkF → | CS.NONPFc<br>.1.1.2.2 | obtain and document a health history for critically ill patients | ← 500Akf |
| 500AkG → | CS.NONPFc<br>.1.2.7.1 | diagnose complications of complex acute illness considering multi-system health problems | ← 500Akg |
| 500AkH → | CS.NONPF<br>m.1.1.7 | perform a comprehensive assessment of mental health needs of a community | ← 500Akh |

Copyright 2010 Beth Ann Wright

| | | | |
|---|---|---|---|
| 500AlA | CS.AOTAt. 3.4.1 | assess client factors that support and hinder occupational performance | 500Ala |
| 500AlB | CS.AOTAt. 4.1 | articulate a clear and logical rationale for the intervention process | 500Alb |
| 500AlC | CS.AOTAt. 4.9 | document the client's response to services in a manner that demonstrates the efficacy of interventions | 500Alc |
| 500AlD | CS.AOTAt. 7.3 | respond constructively to feedback | 500Ald |
| 500AlE | CS.AOTAa. 1.3 | use sound judgment in regard to safety of self and others during all fieldwork-related activities | 500Ale |
| 500AlF | CS.AOTAa. 2.3.1 | make informed practice decisions based on published research | 500Alf |
| 500AlG | CS.AOTAa. 3.4.1 | report results accurately in a clear, concise manner that reflects the client's status | 500Alg |

Copyright 2010 Beth Ann Wright

| | | | |
|---|---|---|---|
| 500AmA | CS.ASCO. 2.5.1 | be able to recognize personal limitations regarding optimal patient care | 500Ama |
| 500AmB | CS.ASCO. 3.4.1 | understand the structures and processes contributing to the development of refractive error of the visual system | 500Amb |
| 500AmC | CS.ASCO. 4.2 | order and interpret frequently needed laboratory and diagnostic procedures | 500Amc |
| 500AmD | CS.ASCOlv. 4.1 | recognize psychosocial factors that may affect adjustment to vision loss | 500Amd |
| 500AmE | CS.ASCOlv. 11.1 | understand the basic optical principles of low vision rehabilitation devices | 500Ame |
| 500AmF | CS.ASCOg. 2.8.1 | understand the indications for genetic testing | 500Amf |
| 500AmG | CS.ASCOg. 3.8 | obtain informed consent for genetic testing | 500Amg |

Copyright 2010 Beth Ann Wright

| | | | |
|---|---|---|---|
| 500AnA | CS.ACPE. 1.1.3 | monitor pharmacy care plans that are patient-specific | 500Ana |
| 500AnB | CS.ACPE. 1.2.2 | manage marketing a successful patient-centered practice | 500Anb |
| 500AnC | CS.ACPE. 2.1.1.4 | develop population-specific, evidence-based disease management programs and protocols based upon risk reduction strategies | 500Anc |
| 500AnD | CS.ACPE. 4.1.2.2 | manage medication use systems to participate in the development of health policy | 500And |
| 500AnE | CS.ACPE. 6.1.1.2 | communicate with physicians, nurses, and other health care providers to engender a team approach to patient care | 500Ane |
| 500AnF | CS.ACPE. 8.1 | demonstrate expertise in informatics | 500Anf |
| 500AnG | CS.ACPE. 9.1.1 | carry out duties in accordance with legal guidelines | 500Ang |

Copyright 2010 Beth Ann Wright

| | | | |
|---|---|---|---|
| 500AoA | CS.APTAt. 2.3.1 | perform posture tests | 500Aoa |
| 500AoB | CS.APTAt. 3.3.3 | verbalize possible alternatives when interpreting the examination findings | 500Aob |
| 500AoC | CS.APTAt. 6.2.1 | identify who needs to collaborate in the plan of care | 500Aoc |
| 500AoD | CS.APTAt. 10.3.1.2 | participate in a quality improvement program of peers | 500Aod |
| 500AoE | CS.APTAt. 13.1.6 | share expertise related to accessing evidence with colleagues | 500Aoe |
| 500AoF | CS.APTAa. 1.5 | explain the rationale for selected interventions to achieve patient goals as identified in the plan of care | 500Aof |
| 500AoG | CS.APTAa. 2.3.3 | position or drape to protect patient modesty | 500Aog |
| 500AoH | CS.APTAa. 4.1.3 | identify possible progressions that will continue to advance the patient's response | 500Aoh |

Copyright 2010 Beth Ann Wright

| | | | |
|---|---|---|---|
| 500ApA | CS.ASHAs. 3.2.2 | demonstrate understanding of hearing disorder characteristics | 500Apa |
| 500ApB | CS.ASHAs. 3.4.3 | integrate information about swallowing disorder anatomy and physiology | 500Apb |
| 500ApC | CS.ASHAs. 4.2.2 | demonstrate understanding of methods of assessment for communication disorders | 500Apc |
| 500ApD | CS.ASHAs. 5.3.1 | demonstrate the ability to interpret standards of ethical conduct in applying the ASHA Code of Ethics | 500Apd |
| 500ApE | CS.ASHAs. 6.2.1 | demonstrate integration of research principles into evidence-based clinical practice | 500Ape |
| 500ApF | CS.ASHAs. 7.1.5 | demonstrate knowledge of professional issues involving reimbursement procedures | 500Apf |
| 500ApG | CS.ASHAs. 11.2.2 | implement intervention plans | 500Apg |

Copyright 2010 Beth Ann Wright

| | | | |
|---|---|---|---|
| 500AqA | CS.DESEt. 1.2.3 | present the subject matter in multiple, effective ways which are purposefully selected to engage every student in learning | 500Aqa |
| 500AqB | CS.DESEt. 2.3.1 | encourage student responsibility through establishment of clear expectations | 500Aqb |
| 500AqC | CS.DESEt. 3.1.3.1 | create a caring, positive environment | 500Aqc |
| 500AqD | CS.DESEt. 4.4.3.1 | teach students to set personal learning goals | 500Aqd |
| 500AqE | CS.DESEt. 6.1.4.2 | mentor colleagues to help them create a more positive learning environment | 500Aqe |
| 500AqF | CS.DESEt. 6.3.2 | offer students opportunities to practice decision-making | 500Aqf |
| 500AqG | CS.DESEt. 7.4.2.1 | facilitate safe, freedom of learner expression in speaking | 500Aqg |
| 500AqH | CS.DESEt. 8.9.2.2 | participate in grade level data analyses processes | 500Aqh |

Copyright 2010 Beth Ann Wright

| | |
|---|---|
| 200Za | I, [audiology learner's name], will discover patterns in information to understand the vocational effects of hearing impairment with 90% accuracy through journal club because it interests me. |
| 200Zb | I, [clinical and translational research learner's name], will assess the benefits of proposed solutions to develop protocols utilizing management of information using computer technology with moderate assistance through mentor meetings because I want to succeed. |
| 200Zc | I, [dentistry learner's name], will revise communications to improve clarity to order appropriate laboratory, radiographic, and other diagnostic tests as indicated, including biopsy of suspicious oral lesions with 100% accuracy through simulated skills training because I want to master it. |
| 200Zd | I, [dietetic learner's name], will conduct research to evaluate ideas to explain the impact of a public policy position on dietetics practice with minimal assistance through self-directed learning because I enjoy it. |
| 200Ze | I, [K-12 math learner's name], will discover patterns in information to describe important features of a data set with 90% accuracy using the Johnny Appleseed Survey because I want to beat my best score. |

Copyright 2010 Beth Ann Wright

| | |
|---|---|
| 200Zf | I, [K-12 science learner's name], will reason inductively from a set of specific facts to describe how friction affects the amount of force needed to do work over different surfaces with moderate assistance through observation because I want to know how it works. |
| 200Zg | I, [K-12 health education learner's name], will develop questions to initiate research to assess key nutrients and their specific functions and influences on body processes (e.g. disease, prevention) correctly 7 times out of 10 using self-directed learning because it interests me. |
| 200Zh | I, [engineering learner's name], will exchange ideas while recognizing the perspectives of others to understand orbital mechanics applications in astronautical engineering with moderate assistance through seminars because I want to know how it works. |
| 200Zi | I, [law learner's name], will evaluate relationships in ideas to understand the process for recognizing ethical dilemmas with minimal assistance through journal club because I want to feel better about myself. |

Copyright 2010 Beth Ann Wright

| | |
|---|---|
| 200Zj | I, [medical resident learner's name], will develop a plan of action to accomplish a goal to prioritize and stabilize multiple patients simultaneously with supervision through simulated skills training because I want to succeed. |
| 200Zk | I, [nurse practitioner learner's name], will develop questions to initiate research to perform a comprehensive assessment of mental health needs of a community with minimal assistance through a team building activity because I want to see the result. |
| 200Zl | I, [occupational therapy learner's name], will revise communications to improve clarity to articulate a clear and logical rationale for the intervention process correctly 7 times out of 10 through mentor meetings because I enjoy it. |
| 200Zm | I, [optometry learner's name], will reason inductively from a set of specific facts to understand the basic optical principles of low vision rehabilitation devices with 75% accuracy through case studies because it interests me. |
| 200Zn | I, [pharmacy learner's name], will discover patterns in information to manage medication use systems to participate in the development of health policy with moderate assistance through observation because I want to know how it works. |

Copyright 2010 Beth Ann Wright

|  |  |
|---|---|
| 200Zo | I, [physical therapy learner's name], will deliver a visual presentation for a variety of purposes and audiences to explain the rationale for selected interventions to achieve patient goals as identified in the plan of care with 100% accuracy through an interdisciplinary meeting because I want to beat my best score. |
| 200Zp | I, [speech-language pathology learner's name], will evaluate relationships in ideas to integrate information about swallowing disorder anatomy and physiology correctly 9 times out of 10 through simulated skills training because I want to know the cause. |
| 200Zq | I, [teacher learner's name], will develop a plan of action to accomplish a goal to present the subject matter in multiple, effective ways which are purposefully selected to engage every student in learning with minimal assistance using case studies because it makes me feel good. |

Copyright 2010 Beth Ann Wright

| | |
|---|---|
| 880ZA | MY PRESENTATIONS |
| 880ZB | MY REPORTS AND PUBLICATIONS |
| 880ZC | MY TESTS, EVALUATIONS, AND ASSESSMENTS |
| 880ZD | MY PERSONHOOD |
| 880ZE | MY AWARDS AND RECOGNITION |
| 880ZF | MY VOCATIONAL INTERESTS |
| 880ZG | MY CAREER OPPORTUNITIES |
| 880ZH | MY RESUME |
| 880ZI | MY LETTERS OF RECOMMENDATION |
| 880ZJ | MY CONTACTS |
| 880ZK | MY CONTINUING EDUCATION |
| 880ZL | MY LICENSES, CERTIFICATION, AND SPECIAL TRAINING |

| | ASSESSMENTS 820 | |
|---|---|---|
| 170Fg | LEARNER FORMATIVE ASSESSMENT SCORES DATA | MENTOR FORMATIVE ASSESSMENT SCORES DATA 170Fh |
| 170Fg1 | 2 | 2 170Fh1 |
| 170Fg2 | 1 | 2 170Fh2 |
| 170Fg3 | 3 | 3 170Fh3 |
| 170Fg4 | 1 | NA 170Fh4 |
| 170Fg5 | 2 | 1 170Fh5 |
| 170Fg6 | 1 | 1 170Fh6 |
| 170Fg7 | 4 | 4 170Fh7 |
| 170Fg8 | 3 | 2 170Fh8 |
| 170Fg9 | 2 | 2 170Fh9 |

Copyright 2010 Beth Ann Wright

| | |
|---|---|
| 170Gg | WOLVES HOWLING IN THE DISTANCE DATA |
| 940Ah | QUESTIONING THE COMPASS'S RELIABILITY |
| 170Gh | QUESTIONING THE COMPASS'S RELIABILITY DATA |
| 940Ai | LESSONS LEARNED FROM YOUR HANDBOOK |
| 170Gi | LESSONS LEARNED FROM YOUR HANDBOOK DATA |
| 940Aj | BLAZING "X'S" ON TREES |
| 170Gj | BLAZING "X'S" ON TREES DATA |
| 940Ak | FINDING YOUR FRESH WATER STREAM |
| 170Gk | FINDING YOUR FRESH WATER STREAM DATA |
| 940Al | GROWING ACCUSTOMED TO THE NIGHT |
| 170Gl | GROWING ACCUSTOMED TO THE NIGHT DATA |
| 940Am | SHARING STORIES BACK AT BASE CAMP |
| 170Gm | SHARING STORIES BACK AT BASE CAMP DATA |

LEARNING MODEL FOR COMPETENCY BASED PERFORMANCE

CROSS-REFERENCE TO RELATED APPLICATIONS

Not Applicable

FEDERALLY SPONSORED RESEARCH

Not Applicable

SEQUENCE LISTING OR PROGRAM

Not Applicable

A portion of the disclosure of this patent document contains material which is subject to copyright protection. The copyright owner has no objection to the fascimile reproduction by anyone of the patent document or the patent disclosure, as it appears in the patent and trademark office patent file or records, but otherwise reserves all copyright rights whatsoever. (See (37 C.F.R. 1.71(d)(e)).

COPYRIGHT NOTICE

A portion of the disclosure of this patent document contains material which is subject to copyright protection. The copyright owner has no objection to the fascimile reproduction by anyone of the patent document or the patent disclosure, as it appears in the Patent and Trademark Office patent file or records, but otherwise reserves all copyright rights whatsoever.

© COPYRIGHT 2010 Beth Ann Wright, FIGS. 5 through 29, and 49, and the related text in the specifications.

© COPYRIGHT 2010 Beth Ann Wright, Learning Model for Competency Based Performance.

TECHNICAL FIELD OF THE INVENTION

The present invention generally relates to learning, and more particularly to learning of occupational performance for competency based education and work force performance.

BACKGROUND OF THE INVENTION

Public school education in America has experienced almost no substantive change in the design, methods, and approaches implemented to teach, assess, and improve learning over the last 100 years. Similarly, professional educational programs at our universities and colleges are at a crossroads, searching for methods to ensure that members of their respective professions acquire and maintain competency skills and ethical behaviors to preserve the professions' social contract with society at large, and in turn, preserve the professions' autonomy, esteem, and privilege of self-regulation. As we move towards an ever more connected global economy, we must dramatically redesign our educational methods and systems to focus on how to teach people to think and on how to teach people to perform. From Robert B. Reich in The Work of Nations, to The Carnegie Foundation for the Advancement of Teaching's senior scholar William Sullivan in Work and Integrity: The Crisis and Promise of Professionalism in America, to the Institute of Medicine in Crossing the Quality Chasm and others, the message is clear, we must reform our education system. Education is the life-blood of our economic health, a source of our respect and power as a world leader, and a key ingredient to individual quality of life under a free market economy. Yet, education is starved of innovation.

Evolutionary changes in education have occurred, to be sure, with the expansion of technology and the internet. Other inventors have created an online portfolio to evaluate task performance under U.S. Pat. Application Pub. No. 2004/0224496 to Carraccio and performance improvement pathways under U.S. Pat. Application Pub. No. 2008/0059292 to Myers, Karp, & Rabin through exploiting the use of technology to convert pre-existing manual methods into internet-based methods. Other inventors have used technology to create methods to push "mini-lessons" to employees throughout their workday under U.S. Pat. No. 6,767,211 to Hall and Shields (2004) as well as pull goals from people about sales targets, making financial investments, and weight loss under U.S. Pat. No. 5,954,510 to Merrill (1999). Still others have used technology to create systems to track employee certifications, match their skills to jobs and tasks to which they are qualified, and identify and deliver employee training under U.S. Pat. No. 6,157,808 to Hollingsworth (2000); to create systems to deliver online interactive multimedia through audiovisual presentations under U.S. Pat. No. 6,514,079 to McMenimen and Sack (2003); and to create systems to deliver online distance learning by disseminating school curriculum over the internet with an Intelligent Administrator under U.S. Pat. No. 5,904,485 to Siefert (1994). Such evolutionary change has resulted through the advent of technology, the internet, and the creative insight of inventors.

What our education system needs, however, is revolutionary change. A dramatic departure, a fundamental shift in our methodology to teach competency skills and ethical behaviors must emerge to effectively prepare our citizens for fruitful work in the 21st Century. What served us well as a mode of education and led to great prosperity over the first eighty or so years of the last hundred will not preserve our competitiveness in the future. We should bury outmoded approaches to pre-post assessments (U.S. Pat. Application Pub. No. 2004/0224496, Carrraccio) and prescribed pathways like skills checklist and course syllabi (U.S. Pat. Application Pub. No. 2008/0059292, Myers, Karp, & Rabin) as the method to formal education. For a hundred years we have taught, tested, and assigned scores with this approach. We should abandon arcane approaches that lack sufficient evidence to support their continuance, such as self-set goals which lack a framework of goal elements which support successful goal-setting and focus instead on criteria such as goal "importance" and "relevance" which positively impact goal attainment. (U.S. Pat. No. 5,954,510, Merrill). We should exercise care in consuming new approaches which may have an adverse impact on the learning or work environment such as "mini-lessons" pushed throughout the work day which may adversely impact attention to task and productivity (U.S. Pat. No. 6,767,211, Hall and Shields), or the negative feedback of falling of the "pathway." Such recent innovations lie in disseminating the same old approaches through the use of technology. Herein lies their novelty. Such methods should be abandoned because they simply do not support learners in acquiring the competency skills and ethical behaviors to think and perform an occupational task.

Moreover, we must make a paradigmatic shift from contrivances which merely deliver educational content or curriculum more effectively and efficiently (U.S. Pat. No. 6,767,211, Hall and Shields, U.S. Pat. No. 6,157,808, Hollingsworth, U.S. Pat. No. 5,904,485 Siefert, and U.S. Pat. No. 6,514,079, McMenimen and Sack). Technology and the internet create unfettered access to the broadest scope of content the world has ever known. What we must instead create is a method which teaches a learner how to think and how to perform in ways that drive him or her to search and locate relevant content so that he or she may achieve competent performance of enumerated skills and behaviors established by self-regulatory bodies who set competency standards. Relevant content is dynamic and rapidly changing. As such, the shifting role of educators must be redefined to teach learners how to find, analyze, judge, combine, and make good use of readily available content. We are charged with creating smarter contexts for learning so that our citizens develop deep, multi-sided intelligence to enable performance over time in our rapidly changing world. To this end, we must employ an educational system and method that enables teachers and mentors to inject tools, media, activities, and curriculum into rich, authentic learning environments which deliver individualized, competency-aligned media to drive the development of intelligent occupational performance. To be sure, a teacher, mentor or learner may someday be able to download an "App" (i.e. education application) from the internet which has relevant content specific to the learner's acquisition of a particular competency skill, but the fundamental shift requires that learning occur in the real world, in the authentic environment where the task is actually performed, not sitting hooked up to a computer to passively, or even interactively, learning prescribed curriculum (U.S. Pat. No. 6,157,808, Hollingsworth, U.S. Pat. No. 6,514,079 to McMenimen and Sack, U.S. Pat. No. 5,904,485, Siefert).

Public school teachers, administrators, and other stakeholders subject to the No Child Left Behind and the Higher Education mandates as well as professional regulatory bodies have expressed a strong need for development of a methodology to measure learning and performance improvement by means other than standardized testing as it relates to their Annual-Yearly-Progress (AYP) Reports, their funding, their reputation, and some cases, their very existence. They argue that standardized testing simply fails to capture real progress and real change that is occurring at the classroom level. To date, no such method or system has been identified to meet the needs of the public schools, the government oversight agencies, and the public to ensure that we fulfill our promise to raise the floor of public education.

The U.S. Department of Education and the National Center for Education Statistics have expressed a long-felt, unsolved need to develop methods to facilitate our ability to examine and improve alignment, attainment, and persistence issues in education. To date, no such comprehensive method or system has been identified to meet this need. The challenge is great. Development of a learning method and system which produces real-time informatics and analytics to enable examination and improvement of alignment, attainment, and persistence issues that is financially feasible, deployable, and sustainable confounds us. If we add to that the need to design a methodology and system that cross-cuts K-12 public school education through professional post-graduate education programs and into the work force, creating a workable solution is great indeed.

Beyond all this lies the hurdle of developing a comprehensive education method and system which supports rigorous scientific inquiry to encourage the emergence of evidence-based education. A well-founded framework paired with the learners' informatics and analytic data would support thoughtful inquiry by experts in their respective specialties to spur evidence-based education. The need is great, the potential results profound. Our education system is wanting of such an approach.

Nothing short of transformation will fix our out-dated approach to education.

SUMMARY OF THE INVENTION

A system and method, a machine, and an article of manufacture of an occupational performance system and a method for achieving occupational performance of competency based education and work force standards.

An object of the invention is to provide a learning model to drive a learner's achievement of education and workforce competency based skills through facilitating learner to mentor and learner to learner relationships, and supporting a community of practice.

An object of the invention is to provide a learning model for educators, administrators, and other stakeholders to conduct meaningful outcomes research in education and work force performance.

An object of the invention is to provide a learning model for investigators, and stakeholders to conduct meaningful scientific research in education and work force performance.

Another object of the invention is to provide a learning model to support the creation, assessment, and improvement of evidence based curriculum, tools, activities, and multimedia.

Another object of the invention is to provide a learning model learning model to support vocational exploration, development, social networking, and decision making.

Another object of the invention is provide a learning model to raise to floor of public school education so that no child is left behind, and each in turn, has the liberty to pursue an occupation that brings him or her happiness and contributes to the public good.

Another object of the invention is to provide a learning model to reduce the medical error rate through improving the competency skills of the health care work force.

Another object of the invention is to provide a learning model to more effectively assess occupational performance for re-accreditation in the various occupations, for faculty and tenure appointment in the various occupations, and for promotion and compensation in the various occupations.

Another object of the invention is to provide a learning model to spur the emergence, development, and advancement of self-regulated professions.

Another object of the invention is to provide a learning model to capture and transmit the intellectual capital of corporations and organizations to its newest members which otherwise face the loss of their most valuable resource through the inevitable aging and retirement of their most precious resource, namely, their human resource.

Another object of the invention is to provide a learning model for humans to effectively engage in weight loss, fitness, well-being, and healthy living.

Another object of the invention is to provide a learning model to create a watershed of opportunities for educators, industrial psychologists, organizational psychologists, educational psychologists, sociologists, occupational therapists, neurologists, neurosurgeons, diversity and cultural competency specialists, and other stakeholders to transcend current methodologies for improving occupational performance.

Another object of the invention is to provide a learning model to retrain a multitude of displaced workers from "jobs that are never coming back" in manufacturing, and so forth, to ancillary careers in clinical and translational medicine, human subject research coordination, education research coordination, clean energy, green technology, fraud and abuse auditing, bank auditing, and other growth areas.

Another object of the invention is to provide a learning model to efficiently and effectively meet the longitudinal capacity demands anticipated by the U.S. Department of Labor for identified high growth occupations.

Another object of the invention is to provide a learning model for the United States of America to redefine itself from a once agrarian and then once industrial-manufacturing nation into the occupational performance nation by becoming the "World's exporter of applied knowledge" to enable other nations to teach occupations to their people.

BRIEF DESCRIPTION OF THE DRAWINGS

FIG. 5 illustrates one embodiment of a plurality of goal element lists, namely, a performance standard library.

FIG. 6 illustrates one embodiment of a plurality of goal element lists, namely, a tools, media, activities, and curriculum library.

FIG. 7 illustrates one embodiment of a plurality of goal element lists, namely, a measurement library.

FIG. 8 illustrates one embodiment of a plurality of goal element lists, namely, a motivator library.

FIG. 9 illustrates one embodiment of a plurality of goal element lists, namely, a competency library for audiology.

FIG. 10 illustrates one embodiment of a plurality of goal element lists, namely, a competency library for clinical and translational research.

FIG. 11 illustrates one embodiment of a plurality of goal element lists, namely, a competency library for dentistry.

FIG. 12 illustrates one embodiment of a plurality of goal element lists, namely, a competency library for dietetics.

FIG. 13 illustrates one embodiment of a plurality of goal element lists, namely, a competency library for education K-12 in math.

FIG. 14 illustrates one embodiment of a plurality of goal element lists, namely, a competency library for education K-12 in science.

FIG. 15 illustrates one embodiment of a plurality of goal element lists, namely, a competency library for education K-12 in health education.

FIG. 16 illustrates one embodiment of a plurality of goal element lists, namely, a competency library for engineering.

FIG. 17 illustrates one embodiment of a plurality of goal element lists, namely, a competency library for law.

FIG. 18 illustrates one embodiment of a plurality of goal element lists, namely, a competency library for medicine.

FIG. 19 illustrates one embodiment of a plurality of goal element lists, namely, a competency library for nurse practitioner.

FIG. 20 illustrates one embodiment of a plurality of goal element lists, namely, a competency library for occupational therapy FIG. 21 illustrates one embodiment of a plurality of goal element lists, namely, a competency library for optometry.

FIG. 22 illustrates one embodiment of a plurality of goal element lists, namely, a competency library for pharmacy.

FIG. 23 illustrates one embodiment of a plurality of goal element lists, namely, a competency library for physical therapy.

FIG. 24 illustrates one embodiment of a plurality of goal element lists, namely, a competency library for speech-language pathology.

FIG. 25 illustrates one embodiment of a plurality of goal element lists, namely, a competency library for teacher.

FIGS. 26, 27, 28, and 29 illustrate one embodiment of a plurality of competency based goals, namely, competency based goals for a multitude of learners.

FIG. 32 illustrates one embodiment of a plurality of artifacts.

FIGS. 34 and 50 illustrates one embodiment of a plurality of community activities, namely, storytelling by analogy to share experiences.

FIG. 45 illustrates one embodiment of a plurality of community activities, namely, conduct performance measurement research about an adapted stages of skill acquisition scoring rubric.

FIGS. 50 and 34 illustrates one embodiment of a plurality of community activities, namely, storytelling by analogy to share experiences.

SYMBOLS IN DRAWINGS

Figure 1:
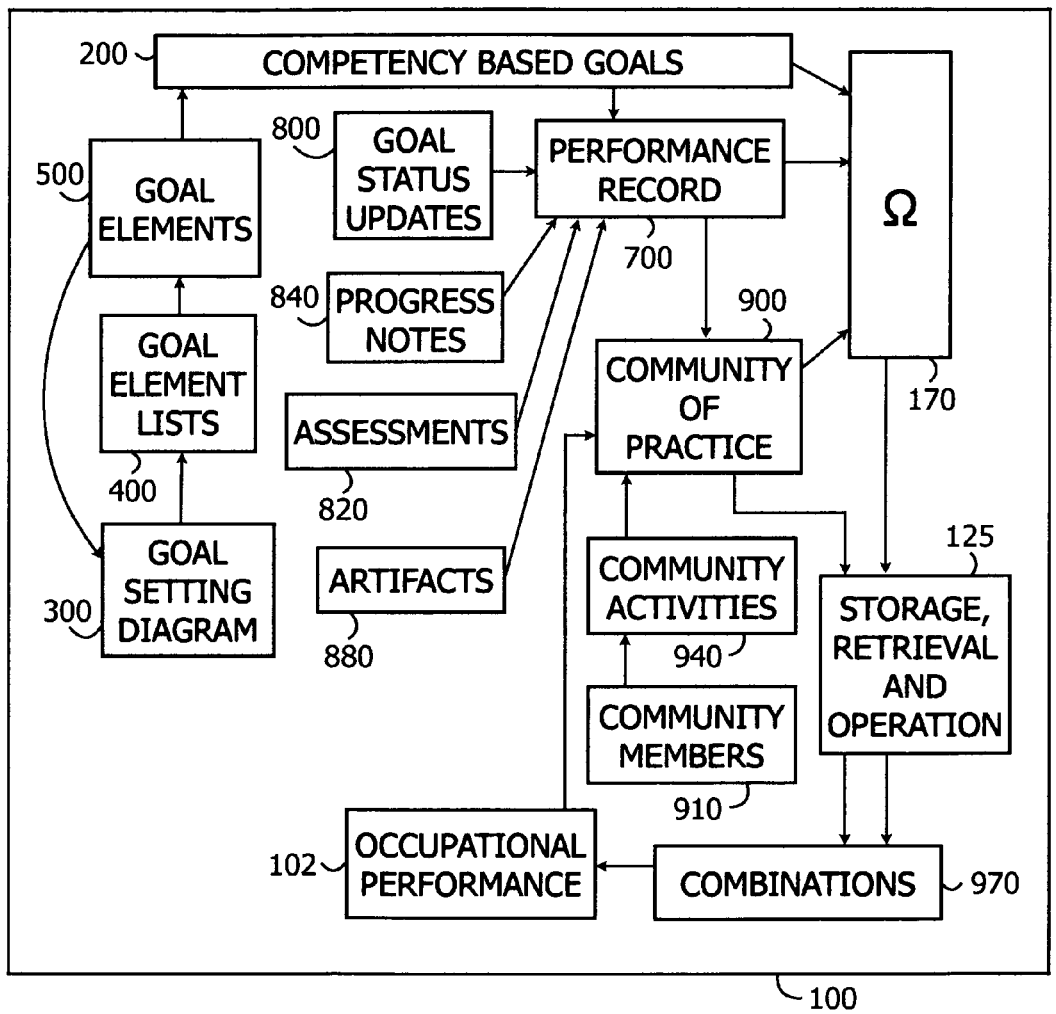
FIG. 1 illustrates one embodiment of an occupational performance system and a method for achieving occupational performance.

The symbol "Ω" as shown in the drawings means "occupational performance data fields."

REFERENCE NUMERALS

Please refer to the section entitled "DRAWING REFERENCES" after the specifications for a list of reference numerals featured in the drawings and described in the specifications.

DETAILED DESCRIPTION OF THE EMBODIMENTS

The following definitions are presented to facilitate an understanding of the structure and purpose of the various entities in the current embodiments:

automated: automated includes, but is not limited to, programmable software features in addition to electronic finable forms, such as a fillable word processing document or fillable spreadsheet. Such programmable software features may include, but are not limited to features that improve the user experience, prompt the user to complete data fields, limit data entry choices, prevent data loss resulting from users deleting or modifying data, populating data displayed in one document or window into another document or window in the same or a different form.

combinations: statistical analysis software, database software, and/or data mining software employed to analyze a plurality of occupational performance data fields to yield charts, graphs, tables, or other statistical data.

learner: a learner includes a traditional learner in an educational program from kindergarten through post-professional degree programs, members of the work force continuing their education, and everyday people, from cradle to grave, who are life-long learners related to their own occupational performance or the occupational performance of another.

manual: manual includes, but is not limited to, physical paper or electronic fillable form, such as a fillable word processing document or fillable spreadsheet, or a portable document file, or other similar document.

occupational performance: a live experience where a person engages with tools, media, activities, persons, ideas and so forth, in an environment within a community, where the context is shaped by history and culture, to accomplish a task, participate in a process, produce a product, perform a function, or otherwise attain an effect or result, related to the person's life roles.

users: users include learners and a multitude of community members.

A System and Method

FIG. 1 illustrates one embodiment of an occupational performance system and a method for achieving an occupational performance. As illustrated in FIG. 1, the occupational performance system 100 and method for achieving occupational performance 102 comprising: first, setting a plurality of competency based goals 200 with a goal setting diagram 300 to sequentially browse a plurality of goal element lists 400 to sequentially select a plurality of goal elements 500 to set competency based goals 200; second, recording in a performance record 700 competency based goals 200, along with recording a plurality of goal status updates 800, a plurality of progress notes 840, a plurality of assessments 820, and a plurality of artifacts 880 in the performance record 700; and third, interacting in a community of practice 900 including a plurality of community members 910 engaging in a plurality of community activities 940, and sharing the performance record 700, and performing a multitude of a storage, retrieval, and operation 125 of a multitude of combinations 970 using a plurality of occupational performance data fields 170 selected from the competency based goals 200, performance record 700, and community of practice 900 to improve occupational performance 102 of the community of practice 900 within the occupational performance system 100.

As illustrated in FIG. 1, the occupational performance system and method for achieving occupational performance involves setting competency based goals, recording performance in the performance record, and interacting in the community of practice. Each of which will now be discussed, in turn.

Figure 49:
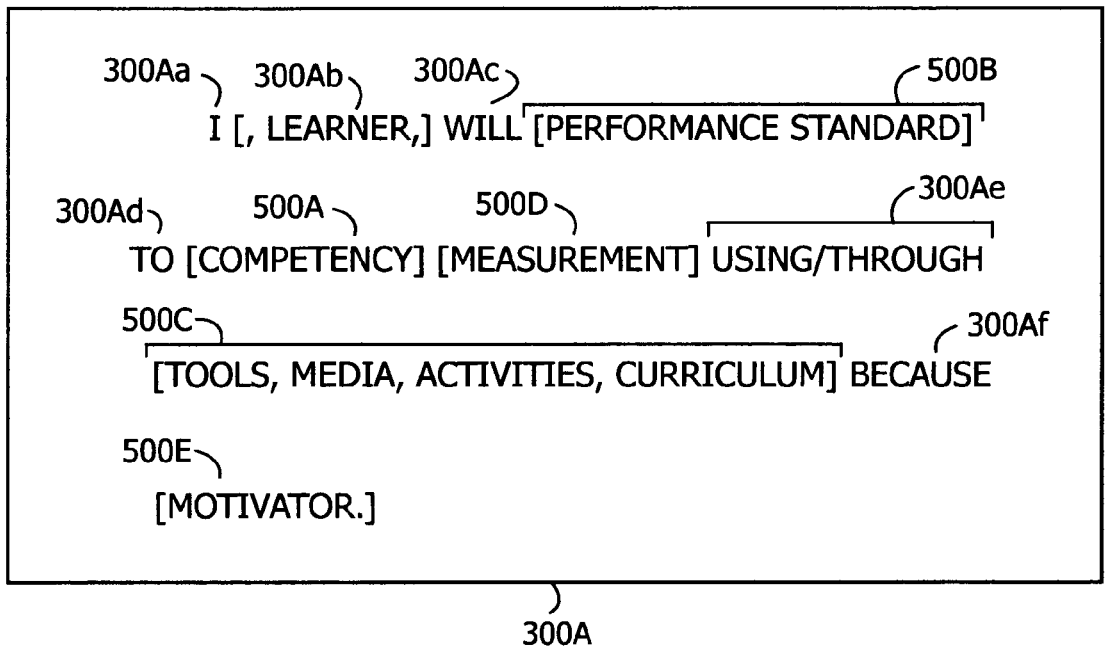
FIG. 49 illustrates one embodiment of a goal setting diagram.

First, as illustrated in FIG. 1, setting competency based goals 200 involves making the goal setting diagram 300, the plurality of goal element lists 400, and the plurality of goal elements 500 to enable the learner to set competency based goals 200. As illustrated in FIG. 49, in the present embodiment, the goal setting diagram 300A includes a subject "I" 300Aa, a space or prompt for a "learner's name" 300Ab, a verb "will" 300Ac, a prompt to select a performance standard goal element 500B, a preposition "to" 300Ad, a prompt to select a competency goal element 500A, a prompt to select a measurement goal element 500D, a prompt to select a preposition "using" or "through" 300Ae, a prompt to select a tools, media, activities, curriculum goal element 500C, a preposition "because" 300Af, and a prompt to select a motivator goal element 500E. One with ordinary skill in the art will understand how to prompt the learner to select various goal elements, for example, by prompting "What competency skill would you like to work on?" or "How will you measure your success?" or "What is motivating you to achieve success?"

Goal element prompts 500A through 500E, as illustrated in FIG. 49, sequentially prompt the learner to browse the plurality of goal element lists 400A through 400E, as illustrated in FIGS. 5 through 25, as presently illustrated in detail in 400Aa through 400Aq, 400B, 400C, 400D, 400E, to sequentially select the plurality of goal elements 500A through 500E, as presently illustrated in detail in 500AaA through 500AqH, 500Aaa through 500Aqh, 500BA through 500BK, 500Ba through 500Bk, 500CA through 500CP, 500Ca through 500Cp, 500DA through 500DP, 500Da through 500Dp, and 500EA through 500EP, 500Ea through 500Ep, FIGS. 5 through 25. In FIGS. 5 through 25, each goal element has a unique and consistent binary match of a code number and a text phrase. For example, referring to FIG. 5, performance standard goal element "PS.G1.1" 500BA is the code number and "develop questions to initiate research" 500Ba is the text phrase forming the unique and consistent binary match. The code numbers are for outcomes research and scientific research purposes. The text phrases will be viewable to learners, whereas the code numbers will be hidden. The goal elements listed in FIG. 5 through 25 are illustrative, and represent a partial list, of goal elements 500A through 500E to demonstrate to one with ordinary skill in the art how to make goal element lists 400A through 400E. Goal elements are derived from research of one with ordinary skill in the art of various literature and theories drawn from neuroscience, psychology, sociology, philosophy, occupational therapy, education, and self-regulated professions. The goal element lists 400A through 400E as illustrated in FIGS. 5 through 25, and the goal elements 500A through 500E as illustrated in FIGS. 5 through 25 are merely illustrative and represent how one with ordinary skill in the art can make complete lists of goal element lists and goal elements which may be updated and modified over time.

Competency based goals 200, as illustrated in FIG. 1, are depicted in detail as examples 200Z1, 200Z2, 200Z3, and 200Z4 illustrated in FIGS. 26 through 29. For example, the following competency based goals can be set across a wide age span and broad scope of learning: As illustrated in FIG. 26, "I, [audiology learner's name], will discover patterns in information to understand the vocational effects of hearing impairment with 90% accuracy through journal club because it interests me." 200Za; "I, [clinical and translational research learner's name], will assess the benefits of proposed solutions to develop protocols utilizing management of information using computer technology with moderate assistance through mentor meetings because I want to succeed." 200Zb; "I, [dentistry learner's name], will revise communications to improve clarity to order appropriate laboratory, radiographic, and other diagnostic tests as indicated, including biopsy of suspicious oral lesions with 100% accuracy through simulated skills training because I want to master it." 200Zc; "I, [dietetic learner's name], will conduct research to evaluate ideas to explain the impact of a public policy position on dietetics practice with minimal assistance through self-directed learning because I enjoy it." 200Zd; and, "I, [K-12 math learner's name], will discover patterns in information to describe important features of a data set with 90% accuracy using the Johnny Appleseed Survey because I want to beat my best score." 200Ze can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 27, "I, [K-12 science learner's name], will reason inductively from a set of specific facts to describe how friction affects the amount of force needed to do work over different surfaces with moderate assistance through observation because I want to know how it works." 200Zf; "I, [K-12 health education learner's name], will develop questions to initiate research to assess key nutrients and their specific functions and influences on body processes (e.g. disease, prevention) correctly 7 times out of 10 using self-directed learning because it interests me." 200Zg; "I, [engineering learner's name], will exchange ideas while recognizing the perspectives of others to understand orbital mechanics applications in astronautical engineering with moderate assistance through seminars because I want to know how it works." 200Zh; and, "I, [law learner's name], will evaluate relationships in ideas to understand the process for recognizing ethical dilemmas with minimal assistance through journal club because I want to feel better about myself." 200Zi can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 28, "I, [medical resident learner's name], will develop a plan of action to accomplish a goal to prioritize and stabilize multiple patients simultaneously with supervision through simulated skills training because I want to succeed." 200Zj; "I, [nurse practitioner learner's name], will develop questions to initiate research to perform a comprehensive assessment of mental health needs of a community with minimal assistance through a team building activity because I want to see the result." 200Zk; "I, [occupational therapy learner's name], will revise communications to improve clarity to articulate a clear and logical rationale for the intervention process correctly 7 times out of 10 through mentor meetings because I enjoy it." 200Zl; "I, [optometry learner's name], will reason inductively from a set of specific facts to understand the basic optical principles of low vision rehabilitation devices with 75% accuracy through case studies because it interests me." 200Zm; "I, [pharmacy learner's name], will discover patterns in information to manage medication use systems to participate in the development of health policy with moderate assistance through observation because I want to know how it works." 200Zn can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 29, "I, [physical therapy learner's name], will deliver a visual presentation for a variety of purposes and audiences to explain the rationale for selected interventions to achieve patient goals as identified in the plan of care with 100% accuracy through an interdisciplinary meeting because I want to beat my best score." 200Zo; "I, [speech-language pathology learner's name], will evaluate relationships in ideas to integrate information about swallowing disorder anatomy and physiology correctly 9 times out of 10 through simulated skills training because I want to know the cause." 200Zp; and, "I, [teacher learner's name], will develop a plan of action to accomplish a goal to present the subject matter in multiple, effective ways which are purposefully selected to engage every student in learning with minimal assistance using case studies because it makes me feel good." 200Zq can be set using the goal setting diagram as illustrated in FIG. 49, the goal element lists 400A through 400E as illustrated in FIGS. 5 through 25, and the goal elements 500A through 500E as illustrated in FIGS. 5 through 25.

The competency based goals, 200Z1, 200Z2, 200Z3, and 200Z4 as illustrated in FIGS. 26 through 29, are depicted as examples to demonstrate the competency based goals a multitude of learners can set using the goal setting diagram to sequentially browse the plurality of goal element lists to sequentially select the plurality of goal elements. As mentioned above, the goal element lists 400A through 400E as illustrated in FIGS. 5 through 25, and the goal elements 500A through 500E as illustrated in FIGS. 5 through 25 are merely illustrative and as such represent just a sample of competency based goals that learners can actually set using the system and method in FIG. 1.

If setting competency based goals is a manual method, the learner uses the goal setting diagram, FIG. 49, and selects the goal elements from the goal element lists in the following order: first, competency 500A; second, performance standard 500B; third, tools, media, activities, curriculum 500C; fourth, measurement 500D; and, fifth, motivator 500E, with a manual instruction sheet with prompts like "What competency skill would you like to work on?" in sequential order, and places each phrase into the goal setting diagram to set competency based goals. If setting competency based goals is an automated method, the learner uses the goal setting diagram, FIG. 49, and receives automatic prompts like "What competency skill would you like to work on?" in sequential order: first, competency 500A; second, performance standard 500B; third, tools, media, activities, curriculum 500C; fourth, measurement 500D; and, fifth, motivator 500E, and places each phrase into the goal setting diagram to set competency based goals, and each goal element is automatically placed into the correct field of the goal setting diagram and displayed to the learner as the goal is being set.

To share some advantages, setting competency based goals 200 as illustrated in FIG. 1, using the goal setting diagram 300A as illustrated in FIG. 49, the goal element lists 400A through 400E as illustrated in FIGS. 5 through 25, and the goal elements 500A through 500E as illustrated in FIGS. 5 through 25 include the following: Each goal element supports occupational performance achievement based upon research of evidence in the field; having the learner include each goal element in setting his/her competency based goals increases the likelihood of achieving goals; providing the learner with text phrases supports successful goal setting and teaches one how to set effective goals; self-set goals by learners are perceived as more relevant and important which increases the likelihood of achievement; the goals are individualized to the learner's needs and interests which facilitates achievement and enables teachers and mentors to tailor and individualize the learning process; defines the purpose of what the learner is learning and shapes the execution of action to learn; enables goal setting for any learner who is participating in any competency based, often called standards based, learning including, but not limited to: audiology, clinical and translational research, dentistry, dietetics, kindergarten through 12th grade public education, engineering, law, medicine, nurse practitioner, occupational therapy, optometry, pharmacy, physical therapy, speech-language pathology, and teachers; enables outcomes based research across a wide age span and broad scope of education; and finally, enables scientific research across a wide age span and broad scope of education. A limitation of the method is that it does not apply to non-competency based education such as a masters of business administration, a bachelor of arts in history, or a doctorate in philosophy. If, however, such education programs establish competency based performance skills for the learning that is to occur, as opposed to content based education, then the method applies.

Figure 30:
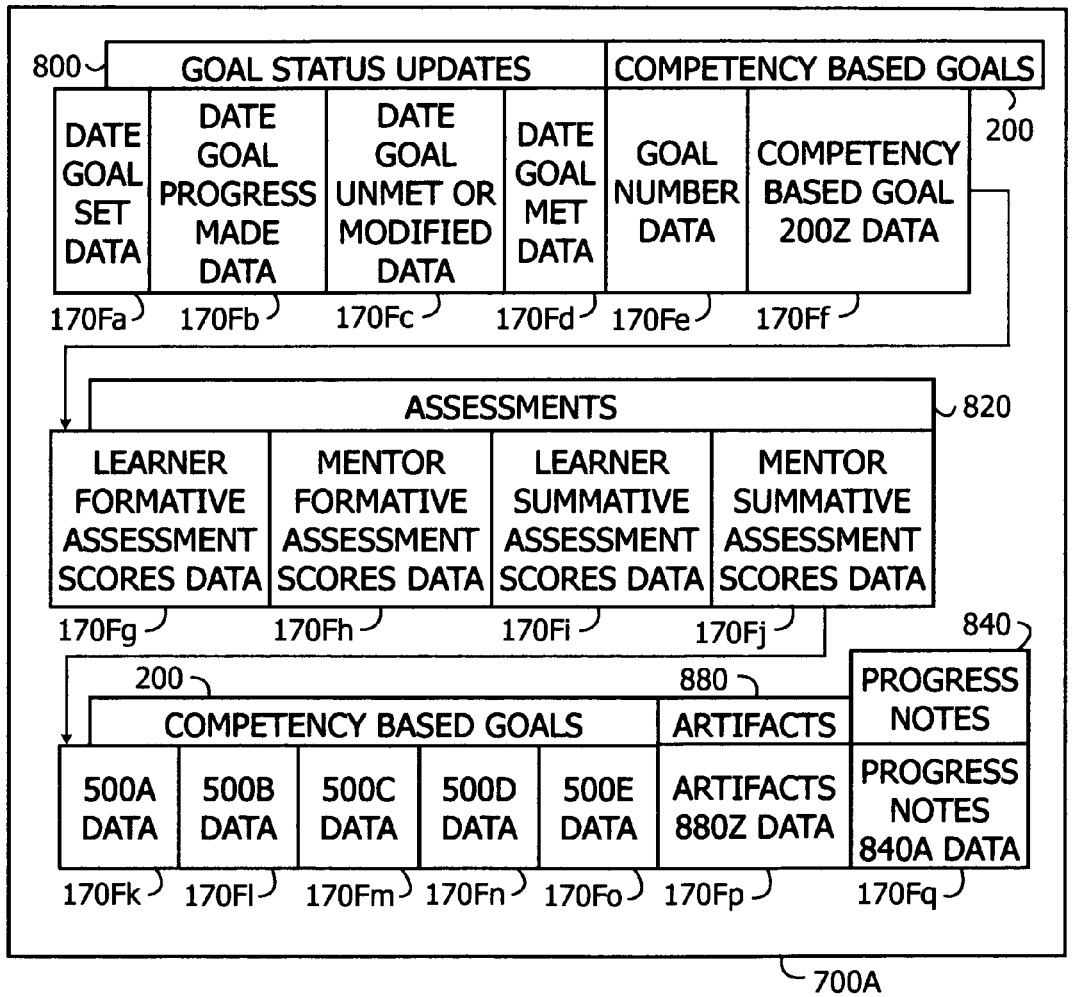
FIG. 30 illustrates one embodiment of a performance record.

Second, as illustrated in FIG. 1, recording performance in the performance record 700 involves making the performance record 700 including competency based goals 200, goal status updates 800, progress notes 840, assessments 820, and artifacts 880. As illustrated in FIG. 30, in the present embodiment, the performance record 700 is a spreadsheet including the following: Competency based goals 200 with occupational performance data fields for "goal number data" 170Fe, "competency based goal 200Z data" 170Ff, "500A data" 170Fk, "500B data" 170Fl, "500C data" 170Fm, "500D data" 170Fn, and "500E data" 170Fo. The goal number data 170Fe occupational performance field will prompt the learner to categorize the goal as a short-term goal or a long-term goal, record this response and assign a goal number based upon the number of goals the learner has written related to that competency goal element 500A from FIGS. 9 through 25. The competency based goal 200Z data 170Ff occupational performance data field imports the competency based goal 200Z data, like the examples given in 200Z1, 200Z2, 200Z3, and 200Z4, FIGS. 26 through 29. For example "I, [audiology learner's name], will discover patterns in information to understand the vocational effects of hearing impairment with 90% accuracy through journal club because it interests me." 200Za from FIG. 26 which the learner set by using the goal setting diagram 300A illustrated in FIG. 49. Returning to FIG. 30, the 500A data 170Fk occupational performance data field captures the 500A unique and consistent binary match of the code number and text phrase, as illustrated in FIGS. 9 through 25. For example, using the audiology learner's goal immediately above, the 500A data 170Fk occupational performance data field captures the code number "CS.ASHAa.2.3.2" 500AaB from FIG. 9, and the text phrase "understand the vocational effects of hearing impairment" 500Aab from FIG. 9. Referring to FIG. 30, the 500B data 170Fl occupational performance data field captures the 500B unique and consistent binary match of the code number and text phrase, as illustrated in FIG. 5. For example, using the audiology learner's goal immediately above, the 500B data 170Fl occupational performance data field captures the code number "PS.G1.28" 500BC from FIG. 5, and the text phrase "discover patterns in information" 500Bc from FIG. 5. Referring to FIG. 30, the 500C data 170Fm occupational performance data field captures the 500C unique and consistent binary match of the code number and text phrase, as illustrated in FIG. 6. For example, using the audiology learner's goal immediately above, the 500C data 170Fm occupational performance data field captures the code number "K.HC.1.4" 500CE from FIG. 6, and the text phrase "journal club" 500Ce from FIG. 6. Referring to FIG. 30, the 500D data 170Fn occupational performance data field captures the 500D unique and consistent binary match of the code number and text phrase, as illustrated in FIG. 7. For example, using the audiology learner's goal immediately above, the 500D data 170Fn occupational performance data field captures the code number "M.1.4" 500DE from FIG. 7, and the text phrase "with 90% accuracy" 500De from FIG. 7. Referring to FIG. 30, the 500E data 170Fo occupational performance data field captures the 500E unique and consistent binary match of the code number and text phrase, as illustrated in FIG. 8. For example, using the audiology learner's goal immediately above, the 500E data 170Fo occupational performance data field captures the code number "MV.1.2" 500EC from FIG. 8, and the text phrase "it interests me" 500Ec from FIG. 8.

If the performance record, FIG. 30, is the manual method, the learner will enter each competency based goal into respective competency based goal 200Z data 170Ff occupational performance data fields. The performance record is formated to aid the learner in placing the competency based goals in the correct fields. The learner will then indicate whether the competency based goal is a short-term goal or long-term goal and number the goal in the goal number data 170Fe occupational data performance field. If the performance record is the automated method, the learner's competency based goals will be automatically placed in the correct competency based goal 200Z data 170Ff occupational performance data fields which are mapped to the correct section of the formated performance record by the competency 500A goal element. The learner then receives a prompt, asking whether the goal is a short-term goal or long-term goal, answers the prompt, and the goal is automatically numbered. If the performance record method is manual, the teacher or mentor or other person will enter the correct codes and text phrases for 500A data 170Fk, 500B data 170Fl, 500C data 170Fm, 500D data 170Fn, and 500E 170Fo data. If the performance record is the automated method, the correct codes and text phrases for 500A data 170Fk, 500B data 170Fl, 500C data 170Fm, 500D data 170Fn, and 500E 170Fo data will be automatically populated to the appropriate occupational performance data fields.

To share some advantages, capturing the 500A through 500E, FIG. 5 through 25, code number and text phrase in the spreadsheet is designed to facilitate quantitative, qualitative, and mixed method outcomes research and scientific research. Importing the competency based goal 200Z data 170Ff allows the learner and mentor or teacher to quickly identify areas under which the learner has set and has not set competency based goals across the whole scope of competencies. This creates visual feedback for the learner and mentor or teacher to immediately identify areas where competencies are not being addressed, and the impetus to set competency based goals in other areas. Importing the competency based goal also creates a permanent record of the nature of the learner's experience and achievement. Additionally, the competency based goals are an important part of assessments which is discussed in detail below.

Continuing with FIG. 30, in the present embodiment, the performance record 700 is the spreadsheet which also includes goal status updates 800 with occupational performance data fields for "date goal set data" 170Fa, "date goal progress made data" 170Fb, "date goal unmet or modified data" 170Fc, and "date goal met data" 170Fd. The goal status updates 800 occupational performance data fields 170Fa through 170Fd are formatted as mm/dd/yyyy dates.

If the performance record is the manual method, the learner will enter the goal status updates 800 for goal set data 170Fa, date goal progress made data 170Fb, date goal unmet or modified data 170Fc, and date goal met data 170Fd by reviewing all competency based goals on the performance record and manually entering the correct dates. If the performance record is the automated method, the learner will be prompted to enter the goal status updates 800 for each and every goal on the performance record, and enter the correct dates for goal set data 170Fa, date goal progress made data 170Fb, date goal unmet or modified data 170Fc, and date goal met data 170Fd.

To share some advantages, tracking progress by recording goal status updates helps the learner to focus on goal directed behavior and achievement of goals, helps the mentor or teacher to identify ways to support the learner's achievement and provide effective and specific feedback, helps to recognize and celebrate achievement which improves self-efficacy and is designed to drive further achievement. Additionally, the goal status updates data are useful for outcomes research and scientific research.

Figure 31:
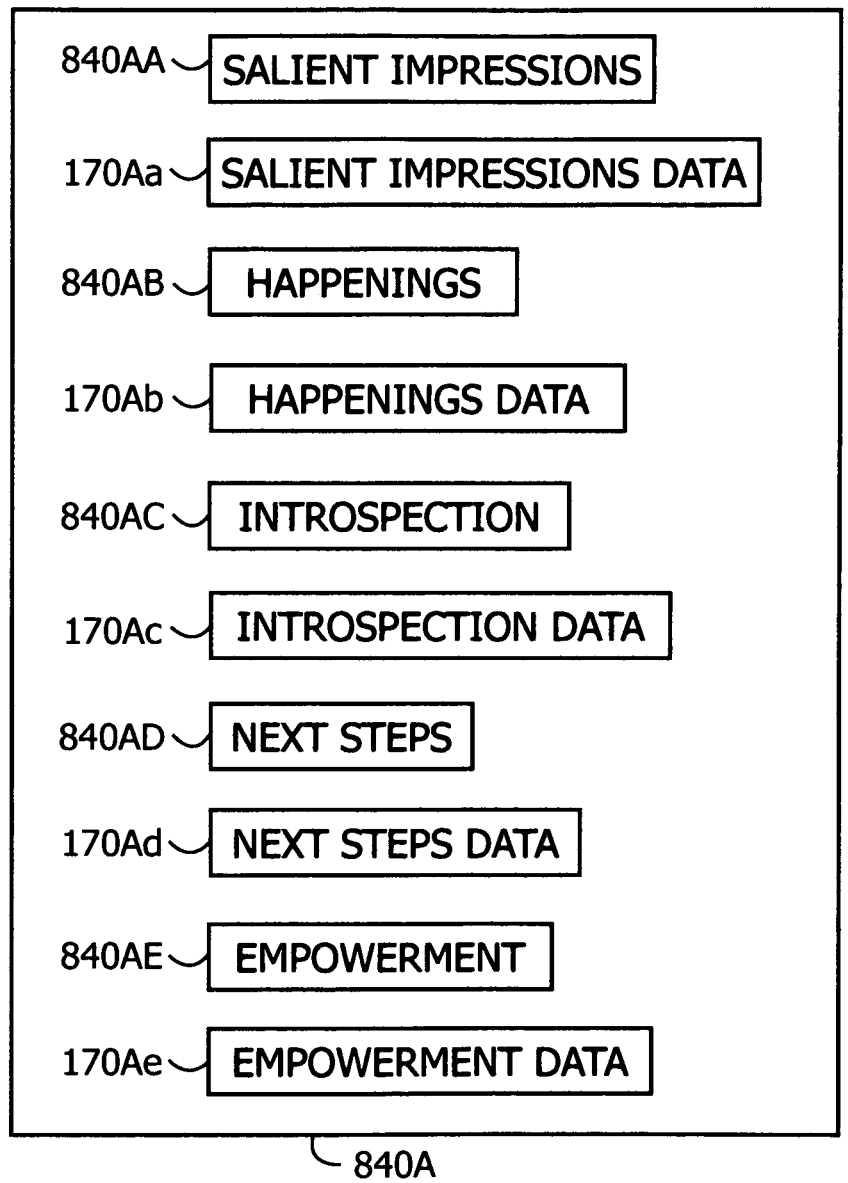
FIG. 31 illustrates one embodiment of a plurality of progress notes.

Continuing with FIG. 30, in the present embodiment, the performance record 700 is the spreadsheet which also includes progress notes 800, and related "progress notes 840A data" 170Fq. As illustrated in detail in FIG. 31, the example of progress notes 840A includes the following: salient impressions 840AA, salient impressions data 170Aa, happenings 840AB, happenings data 170Ab, introspection 840AC, introspection data 170Ac, next steps 840AD, next steps data 170Ad, empowerment 840AE, empowerment data 170Ae. Salient impressions 840AA includes a prompt to stimulate the learner's thinking which presently asks, "Can you describe your subjective reactions to your experience this week? What did you experience as important, remarkable, or striking in nature? Did you have any strong emotional reactions to an experience this week? If so, describe your reaction and the impression it left upon you. What will you remember most about what you experienced this week?" Salient impressions data 170Aa is a text box which allows the learner to enter free form text. Happenings 840AB includes a prompt to stimulate the learner's thinking which presently asks, "What events took place this week? What were the facts and circumstances surrounding those events? Can you describe the context in which the events occurred? What was unique or different about the event? How will this event help you to understand what you do next time under a somewhat different set of facts and circumstances? In what way was this event similar or different than your other experiences? To what degree was the experience similar or different?" Happenings data 170Ab is a text box which allows the learner to enter free form text. Introspection 840AC includes a prompt to stimulate the learner's thinking which presently asks, "What did you learn this week? What did you learn from what you observed, or when you performed a task, or when you discussed your observations or performance with your mentor, teacher, peers, or others? What did you learn from what you researched, read, analyzed, and wrote? What did you learn by noticing what/how others performed, avoided performing, or failed to perform properly? Are you working towards meeting your short-term goals? Did you meet a short-term goal? Do you need to modify a short-term goal because something has changed? Do you need to discontinue or discharge a goal because it has become irrelevant, impossible, or impractical to meet? Do you need to set a new short-term goal? Do you want to continue working on the same short-term goal, but in the context of a new assignment? Consider these questions related to your long-term goals." Introspection data 170Ac is a text box which allows the learner to enter free form text. Next steps 840AD includes a prompt to stimulate the learner's thinking which presently asks, "What are the preparatory actions that you need to take to achieve your current short-term and long-term goals? What does your list of 'Things to Do' include for the next week or two? Are there any systems or procedures that you need to identify, have access to, or understand to meet your goals? What can you do to ensure that time, effort, and resources are allocated effectively to enable you to complete your work?" Next steps data 170Ad is a text box which allows the learner to enter free form text. Empowerment 840AE includes a prompt to stimulate the learner's thinking which presently asks, "What do you now possess the capacity or authority to do? About what experience can you now claim, 'I did it!'? How did you experience a small measure of success this week? What kind of personal achievement do you have to celebrate?" Empowerment data 170Ae is a text box which allows the learner to enter free form text.

If the performance record is the manual method, the learner will have the progress note template with the 840AA, 840AB, 840AC, 840AD, and 840AE prompts to stimulate the learner's thinking, and a formated progress note listing salient impressions 840AA, happenings 840AB, introspection 840AC, next steps 840AD, and empowerment 840AE as headers, each with space for the learner to enter free form text 170Aa, 170Ab, 170Ac, 170Ad, and 170Ae data, respectively. If the performance record is the automated method, the learner will have a progress note formated with the headers salient impressions 840AA, happenings 840AB, introspection 840AC, next steps 840AD, and empowerment 840AE as headers, each with space for the learner to enter free form text 170Aa, 170Ab, 170Ac, 170Ad, and 170Ae data, respectively. If the learner needs to review the prompts to stimulate thinking, he or she will hover over the relevant header and the relevant prompt will appear, and then disappear as the learner move the cursor to enter free form text.

To share some advantages, the progress notes facilitate organization, planning, reflection and execution of occupational performance and build self-efficacy for the learner. The progress notes allow the teacher, mentor and others to have a window into the experience and mental thought processes of the learner, many experiences of which may occur when the teacher, mentor, and others are not in a position to observe the learning and achievement that is occurring. The progress notes can serve as a springboard for group discussion. The progress notes also produce useful data for outcomes research and scientific research.

Continuing with FIG. 30, in the present embodiment, the performance record 700 is the spreadsheet which also includes assessments 820 with occupational performance data fields for "learner formative assessment scores data" 170Fg, "mentor formative assessment scores data" 170Fh, "learner summative assessment scores data" 170Fi, and "mentor summative assessment scores data" 170Fj. The mentor or teacher can establish a scoring rubric of his or her choice. A Likert scale with numeric scores 1 through 5, or a version of the Dreyfus scale with level of skill acquisition number scores 1 through 5, or another scoring rubric with at least some evidence of validity and reliability may be used. Additional mentor formative and summative assessment occupational performance data fields may be added if the learner would like to have more than one mentor or teacher participate in assessments.

If the performance record is the manual method, the learner will enter a numeric score in the appropriate formative or summative assessment occupational performance data fields, following instructions for the scoring rubric chosen by the teacher, mentor, or other, along with instructions for completion deadlines and meeting with respective teachers or mentors to compare scores and discuss feedback. Any mentors or teachers involved with respective learners will also enter a numeric score in the appropriate formative or summative assessment occupational performance data fields, following the scoring rubric and instructions. If the performance record is the automated method, the learner will enter a numeric score in the appropriate formative or summative assessment occupational performance data fields, following instructions for the scoring rubric chosen by the teacher, mentor, or other, along with instructions for completion deadlines and meeting with respective teachers or mentors to compare scores and discuss feedback. The learner will receive a prompt if any data fields are left blank and the learner will not be allowed to enter a score not listed on the instruction sheet, such as a "1.5" if the scoring rubric instructs to only use whole numbers. The learner will receive automatic reminders to complete the assessment before the deadline, and if necessary, continued reminders to complete the assessment if the deadline passes. Any mentors or teachers involved with respective learners will also enter a numeric score in the appropriate formative or summative assessment occupational performance data fields, following the scoring rubric and instructions. The mentor or teacher will receive a prompt if any data fields are left blank and the mentor or teacher will not be allowed to enter a score not listed on the instruction sheet, such as a "1.5" if the scoring rubric instructs to only use whole numbers. The mentor or teacher will receive automatic reminders to complete the assessment before the deadline, and if necessary, continued reminders to complete the assessment if the deadline passes.

To share some advantages, the formative and summative assessment scores reflect occupational performance in authentic environments observed over a period of time. The formative and summative assessments inherently afford weighting to the competency skills by listing the learner's specific competency based goals 200 in lieu of the endless need to create behavioral anchors or qualifiers around performance skills which is problematic, or confounding, or unsustainable. The formative and summative assessments allow the learner to self-score his or her own occupational performance along with his or her mentor or teacher. Accurate self-assessment is very important for members of self-regulated professions who must decide whether they possess minimum competency to perform a specific task safely and independently, or pose risk to their patients or clients. Accurate self-assessment is also very important for determining what future goals any learner should consider for himself or herself. The learner must accurately grasp his or her current occupational performance abilities to effectively set future goals as a life-long learner. The formative and summative assessment encourages the learner and mentor or teacher to exchange dialogue and share feedback about the learner's performance with a specific, objective approach.

Continuing with FIG. 30, in the present embodiment, the performance record 700 is the spreadsheet which also includes artifacts 880, and related "artifacts 880Z data" 170Fp. As illustrated in detail in FIG. 32, the example of artifacts 880Z includes the following: "my presentations" 880ZA, "my reports and publications" 880ZB, "my tests, evaluations, and assessments" 880ZC, "my personhood" 880ZD, "my awards and recognition" 880ZE, "my vocational interests" 880ZF, "my career opportunities" 880ZG, "my resume" 880ZH, "my letters of recommendation" 880ZI, "my contacts" 880ZJ, "my continuing education" 880ZK, and "my licenses, certification, and special training" 880ZL. My presentations 880ZA, for example, may include any written presentations, speeches, or audiovisual presentations the learner gives. My reports and publications 880ZB, for example, may include book reports, term papers, poems, short stories, newspaper editorials or articles, doctoral thesis, journal articles, books, chapters, and the like, that the learner produces. My test, evaluations, and assessments 880ZC, for example, may include standardized assessment scores, any tests or quizzes, mid-term and final exams, oral exam results, simulated skills training results, standardized examination results (SAT, ACT, LSAT, GRE, GMAT, etc.), board scores, annual performance evaluations, physical/functional capacity evaluations, vision tests, driving tests, drug screens, criminal background checks, and so forth of the learner. My personhood 880ZD, for example, may include results of items illustrated in FIG. 35 which will be discussed in detail below, such as an Interest inventory 940Bb, a Role Checklist 940Bc, a Myers-Briggs type indicator 940Bd, a Social Style profile 940Be, and a Flower Exercise 940Bf, as well as other personhood items such as familial cultural or historical items and so forth that are significant to the learner. My awards and recognition 880ZE, for example, may include trophies, scholarship awards, metals, ribbons, certificates of achievement, plaques, leadership positions, and so forth of the learner. My vocational interests 880ZF, for example, may include results of items illustrated in FIG. 44 which will be discussed in detail below, such as explore vocations data as well as vocational interest items from career days, bring your child to work days, career guides, and so forth. My career opportunities 880ZG, for example, may include job ads, job leads, job postings, career guides, professional program literature, and so forth that interest the learner and for which the learner may be qualified or holds as a dream job. My resume 880ZH, for example, may include all historical resumes or curriculum vitae of the learner. My letters of recommendation 880ZI, for example, may include any letters of recommendation, letters of commendation, letters of reference, letters of support and so forth of the learner. My contacts 880ZJ, for example, may include any contact information of any persons or entities that may assist the learner with vocational exploration, vocational readiness, vocational opportunities, vocational counseling, vocational mentoring, and so forth that the learner collects. My continuing education 880ZK, for example, may include any continuing education certificates, attendance records, brochures about future courses, workshops or seminars and so forth of the learner. My licenses, certification, and special training 880ZL, for example, may include professional licenses, board certifications, letters of reciprocity, visitor status, specialized training certificates, documentation related to good standing or adverse actions, reprimands, removal, or re-installment of license or certification and so forth of the learner.

If artifacts is the manual method, the learner will collect all artifacts in a designated artifacts folder. If artifacts is the automated method, the learner will collect all artifacts in a designated electronic folder.

To share some advantages, learners must be taught how to prepare for work force readiness. Artifacts 880Z constantly reminds learners to think in terms of how their occupational performance impacts their vocational opportunities. Artifacts 880Z drives vocational exploration, vocational planning, and vocational attainment. Competency goal elements 500A, as illustrated in FIGS. 9 through 25, of many programs from K-12 through professional programs specifically include competency requirements related to vocational exploration, planning, and attainment. The learner can produce or collect various artifacts 880Z and store them in the performance record 700 section for artifacts to show achievement of self-set competency based goals related to vocations in artifacts 880Z. Learners, especially those who have limited role models, can start to envision themselves pursuing various vocations and generate feedback and solicit guidance from mentors, teachers, peers, and others. Artifacts 880Z helps organize learners and helps them manage the task of continuously collecting artifacts related to vocations. Any learner who has submitted a bar application, updated an academic curriculum vitae, or submitted a college application, or applied for a competitive job, or run for a leadership position understands the daunting task of collecting relevant artifacts of one's achievements and the benefits of organization and planning.

Figure 33:
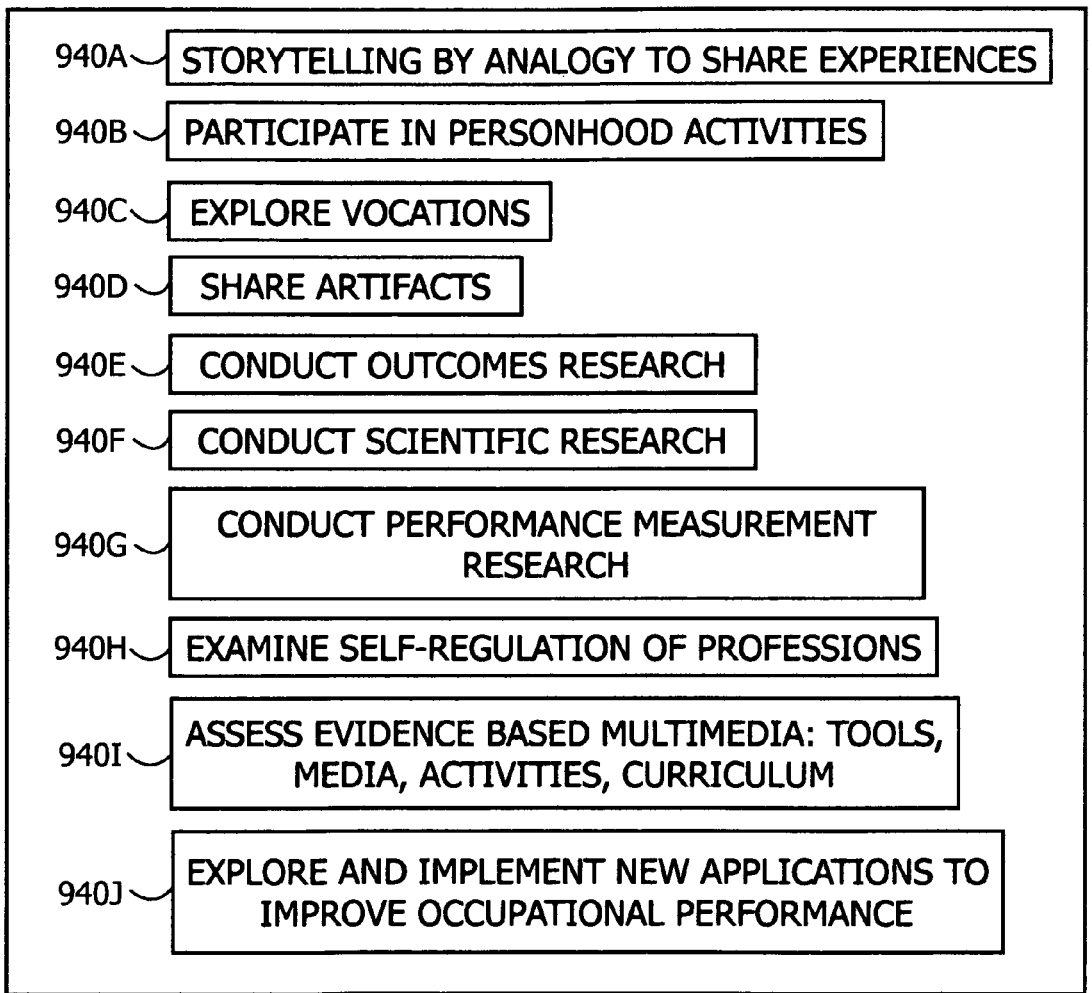
FIG. 33 illustrates one embodiment of a plurality of community activities.
Figure 48:
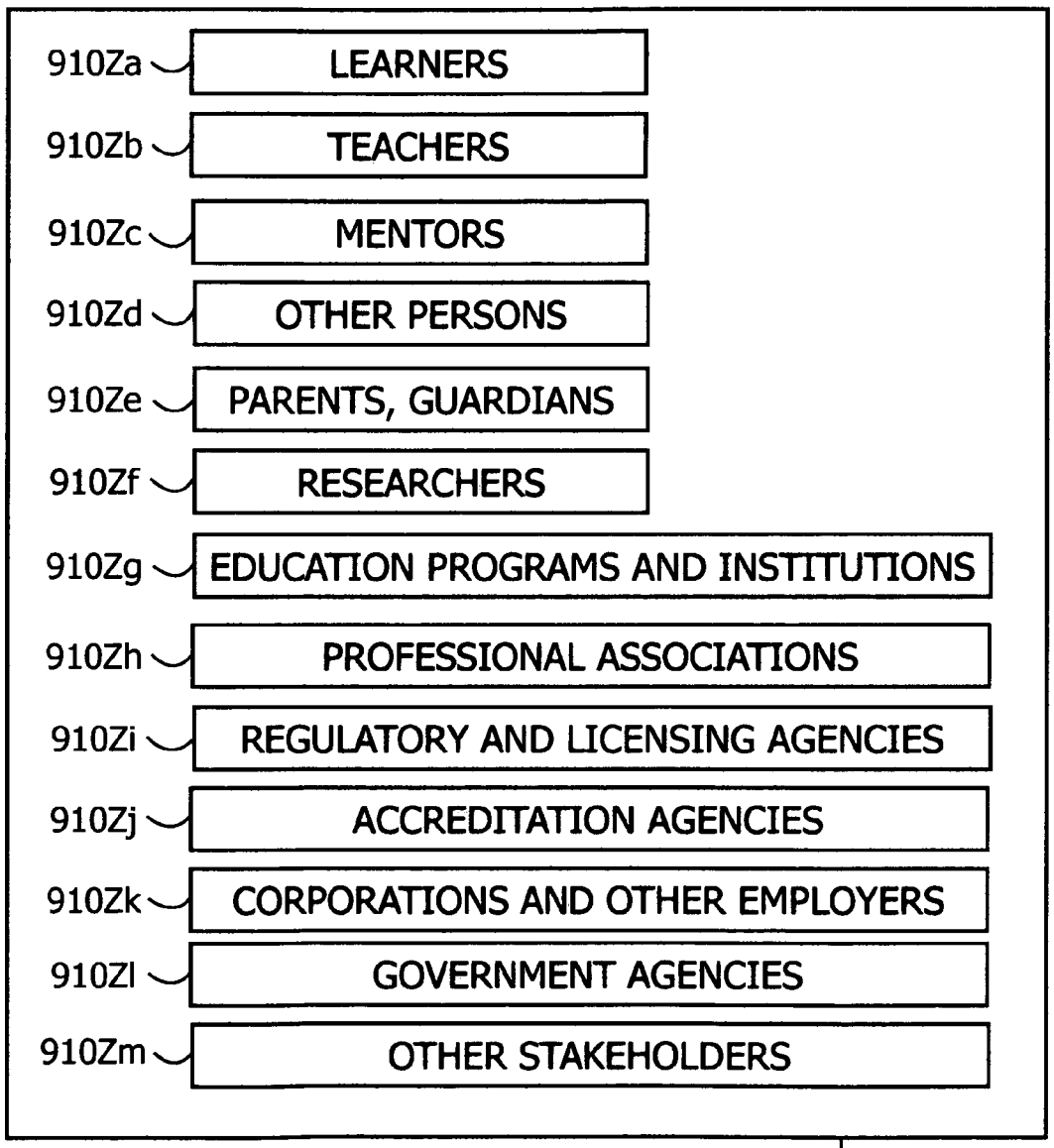
FIG. 48 illustrates one embodiment of a plurality of community members.

Third, as illustrated in FIG. 1, interacting in the community of practice 900 involves making the plurality of community activities 940 for the plurality of community members 910 to engage in, and sharing aspects of the performance record 700, and performing a multitude of a storage, retrieval, and operation 125 of the multitude of combinations 970 of research approaches using the occupational performance data fields 170 to improve occupational performance 102 of the community of practice 900. The method is iterative and continuous. As illustrated in FIG. 48, in the present embodiment, the community members 910Z include the following: learners 910Za, teachers 910Zb, mentors 910Zc, other persons 910Zd, parents, guardians 910Ze, researchers 910Zf, education programs and institutions 910Zg, professional associations 910Zh, regulatory and licensing agencies 910Zi, accreditation agencies 910Zj, corporations and other employers 910Zk, government agencies 910Zl, and other stakeholders 910Zm. As illustrated in FIG. 33, in the present embodiment, the community activities 940Z include the following: storytelling by analogy to share experiences 940A, participate in personhood activities 940B, explore vocations 940C, share artifacts 940D, conduct outcomes research 940E, conduct scientific research 940F, conduct performance measurement research 940G, examine self-regulation of professions 940H, assess evidence based multimedia: tools, media, activities, curriculum 940I, explore and implement new applications to improve occupational performance 940J.

Continuing with FIG. 33, in the present embodiment, community activities 940Z include storytelling by analogy to share experiences 940A. As illustrated in detail in FIGS. 34 and 50, the example of storytelling by analogy to share experiences 940A1 and 940A2 includes the following: sounding the horn 940Aa, sounding the horn data 170Ga, playing leap frog in the night 940Ab, playing leap from in the night data 170Gb, burning just one flashlight 940Ac, burning just one flashlight data 170Gc, modified leap frog: walking together 940Ad, modified leap frog: walking together data 170Gd, running together on white gravel 940Ae, running together on white gravel data 170Ge, dew-covered spider webs 940Af, dew-covered spider webs data 170Gf, wolves howling in the distance 940Ag, wolves howling in the distance data 170Gg, questioning the compass's reliability 940Ah, questioning the compass's reliability data 170Gh, lessons learned from your handbook 940Ai, lessons learned from your handbook data 170Gi, blazing "x's" on trees 940Aj, blazing "x's" on trees data 170Gj, finding your fresh water stream 940Ak, finding your fresh water stream data 170Gk, growing accustomed to the night 940Al, growing accustomed to the night data 170G1, sharing stories back at base camp 940Am, and sharing stories back at base camp data 170Gm. The following allegory, Finding Your Way: The Lessons of Experience, from Preserving the Social Contract, B. A. Wright (2009), accompanies 940A:

The guide master grouped us in pairs, with one novice and one experienced trail-blazer per team. She told us to gather two canteens of water, two energy snacks, two flash lights with new batteries but no back-up batteries allowed, a Swiss Army knife, and one compass. Additionally, the guide master supplied each of us with a "rape horn," instructing us to use it only in the event of a serious emergency. Upon sounding your "rape horn," you must know that SWAT Rangers will be immediately dispatched via helicopter to extract you from the woods, she explained Just after dusk, each team is dropped in a different location deep in the woods of Ozark Mountain country. The guide master handed my team the following instructions on an index card: "Travel due northeast until you meet a white gravel road Take the white gravel road due southeast until it forks. At the fork, set your compass due southwest and travel until you reach the stream. Traveling near the bank, head up stream until you reach the base camp. When your team reaches the base camp, you have succeeded"

The time is now 8:00 p.m., it is pitch dark, the moon is almost full, the stars are shining bright against the clear sky, the temperature is about fifty degrees, and the leaves have begun to fall from the trees. While orienteering at night, in pairs of two, the most effective method for staying on course is playing "leap-frog." Leap frog is a method where one member of the team sets the compass, in this case due northeast, then holds the flashlight under the compass, and points the light in the same direction as the needle on the compass. The light will inevitably shine on a tree since the woods are so dense. One member of the team will leap ahead to reach the target tree, while the other team member remains behind shining the light on the target tree. Only after the first member reaches the target tree by blazing ahead alone, will the light-shedding member leap to catch up.

As you begin this process, you both realize that there are other decisions you must make. Even the experienced member of your team has only been orienteering in the daytime in a team of four, so the challenges presented in this situation are somewhat different than prior experience. You must decide whether the trail-blazer should burn the second flashlight as he or she forges ahead, and when the light-shedder is catching up. You start wondering how long your journey will take, how long your flashlights will burn, and realize that you were not told how long you would be in the deep woods. A bit of fear of the unknown sets in as you realize that you don't know how long it will take to succeed in finding the base camp. Together, you decide to conserve your resources and burn just one flashlight at a time. You know this is the right decision, but as you implement this decision, you realize it has its drawbacks as well. The trail-blazer is forging through the thickness of the brush, fallen leaves and branches, with nothing to light the path, only a beam shining on the target tree. Leaping ahead in the darkness requires courage, a keen alertness, and an agile posture over the unsteady terrain. Staying behind as light-shedder bears its own unique experience—technical accuracy in finding a good target, determining how far ahead that target should be, waiting patiently as your partner reaches the target, and the growing sense of loneliness as your only human contact slips away into the darkness.

While you both know that playing leap frog is the most effective method for accurately staying on course, it is very slow-going and is starting to take its physical and emotional toll on you as the night wears on. Together, you decide to modify the method. You agree to set the compass, shine the light, and walk together toward the target tree. This feels better. The loneliness and fear of the night start to subside as you find friendship while traveling together. The light-shiner realizes that maintaining the beam on the target tree is much more difficult while navigating over the rugged terrain and talking. You find yourselves heading in the general direction in which you shined the light and checking your compass more frequently because maintaining the target it more elusive while walking. Finally, one of you expresses concern about not hitting the white gravel road yet and questions whether traveling together might be throwing you off course. Together, you agree to resume the playing leap frog.

Together, you reach the white gravel road at 11:30 p.m. and you're ecstatic. You did it together! You quickly check your compass to see which direction is southeast. Fabulous! You head straight down the gravel road. You are walking briskly now, no need to check the compass until you hit the fork in the road. Just the physical space around your body created by the road, pushing the trees back into the woods, allow you to breathe easier. The rhythm of your pace, the speed of your progress, and the joy of your success, are all celebrated together.

Suddenly, you reach the fork in the road, and the path you are directed to take is neither left nor right, but rather due southwest. Yes, it is time to set your compass and head back into the woods. You swell up with emotion as the thickness of woods seems to invade your space. Together, methodically, you start playing leap frog again. It is not long before your first flashlight grows dim, too dim to reach the target tree, so you begin to burn the second flashlight. Again, trail-blazer and light-shedder are working in tandem to achieve the goal. As the light-shedder aims for the next target, the beam shines brilliantly on an enormous spider web. It must be four feet wide. The amazingly intricate web is covered with drops of dew, sparkling in your light. A large fury spider sits dead-center in his web. You usually don't like spiders, but strangely enough, you're happy to see something besides your partner, the moon, and the endless sea of trees. Even though the web is blocking your path toward your next target tree, you decide not to destroy something so beautiful. Together, you realize that it is okay sometimes to be thrown a little off course.

Fatigue is setting in. The time is now 1:18 a.m. Wolves begin howling in the distance. It is almost impossible to pinpoint the direction of the threat because their howl is bouncing off the mountainside. You are glad you have your rape horn. You feel for it against your chest, reassured that it still hangs around your neck, even though you've felt it bumping against your chest with every step since your journey began. You don't want to be the team that calls in the Rangers, so you vow not to sound the alarm unless the threat becomes imminent.

The night is wearing on, and it is now 2:37 a.m. You never thought the guide master would leave you in the woods so long. The goal of finding the base camp starts to feel unattainable. Your senses are getting dull, the sounds of the night are impinging on your emotions, and the darkness of the night instills a sense of anguish. Together, you both start questioning the reliability of your compass. Surely, we should have reached the stream by now. You begin thinking through lessons learned in your orienteering handbook First, you remember that the compass never lies. The compass is a reliable instrument, gaining its direction from the unwavering pull of the North Pole. This theory is sound It will be questioned by those blazing trails, but this theory remains well-settled. Second, you remember the anecdotal story about people getting lost in the woods, traveling in circles, in their attempt to follow the moon, and realize the futility of relying on the moving target of the moon to direct your path. Third, you learned that the eastern hillside, as a general rule, has denser underbrush than the western hillside. As you compare the two for the first time, one hillside does seem denser than the other. This information, along with your reliable compass, provides reassurance that you are traveling in the right direction of your ultimate goal.

As you continue playing leap frog through the dark, you see a sign of an expert who has gone before you. A large "X" is blazed into a tree. This is an unmistakable sign, carved by the guide master, to renew your sense of hope and conviction that you are heading the right direction. Someday, when you have the expertise, you will confidently use your Swiss Army knife to blaze the trail and instill hope in other travelers. The time is now 3:24 a.m. Even though you are physically weary, the "X" brightened your emotions and gives you the energy to press on.

Now, you can finally hear it. The dancing sounds of fresh water rolling over rocks in the distance. With your second flashlight now growing dim, together you decide to turn it off and walk side by side in the darkness letting the sound of the stream serve as your guide. In no time, it seems, you reach the stream. You are overjoyed! This is worth celebrating! You are laughing, and crying, jumping up and down, and absolutely confident you are going to achieve your goal.

Together, you walk upstream along the bank. You are talking, reflecting on the events of the night, and sharing the glory of knowing that you did it together. Suddenly, you realize how accustomed you've grown to the darkness of the night and the thickness of the woods. The shadows of the moon and sounds of the wolves no longer play on your emotions. You have experienced all of it. And, the fear of the unknown is gone.

As the terrain becomes a steeper uphill climb, you and your partner occasionally find yourself placing your hand on a rock or branch to maintain control. Almost simultaneously, you gasp and cry out to each other as you see the glow of the base camp in the distance. You are scrambling uphill faster now. As you reach the site, the camp is lit by make-shift luminaries from cut open milk jugs filled with candles all aglow. There is your guide master, sitting atop a large bolder, and two other teams to greet you. You exchange stories about your experiences and wait for the other three teams to arrive. The guide master leads the ceremony where everyone receives their award in commemoration of their success. Congratulations, you did it!

Figure 34:
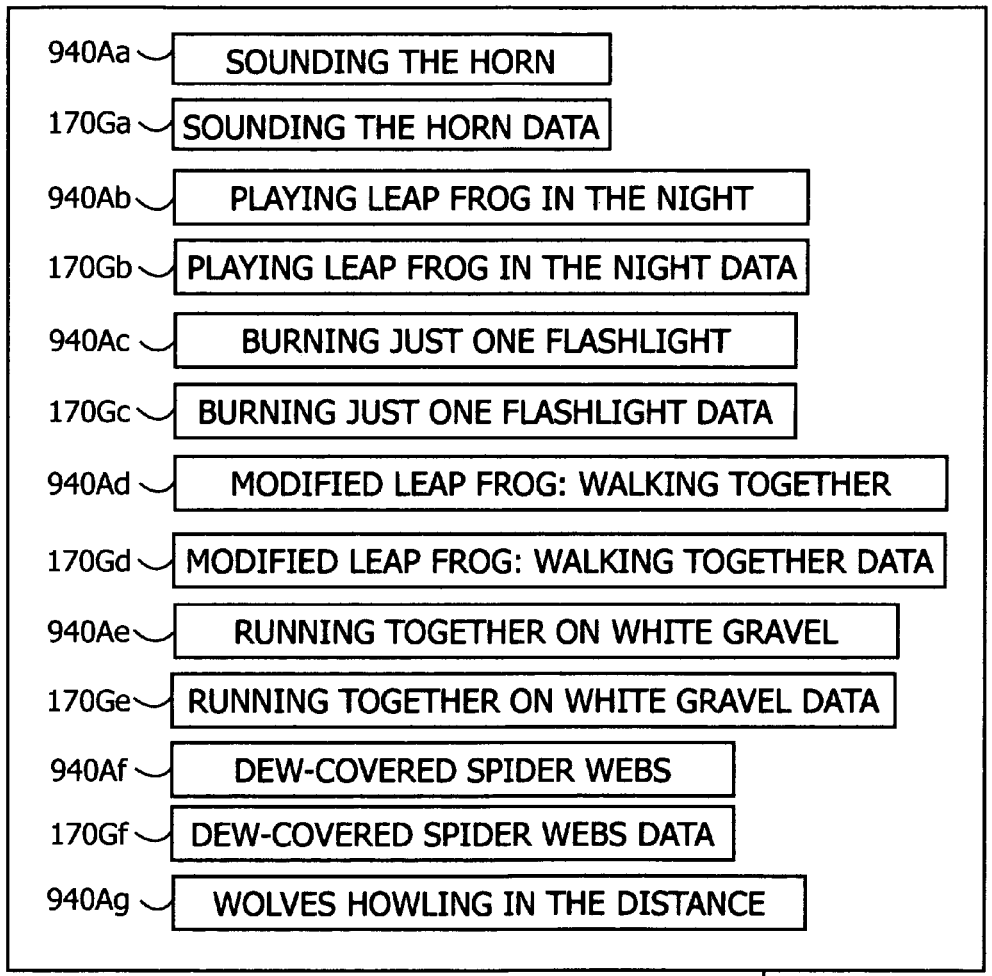

If storytelling by analogy to share experiences 940A, 940A1 and 940A2, FIGS. 33, 34 and 50, is the manual method, then the learner will enter free form text into a journal or text document under the 170Ga through 170Gm occupational performance data field sharing how the learner's own experience is analogous 940Aa through 940Am, FIGS. 34 and 50. The learner will share his or her experience with other members of the community of practice 900 including other community members 910, FIG. 1, such as learners, teachers, mentors, and others. The manual method will store all data in a retrievable form. If storytelling by analogy to share experiences 940A, 940A1 and 940A2, FIGS. 33, 34 and 50, is the automated method, then the learner will enter free form text into a chat room discussion board under the appropriate discussion string's 170Ga through 170Gm occupational performance data field sharing how the learner's own experience is analogous 940Aa through 940Am, FIGS. 34 and 50. The learner will share his or her experience with other members of the community of practice including community members 910, FIG. 1, such as other learners, teachers, mentors, and others through the automated discussion board. The chat room discussion board will be limited to a subset of the community of practice for active participation purposes, determined by the teacher or mentor. The automated chat room discussion board will list 940Aa through 940Am, FIGS. 34 and 50, as discussion strings under which learners can enter free form text in 170Ga through 170Gm occupational performance data fields to share how their experiences are analogous to the experiences in the story listed above. The chat room discussion board will have query functions for the teacher, mentor, or others to query the data, such as: the number of entries per learner per week, the number of learners making entries under various categories, the number of learners making entries under various categories on a per week basis over time, and so forth.

To share some advantages, storytelling creates a fluid approach for members of the community of practice to internalize a story and create a script of their unique learning experience. Symbolic representations, that is 940Aa through 940Am, FIGS. 34 and 50, facilitate experiential learning through enabling the learners to link their unique experience to symbols and share personal experiences with other members of the community of practice as part of the process of developing tacit knowledge. Storytelling allows teachers, mentors, and others to identify learners with significant psychosocial or even mental health problems that may require intervention. Storytelling allows teachers, mentors, and others to identify curriculum or resource needs of the learners, in real-time, and implement improvements to impact learning. Traditional approaches including end of course surveys fail to capture curriculum and resource needs in time to impact learning and often may fail to capture the learning needs at all if the survey sensitivity is weak or the learner limits his or her feedback. Storytelling allows learners to share experiences from their whole lives which impact learning; the interplay of familial relationships, the dynamics of competing life roles, financial issues, health issues, etc., are more readily shared and their impact felt as an integrated part of the learners' story of being on a path to acquire competency based skills. Storytelling lends itself to outcomes based research and scientific research to improve achievement of occupational performance. The storytelling by analogy to share experiences 940A creates opportunities, referring to FIG. 1, for community members 910 such as teachers, mentors, and others to lead community activities 940 within the community of practice 900 around storytelling by analogy to share experiences 940A, FIGS. 33, 34 and 50.

Continuing with FIG. 33, in the present embodiment, community activities 940Z include participate in personhood activities 940B. As illustrated in detail in FIG. 35, the example of participate in personhood activities 940B includes: a demographic survey 940Ba, a competency skill importance survey 940Bg, a competency skill relevance survey 940Bh, a competency skill interest survey 940Bi; and the following optional items: Interest Inventory 940Bb, Role Checklist 940Bc, Myers-Briggs type indicator 940Bd, Social Styles profile 940Be, the Flower Exercise 940Bf.

Figure 35:
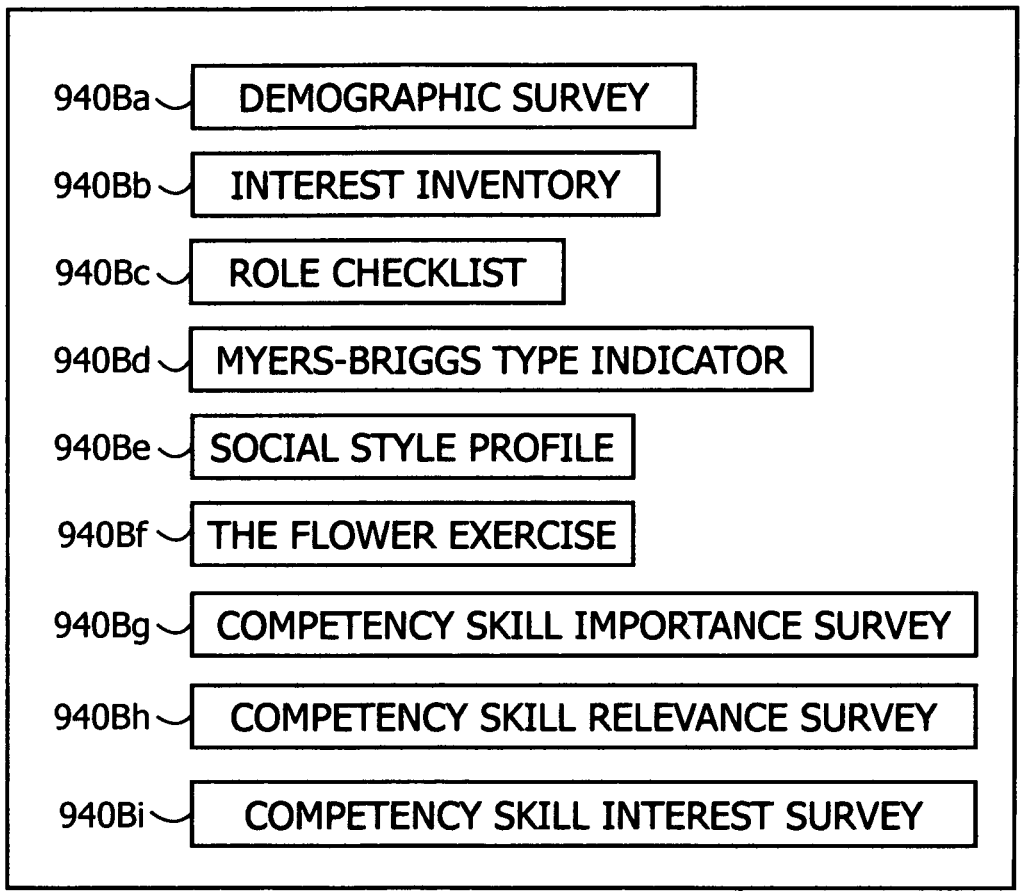
FIG. 35 illustrates one embodiment of a plurality of community activities, namely, participate in personhood activities.

If participate in personhood activities 940B, FIGS. 33 and 35, is the manual method, then the learner will complete the demographic survey 940Ba with demographic questions created by one with ordinary skill in the art. The learner will complete the competency skill importance survey 940Bg and competency skill relevance survey 940Bh which lists the competency 500A elements for the learner's competencies, like the competency text phrases listed in FIGS. 9 through 25 and the Likert scale, with instructions for the learner to score his or her perceived importance and relevance of each competency on the one through five point Likert scale. The learner will complete the competency skill interest survey 940Bi by ranking his or her perceived top ten most interesting competency skills as well as his or her perceived top ten least interesting competency skills form a list of the competency 500A elements for the learner's competencies, like the competency text phrases listed in FIGS. 9 through 25. If the teacher, mentor or other person has decided to have the learners complete any or all of the optional items of the personhood activities; namely, Interest Inventory 940Bb, Role Checklist 940Bc, Myers-Briggs type indicator 940Bd, Social Styles profile 940Be, the Flower Exercise 940Bf, then the learner will follow the instructions attached to each component to complete the personhood activities. The manual method will store all data in retrievable form. If participate in personhood activities 940B, FIGS. 33 and 35, is the automated method, then the learner will complete the demographic survey 940Ba with demographic questions created by one with ordinary skill in the art. The automated method will notify the learner if any fields are incomplete, request that the learner complete the survey, and store all data in retrievable form. The learner will complete the competency skill importance survey 940Bg and competency skill relevance survey 940Bh which lists the competency 500A elements for the learner's competencies, like the competency text phrases listed in FIGS. 9 through 25 and the Likert scale, with instructions for the learner to score his or her perceived importance and relevance of each competency on the one through five point Likert scale. The automated method will prevent the learner from circling more than one number on the five point scale and prevent the learner from marking the survey form halfway between two points on the five point Likert scale. The automated method will notify the learner if any fields are incomplete, request that the learner complete the survey, and store all data in retrievable form. The learner will complete the competency skill interest survey 940Bi by ranking his or her perceived top ten most interesting competency skills as well as his or her perceived top ten least interesting competency skills from the list of the competency 500A elements for the learner's competencies, like the competency text phrases listed in FIGS. 9 through 25. As the learner selects his or her most and least interesting competency skills one by one, the automated method will create the rank ordered list at the top of the electronic survey form. If the learner wishes to delete or change the rank order of a competency skill, the delete, drag, and drop functions of the automated method will allow the learner to modify his or her list. The automated method will notify the learner if any fields are incomplete, request that the learner complete the survey, and store all data in retrievable form. If the teacher, mentor or other person has decided to have the learners complete any or all of the optional items of the personhood activities; namely, Interest Inventory 940Bb, Role Checklist 940Bc, Myers-Briggs type indicator 940Bd, Social Styles profile 940Be, the Flower Exercise 940Bf, then the learner will follow the instructions attached to each component to complete the personhood activities. The learner will complete each optional survey as instructed, in an automated format. The automated method will notify the learner if any fields are incomplete, request that the learner complete the survey, and store all data in retrievable form.

To share some advantages, participate in personhood activities 940B allows the learner to identify competency skills he or she perceives as important and relevant. The learner's perception of importance and relevance in goal setting is correlated with achievement. If the learner lacks perceived importance and relevance of some competency skills, then teachers and mentors can work to align the learner's perceptions with the requirements of the program, course or degree that enumerates the competency skills, or at least provide consultation to the learner about the learner's likely potential satisfaction or persistence in occupational performance of skills which her or she finds unimportant or irrelevant. Conversely, teachers, mentors and others persons involved in a program, course, or degree may rightly question the rational for inclusion of a particular competency skill if a significant number of learners rate the competency skill as either unimportant or irrelevant. Diversity and disparity issues in education are important considerations, yet currently there are few methods to consider such issues, their impact on education, and recommendations to address reform. The participate in personhood activities 940B data can be used for outcomes research and scientific research to address diversity and disparity issues. The Interest Inventory 940Bb, Role Checklist 940Bc, Myers-Brigs type indicator 940Bd, Social Style profile 940Be, the Flower Exercise 940Bf, and competency skill interest survey 940Bi data can be used to identify and suggest possible vocational interests, and is discussed in greater detail below. The participate in personhood activities 940B creates opportunities, referring to FIG. 1, for community members 910 such as teachers, mentors, and others to lead community activities 940 within the community of practice 900 around personhood activities 940B, FIGS. 33 and 35.

Continuing with FIG. 33, in the present embodiment, community activities 940Z include explore vocations 940C. As illustrated in detail in FIG. 36, the example of explore vocations 940C includes: the plurality of community members, for example, a K-12 math student 910Ae, a clinical and translational research fellow 910Ab, and a practicing engineer 910Ah; multitude of combinations of each community member respectively, for example, 940Bb+940Bc+940Bd+940Be+940Bf+940Bi+170Fg+170Fh+170Fi+170Fj, 970De of the K-12 math student 910Ae, 940Bb+940Bc+940Bd+940Be+940Bf+940Bi+170Fg+170Fh+170Fi+170Fj, 970Db of the clinical and translational research fellow 910Ab, and, 940Bb+940Bc+940Bd+940Be+940Bf+940Bi+170Fg+170Fh+170Fi+170Fj, 970Dh of the practicing engineer 910Ah, are combined as combinations for exploring vocations 970D, and generate explore vocations data for K-12 math student 170De, explore vocations data for clinical and translational research fellow 170Db, and explore vocations data for practicing engineer 170Dh, occupational performance data fields for exploring vocations.

Figure 36:
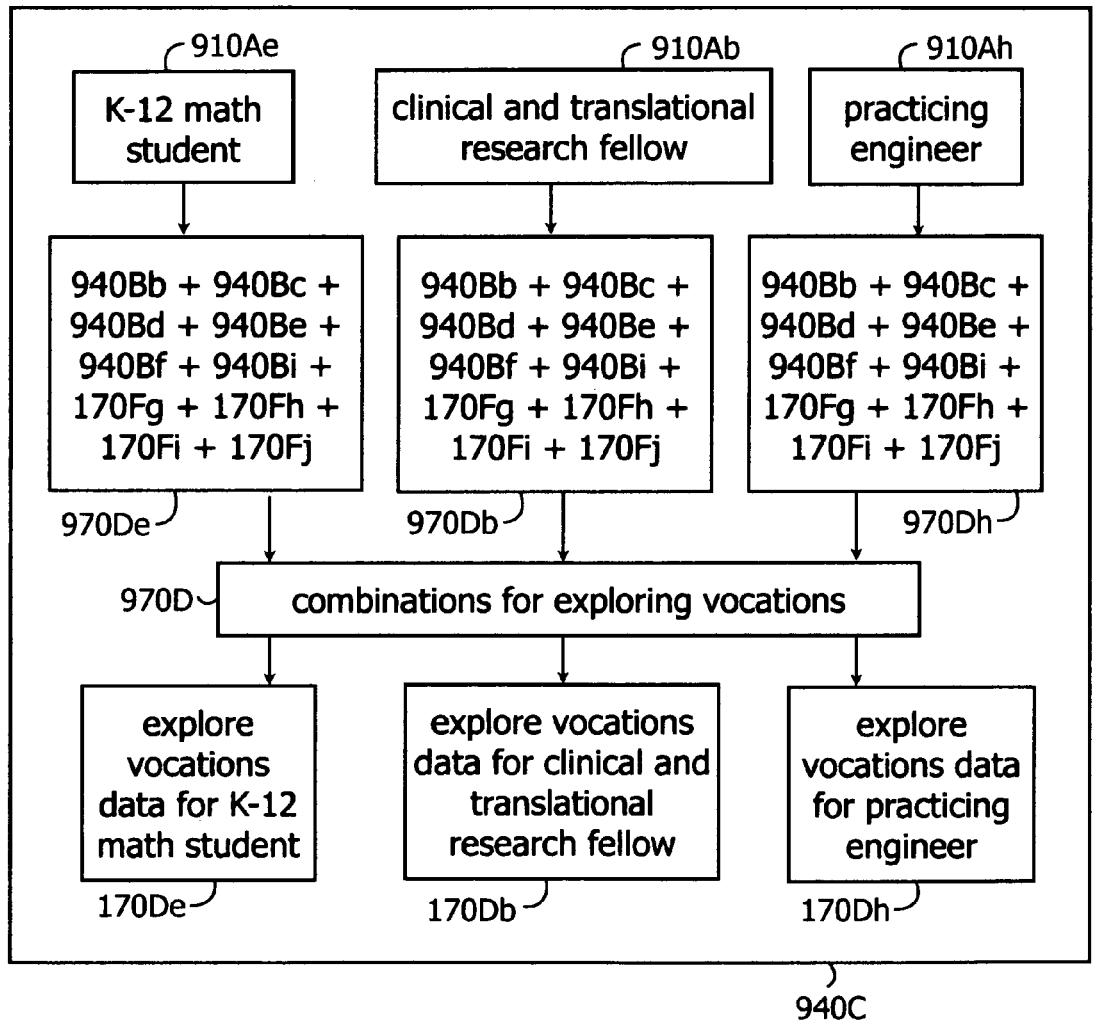
FIG. 36 illustrates one embodiment of a plurality of community activities, namely, explore vocations.

To further illustrate how exploring vocations works, referring to FIG. 36, assume the following hypothetical facts. The combinations for exploring vocations 970D searches to correlate and match occupational performance data fields across the plurality of community members 910. Assume the K-12 math student 910Ae expresses interest math, sports, and constructing things in the interest inventory 940Bb, Myers-Briggs type indicator 940Bd of "INTP" (I=Introvert, N=Intuitive, T=Thinker, P=Perceiver), Social Style profile 940Be of "Analytical-Analytical," and competency skill interest survey 940Bi that identifies 500A type, FIG. 49, hypothetical competency goal elements in math related to levers, force, statistics, probability testing, and generating hypotheses as most interesting. Now assume the K-12 math student 910Ae combinations 970De find matches with the clinical and translational research fellow 910Ab combinations 970Db, and the practicing engineer 910Ah combinations 970Dh through combinations for exploring vocations 970D. Each community member receives communication, via a letter or email, to share the community members 910 common interests through the explore vocations data 170De, 170Db, and 170Dh.

If explore vocations 940C, FIG. 36, is the manual method, then the learner will complete the surveys and submit them. The manual method will store data in retrievable form. If explore vocations 940C, FIG. 36, is the automated method, then the learner will complete the surveys and the automated method will store the data in retrievable form. The learner will receive a prompt if any data fields are left blank or if the learner enters a response that is inconsistent with survey instructions to ensure data collection is complete and accurate. For both the manual and automated methods, the teacher, mentor, or other person will perform combinations 970, FIG. 1, with the data using database software employed by one with ordinary skill in the art to match community members with common interests to explore vocations. The teacher, mentor, or other person will notify the community members via mail or email of the match and provide the explore vocations data, such as 170De, 170Db, and 170Dh, referring to FIG. 36, to each community member 910, such as 910Ae, 910Ab, 910Ah.

To share some advantages, to illustrate by example, the K-12 math student 910Ae has an opportunity to explore vocations of the clinical and translational research fellow 910Ab who hypothetically is a physical therapy doctoral student studying the differences in orthopedic knee injuries in boys and girls based upon body posture when they kick the soccer ball. And, the K-12 math student 910Ae has an opportunity to explore vocations of the practicing engineer 910Ah who hypothetically designs bicycle helmets for a leading manufacturer and is studying the rotational force effects of helmets having long, aerodynamic extensions at the back of the helmet versus a low profile rigid helmet to determine whether the low profile helmet reduces the risk of brain injury if rotational force is involved in a bicycle crash. These three community members 910 have mutual common interests and the clinical and translational research fellow 910Ab and practicing engineer 910Ah have both also expressed interest in mentoring young people, increasing awareness of their respective professional fields, and sharing information about career outlook information regarding job growth, salaries, etc. The K-12 math student benefits by learning about careers to which he or she has an interest and might not otherwise learn about, and makes connections with mentors and role models when he or she might otherwise have none. At an early age, the K-12 math student 910Ae internalizes the need to perform well and persist in math courses and, importantly, begins to try on different career hats. The K-12 500A competencies as well as 500A competencies for many other professional programs, FIGS. 9 through 25, include exploring vocations as explicit competency skills. The clinical and translational research fellow 910Ab and practicing engineer 910Ah have an opportunity to participate in self-regulation of their professions through promoting the professions and recruiting potential new members, provide community service as role models, possibly satisfy continuing education credit requirements, use outreach as part of their role as a chair or board member of a nonprofit organization, and so forth. The explore vocations 940C creates opportunities, referring to FIG. 1, for community members 910 such as teachers, mentors, and others to foster relationships and other community activities 940 within the community of practice 900 around explore vocations 940C, FIGS. 33 and 36.

Continuing with FIG. 33, in the present embodiment, community activities 940Z include share artifacts 940D. Share artifacts 940D creates an opportunity for artifacts 880Z, FIG. 32, from performance records 700A, FIG. 30 to be shared by community members 910, as community activities 940, FIG. 1.

If share artifacts 940D, FIG. 33, is the manual method, then the learner will share his or her artifacts through speeches, group dialogue, question and answer sessions, print media, such as posters, brochures, hand-outs, packets, and so forth. The manual method will store data in retrievable form. If share artifacts 940D, FIG. 33, is the automated method, then the learner may share his or her artifacts through any of the approaches stated immediately above, and additionally, using presentation software, voice and video chat, podcasts, smart boards, and any other interactive multimedia available. The automated method will store data in retrievable form.

To share some advantages, the community of practice 900, FIG. 1, creates opportunities for community members 910 to share artifacts 940D that individual members create related achieving their competency based goals 200, FIG. 1. Visual, written, and audiovisual presentation of artifacts 880, FIG. 30, is a way to share artifacts 940D, FIG. 33, in preparation for an actual presentation or speech the community member 910 may give related to his or her work. Sharing artifacts 940D gives the community member an opportunity to gain valuable feedback from other community members before sharing the presentation, speech, publication, etc. more widely. Presenting and sharing information helps build the community of practice 900, FIG. 1. Presenting, critiquing, analyzing and sharing constructive feedback to others are in themselves competency 500A, FIGS. 9 through 25, skills for many learners' education standards. Exploring careers and job seeking skills are also in themselves competency 500A, FIG. 9 through 25, skills for many learners' education standards. Sharing challenges can create support, increase persistence, and aid in problem-solving issues related to knowledge development or other issues confronting professions. Sharing success engenders a sense of empowerment, recognition, and good will among community members 910, FIG. 1.

Continuing with FIG. 33, in the present embodiment, community activities 940Z include conduct outcomes research 940E. As illustrated in detail in 940E1, FIG. 37, hypothetical data for illustrative purposes in the example of conduct outcomes research 940E1 includes: combinations 970E1 of goal number data 170Fe and date goal met data 170Fd correlation with competency skill relevance data 940Bh displayed in a graph. The teacher, mentor, or other person can select the multitude of combinations of data to examine various alignment issues in education. Here, the hypothetical data display alignment of goal achievement with competency skill relevance 940E1; specifically, a positive correlation of the learner's perceived level of competency skill relevance from survey data with which goals the learner has met.

Continuing with FIG. 33, in the present embodiment, community activities 940Z include conduct outcomes research 940E. As illustrated in detail in 940E2, FIG. 38, hypothetical data for illustrative purposes in the example of conduct outcomes research 940E2 includes: combinations 970E2 of demographic survey 940Ba and competency 500A correlation with combinations 970E1 goal number data 170Fe and date goal met data 170Fd displayed in a graph. The teacher, mentor, or other person can select the multitude of combinations of data to examine various attainment issues in education. Here, the hypothetical data display attainment of competencies based upon demographics 940E2; specifically, disparities in goals met among whites, blacks, and hispanics for various competencies. With this level of granularity in the data, the community of practice 900, FIG. 1, can begin to uncover and examine why, hypothetically, an african american learner performs higher than his or her peers on counting currency and time-telling versus a caucasian learner performs higher on word problems and naming geometric shapes, and why african american, caucasian, and hispanic learners all perform about the same on generating hypotheses.

Continuing with FIG. 33, in the present embodiment, community activities 940Z include conduct outcomes research 940E. As illustrated in detail in 940E3, FIG. 39, hypothetical data for illustrative purposes in the example of conduct outcomes research 940E3 includes: combinations 970E3 of demographic survey 940Ba and competency skill importance survey 940Bg correlation with combinations 970E1 of goal number data 170Fe and date goal met data 170Fd displayed in a graph. The teacher, mentor, or other person can select the multitude of combinations of data to examine various persistence issues in education. Here, the hypothetical data display persistence of goal achievement related to competency skill importance and demographics 940E3; specifically, disparities in goals met among whites, blacks, and hispanics based upon whether the learner perceived the competency skill as important. With this level of granularity in the data, the community of practice 900, FIG. 1, can begin to uncover and examine why, hypothetically, an african american learner perceives math facts for subtraction as important versus describing attributes of shapes as unimportant and how this perception may impact persistence in achieving competency skills, and why a hispanic learner perceives describing attributes of shapes as more important than expressing equations and how this perception may impact persistence in achieving competency skills.

Figure 37:
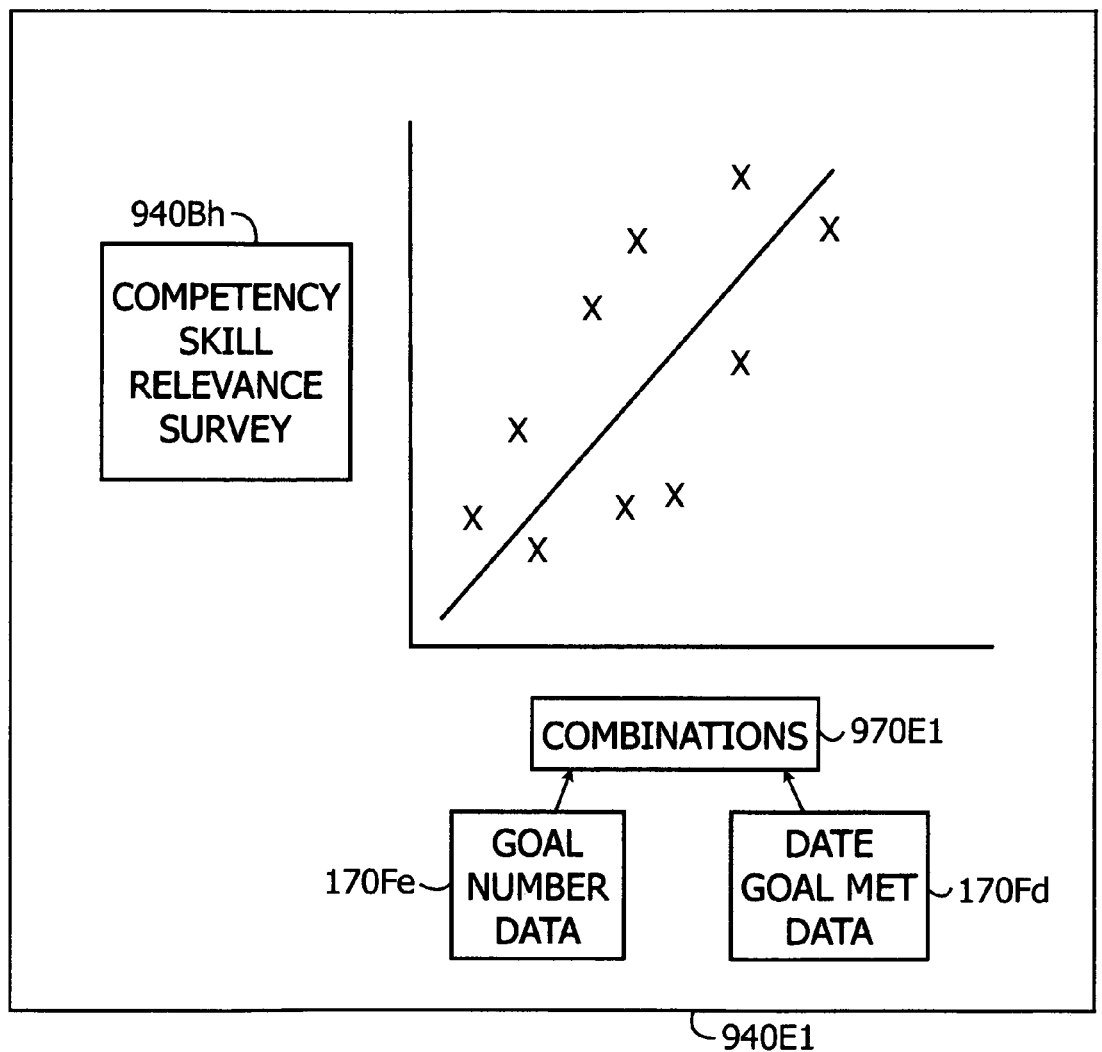
FIG. 37 illustrates one embodiment of a plurality of community activities, namely, conduct outcomes research about alignment of goal achievement with competency skill relevance.
Figure 38:
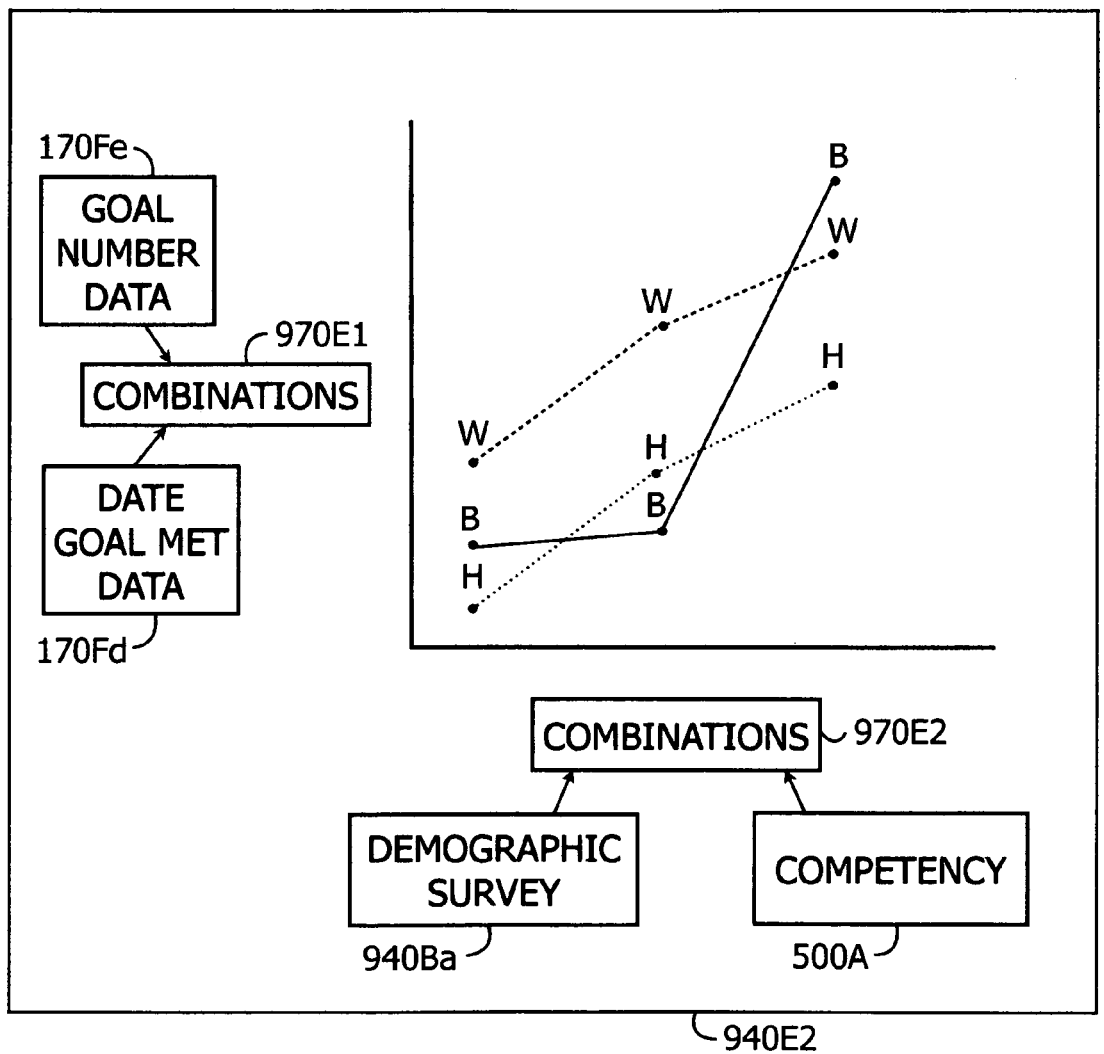
FIG. 38 illustrates one embodiment of a plurality of community activities, namely conduct outcomes research about attainment of competencies based upon demographics.
Figure 39:
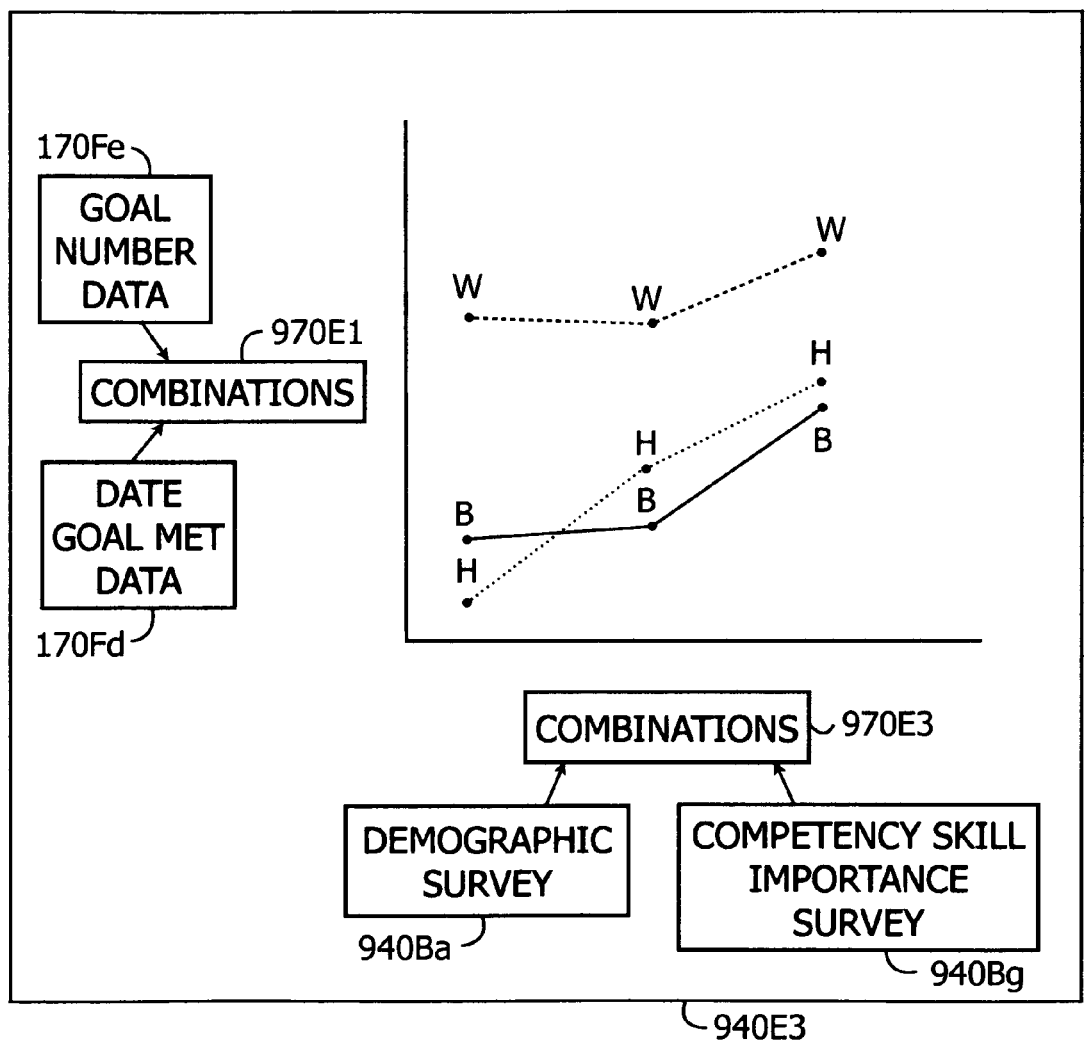
FIG. 39 illustrates one embodiment of a plurality of community activities, namely, conduct outcomes research about persistence of goal achievement related to competency skill importance and demographics.

If conduct outcomes research 940E1, 940E2, and 940E3, FIGS. 37, 38, and 39, is the manual method, then the teacher, mentor, or other person will enter data and perform combinations 970, FIG. 1, with the data using statistical analysis software employed by one with ordinary skill in the art to analyze the data. If conduct outcomes research 940E1, 940E2, and 940E3, FIGS. 37, 38, and 39, is the automated method, then the teacher, mentor, or other person will retrieve data from the plurality of occupational performance data fields, import the data into statistical software, and perform combinations 970, FIG. 1, with the data using statistical analysis software employed by one with ordinary skill in the art to analyze the data.

To share some advantages, teachers, mentors, and other persons can conduct outcomes research, as examples illustrate in FIGS. 37, 38, 39, for individual learners and learners in the aggregate, across selected competency skills, and time periods, and examine data and their implications for improving occupational performance. The data give the community of practice 900, FIG. 1, the multitude of options for conducting qualitative, quantitative and mixed method outcomes research to identify areas of success, areas of concern, and areas of serendipity, and so forth. The data capture occupational performance improvement in authentic environments over time in sharp contrast to standardized testing measures or examinations in testing environments on a given day. The conduct outcomes research 940E creates opportunities, referring to FIG. 1, for community members 910 such as teachers, mentors, and others to engage in community activities 940 within the community of practice 900 around conduct outcomes research 940E, 940E1, 940E2, 940E3, FIGS. 33, 37, 38, and 39.

Continuing with FIG. 33, in the present embodiment, community activities 940Z include conduct scientific research 940F. As illustrated in detail in 940Fa, FIG. 40, the example of conduct scientific research 940Fa includes: progress note data 170A including salient impressions data 170Aa, happenings data 170Ab, introspection data 170Ac, next steps data 170Ad, and empowerment data 170Ae performing the multitude of combinations 970 to re-categorize the occupational performance data fields as progress note brain function data including self-efficacy data 170Ba, goal commitment data 170Bb, goal relevance data 170Bc, goal importance data 170Bd, self-appraisal data 170Be, organization data 170Bf, emotional imprint data 170Bg, goal-setting behavior data 170Bh, share experiences data 170Bi, sensory experiences data 170Bj, success data 170Bk, and determination data 170Bl. One with ordinary skill in the art may choose any number of approaches to re-categorize the progress note. For example, to perform combinations 970 to re-categorize the data if the method is manual, using various colored highlighters or markers for each 170B progress note brain function data occupational performance data field directly on the free form text of 170A progress note data is one approach. Referring to FIG. 1, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fa conduct scientific research, qualitative study of progress note and brain function. As another example, to perform combinations 970 to re-categorize the data if the method is automated, using various electronic paintbrushes or highlighters for each 170B progress note brain function data occupational performance data field either directly on the free form text of 170A progress note data or to copy/paste the free form text 170A progress note data directly into 170B occupational performance data fields are two approaches. Again, referring to FIG. 1, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fa conduct scientific research, qualitative study of progress note and brain function.

Figure 40:
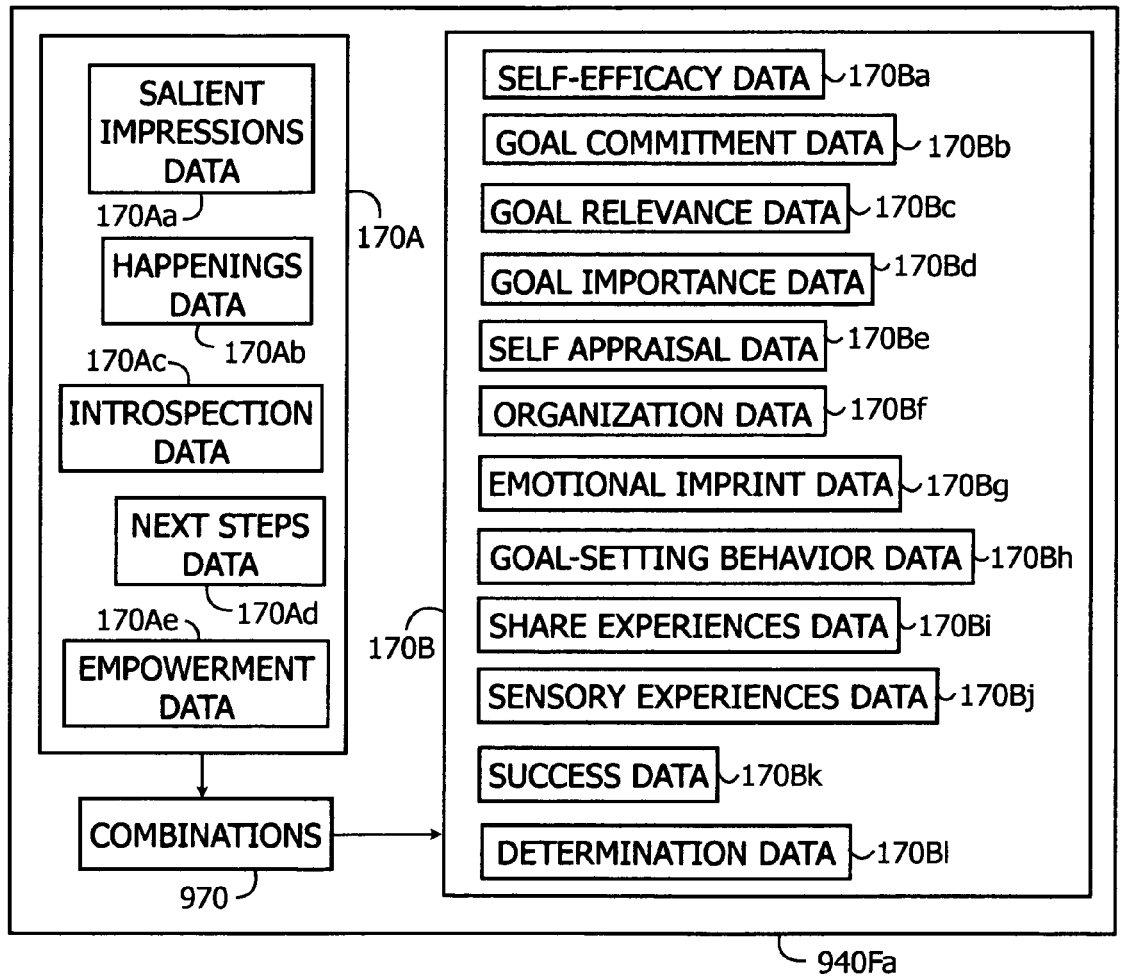
FIG. 40 illustrates one embodiment of a plurality of community activities, namely, conduct scientific research about a qualitative study of progress notes and brain function.

If conduct scientific research 940Fa, FIG. 40, is the manual method, then the community members 910, such as the teacher, mentor, or other person, will enter data and perform combinations 970, FIG. 1, with the data using statistical analysis software, database software, and/or data mining software employed by one with ordinary skill in the art to analyze the data. If conduct outcomes research 940Fa, FIG. 40, is the automated method, then the community members 910, such as the teacher, mentor, or other person, will retrieve data from the plurality of occupational performance data fields, import the data into statistical software, database software, and/or data mining software and perform combinations 970, FIG. 1, with the data using statistical analysis software, database software, and/or data mining software employed by one with ordinary skill in the art to analyze the data.

To share some advantages, the community of practice 900, FIG. 1, has an opportunity to conduct scientific research 940Fa, FIG. 40, to gain an understanding into how the multitude of learners achieve goal-directed occupational performance in authentic environment. Referring to FIG. 1, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fc, FIG. 41, the example of conduct scientific research 940Fc includes: storytelling by analogy to share experiences occupational performance data field 170G data performing the multitude of combinations 970 to re-categorize the role of story telling occupational performance data fields 170C as experiential data 170Ca, memory recall data 170Cb, projection data 170Cc, hypothetical data 170Cd, prospective data 170Ce, relational data 170Cf, gender-based data 170Cg, observational data 170Ch, cultural data 170Ci, faith-based data 170Cj, traditions data 170Ck, forbidden, proscribed data 170Cl, and coping data 170Cm. One with ordinary skill in the art may choose any number of approaches to re-categorize the storytelling by analogy to share experiences occupational performance data field 170G data. For example, to perform combinations 970 to re-categorize the data if the method is manual, using various colored highlighters or markers for each 170G storytelling by analogy to share experiences data occupational performance data field directly on the free form text of 170G data is one approach. Referring to FIG. 1, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fc conduct scientific research, qualitative study of the role of storytelling in skill acquisition. As another example, to perform combinations 970 to re-categorize the data if the method is automated, using various electronic paintbrushes or highlighters for each 170G storytelling by analogy to share experiences data occupational performance data field either directly on the free form text of 170G data or to copy/paste the free form text 170G data directly into 170C occupational performance data fields are two approaches. Again, referring to FIG. 1, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fc conduct scientific research, qualitative study of the role of storytelling in skill acquisition.

Figure 41:
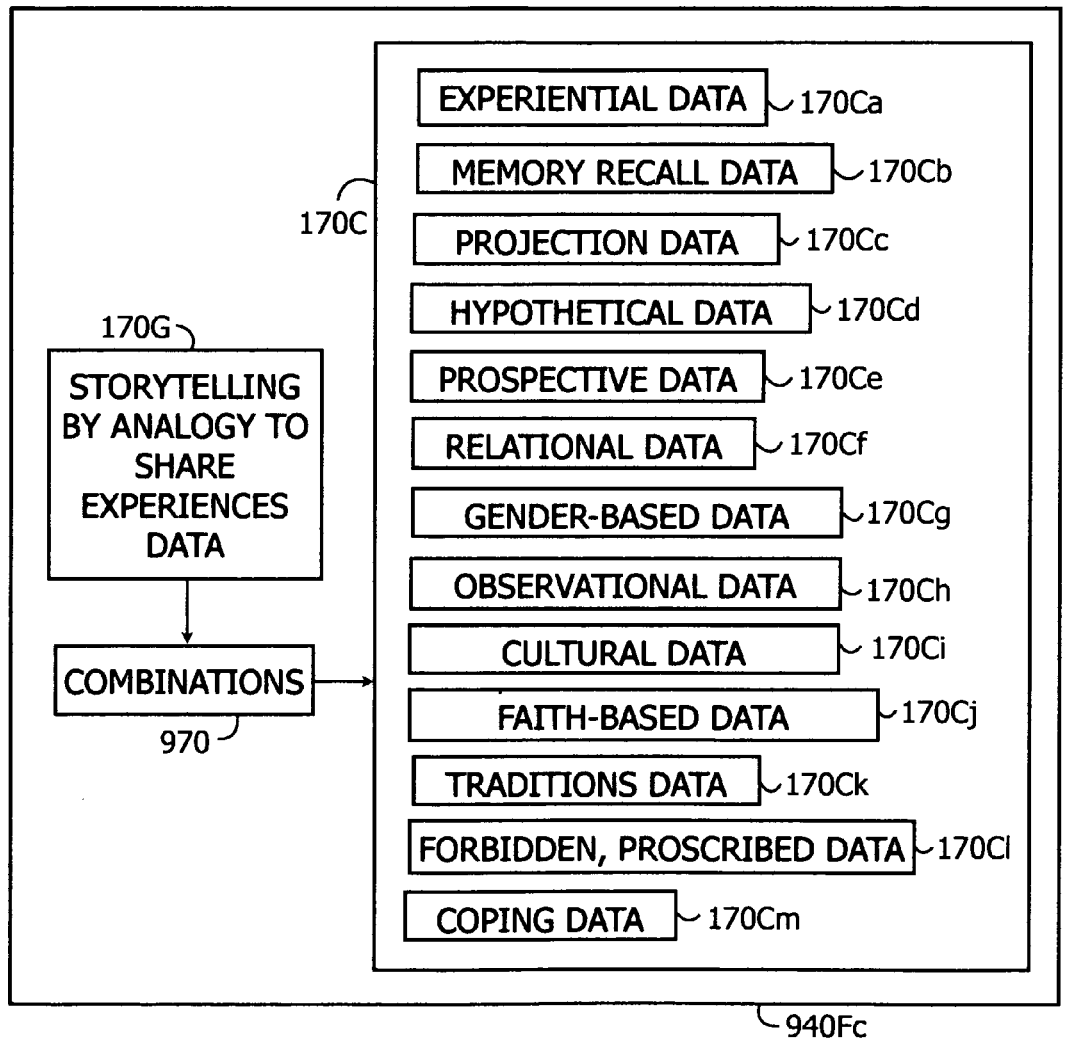
FIG. 41 illustrates one embodiment of a plurality of community activities, namely, conduct scientific research about a qualitative study of the role of storytelling in skill acquisition.

If conduct scientific research 940Fc, FIG. 41, is the manual method, then the community members 910, such as the teacher, mentor, or other person, will enter data and perform combinations 970, FIG. 1, with the data using statistical analysis software, database software, and/or data mining software employed by one with ordinary skill in the art to analyze the data. If conduct outcomes research 940Fc, FIG. 41, is the automated method, then the community members 910, such as the teacher, mentor, or other person, will retrieve data from the plurality of occupational performance data fields, import the data into statistical software, database software, and/or data mining software and perform combinations 970, FIG. 1, with the data using statistical analysis software, database software, and/or data mining software employed by one with ordinary skill in the art to analyze the data.

To share some advantages, the community of practice 900, FIG. 1, has an opportunity to conduct scientific research 940Fc, FIG. 41, to gain an understanding into how the multitude of learners internalize occupational performance experiences as stories and shared their learned experiences in authentic environment. Lived experience, encoded as stories, builds tacit knowledge and moves the learner from novice towards expert performance. Storytelling facilitates the transmission of knowledge among members of the community of practice and continuously influences and reshapes the occupational performance of its community members. Referring to FIG. 1, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fb1, 940Fb2, and 940Fb3, FIGS. 42, 43 and 44, the example of conduct scientific research 940Fb1, 940Fb2, and 940Fb3 includes: "500E+170Ea" combination 970Aa yields motivation data about occupational performance 170Za, "500E+170Ea+170Ej+170Eb" combination 970Ab yields cultural competency data about occupational performance 170Zb, "500E+170Ea+170Ej+170Ec" combination 970Ac yields diversity data about occupational performance 170Zc, "500E+170Ea+170Ej+170Ed" combination 970Ad yields disparities data about occupational performance 170Zd, "500B+170En" combination 970Ae yields levels of cognitive functioning data about occupational performance 170Ze, "500B+170En+500A" combination 970Af yields performance standards relation to brain function and competency skills during occupational performance 170Zf, "500B+170En+500C" combinations 970Ag yields performance standards relation to brain function and tools, media, and activities during occupational performance 170Zg, "500B+170En+500E" combination 970Ah yields performance standards relation to brain function and motivation during occupational performance 170Zh, "500B+170En+500D" combination 970Ai yields performance standards relation to brain function and accuracy or measure of independence during occupational performance 170Zi, "170Ej+500B+500C+170Ee" combination 970Aj yields situated cognition data about occupational performance 170Zj, "500A+170Ek+170Ej+500B+500C+170Ee+170Ef" combination 970Ak yields communities of practice data about occupational performance 170Zk, "500A+170Ek+170Ej+500B+500C+170Ee+170Ef+170Eg" combination 970Al yields historical-cultural approach data about occupational performance 170Zl, "500A+170Ek+170Ej+500B+500C+170Ee+170Ef+170Eg+170Eh" combination 970Am yields distributed cognition data about occupational performance 170Zm, "500D+500C+170El" combination 970An yields FLOW, psychology of optimal performance data about occupational performance 170Zn, "170Ej+500C+170Eo" combination 970Ao yields ecological psychology data about occupational performance 170Zo, and "500A+500D+500C+170Ep" combination 970Ap yields talent development data about occupational performance 170Zp. One with ordinary skill in the art may choose any number of approaches to perform combinations 970Aa through 970Ap, 940Fb1, 940Fb2, and 940Fb3, FIGS. 42, 43, and 44, of the plurality of occupational performance data field data. For example, to perform combinations 970 if the method is manual, entering the data into statistical software, database software, and/or data mining software, and then manipulating and analyzing the multitude of 970A combinations is used to accomplish the community activity, 940Fb conduct scientific research, mixed method study of contemporary cognitive theories and occupational performance. Referring to FIG. 1, community members 910 as part of the community of practice 900 perform combinations 970 to allow analysis and improvement of occupational performance 102 for the benefit of the community of practice 900. As another example, to perform combinations 970 if the method is automated, retrieving and importing the stored and retrievable data into statistical software, database software, and/or data mining software is used to accomplish the community activity, 940Fb conduct scientific research, mixed method study of contemporary cognitive theories and occupational performance. Again, referring to FIG. 1, community members 910 as part of the community of practice 900 perform combinations 970 to allow analysis and improvement of occupational performance 102 for the benefit of the community of practice 900.

Figure 42:
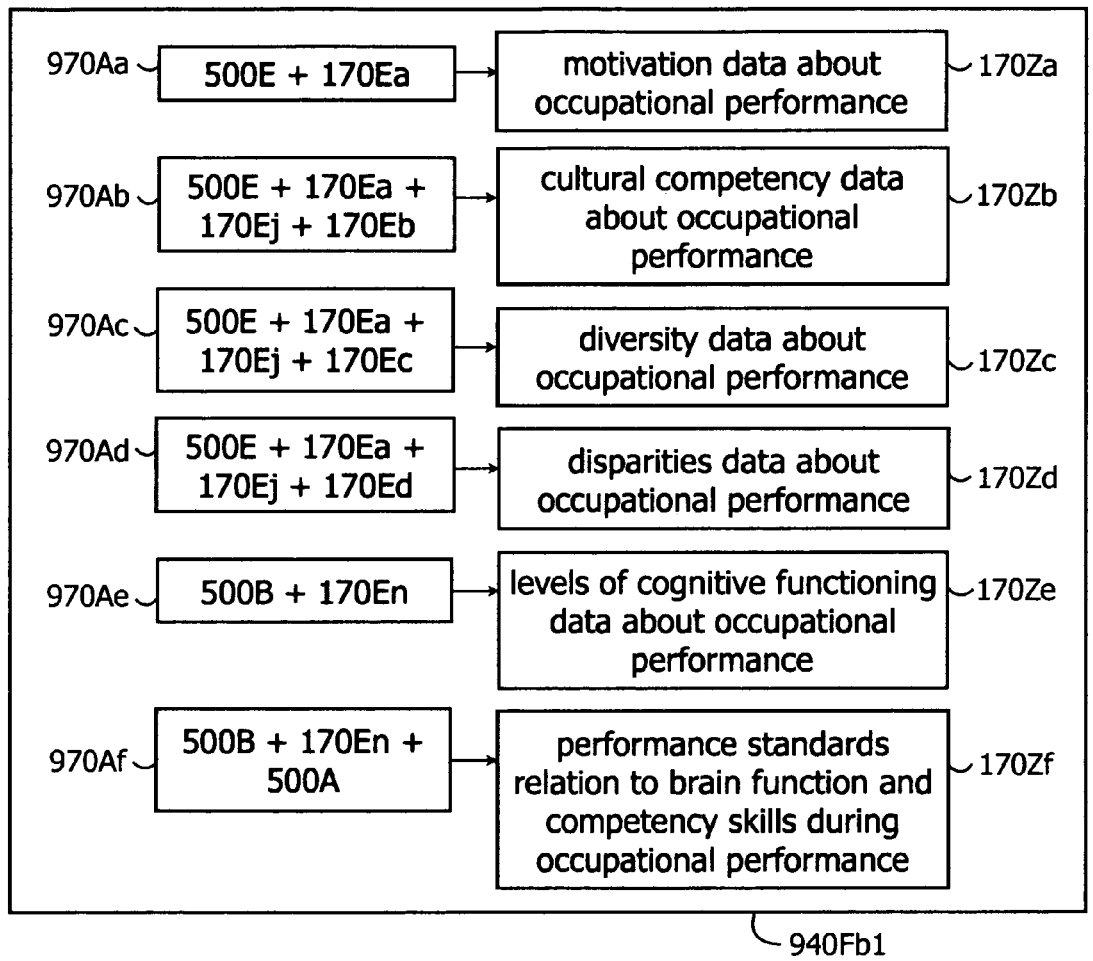
FIGS. 42, 43, and 44 illustrate one embodiment of a plurality of community activities, namely, conduct scientific research about a mixed method study of contemporary cognitive theories and occupational performance.
Figure 43:
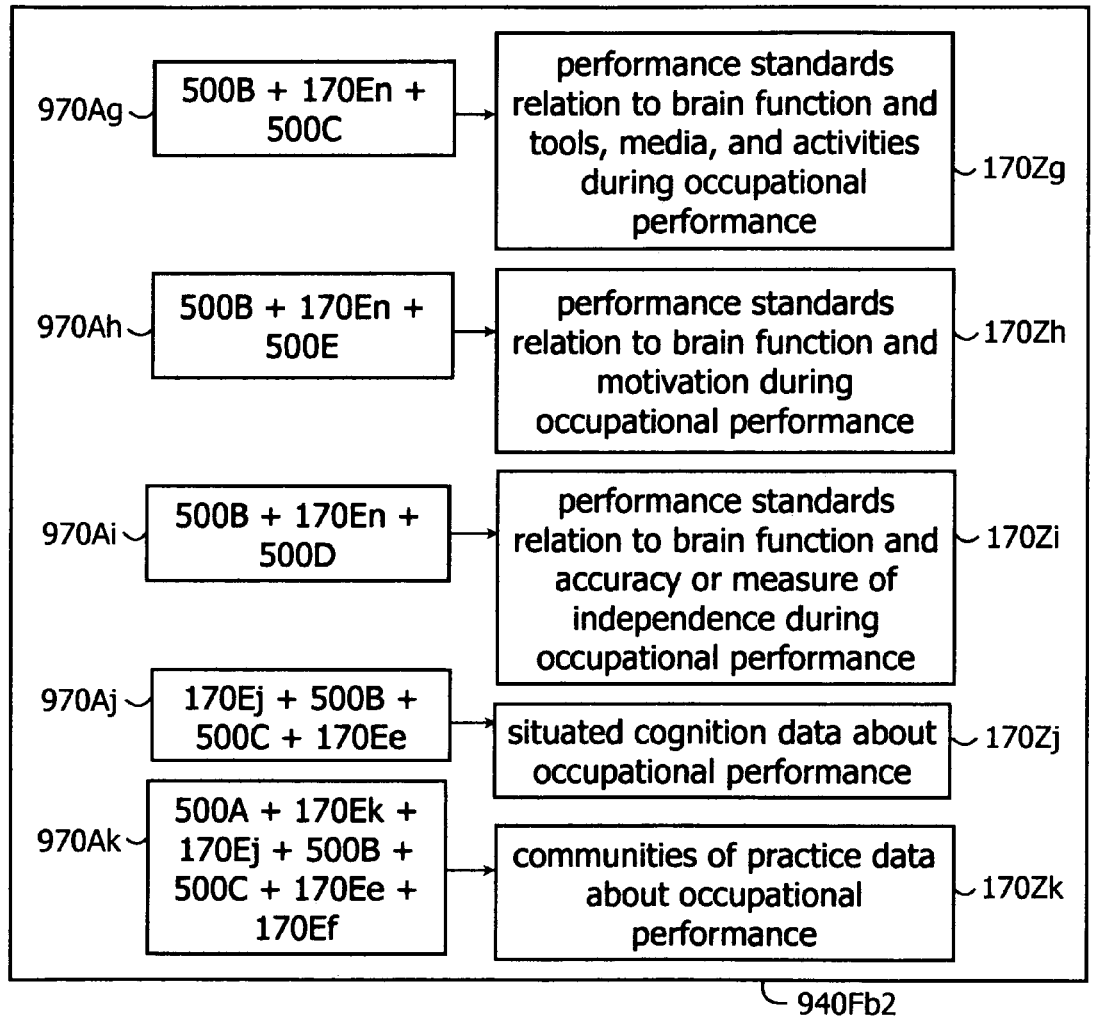
Figure 44:
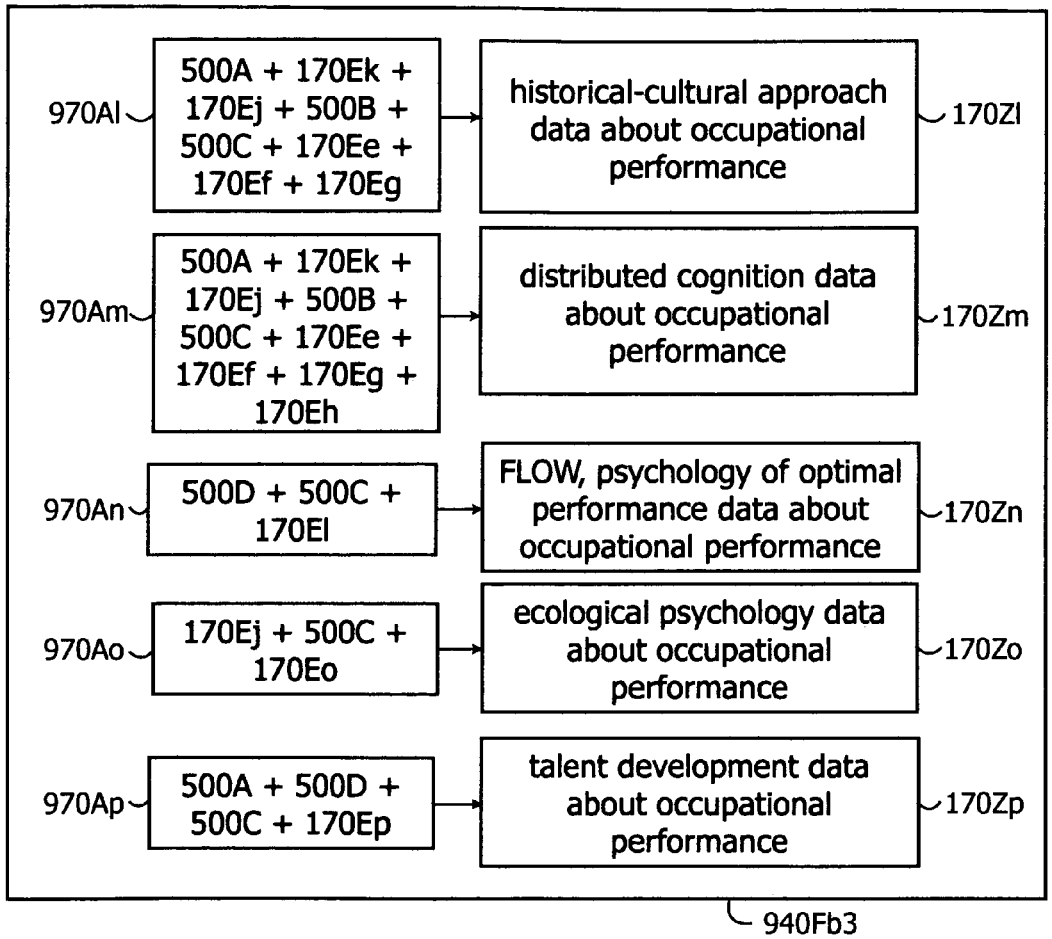

If conduct scientific research 940Fb1, 940Fb2, and 940Fb3, FIGS. 42, 43, and 44, is the manual method, then the community members 910, such as the teacher, mentor, or other person, will enter data and perform combinations 970, FIG. 1, with the data using statistical analysis software, database software, and/or data mining software employed by one with ordinary skill in the art to analyze the data. If conduct outcomes research 940Fb1, 940Fb2, and 940Fb3, FIGS. 42, 43, and 44, is the automated method, then the community members 910, such as the teacher, mentor, or other person, will retrieve and import the data into statistical software, database software, and/or data mining software and perform combinations 970, FIG. 1, with the data using statistical analysis software, database software, and/or data mining software employed by one with ordinary skill in the art to analyze the data.

To share some advantages, the community of practice 900, FIG. 1, has an opportunity to conduct scientific research 940F, 940Fb1, 940Fb2, and 940Fb3, FIGS. 33, 42, 43, and 44, to gain an understanding into how the multitude of learners achieve occupational performance through the lens of various contemporary cognitive theories. Contemporary cognitive theories facilitate the development of knowledge, insight to spawn new learning approaches, and adaption for smarter contexts for learning among members of the community of practice. The method is iterative, continuously influencing, challenging, and redefining the occupational performance of its community members. Referring to FIG. 1, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct performance measurement research 940G. As illustrated in detail in 940Ga, FIG. 45, the example of conduct performance measurement research, adapted stages of skill acquisition scoring rubric, 940Ga includes: assessments 820, learner formative assessment scores data 170Fg, occupational performance data field, scored "2" 170Fg1, "1" 170Fg2, "3" 170Fg3, "1" 170Fg4, "2" 170Fg5, "1" 170Fg6, "4" 170Fg7, "3" 170Fg8, "2" 170Fg9, mentor formative assessment scores data 170Fh, occupational performance data field, scored "2" 170Fh1, "2" 170Fh2, "3" 170Fh3, "NA" 170Fh4, "1" 170Fh5, "1" 170Fh6, "4" 170Fh7, "2" 170Fh8, and "2" 170Fh9. FIG. 45 illustrates in greater detail how the assessments 820 section of the performance record 700A as embodied in FIG. 30 displays the learner's formative assessments scores. The mentor or teacher can establish a scoring rubric of his or her choice. The Likert scale with numeric scores 1 through 5, or a version of the Dreyfus scale with level of skill acquisition number scores 1 through 5, or another scoring rubric with at least some evidence of validity and reliability may be used. The following example illustrates one scoring rubric for assessments 820, FIG. 45.

In Mind over Machine, H. L. Dreyfus and Stuart E. Dreyfus share "Five Stages of Skill Acquisition" based upon their extensive research with airplane pilots, chess players, automobile drivers, and adult learners of a second language (Copyright 1986). B. A. Wright has modified, abridged, and adapted the Dreyfus' stages of skill acquisition into the following rubric for scoring formative and summative assessments (Copyright © 2010) as illustrated in the current embodiment of the performance record 700A, FIG. 30, and as illustrated in detail in 820A, FIG. 45. As previously stated, any scoring rubric which is rooted in some body of evidence, and has some validity and reliability in another field is contemplated and may be adapted as a scoring rubric for scoring assessments herein.

| Dreyfus Scores for Skill Acquisition: | |
|---|---|
| "1" = | Novice |
| "2" = | Advanced Beginner |
| "3" = | Competent |
| "4" = | Proficient |
| "5" = | Expert |
| "NA" = | Not Assessed, Experienced or Observed |

Stage 1: Novice
   Indicia of Novice Skills (Score=1 on the Assessment)
   Learns to recognize various objective facts and features relevant to the skill.
   Acquires rules for determining actions based upon facts and features.
   Perceives relevant elements of the situation as clearly and objectively defined.
   Recognizes relevant elements without reference to the overall situation in which they occur, called "context-free" elements.
   Applies relevant rules to context-free elements regardless of what else is happening, called "context-free" rules.
   Manipulates unambiguously defined context-free elements by precise rules, called "information processing."
   Ignores context when applying rules.
   Does not understand that in certain situations, the rule should be violated.
   Does not interpret a situation as a whole.
   Recognizes context-free features and applies objective procedures.
   Recognizes learned components and applies learned rules, and consequently, feels little responsibility for the outcome of hi/her acts.
Stage 2: Advanced Beginner
   Indicia of Advanced Beginner Skills (Score=2 on the Assessment)
   Acquires experience in coping with real situations.
   Considers more context-free facts.
   Learns to use more sophisticated rules.
   Recognizes meaningful elements in concrete situations through considerable practical experience.
   Identifying objective, context-free features no longer dominates perceptions.
   Perceives similarities to prior examples or situations.
   Perceives new elements as "situational" rather than context-free.
   Responds with rules for performance or behavior that incorporate both new situational components and context-free components.
   Perceiving and responding to the situational experience seems immeasurably more important than any form of verbal description.
   Follows formal procedures or sequential directions without observing and weighing what is most important.
   Exhibits difficulty identifying and prioritizing what is most important.
   Recognizes learned components and applies learned rules, and consequently, feels little responsibility for the outcome of his/her acts.
Stage 3: Competence
   Indicia of Competent Skills (Score=3 on the Assessment)
   Recognizing numerous situational elements along with context-free elements present in real-world circumstances becomes overwhelming.
   Recognizes the need to identify and prioritize what is most important.
   Develops a plan to organize the situation, then examines only a smaller set of factors that are most important based upon the chosen plan.
   Screens out elements determined to be irrelevant to decision-making and responding.
   Adopts a hierarchical procedure of decision-making.
   Sees a situation as a set of facts where the importance of some facts may depend on the presence of other facts.
   Learns that when a situation has a particular constellation of elements, a certain conclusion should be drawn, decision made, or expectation investigated.
   Exhibits more skill and less analytical reasoning.
   Assesses the urgency of competing needs and plans work accordingly.
   Monitors the plan to identify new situational elements, assesses the presence or absence of certain factors, and modifies the plan when indicated.
   Determines whether new situational elements become important or should be ignored.
   Pays attention to only a few of the immense number of factors impinging on the overall situation to decide the hierarchy of action.
   Choosing an organizing plan is no simple matter for the competent performer.
   Combines and assigns nonobjective and necessary elements when wrestling with the question of the choice of a plan, and consequently, feels responsible for and emotionally involved in the product of his/her choice.
   Understands and decides in a detached manner, but finds himself/herself intensely involved in what occurs thereafter.
   Feels deeply satisfied with successful outcomes.
   Remembers poor outcomes and associated feelings.
   Vividly remembers successfully chosen plans and remembers the situation from the perspective of the plan.
Stage 4: Proficiency
   Indicia of Proficient Skills (Score=4 on the Assessment)
   Deeply involved in his/her task and experiences it from some specific perspective because of recent events.
   Perceives certain features as salient or standing out while other features recede into the background or are ignored.

Perceives changes gradually as events modify the salient features, plans and expectations, and reorders the relative importance or saliency of features.

Displays rapid, fluid, involved behavior that bears no similarity to the slow, detached reasoning of the problem-solving process.

Choosing is engaged rather than detached and deliberate.

Recalls experiences to similar situations in the past and memories trigger plans similar to those that worked in the past.

Recalls experiences to similar situations in the past and anticipates events similar to those that occurred in the past.

Possesses an intuitive ability to use patterns without decomposing them into component features, called "holistic similarity recognition."

Intuitively organizes and understands tasks where intuition is the product of deep situational involvement and recognition of similarity.

Intuitively organizes his/her actions by assessing elements defined as important through prior experience along with combining rules to produce decisions about how best to manipulate the environment to achieve the desired outcome.

Stage 5: Expertise

Indicia of Expert Skills (Score=5 on the Assessment)

Knows what to do based upon mature and practiced understanding.

Totally engages in his/her environment and does not see problems in some detached way or work at solving them.

Present in the moment and does not worry about the future and devising plans.

Rapid automatic response.

So engrossed in the present experience as an "involved participant" that he/she uses tools or media to connect to the environment.

Loses awareness of his/her separateness from the tools, media or activity manipulated in the environment and connects to a world of opportunities, threats, strengths, weaknesses, hopes and fears.

Displays rapid, fluid, involved behavior that bears no similarity to the slow, detached reasoning of the problem-solving process.

Associates particular features of a pattern in a given situation with a condition stored in memory and triggers a decision.

Performs mostly in an ongoing and non-reflective manner doing what normally works.

When time permits and outcomes are crucial, experts will deliberate before acting. This deliberation is qualitatively different from detached, calculative problem-solving, the expert's deliberation involves critical reflection on one's intuitions.

Responds to "holistic recognition of similarities" produced through deep situational understanding of past experiences, relates current situations to prior similar situations, and associates the related decision, action or tactic simultaneously.

Performs so fluidly that the situation defies complete verbal description.

If conduct performance measurement research 940Ga, FIG. 45, is the manual method, then the teacher, mentor, or other person will enter data and perform combinations 970, FIG. 1, with the data using statistical analysis software employed by one with ordinary skill in the art to analyze the data. If conduct performance measurement research 940Ga, FIG. 45, is the automated method, then the teacher, mentor, or other person will retrieve data from the plurality of occupational performance data fields, import the data into statistical software, and perform combinations 970, FIG. 1, with the data using statistical analysis software employed by one with ordinary skill in the art to analyze the data.

To share some advantages, teachers, mentors, and other persons can conduct performance measurement research, as examples illustrate in FIG. 45, for individual learners and learners in the aggregate, across all or selected competency skills, and time periods, and examine data and their implications for improving occupational performance. The method creates an opportunity to conduct performance measurement research 940G, FIG. 33, so that equitable, effective, valid, and reliable scoring rubric may be developed and/or tested. The data capture occupational performance improvement in authentic environments over time in sharp contrast to standardized testing measures or examinations in testing environments on a given day. The conduct performance measurement research 940G, FIG. 33, creates opportunities, referring to FIG. 1, for community members 910 such as teachers, mentors, and others to lead community activities 940 within the community of practice 900 around developing, testing, implementing, and improving the community's ability to conduct performance measurement research 940G, FIGS. 33 and 45.

Figure 46:
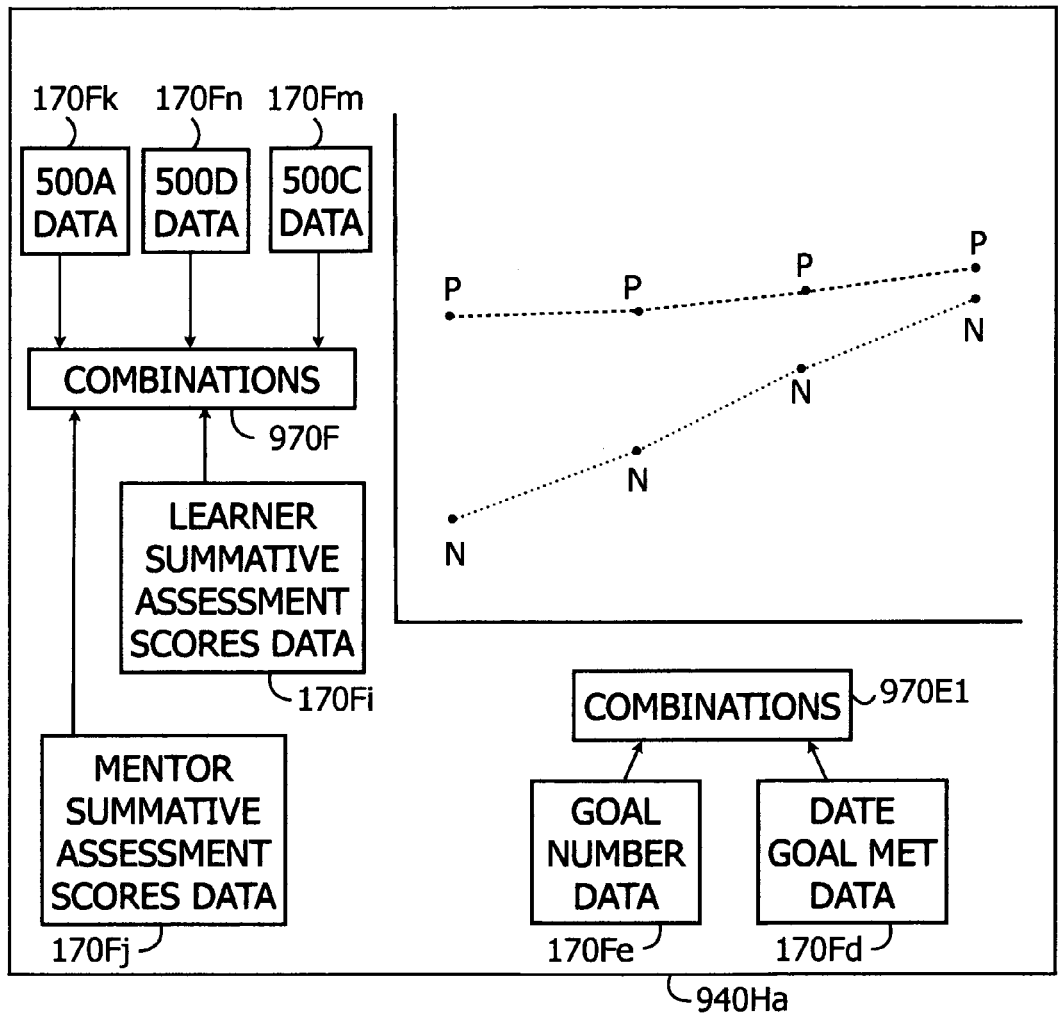
FIG. 46 illustrates one embodiment of a plurality of community activities, namely, examine self-regulation of professions about a comparison study of mid-level practitioners and new graduates.

Continuing with FIG. 33, in the present embodiment, community activities 940Z include examine self-regulation of professions 940H. As illustrated in detail in 940Ha, FIG. 46, hypothetical data for illustrative purposes of an example of examine self-regulation of professions, comparison study of mid-level practitioners and new graduates, 940Ha includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Assume the hypothetical data represents a medical surgical specialty. Many surgical specialties require a board re-certification for medical practitioners, commonly after ten years of practicing medicine. Now also assume that the surgical specialty has adopted use of the system and method of the present embodiment for its practicing surgeons as part of their professional practice standards and board re-certification. Referring to FIG. 46, assume the hypothetical data "P" represents practitioners of this medical surgical specialty who have four to ten years experience, and each "P" represents the aggregate performance of the cohort for years 2006, 2007, 2008, and 2009, respectively. Referring to FIG. 46, assume the hypothetical data "N" represents practitioners of this medical surgical specialty who have zero years of experience in 2006; that is, they are newly minted practitioners of this medical surgical specialty. Each "N" represents the aggregate performance of the cohort of 2006 graduates for years 2006, 2007, 2008, and 2009. Assume the hypothetical data lead to a conclusion that the new practitioners are performing significantly below the practitioners with four or more years of professional experience, and that this discrepancy is resulting in a significantly higher percentage of medical errors that harm patients. The data raise questions regarding self-regulation for this medical surgical specialty about whether the new practitioners should have more supervision during the first few years of practice, should have a longer surgical residency, should raise the requirement for more practice performing this particular surgical procedure during residency training, or should explore improving other aspects of the curriculum, or some combination of these options.

If examine self-regulation of professions 940Ha, FIG. 46, is the manual method, then the community members 910, such as the teacher, mentor, or other person, will enter data and perform combinations 970, FIG. 1, with the data using statistical analysis software, database software, and/or data mining software employed by one with ordinary skill in the art to analyze the data. If examine self-regulation of professions 940Ha, FIG. 46, is the automated method, then the community members 910, such as the teacher, mentor, or other person, will retrieve and import the data into statistical software, database software, and/or data mining software and perform combinations 970, FIG. 1, with the data using statistical analysis software, database software, and/or data mining software employed by one with ordinary skill in the art to analyze the data.

To share some advantages, the community of practice 900, FIG. 1, has an opportunity to examine self-regulation of professions like the example illustrates in 940Ha, FIG. 46, to gain an understanding of how a multitude of professions can identify and address improvement of occupational performance for its members during formal education program years as well as throughout professional practice. Referring to FIG. 1, community members 910 can engage in community activities 940 as part of the community of practice 900 to gain new insights and explore the impact various self-regulatory issues have on their respective professions through the multitude of combinations 970 to improve occupational performance 102 for the benefit of the community of practice 900.

Figure 47:
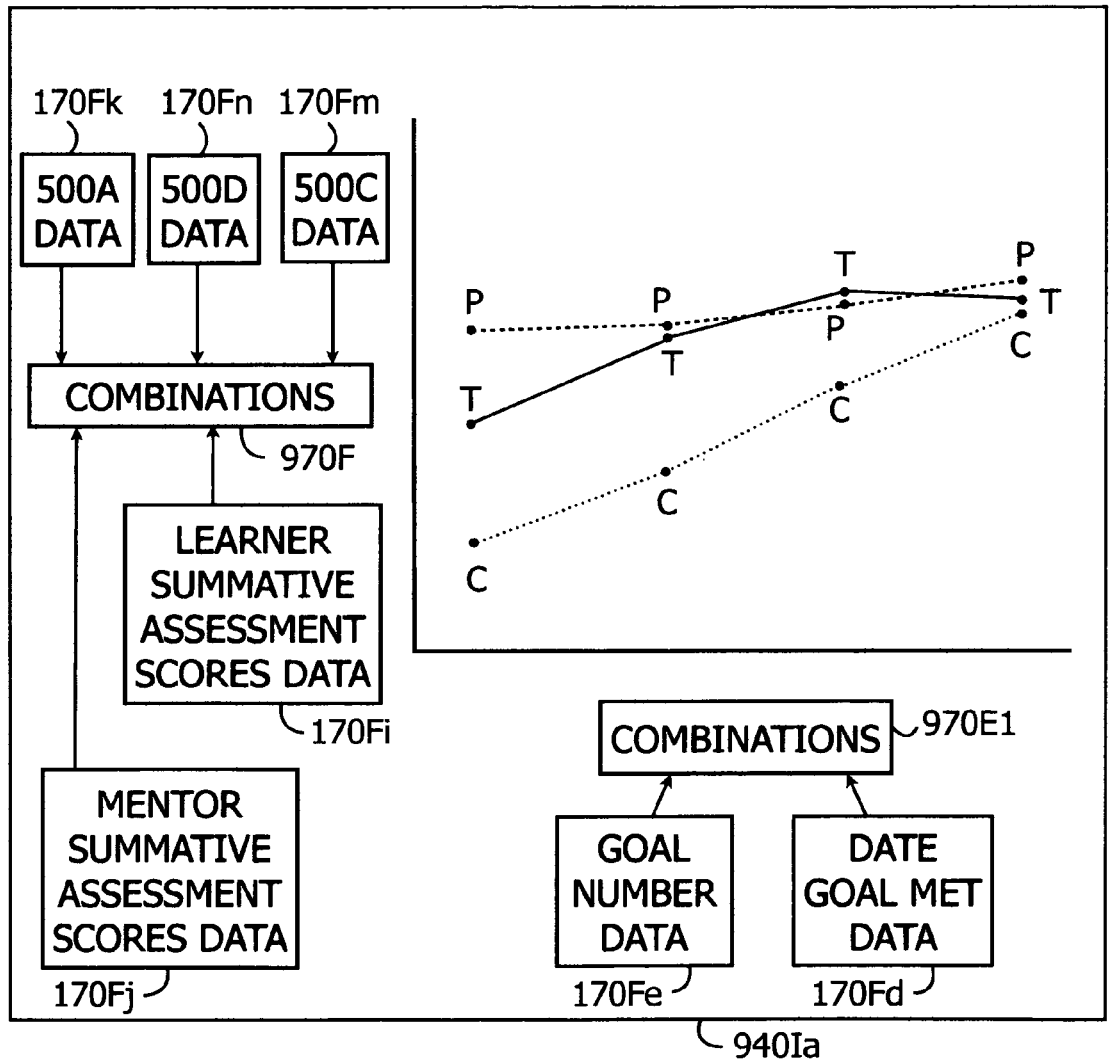
FIG. 47 illustrates one embodiment of a plurality of community activities, namely, assess evidence based multimedia: tools, media, activities, curriculum about randomized controlled trial.

Continuing with FIG. 33, in the present embodiment, community activities 940Z include assess evidence based multimedia: tools, media, activities, curriculum 940I. As illustrated in detail in 940Ia, FIG. 47, hypothetical data for illustrative purposes of an example of assess evidence based multimedia: tools, media, activities, curriculum, randomized controlled trial, 940Ia includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Continue with the hypothetical situation involving the medical surgical specialty identified immediately above. Assume the hypothetical community of practice of medical surgical specialists decide to improve the curriculum and conduct a controlled randomized trial at several medical residency programs and longitudinally follow the cohort for four years. Referring to FIG. 47, assume the hypothetical data "P" represents practitioners of this medical surgical specialty who have four to ten years experience, and each "P" represents the aggregate performance of the cohort for years 2011, 2012, 2013, and 2014, respectively. Referring to FIG. 47, assume the hypothetical data "C" represents the control group of practitioners of this medical surgical specialty who have zero years of experience in 2011; that is, they are newly minted practitioners of this medical surgical specialty. The control group had no change in the curriculum or any other significant change in their residency program during the study. Each "C" represents the aggregate performance of the cohort of 2011 graduates for years 2011, 2012, 2013, and 2014. Referring to FIG. 47, assume the hypothetical data "T" represents the test group of practitioners of this medical surgical specialty who have zero years of experience in 2011; that is, they are newly minted practitioners of this medical surgical specialty. The test group received the new evidence based curriculum, but had no other significant changes in their residency program during the study. Each "T" represents the aggregate performance of the cohort of 2011 graduates for years 2011, 2012, 2013, and 2014. Assume the hypothetical data leads to a conclusion that the new practitioners who received the new evidence based curriculum performed significantly better than the control group. The significant improvement resulted in a significantly lower number of medical errors. The medical surgical specialty can now consider how to disseminate this information and address curriculum changes to the residency program. The medical surgical specialty can also consider continuing education training for those new practitioners who were in the "C" control group of the study, and therefore, did not receive the improved curriculum along with other new practitioners who were not participants in the study.

If assess evidence based multimedia: tools, media, activities, curriculum 940Ia, FIG. 47, is the manual method, then the community members 910, such as the teacher, mentor, or other person, will enter data and perform combinations 970, FIG. 1, with the data using statistical analysis software, database software, and/or data mining software employed by one with ordinary skill in the art to analyze the data. If assess evidence based multimedia: tools, media, activities, curriculum 940Ia, FIG. 47, is the automated method, then the community members 910, such as the teacher, mentor, or other person, will retrieve and import the data into statistical software, database software, and/or data mining software and perform combinations 970, FIG. 1, with the data using statistical analysis software, database software, and/or data mining software employed by one with ordinary skill in the art to analyze the data.

To share some advantages, the community of practice 900, FIG. 1, has an opportunity to assess evidence based multimedia: tools, media, activities, curriculum 940Ia, FIG. 47, to evaluate whether specific tools, media, activities, and curriculum significantly improve occupational performance when compared against other tools, media, activities, and curriculum. Referring to FIG. 1, community members 910 can engage in community activities 940 as part of the community of practice 900 to evaluate the comparative effects of specific tools, media, activities, and curriculum through the multitude of combinations 970 to improve occupational performance 102 for the benefit of the community of practice 900. The improved evidence based multimedia can improve the occupational performance of learners during their formal education program as well as learners during their professional practice years through continuing education programs.

Continuing with FIG. 33, in the present embodiment, community activities 940Z include explore and implement new applications to improve occupational performance 940J. Referring to FIG. 1, community members 910 can engage in community activities 940 as part of the community of practice 900 which is dynamic and oriented towards formulating new combinations of data to iteratively and continuously explore and improve occupational performance 102 for the benefit of the community of practice 900.

A Machine

Figure 2:
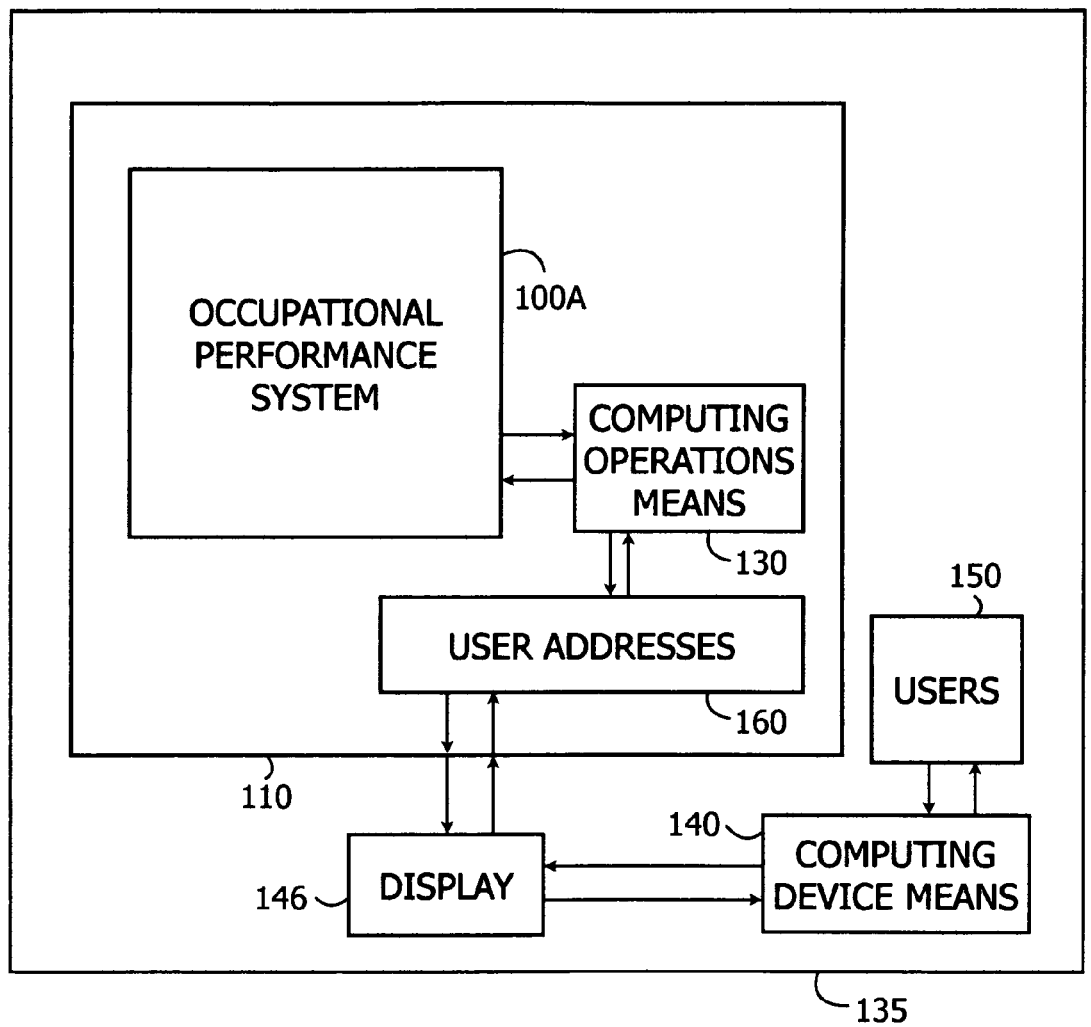
FIG. 2 illustrates one embodiment of a machine, showing a high-level presentation of an occupational performance system.
Figure 3:
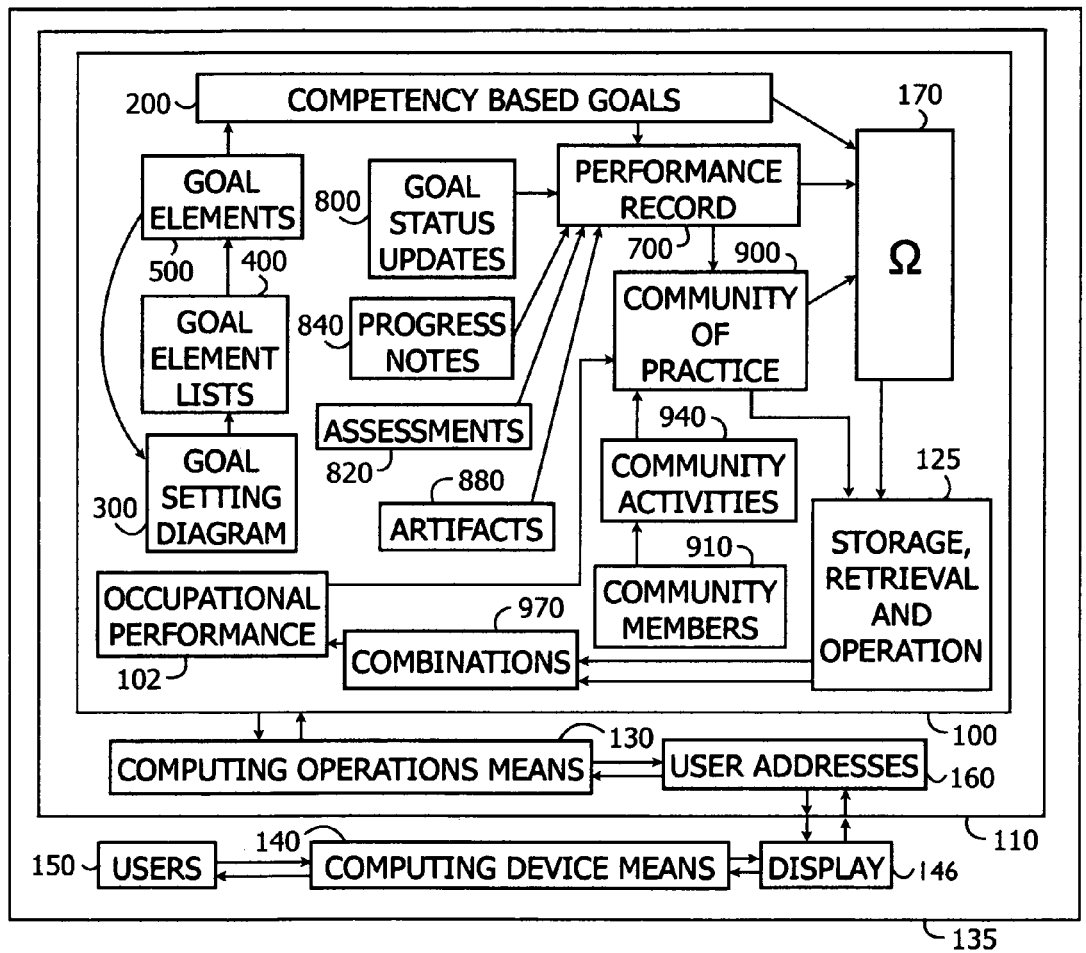
FIG. 3 illustrates a detailed embodiment of the machine in FIG. 2, showing a detailed presentation of an occupational performance system.

The best mode for an occupational performance system and a method for achieving occupational performance, as presently embodied, is a machine. FIG. 2 illustrates one embodiment of the machine 135, showing a high-level presentation of the occupational performance system 100A. FIG. 3 illustrates a detailed embodiment of the same machine 135, in FIG. 2, showing a detailed presentation of the occupational performance system 100. Referring to FIGS. 2 and 3, the machine 135 for providing the occupational performance system, 100 and 100A, to improve occupational performance 102 of a multitude of users 150, comprising: first, a hardware platform 110 including the occupational performance system, 100A, FIG. 2, and illustrated in detail in 100, FIG. 3, a computing operations means 130, operatively connected to a multitude of user addresses 160 in the hardware platform 110; second, a display 146 is operatively connected to the hardware platform 110 using the user addresses 160 to display 146 the occupational performance system 100A and 100 of the hardware platform 110; and third, a computing device means 140 is operatively connected to the display 146 for the multitude of users 150 to process computing operations means 130 to participate in the occupational performance system 100A, 100 of the machine 135. The detailed presentation of the occupational performance system 100, FIG. 3, further illustrates, in the present embodiment, the occupational performance system 100 and method for achieving occupational performance 102 includes: first, setting a plurality of competency based goals 200 with a goal setting diagram 300, to sequentially browse a plurality of goal element lists 400, to sequentially select a plurality of goal elements 500, to set the competency based goals 200; second, recording in a performance record 700 the competency based goals 200, along with recording a plurality of goal status updates 800, a plurality of progress notes 840, a plurality of assessments 820, and a plurality of artifacts 880 in the performance record 700; and third, interacting in a community of practice 900 including a plurality of community members 910 engaging in plurality of community activities 940, and sharing the performance record 700, and performing a multitude of a storage, retrieval, and operation 125 of a multitude of combinations 970 using a plurality of occupational performance data fields 170 selected from the competency based goals 200, the performance record 700, and the community of practice 900 to improve occupational performance 102 of the community of practice 900 within the occupational performance system 100.

One embodiment of the hardware platform 110 includes a cloud computing platform with platform as a service (PaaS), infrastructure as a service (IaaS), and software as a service (SaaS) such as a cloud computing platform available through Force.com or other such providers. This embodiment of the hardware platform 110 also includes a set of regulatory compliance development life cycle tools such as IBM Requisite Pro, Rational Quality Manager, and Rational Appscan or other comparable products and services. One with ordinary skill in the art may make other embodiments of the machine using other available hardware platforms.

First, as illustrated in FIG. 3, setting competency based goals 200 involves making the goal setting diagram 300, the plurality of goal element lists 400, and the plurality of goal elements 500 to enable the learner to set competency based goals 200. As illustrated in FIG. 49, in the present embodiment, the goal setting diagram 300A includes a subject "I" 300Aa, a space or prompt for a "learner's name" 300Ab, a verb "will" 300Ac, a prompt to select a performance standard goal element 500B, a preposition "to" 300Ad, a prompt to select a competency goal element 500A, a prompt to select a measurement goal element 500D, a prompt to select a preposition "using" or "through" 300Ae, a prompt to select a tools, media, activities, curriculum goal element 500C, a preposition "because" 300Af, and a prompt to select a motivator goal element 500E. One with ordinary skill in the art will understand how to prompt the learner to select various goal elements, for example, by prompting "What competency skill would you like to work on?" or "How will you measure your success?" or "What is motivating you to achieve success?" Goal element prompts 500A through 500E, as illustrated in FIG. 49, sequentially prompt the learner to browse the plurality of goal element lists 400A through 400E, as illustrated in FIGS. 5 through 25, as presently illustrated in detail in 400Aa through 400Aq, 400B, 400C, 400D, 400E, to sequentially select the plurality of goal elements 500A through 500E, as presently illustrated in detail in 500AaA through 500AqH, 500Aaa through 500Aqh, 500BA through 500BK, 500Ba through 500Bk, 500CA through 500CP, 500Ca through 500Cp, 500DA through 500DP, 500Da through 500Dp, and 500EA through 500EP, 500Ea through 500Ep, FIGS. 5 through 25. In FIGS. 5 through 25, each goal element has a unique and consistent binary match of a code number and a text phrase. For example, referring to FIG. 5, performance standard goal element "PS.G1.1" 500BA is the code number and "develop questions to initiate research" 500Ba is the text phrase forming the unique and consistent binary match. The code numbers are for outcomes research and scientific research purposes. The text phrases will be viewable to learners, whereas the code numbers will be hidden. The goal elements listed in FIG. 5 through 25 are illustrative, and represent a partial list, of goal elements 500A through 500E to demonstrate to one with ordinary skill in the art how to make goal element lists 400A through 400E. Goal elements are derived from research of one with ordinary skill in the art of various literature and theories drawn from neuroscience, psychology, sociology, philosophy, occupational therapy, education, and self-regulated professions. The goal element lists 400A through 400E as illustrated in FIGS. 5 through 25, and the goal elements 500A through 500E as illustrated in FIGS. 5 through 25 are merely illustrative and represent how one with ordinary skill in the art can make complete lists of goal element lists and goal elements which may be updated and modified over time.

Competency based goals 200, as illustrated in FIG. 3, are depicted in detail as examples 200Z1, 200Z2, 200Z3, and 200Z4 illustrated in FIGS. 26 through 29. For example, the following competency based goals can be set across a wide age span and broad scope of learning: As illustrated in FIG. 26, "I, [audiology learner's name], will discover patterns in information to understand the vocational effects of hearing impairment with 90% accuracy through journal club because it interests me." 200Za; "I, [clinical and translational research learner's name], will assess the benefits of proposed solutions to develop protocols utilizing management of information using computer technology with moderate assistance through mentor meetings because I want to succeed." 200Zb; "I, [dentistry learner's name], will revise communications to improve clarity to order appropriate laboratory, radiographic, and other diagnostic tests as indicated, including biopsy of suspicious oral lesions with 100% accuracy through simulated skills training because I want to master it." 200a; "I, [dietetic learner's name], will conduct research to evaluate ideas to explain the impact of a public policy position on dietetics practice with minimal assistance through self-directed learning because I enjoy it." 200Zd; and, "I, [K-12 math learner's name], will discover patterns in information to describe important features of a data set with 90% accuracy using the Johnny Appleseed Survey because I want to beat my best score." 200Ze can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 27, "I, [K-12 science learner's name], will reason inductively from a set of specific facts to describe how friction affects the amount of force needed to do work over different surfaces with moderate assistance through observation because I want to know how it works." 200Zf; "I,

[K-12 health education learner's name], will develop questions to initiate research to assess key nutrients and their specific functions and influences on body processes (e.g. disease, prevention) correctly 7 times out of 10 using self-directed learning because it interests me." 200Zg; "I, [engineering learner's name], will exchange ideas while recognizing the perspectives of others to understand orbital mechanics applications in astronautical engineering with moderate assistance through seminars because I want to know how it works." 200Zh; and, "I, [law learner's name], will evaluate relationships in ideas to understand the process for recognizing ethical dilemmas with minimal assistance through journal club because I want to feel better about myself." 200Zi can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 28, "I, [medical resident learner's name], will develop a plan of action to accomplish a goal to prioritize and stabilize multiple patients simultaneously with supervision through simulated skills training because I want to succeed." 200Zj; "I, [nurse practitioner learner's name], will develop questions to initiate research to perform a comprehensive assessment of mental health needs of a community with minimal assistance through a team building activity because I want to see the result." 200Zk; "I, [occupational therapy learner's name], will revise communications to improve clarity to articulate a clear and logical rationale for the intervention process correctly 7 times out of 10 through mentor meetings because I enjoy it." 200Zl; "I, [optometry learner's name], will reason inductively from a set of specific facts to understand the basic optical principles of low vision rehabilitation devices with 75% accuracy through case studies because it interests me." 200Zm; "I, [pharmacy learner's name], will discover patterns in information to manage medication use systems to participate in the development of health policy with moderate assistance through observation because I want to know how it works." 200Zn can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 29, "I, [physical therapy learner's name], will deliver a visual presentation for a variety of purposes and audiences to explain the rationale for selected interventions to achieve patient goals as identified in the plan of care with 100% accuracy through an interdisciplinary meeting because I want to beat my best score." 200Zo; "I, [speech-language pathology learner's name], will evaluate relationships in ideas to integrate information about swallowing disorder anatomy and physiology correctly 9 times out of 10 through simulated skills training because I want to know the cause." 200Zp; and, "I, [teacher learner's name], will develop a plan of action to accomplish a goal to present the subject matter in multiple, effective ways which are purposefully selected to engage every student in learning with minimal assistance using case studies because it makes me feel good." 200Zq can be set using the goal setting diagram as illustrated in FIG. 49, the goal element lists 400A through 400E as illustrated in FIGS. 5 through 25, and the goal elements 500A through 500E as illustrated in FIGS. 5 through 25.

The competency based goals, 200Z1, 200Z2, 200Z3, and 200Th as illustrated in FIGS. 26 through 29, are depicted as examples to demonstrate the competency based goals a multitude of learners can set using the goal setting diagram to sequentially browse the plurality of goal element lists to sequentially select the plurality of goal elements. As mentioned above, the goal element lists 400A through 400E as illustrated in FIGS. 5 through 25, and the goal elements 500A through 500E as illustrated in FIGS. 5 through 25 are merely illustrative and as such represent just a sample of competency based goals that learners can actually set using the system and method in FIG. 3.

To set competency based goals, the learner uses the goal setting diagram, FIG. 49, and receives automatic prompts like "What competency skill would you like to work on?" in sequential order: first, competency 500A; second, performance standard 500B; third, tools, media, activities, curriculum 500C; fourth, measurement 500D; and, fifth, motivator 500E, and places each phrase into the goal setting diagram to set competency based goals, and each goal element is automatically placed into the correct field of the goal setting diagram and displayed to the learner as the goal is being set.

To share some advantages, setting competency based goals 200 as illustrated in FIG. 3, using the goal setting diagram 300A as illustrated in FIG. 49, the goal element lists 400A through 400E as illustrated in FIGS. 5 through 25, and the goal elements 500A through 500E as illustrated in FIGS. 5 through 25 include the following: Each goal element supports occupational performance achievement; having the learner include each goal element in setting his/her competency based goals increases the likelihood of achieving goals; providing the learner with text phrases supports successful goal setting and teaches one how to set effective goals; self-set goals by learners are perceived as more relevant and important which increases the likelihood of achievement; the goals are individualized to the learner's needs and interests which facilitates achievement and enables teachers and mentors to tailor and individualize the learning process; defines the purpose of what the learner is learning and shapes the execution of action to learn; enables goal setting for any learner who is participating in any competency based, often called standards based, learning including, but not limited to: audiology, clinical and translational research, dentistry, dietetics, kindergarten through 12th grade public education, engineering, law, medicine, nurse practitioner, occupational therapy, optometry, pharmacy, physical therapy, speech-language pathology, and teachers; enables outcomes based research across a wide age span and broad scope of education; and finally, enables scientific research across a wide age span and broad scope of education. A limitation of the method is that it does not apply to non-competency based education such as a masters of business administration, a bachelor of arts in history, or a doctorate in philosophy. If, however, such education programs establish competency based performance skills for the learning that is to occur, as opposed to content based education, then the method applies.

Second, as illustrated in FIG. 3, recording performance in the performance record 700 involves making the performance record 700 including competency based goals 200, goal status updates 800, progress notes 840, assessments 820, and artifacts 880. As illustrated in FIG. 30, in the present embodiment, the performance record 700 is a spreadsheet including the following: Competency based goals 200 with occupational performance data fields for "goal number data" 170Fe, "competency based goal 200Z data" 170Ff, "500A data" 170Fk, "500B data" 170F1, "500C data" 170Fm, "500D data" 170Fn, and "500E data" 170Fo. The goal number data 170Fe occupational performance field will prompt the learner to categorize the goal as a short-term goal or a long-term goal, record this response and assign a goal number based upon the number of goals the learner has written related to that competency goal element 500A from FIGS. 9 through 25. The competency based goal 200Z data 170Ff occupational performance data field imports the competency based goal 200Z data, like the examples given in 200Z1, 200Z2, 200Z3, and 200Z4, FIGS. 26 through 29. For example "I, [audiology learner's name], will discover patterns in information to understand the vocational effects of hearing impairment with 90% accuracy through journal club because it interests me." 200Za from FIG. 26 which the learner set by using the goal setting diagram 300A illustrated in FIG. 49. Returning to FIG. 30, the 500A data 170Fk occupational performance data field captures the 500A unique and consistent binary match of the code number and text phrase, as illustrated in FIGS. 9 through 25. For example, using the audiology learner's goal immediately above, the 500A data 170Fk occupational performance data field captures the code number "CS.ASHAa. 2.3.2" 500AaB from FIG. 9, and the text phrase "understand the vocational effects of hearing impairment" 500Aab from FIG. 9. Referring to FIG. 30, the 500B data 170F1 occupational performance data field captures the 500B unique and consistent binary match of the code number and text phrase, as illustrated in FIG. 5. For example, using the audiology learner's goal immediately above, the 500B data 170F1 occupational performance data field captures the code number "PS.G1.28" 500BC from FIG. 5, and the text phrase "discover patterns in information" 500Bc from FIG. 5. Referring to FIG. 30, the 500C data 170Fm occupational performance data field captures the 500C unique and consistent binary match of the code number and text phrase, as illustrated in FIG. 6. For example, using the audiology learner's goal immediately above, the 500C data 170Fm occupational performance data field captures the code number "K.HC.1.4" 500CE from FIG. 6, and the text phrase "journal club" 500Ce from FIG. 6. Referring to FIG. 30, the 500D data 170Fn occupational performance data field captures the 500D unique and consistent binary match of the code number and text phrase, as illustrated in FIG. 7. For example, using the audiology learner's goal immediately above, the 500D data 170Fn occupational performance data field captures the code number "M.1.4" 500DE from FIG. 7, and the text phrase "with 90% accuracy" 500De from FIG. 7. Referring to FIG. 30, the 500E data 170Fo occupational performance data field captures the 500E unique and consistent binary match of the code number and text phrase, as illustrated in FIG. 8. For example, using the audiology learner's goal immediately above, the 500E data 170Fo occupational performance data field captures the code number "MV.1.2" 500EC from FIG. 8, and the text phrase "it interests me" 500Ec from FIG. 8.

The learner's competency based goals will be automatically placed by the machine 135, FIGS. 2 and 3, in the correct competency based goal 200Z data 170Ff occupational performance data fields which are mapped to the correct section of the formated performance record by the competency 500A goal element. The learner then receives a prompt, asking whether the goal is a short-term goal or long-term goal, answers the prompt, and the goal is automatically numbered. The correct codes and text phrases for 500A data 170Fk, 500B data 170F1, 500C data 170Fm, 500D data 170Fn, and 500E 170Fo data will be automatically populated by the machine 135, FIGS. 2 and 3, to the appropriate occupational performance data fields.

To share some advantages, capturing the 500A through 500E, FIG. 5 through 25, code number and text phrase in the spreadsheet is designed to facilitate quantitative, qualitative, and mixed method outcomes research and scientific research. Importing the competency based goal 200Z data 170Ff allows the learner and mentor or teacher to quickly identify areas under which the learner has set and has not set competency based goals across the whole scope of competencies. This creates visual feedback for the learner and mentor or teacher to immediately identify areas where competencies are not being addressed, and the impetus to set competency based goals in other areas. Importing the competency based goal also creates a permanent record of the nature of the learner's experience and achievement. Additionally, the competency based goals are an important part of assessments which is discussed in detail below.

Continuing with FIG. 30, in the present embodiment, the performance record 700 is the spreadsheet which also includes goal status updates 800 with occupational performance data fields for "date goal set data" 170Fa, "date goal progress made data" 170Fb, "date goal unmet or modified data" 170Fc, and "date goal met data" 170Fd. The goal status updates 800 occupational performance data fields 170Fa through 170Fd are formatted as mm/dd/yyyy dates.

The learner will be prompted to enter the goal status updates 800 for each and every goal on the performance record, and enter the correct dates for goal set data 170Fa, date goal progress made data 170Fb, date goal unmet or modified data 170Fc, and date goal met data 170Fd by the machine 135, FIGS. 2 and 3.

To share some advantages, tracking progress by recording goal status updates helps the learner to focus on goal directed behavior and achievement of goals, helps the mentor or teacher to identify ways to support the learner's achievement and provide effective and specific feedback, helps to recognize and celebrate achievement which improves self-efficacy and is designed to drive further achievement. Additionally, the goal status updates data are useful for outcomes research and scientific research.

Continuing with FIG. 30, in the present embodiment, the performance record 700 is the spreadsheet which also includes progress notes 800, and related "progress notes 840A data" 170Fq. As illustrated in detail in FIG. 31, the example of progress notes 840A includes the following: salient impressions 840AA, salient impressions data 170Aa, happenings 840AB, happenings data 170Ab, introspection 840AC, introspection data 170Ac, next steps 840AD, next steps data 170Ad, empowerment 840AE, empowerment data 170Ae. Salient impressions 840AA includes a prompt to stimulate the learner's thinking which presently asks, "Can you describe your subjective reactions to your experience this week? What did you experience as important, remarkable, or striking in nature? Did you have any strong emotional reactions to an experience this week? If so, describe your reaction and the impression it left upon you. What will you remember most about what you experienced this week?" Salient impressions data 170Aa is a text box which allows the learner to enter free form text. Happenings 840AB includes a prompt to stimulate the learner's thinking which presently asks, "What events took place this week? What were the facts and circumstances surrounding those events? Can you describe the context in which the events occurred? What was unique or different about the event? How will this event help you to understand what you do next time under a somewhat different set of facts and circumstances? In what way was this event similar or different than your other experiences? To what degree was the experience similar or different?" Happenings data 170Ab is a text box which allows the learner to enter free form text. Introspection 840AC includes a prompt to stimulate the learner's thinking which presently asks, "What did you learn this week? What did you learn from what you observed, or when you performed a task, or when you discussed your observations or performance with your mentor, teacher, peers, or others? What did you learn from what you researched, read, analyzed, and wrote? What did you learn by noticing what/how others performed, avoided performing, or failed to perform properly? Are you working towards meeting your short-term goals? Did you meet a short-term goal? Do you need to modify a short-term goal because something has changed? Do you need to discontinue or discharge a goal because it has become irrelevant, impossible, or impractical to meet? Do you need to set a new short-term goal? Do you want to continue working on the same short-term goal, but in the context of a new assignment? Consider these questions related to your long-term goals." Introspection data 170Ac is a text box which allows the learner to enter free form text. Next steps 840AD includes a prompt to stimulate the learner's thinking which presently asks, "What are the preparatory actions that you need to take to achieve your current short-term and long-term goals? What does your list of 'Things to Do' include for the next week or two? Are there any systems or procedures that you need to identify, have access to, or understand to meet your goals? What can you do to ensure that time, effort, and resources are allocated effectively to enable you to complete your work?" Next steps data 170Ad is a text box which allows the learner to enter free form text. Empowerment 840AE includes a prompt to stimulate the learner's thinking which presently asks, "What do you now possess the capacity or authority to do? About what experience can you now claim, 'I did it!'? How did you experience a small measure of success this week? What kind of personal achievement do you have to celebrate?" Empowerment data 170Ae is a text box which allows the learner to enter free form text.

The learner will have a progress note formated with the headers salient impressions 840AA, happenings 840AB, introspection 840AC, next steps 840AD, and empowerment 840AE as headers, each with space for the learner to enter free form text 170Aa, 170Ab, 170Ac, 170Ad, and 170Ae data, respectively. If the learner needs to review the prompts to stimulate thinking, he or she will hover over the relevant header and the relevant prompt will appear, and then disappear as the learner move the cursor to enter free form text.

To share some advantages, the progress notes facilitate organization, planning, reflection and execution of occupational performance and build self-efficacy for the learner. The progress notes allow the teacher, mentor and others to have a window into the experience and mental thought processes of the learner, many experiences of which may occur when the teacher, mentor, and others are not in a position to observe the learning and achievement that is occurring. The progress notes can serve as a springboard for group discussion. The progress notes also produce useful data for outcomes research and scientific research.

Continuing with FIG. 30, in the present embodiment, the performance record 700 is the spreadsheet which also includes assessments 820 with occupational performance data fields for "learner formative assessment scores data" 170Fg, "mentor formative assessment scores data" 170Fh, "learner summative assessment scores data" 170Fi, and "mentor summative assessment scores data" 170Fj. The mentor or teacher can establish a scoring rubric of his or her choice. A Likert scale with numeric scores 1 through 5, or a version of the Dreyfus scale with level of skill acquisition number scores 1 through 5, or another scoring rubric with at least some evidence of validity and reliability may be used. Additional mentor formative and summative assessment occupational performance data fields may be added if the learner would like to have more than one mentor or teacher participate in assessments.

The learner will enter a numeric score in the appropriate formative or summative assessment occupational performance data fields, following instructions for the scoring rubric chosen by the teacher, mentor, or other, along with instructions for completion deadlines and meeting with respective teachers or mentors to compare scores and discuss feedback. The learner will receive a prompt if any data fields are left blank and the learner will not be allowed to enter a score not listed on the instruction sheet, such as a "1.5" if the scoring rubric instructs to only use whole numbers. The learner will receive automatic reminders to complete the assessment before the deadline, and if necessary, continued reminders to complete the assessment if the deadline passes. Any mentors or teachers involved with respective learners will also enter a numeric score in the appropriate formative or summative assessment occupational performance data fields, following the scoring rubric and instructions. The mentor or teacher will receive a prompt if any data fields are left blank and the mentor or teacher will not be allowed to enter a score not listed on the instruction sheet, such as a "1.5" if the scoring rubric instructs to only use whole numbers. The mentor or teacher will receive automatic reminders to complete the assessment before the deadline, and if necessary, continued reminders to complete the assessment if the deadline passes.

To share some advantages, the formative and summative assessment scores reflect occupational performance in authentic environments observed over a period of time. The formative and summative assessments inherently afford weighting to the competency skills by listing the learner's specific competency based goals 200 in lieu of the endless need to create behavioral anchors or qualifiers around performance skills which is problematic, or confounding, or unsustainable. The formative and summative assessments allow the learner to self-score his or her own occupational performance along with his or her mentor or teacher. Accurate self-assessment is very important for members of self-regulated professions who must decide whether they possess minimum competency to perform a specific task safely and independently, or pose risk to their patients or clients. Accurate self-assessment is also very important for determining what future goals any learner should consider for himself or herself. A learner must accurately grasp his or her current occupational performance abilities to effectively set future goals as a life-long learner. The formative and summative assessment encourages the learner and mentor or teacher to exchange dialogue and share feedback about the learner's performance with a specific, objective approach.

Continuing with FIG. 30, in the present embodiment, the performance record 700 is the spreadsheet which also includes artifacts 880, and related "artifacts 880Z data" 170Fp. As illustrated in detail in FIG. 32, the example of artifacts 880Z includes the following: "my presentations" 880ZA, "my reports and publications" 880ZB, "my tests, evaluations, and assessments" 880ZC, "my personhood" 880ZD, "my awards and recognition" 880ZE, "my vocational interests" 880ZF, "my career opportunities" 880ZG, "my resume" 880ZH, "my letters of recommendation" 880ZI, "my contacts" 880ZJ, "my continuing education" 880ZK, and "my licenses, certification, and special training" 880ZL. My presentations 880ZA, for example, may include any written presentations, speeches, or audiovisual presentations the learner gives. My reports and publications 880ZB, for example, may include book reports, term papers, poems, short stories, newspaper editorials or articles, doctoral thesis, journal articles, books, chapters, and the like, that the learner produces. My test, evaluations, and assessments 880ZC, for example, may include standardized assessment scores, any tests or quizzes, mid-term and final exams, oral exam results, simulated skills training results, standardized examination results (SAT, ACT, LSAT, GRE, GMAT, etc.), board scores, annual performance evaluations, physical/functional capacity evaluations, vision tests, driving tests, drug screens, criminal background checks, and so forth of the learner. My personhood 880ZD, for example, may include results of items illustrated in FIG. 35 which will be discussed in detail below, such as an Interest Inventory 940Bb, a Role Checklist 940Bc, a Myers-Briggs type indicator 940Bd, a Social Style profile 940Be, and a Flower Exercise 940Bf, as well as other personhood items such as familial cultural or historical items and so forth that are significant to the learner. My awards and recognition 880ZE, for example, may include trophies, scholarship awards, metals, ribbons, certificates of achievement, plaques, leadership positions, and so forth of the learner. My vocational interests 880ZF, for example, may include results of items illustrated in FIG. 44 which will be discussed in detail below, such as explore vocations data as well as vocational interest items from career days, bring your child to work days, career guides, and so forth. My career opportunities 880ZG, for example, may include job ads, job leads, job postings, career guides, professional program literature, and so forth that interest the learner and for which the learner may be qualified or holds as a dream job. My resume 880ZH, for example, may include all historical resumes or curriculum vitae of the learner. My letters of recommendation 880ZI, for example, may include any letters of recommendation, letters of commendation, letters of reference, letters of support and so forth of the learner. My contacts 880ZJ, for example, may include any contact information of any persons or entities that may assist the learner with vocational exploration, vocational readiness, vocational opportunities, vocational counseling, vocational mentoring, and so forth that the learner collects. My continuing education 880ZK, for example, may include any continuing education certificates, attendance records, brochures about future courses, workshops or seminars and so forth of the learner. My licenses, certification, and special training 880ZL, for example, may include professional licenses, board certifications, letters of reciprocity, visitor status, specialized training certificates, documentation related to good standing or adverse actions, reprimands, removal, or re-installment of license or certification and so forth of the learner.

The learner will collect all artifacts in a designated electronic folder in the machine 135, FIGS. 2 and 3.

To share some advantages, learners must be taught how to prepare for work force readiness. Artifacts 880Z constantly reminds learners to think in terms of how their occupational performance impacts their vocational opportunities. Artifacts 880Z drives vocational exploration, vocational planning, and vocational attainment. Competency goal elements 500A, as illustrated in FIGS. 9 through 25, of many programs from K-12 through professional programs specifically include competency requirements related to vocational exploration, planning, and attainment. The learner can produce or collect various artifacts 880Z and store them in the performance record 700 section for artifacts to show achievement of self-set competency based goals related to vocations in artifacts 880Z. Learners, especially those who have limited role models, can start to envision themselves pursuing various vocations and generate feedback and solicit guidance from mentors, teachers, peers, and others. Artifacts 880Z helps organize learners and helps them manage the task of continuously collecting artifacts related to vocations. Any learner who has submitted a bar application, updated an academic curriculum vitae, or submitted a college application, or applied for a competitive job, or run for a leadership position understands the daunting task of collecting relevant artifacts of one's achievements and the benefits of organization and planning.

Third, as illustrated in FIG. 3, interacting in the community of practice 900 involves making the plurality of community activities 940 for the plurality of community members 910 to engage in, and sharing aspects of the performance record 700, and performing a multitude of a storage, retrieval, and operation 125 of the multitude of combinations 970 of research approaches using the occupational performance data fields 170 to improve occupational performance 102 of the community of practice 900. The method is iterative and continuous. As illustrated in FIG. 48, in the present embodiment, the community members 910Z include the following: learners 910Za, teachers 910Zb, mentors 910Zc, other persons 910Zd, parents, guardians 910Ze, researchers 910Zf, education programs and institutions 910Zg, professional associations 910Zh, regulatory and licensing agencies 910Zi, accreditation agencies 910Zj, corporations and other employers 910Zk, government agencies 910Zl, and other stakeholders 910Zm. As illustrated in FIG. 33, in the present embodiment, the community activities 940Z include the following: storytelling by analogy to share experiences 940A, participate in personhood activities 940B, explore vocations 940C, share artifacts 940D, conduct outcomes research 940E, conduct scientific research 940F, conduct performance measurement research 940G, examine self-regulation of professions 940H, assess evidence based multimedia: tools, media, activities, curriculum 940I, explore and implement new applications to improve occupational performance 940J.

Continuing with FIG. 33, in the present embodiment, community activities 940Z include storytelling by analogy to share experiences 940A. As illustrated in detail in FIGS. 34 and 50, the example of storytelling by analogy to share experiences 940A1 and 940A2 includes the following: sounding the horn 940Aa, sounding the horn data 170Ga, playing leap frog in the night 940Ab, playing leap from in the night data 170Gb, burning just one flashlight 940Ac, burning just one flashlight data 170Gc, modified leap frog: walking together 940Ad, modified leap frog: walking together data 170Gd, running together on white gravel 940Ae, running together on white gravel data 170Ge, dew-covered spider webs 940Af, dew-covered spider webs data 170Gf, wolves howling in the distance 940Ag, wolves howling in the distance data 170Gg, questioning the compass's reliability 940Ah, questioning the compass's reliability data 170Gh, lessons learned from your handbook 940Ai, lessons learned from your handbook data 170Gi, blazing "x's" on trees 940Aj, blazing "x's" on trees data 170Gj, finding your fresh water stream 940Ak, finding your fresh water stream data 170Gk, growing accustomed to the night 940Al, growing accustomed to the night data 170G1, sharing stories back at base camp 940Am, and sharing stories back at base camp data 170Gm. The following allegory, Finding Your Way: The Lessons of Experience, from Preserving the Social Contract, B. A. Wright (2009), accompanies 940A:

The guide master grouped us in pairs, with one novice and one experienced trail-blazer per team. She told us to gather two canteens of water, two energy snacks, two flash lights with new batteries but no back-up batteries allowed, a Swiss Army knife, and one compass. Additionally, the guide master supplied each of us with a "rape horn," instructing us to use it only in the event of a serious emergency. Upon sounding your "rape horn," you must know that SWAT Rangers will be immediately dispatched via helicopter to extract you from the woods, she explained Just after dusk, each team is dropped in a different location deep in the woods of Ozark Mountain country. The guide master handed my team the following instructions on an index card: "Travel due northeast until you meet a white gravel road Take the white gravel road due southeast until it forks. At the fork set your compass due southwest and travel until you reach the stream. Traveling near the bank, head up stream until you reach the base camp. When your team reaches the base camp, you have succeeded"

The time is now 8:00 p.m., it is pitch dark, the moon is almost full, the stars are shining bright against the clear sky, the temperature is about fifty degrees, and the leaves have begun to fall from the trees. While orienteering at night, in pairs of two, the most effective method for staying on course is playing "leap-frog." Leap frog is a method where one member of the team sets the compass, in this case due northeast, then holds the flashlight under the compass, and points the light in the same direction as the needle on the compass. The light will inevitably shine on a tree since the woods are so dense. One member of the team will leap ahead to reach the target tree, while the other team member remains behind shining the light on the target tree. Only after the first member reaches the target tree by blazing ahead alone, will the light-shedding member leap to catch up.

As you begin this process, you both realize that there are other decisions you must make. Even the experienced member of your team has only been orienteering in the daytime in a team of four, so the challenges presented in this situation are somewhat different than prior experience. You must decide whether the trail-blazer should burn the second flashlight as he or she forges ahead, and when the light-shedder is catching up. You start wondering how long your journey will take, how long your flashlights will burn, and realize that you were not told how long you would be in the deep woods. A bit of fear of the unknown sets in as you realize that you don't know how long it will take to succeed in finding the base camp. Together, you decide to conserve your resources and burn just one flashlight at a time. You know this is the right decision, but as you implement this decision, you realize it has its drawbacks as well. The trail-blazer is forging through the thickness of the brush, fallen leaves and branches, with nothing to light the path, only a beam shining on the target tree. Leaping ahead in the darkness requires courage, a keen alertness, and an agile posture over the unsteady terrain. Staying behind as light-shedder bears its own unique experience—technical accuracy in finding a good target, determining how far ahead that target should be, waiting patiently as your partner reaches the target, and the growing sense of loneliness as your only human contact slips away into the darkness.

While you both know that playing leap frog is the most effective method for accurately staying on course, it is very slow-going and is starting to take its physical and emotional toll on you as the night wears on. Together; you decide to modify the method. You agree to set the compass, shine the light, and walk together toward the target tree. This feels better. The loneliness and fear of the night start to subside as you find friendship while traveling together. The light-shiner realizes that maintaining the beam on the target tree is much more difficult while navigating over the rugged terrain and talking. You find yourselves heading in the general direction in which you shined the light and checking your compass more frequently because maintaining the target it more elusive while walking. Finally, one of you expresses concern about not hitting the white gravel road yet and questions whether traveling together might be throwing you off course. Together, you agree to resume the playing leap frog.

Together, you reach the white gravel road at 11:30 p.m. and you're ecstatic. You did it together! You quickly check your compass to see which direction is southeast. Fabulous! You head straight down the gravel road. You are walking briskly now, no need to check the compass until you hit the fork in the road. Just the physical space around your body created by the road, pushing the trees back into the woods, allow you to breathe easier. The rhythm of your pace, the speed of your progress, and the joy of your success, are all celebrated together.

Suddenly, you reach the fork in the road, and the path you are directed to take is neither left nor right, but rather due southwest. Yes, it is time to set your compass and head back into the woods. You swell up with emotion as the thickness of woods seems to invade your space. Together, methodically, you start playing leap frog again. It is not long before your first flashlight grows dim, too dim to reach the target tree, so you begin to burn the second flashlight. Again, trail-blazer and light-shedder are working in tandem to achieve the goal. As the light-shedder aims for the next target, the beam shines brilliantly on an enormous spider web. It must be four feet wide. The amazingly intricate web is covered with drops of dew, sparkling in your light. A large fury spider sits dead-center in his web. You usually don't like spiders, but strangely enough, you're happy to see something besides your partner, the moon, and the endless sea of trees. Even though the web is blocking your path toward your next target tree, you decide not to destroy something so beautiful. Together, you realize that it is okay sometimes to be thrown a little off course.

Fatigue is setting in. The time is now 1:18 a.m. Wolves begin howling in the distance. It is almost impossible to pinpoint the direction of the threat because their howl is bouncing off the mountainside. You are glad you have your rape horn. You feel for it against your chest, reassured that it still hangs around your neck, even though you've felt it bumping against your chest with every step since your journey began. You don't want to be the team that calls in the Rangers, so you vow not to sound the alarm unless the threat becomes imminent.

The night is wearing on, and it is now 2:37 a.m. You never thought the guide master would leave you in the woods so long. The goal of finding the base camp starts to feel unattainable. Your senses are getting dull, the sounds of the night are impinging on your emotions, and the darkness of the night instills a sense of anguish. Together, you both start questioning the reliability of your compass. Surely, we should have reached the stream by now. You begin thinking through lessons learned in your orienteering handbook. First, you remember that the compass never lies. The compass is a reliable instrument, gaining its direction from the unwavering pull of the North Pole. This theory is sound. It will be questioned by those blazing trails, but this theory remains well-settled. Second, you remember the anecdotal story about people getting lost in the woods, traveling in circles, in their attempt to follow the moon, and realize the futility of relying on the moving target of the moon to direct your path. Third, you learned that the eastern hillside, as a general rule, has denser underbrush than the western hillside. As you compare the two for the first time, one hillside does seem denser than the other. This information, along with your reliable compass, provides reassurance that you are traveling in the right direction of your ultimate goal.

As you continue playing leap frog through the dark you see a sign of an expert who has gone before you. A large "X" is blazed into a tree. This is an unmistakable sign, carved by the guide master, to renew your sense of hope and conviction that you are heading the right direction. Someday, when you have the expertise, you will confidently use your Swiss Army knife to blaze the trail and instill hope in other travelers. The time is now 3:24 a.m. Even though you are physically weary, the "X" brightened your emotions and gives you the energy to press on.

Now, you can finally hear it. The dancing sounds of fresh water rolling over rocks in the distance. With your second flashlight now growing dim, together you decide to turn it off and walk side by side in the darkness letting the sound of the stream serve as your guide. In no time, it seems, you reach the stream. You are overjoyed! This is worth celebrating! You are laughing, and crying, jumping up and down, and absolutely confident you are going to achieve your goal.

Together, you walk upstream along the bank. You are talking, reflecting on the events of the night, and sharing the glory of knowing that you did it together. Suddenly, you realize how accustomed you've grown to the darkness of the night and the thickness of the woods. The shadows of the moon and sounds of the wolves no longer play on your emotions. You have experienced all of it. And, the fear of the unknown is gone.

As the terrain becomes a steeper uphill climb, you and your partner occasionally find yourself placing your hand on a rock or branch to maintain control. Almost simultaneously, you gasp and cry out to each other as you see the glow of the base camp in the distance. You are scrambling uphill faster now. As you reach the site, the camp is lit by make-shift luminaries from cut open milk jugs filled with candles all aglow. There is your guide master, sitting atop a large bolder, and two other teams to greet you. You exchange stories about your experiences and wait for the other three teams to arrive. The guide master leads the ceremony where everyone receives their award in commemoration of their success. Congratulations, you did it!

In the machine 135, FIGS. 2 and 3, for storytelling by analogy to share experiences 940A, 940A1 and 940A2, FIGS. 33, 34 and 50, the learner will enter free form text into a chat room discussion board under the appropriate discussion string's 170Ga through 170Gm occupational performance data field sharing how the learner's own experience is analogous 940Aa through 940Am, FIGS. 34 and 50. The learner will share his or her experience with other members of the community of practice including community members 910, FIG. 3, such as other learners, teachers, mentors, and others through the automated discussion board. The chat room discussion board will be limited to a subset of the community of practice for active participation purposes, determined by the teacher or mentor. The automated chat room discussion board will list 940Aa through 940Am, FIGS. 34 and 50, as discussion strings under which learners can enter free form text in 170Ga through 170Gm occupational performance data fields to share how their experiences are analogous to the experiences in the story listed above. The chat room discussion board will have query functions for the teacher, mentor, or others to query the data, such as: the number of entries per learner per week, the number of learners making entries under various categories, the number of learners making entries under various categories on a per week basis over time, and so forth.

To share some advantages, storytelling creates a fluid approach for members of the community of practice to internalize a story and create a script of their unique learning experience. Symbolic representations, that is 940Aa through 940Am, FIGS. 34 and 50, facilitate experiential learning through enabling the learners to link their unique experience to symbols and share personal experiences with other members of the community of practice as part of the process of developing tacit knowledge. Storytelling allows teachers, mentors, and others to identify learners with significant psychosocial or even mental health problems that may require intervention. Storytelling allows teachers, mentors, and others to identify curriculum or resource needs of the learners, in real-time, and implement improvements to impact learning. Traditional approaches including end of course surveys fail to capture curriculum and resource needs in time to impact learning and often may fail to capture the learning needs at all if the survey sensitivity is weak or the learner limits his or her feedback. Storytelling allows learners to share experiences from their whole lives which impact learning; the interplay of familial relationships, the dynamics of competing life roles, financial issues, health issues, etc., are more readily shared and their impact felt as an integrated part of the learners' story of being on a path to acquire competency based skills. Storytelling lends itself to outcomes based research and scientific research to improve achievement of occupational performance. The storytelling by analogy to share experiences 940A creates opportunities, referring to FIG. 3, for community members 910 such as teachers, mentors, and others to lead community activities 940 within the community of practice 900 around storytelling by analogy to share experiences 940A, FIGS. 33, 34 and 50.

Continuing with FIG. 33, in the present embodiment, community activities 940Z include participate in personhood activities 940B. As illustrated in detail in FIG. 35, the example of participate in personhood activities 940B includes: a demographic survey 940Ba, a competency skill importance survey 940Bg, a competency skill relevance survey 940Bh, a competency skill interest survey 940Bi; and the following optional items: Interest Inventory 940Bb, Role Checklist 940Bc, Myers-Briggs type indicator 940Bd, Social Styles profile 940Be, the Flower Exercise 940Bf.

To participate in personhood activities 940B, FIGS. 33 and 35, the learner will complete the demographic survey 940Ba with demographic questions created by one with ordinary skill in the art. The machine 135, FIGS. 2 and 3, will notify the learner if any fields are incomplete, request that the learner complete the survey, and store all data in retrievable form. The learner will complete the competency skill importance survey 940Bg and competency skill relevance survey 940Bh which lists the competency 500A elements for the learner's competencies, like the competency text phrases listed in FIGS. 9 through 25 and the Likert scale, with instructions for the learner to score his or her perceived importance and relevance of each competency on the one through five point Likert scale. The machine 135, FIGS. 2 and 3, will prevent the learner from circling more than one number on the five point scale and prevent the learner from marking the survey form halfway between two points on the five point Likert scale. The machine 135, FIGS. 2 and 3, will notify the learner if any fields are incomplete, request that the learner complete the survey, and store all data in retrievable form. The learner will complete the competency skill interest survey 940Bi by ranking his or her perceived top ten most interesting competency skills as well as his or her perceived top ten least interesting competency skills from a list of the competency 500A elements for the learner's competencies, like the competency text phrases listed in FIGS. 9 through 25. As the learner selects his or her most and least interesting competency skills one by one, the machine 135, FIGS. 2 and 3, will create a rank ordered list at the top of the electronic survey form. If the learner wishes to delete or change the rank order of a competency skill, the delete, drag, and drop functions of the machine 135, FIGS. 2 and 3, will allow the learner to modify his or her list. The machine 135, FIGS. 2 and 3, will notify the learner if any fields are incomplete, request that the learner complete the survey, and store all data in retrievable form. If the teacher, mentor or other person has decided to have the learners complete any or all of the optional items of the personhood activities; namely, Interest Inventory 940Bb, Role Checklist 940Bc, Myers-Briggs type indicator 940Bd, Social Styles profile 940Be, the Flower Exercise 940Bf, then the learner will follow the instructions attached to each component to complete the personhood activities. The learner will complete each optional survey as instructed, in an computerized format. The machine 135, FIGS. 2 and 3, will notify the learner if any fields are incomplete, request that the learner complete the survey, and store all data in retrievable form.

To share some advantages, participate in personhood activities 940B allows the learner to identify competency skills he or she perceives as important and relevant. The learner's perception of importance and relevance in goal setting is correlated with achievement. If the learner lacks perceived importance and relevance of some competency skills, then teachers and mentors can work to align the learner's perceptions with the requirements of the program, course or degree that enumerates the competency skills, or at least provide consultation to the learner about the learner's likely potential satisfaction or persistence in occupational performance of skills which her or she finds unimportant or irrelevant. Conversely, teachers, mentors and others persons involved in a program, course, or degree may rightly question the rational for inclusion of a particular competency skill if a significant number of learners rate the competency skill as either unimportant or irrelevant. Diversity and disparity issues in education are important considerations, yet currently there are few methods to consider such issues, their impact on education, and recommendations to address reform. The participate in personhood activities 940B data can be used for outcomes research and scientific research to address diversity and disparity issues. The Interest Inventory 940Bb, Role Checklist 940Bc, Myers-Brigs type indicator 940Bd, Social Style profile 940Be, the Flower Exercise 940Bf, and competency skill interest survey 940Bi data can be used to identify and suggest possible vocational interests, and is discussed in greater detail below. The participate in personhood activities 940B creates opportunities, referring to FIG. 3, for community members 910 such as teachers, mentors, and others to lead community activities 940 within the community of practice 900 around personhood activities 940B, FIGS. 33 and 35.

Continuing with FIG. 33, in the present embodiment, community activities 940Z include explore vocations 940C. As illustrated in detail in FIG. 36, the example of explore vocations 940C includes: the plurality of community members, for example, a K-12 math student 910Ae, a clinical and translational research fellow 910Ab, and a practicing engineer 910Ah; a multitude of combinations of each community member respectively, for example, 940Bb+940Bc+940Bd+940Be+940Bf+940Bi+170Fg+170Fh+170Fi+170Fj, 970De of the K-12 math student 910Ae, 940Bb+940Bc+940Bd+940Be+940Bf+940Bi+170Fg+170Fh+170Fi+170Fj, 970Db of the clinical and translational research fellow 910Ab, and, 940Bb+940Bc+940Bd+940Be+940Bf+940Bi+170Fg+170Fh+170Fi+170Fj, 970Dh of the practicing engineer 910Ah, are combined as combinations for exploring vocations 970D, and generate explore vocations data for K-12 math student 170De, explore vocations data for clinical and translational research fellow 170Db, and explore vocations data for practicing engineer 170Dh, occupational performance data fields for exploring vocations.

To further illustrate how exploring vocations works, referring to FIG. 36, assume the following hypothetical facts. The combinations for exploring vocations 970D searches to correlate and match occupational performance data fields across the plurality of community members 910. Assume the K-12 math student 910Ae expresses interest math, sports, and constructing things in the interest inventory 940Bb, Myers-Briggs type indicator 940Bd of "INTP" (I=Introvert, N=Intuitive, T=Thinker, P=Perceiver), Social Style profile 940Be of "Analytical-Analytical," and competency skill interest survey 940Bi that identifies 500A type, FIG. 49, hypothetical competency goal elements in math related to levers, force, statistics, probability testing, and generating hypotheses as most interesting. Now assume the K-12 math student 910Ae combinations 970De find matches with the clinical and translational research fellow 910Ab combinations 970Db, and the practicing engineer 910Ah combinations 970Dh through combinations for exploring vocations 970D. Each community member receives communication, via a letter or email, to share the community members 910 common interests through the explore vocations data 170De, 170Db, and 170Dh.

To explore vocations 940C, FIG. 36 in the machine 135, FIGS. 2 and 3, the learner will complete the surveys and the machine 135, FIGS. 2 and 3, will store the data in retrievable form. The learner will receive a prompt if any data fields are left blank or if the learner enters a response that is inconsistent with survey instructions to ensure data collection is complete and accurate. The teacher, mentor, or other person will perform combinations 970, FIG. 3, with the data using database software employed by one with ordinary skill in the art to match community members with common interests to explore vocations. The machine 135, FIGS. 2 and 3, will notify the community members via mail or email of the match and provide the explore vocations data, such as 170De, 170Db, and 170Dh, referring to FIG. 36, to each community member 910, such as 910Ae, 910Ab, 910Ah.

To share some advantages, to illustrate by example, the K-12 math student 910Ae has an opportunity to explore vocations of the clinical and translational research fellow 910Ab who hypothetically is a physical therapy doctoral student studying the differences in orthopedic knee injuries in boys and girls based upon body posture when they kick the soccer ball. And, the K-12 math student 910Ae has an opportunity to explore vocations of the practicing engineer 910Ah who hypothetically designs bicycle helmets for a leading manufacturer and is studying the rotational force effects of helmets having long, aerodynamic extensions at the back of the helmet versus a low profile rigid helmet to determine whether the low profile helmet reduces the risk of brain injury if rotational force is involved in a bicycle crash. These three community members 910 have mutual common interests and the clinical and translational research fellow 910Ab and practicing engineer 910Ah have both also expressed interest in mentoring young people, increasing awareness of their respective professional fields, and sharing information about career outlook information regarding job growth, salaries, etc. The K-12 math student benefits by learning about careers to which he or she has an interest and might not otherwise learn about, and makes connections with mentors and role models when he or she might otherwise have none. At an early age, the K-12 math student 910Ae internalizes the need to perform well and persist in math courses and, importantly, begins to try on different career hats. The K-12 500A competencies as well as 500A competencies for many other professional programs, FIGS. 9 through 25, include exploring vocations as explicit competency skills. The clinical and translational research fellow 910Ab and practicing engineer 910Ah have an opportunity to participate in self-regulation of their professions through promoting the professions and recruiting potential new members, provide community service as role models, possibly satisfy continuing education credit requirements, use outreach as part of their role as a chair or board member of a nonprofit organization, and so forth. The explore vocations 940C creates opportunities, referring to FIG. 3, for community members 910 such as teachers, mentors, and others to foster relationships and other community activities 940 within the community of practice 900 around explore vocations 940C, FIGS. 33 and 36.

Continuing with FIG. 33, in the present embodiment, community activities 940Z include share artifacts 940D. Share artifacts 940D creates an opportunity for artifacts 880Z, FIG. 32, from performance records 700A, FIG. 30 to be shared by community members 910, as community activities 940, FIG. 3.

To share artifacts 940D, FIG. 33, the learner will share his or her artifacts through speeches, group dialogue, question and answer sessions, print media, such as posters, brochures, hand-outs, packets, and additionally the machine 135, FIGS. 2 and 3, allows the learner to use presentation software, voice and video chat, podcasts, smart boards, and any other interactive multimedia available. The machine 135, FIGS. 2 and 3, will store data in retrievable form.

To share some advantages, the community of practice 900, FIG. 3, creates opportunities for community members 910 to share artifacts 940D that individual members create related achieving their competency based goals 200, FIG. 3. Visual, written, and audiovisual presentation of artifacts 880, FIG. 30, is a way to share artifacts 940D, FIG. 33, in preparation for an actual presentation or speech the community member 910 may give related to his or her work. Sharing artifacts 940D gives the community member an opportunity to gain valuable feedback from other community members before sharing the presentation, speech, publication, etc. more widely. Presenting and sharing information helps build the community of practice 900, FIG. 3. Presenting, critiquing, analyzing and sharing constructive feedback to others are in themselves competency 500A, FIGS. 9 through 25, skills for many learners' education standards. Exploring careers and job seeking skills are also in themselves competency 500A, FIG. 9 through 25, skills for many learners' education standards. Sharing challenges can create support, increase persistence, and aid in problem-solving issues related to knowledge development or other issues confronting professions. Sharing success engenders a sense of empowerment, recognition, and good will among community members 910, FIG. 3.

Continuing with FIG. 33, in the present embodiment, community activities 940Z include conduct outcomes research 940E. As illustrated in detail in 940E1, FIG. 37, hypothetical data for illustrative purposes in the example of conduct outcomes research 940E1 includes: combinations 970E1 of goal number data 170Fe and date goal met data 170Fd correlation with competency skill relevance data 940Bh displayed in a graph. The teacher, mentor, or other person can select the multitude of combinations of data to examine various alignment issues in education. Here, the hypothetical data display alignment of goal achievement with competency skill relevance 940E1; specifically, a positive correlation of the learner's perceived level of competency skill relevance from survey data with which goals the learner has met.

Continuing with FIG. 33, in the present embodiment, community activities 940Z include conduct outcomes research 940E. As illustrated in detail in 940E2, FIG. 38, hypothetical data for illustrative purposes in the example of conduct outcomes research 940E2 includes: combinations 970E2 of demographic survey 940Ba and competency 500A correlation with combinations 970E1 goal number data 170Fe and date goal met data 170Fd displayed in a graph. The teacher, mentor, or other person can select the multitude of combinations of data to examine various attainment issues in education. Here, the hypothetical data display attainment of competencies based upon demographics 940E2; specifically, disparities in goals met among whites, blacks, and hispanics for various competencies. With this level of granularity in the data, the community of practice 900, FIG. 3, can begin to uncover and examine why, hypothetically, an african american learner performs higher than his or her peers on counting currency and time-telling versus a caucasian learner performs higher on word problems and naming geometric shapes, and why african american, caucasian, and hispanic learners all perform about the same on generating hypotheses.

Continuing with FIG. 33, in the present embodiment, community activities 940Z include conduct outcomes research 940E. As illustrated in detail in 940E3, FIG. 39, hypothetical data for illustrative purposes in the example of conduct outcomes research 940E3 includes: combinations 970E3 of demographic survey 940Ba and competency skill importance survey 940Bg correlation with combinations 970E1 of goal number data 170Fe and date goal met data 170Fd displayed in a graph. The teacher, mentor, or other person can select the multitude of combinations of data to examine various persistence issues in education. Here, the hypothetical data display persistence of goal achievement related to competency skill importance and demographics 940E3; specifically, disparities in goals met among whites, blacks, and hispanics based upon whether the learner perceived the competency skill as important. With this level of granularity in the data, the community of practice 900, FIG. 3, can begin to uncover and examine why, hypothetically, an african american learner perceives math facts for subtraction as important versus describing attributes of shapes as unimportant and how this perception may impact persistence in achieving competency skills, and why a hispanic learner perceives describing attributes of shapes as more important than expressing equations and how this perception may impact persistence in achieving competency skills.

To conduct outcomes research 940E1, 940E2, and 940E3, FIGS. 37, 38, and 39, using the machine 135, FIGS. 2 and 3, the teacher, mentor, or other person will retrieve data from the plurality of occupational performance data fields, import the data into statistical software, and perform combinations 970, FIG. 3, with the data using statistical analysis software employed by one with ordinary skill in the art to analyze the data.

To share some advantages, teachers, mentors, and other persons can conduct outcomes research, as examples illustrate in FIGS. 37, 38, 39, for individual learners and learners in the aggregate, across selected competency skills, and time periods, and examine data and their implications for improving occupational performance. The data give the community of practice 900, FIG. 3, a multitude of options for conducting qualitative, quantitative and mixed method outcomes research to identify areas of success, areas of concern, and areas of serendipity, and so forth. The data capture occupational performance improvement in authentic environments over time in sharp contrast to standardized testing measures or examinations in testing environments on a given day. The conduct outcomes research 940E creates opportunities, referring to FIG. 3, for community members 910 such as teachers, mentors, and others to engage in community activities 940 within the community of practice 900 around conduct outcomes research 940E, 940E1, 940E2, 940E3, FIGS. 33, 37, 38, and 39.

Continuing with FIG. 33, in the present embodiment, community activities 940Z include conduct scientific research 940F. As illustrated in detail in 940Fa, FIG. 40, the example of conduct scientific research 940Fa includes: progress note data 170A including salient impressions data 170Aa, happenings data 170Ab, introspection data 170Ac, next steps data 170Ad, and empowerment data 170Ae performing the multitude of combinations 970 to re-categorize the occupational performance data fields as progress note brain function data including self-efficacy data 170Ba, goal commitment data 170Bb, goal relevance data 170Bc, goal importance data 170Bd, self-appraisal data 170Be, organization data 170Bf, emotional imprint data 170Bg, goal-setting behavior data 170Bh, share experiences data 170Bi, sensory experiences data 170Bj, success data 170Bk, and determination data 170Bl. One with ordinary skill in the art may choose any number of approaches to re-categorize the progress note. For example, to perform combinations 970 to re-categorize the data using the machine 135, FIGS. 2 and 3, using various electronic paintbrushes or highlighters for each 170B progress note brain function data occupational performance data field either directly on the free form text of 170A progress note data or to copy/paste the free form text 170A progress note data directly into 170B occupational performance data fields are two approaches. Again, referring to FIG. 3, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fa conduct scientific research, qualitative study of progress note and brain function.

To conduct outcomes research 940Fa, FIG. 40, using the machine 135, FIGS. 2 and 3, then the community members 910, such as the teacher, mentor, or other person, will retrieve data from the plurality of occupational performance data fields, import the data into statistical software, database software, and/or data mining software and perform combinations 970, FIG. 3, with the data using statistical analysis software, database software, and/or data mining software employed by one with ordinary skill in the art to analyze the data.

To share some advantages, the community of practice 900, FIG. 3, has an opportunity to conduct scientific research 940Fa, FIG. 40, to gain an understanding into how the multitude of learners achieve goal-directed occupational performance in authentic environment. Referring to FIG. 3, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fc, FIG. 41, the example of conduct scientific research 940Fc includes: storytelling by analogy to share experiences occupational performance data field 170G data performing the multitude of combinations 970 to re-categorize the role of story telling occupational performance data fields 170C as experiential data 170Ca, memory recall data 170Cb, projection data 170Cc, hypothetical data 170Cd, prospective data 170Ce, relational data 170Cf, gender-based data 170Cg, observational data 170Ch, cultural data 170Ci, faith-based data 170Cj, traditions data 170Ck, forbidden, proscribed data 170Cl, and coping data 170Cm. One with ordinary skill in the art may choose any number of approaches to re-categorize the storytelling by analogy to share experiences occupational performance data field 170G data. For example, to perform combinations 970 to re-categorize the data using the machine 135, FIGS. 2 and 3, using various electronic paintbrushes or highlighters for each 170G storytelling by analogy to share experiences data occupational performance data field either directly on the free form text of 170G data or to copy/paste the free form text 170G data directly into 170C occupational performance data fields are two approaches. Referring to FIG. 3, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fc conduct scientific research, qualitative study of the role of storytelling in skill acquisition.

To conduct outcomes research 940Fc, FIG. 41, as illustrated using the machine 135, FIGS. 2 and 3, the community members 910, such as the teacher, mentor, or other person, will retrieve data from the plurality of occupational performance data fields, import the data into statistical software, database software, and/or data mining software and perform combinations 970, FIG. 3, with the data using statistical analysis software, database software, and/or data mining software employed by one with ordinary skill in the art to analyze the data.

To share some advantages, the community of practice 900, FIG. 3, has an opportunity to conduct scientific research 940Fc, FIG. 41, to gain an understanding into how the multitude of learners internalize occupational performance experiences as stories and shared their learned experiences in authentic environment. Lived experience, encoded as stories, builds tacit knowledge and moves the learner from novice towards expert performance. Storytelling facilitates the transmission of knowledge among members of the community of practice and continuously influences and reshapes the occupational performance of its community members. Referring to FIG. 3, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fb1, 940Fb2, and 940Fb3, FIGS. 42, 43 and 44, the example of conduct scientific research 940Fb1, 940Fb2, and 940Fb3 includes: "500E+170Ea" combination 970Aa yields motivation data about occupational performance 170Za, "500E+170Ea+170Ej+170Eb" combination 970Ab yields cultural competency data about occupational performance 170Zb, "500E+170Ea+170Ej+170Ec" combination 970Ac yields diversity data about occupational performance 170Zc, "500E+170Ea+170Ej+170Ed" combination 970Ad yields disparities data about occupational performance 170Zd, "500B+170En" combination 970Ae yields levels of cognitive functioning data about occupational performance 170Ze, "500B+170En+500A" combination 970Af yields performance standards relation to brain function and competency skills during occupational performance 170Zf, "500B+170En+500C" combinations 970Ag yields performance standards relation to brain function and tools, media, and activities during occupational performance 170Zg, "500B+170En+500E" combination 970Ah yields performance standards relation to brain function and motivation during occupational performance 170Zh, "500B+170En+500D" combination 970Ai yields performance standards relation to brain function and accuracy or measure of independence during occupational performance 170Zi, "170Ej+500B+500C+170Ee" combination 970Aj yields situated cognition data about occupational performance 170Zj, "500A+170Ek+170Ej+500B+500C+170Ee+170Ef" combination 970Ak yields communities of practice data about occupational performance 170Zk, "500A+170Ek+170Ej+500B+500C+170Ee+170Ef+170Eg" combination 970Al yields historical-cultural approach data about occupational performance 170Zl, "500A+170Ek+170Ej+500B+500C+170Ee+170Ef+170Eg+170Eh" combination 970Am yields distributed cognition data about occupational performance 170Zm, "500D+500C+170El" combination 970An yields FLOW, psychology of optimal performance data about occupational performance 170Zn, "170Ej+500C+170Eo" combination 970Ao yields ecological psychology data about occupational performance 170Zo, and "500A+500D+500C+170Ep" combination 970Ap yields talent development data about occupational performance 170Zp. One with ordinary skill in the art may choose any number of approaches to perform combinations 970Aa through 970Ap, 940Fb1, 940Fb2, and 940Fb3, FIGS. 42, 43, and 44, of the plurality of occupational performance data field data. For example, to perform combinations 970 using the machine 135, FIGS. 2 and 3, retrieving and importing the stored and retrievable data into statistical software, database software, and/or data mining software is used to accomplish the community activity, 940Fb conduct scientific research, mixed method study of contemporary cognitive theories and occupational performance. Referring to FIG. 3, community members 910 as part of the community of practice 900 perform combinations 970 to allow analysis and improvement of occupational performance 102 for the benefit of the community of practice 900.

To conduct outcomes research 940Fb1, 940Fb2, and 940Fb3, FIGS. 42, 43, and 44, using the machine 135, FIGS. 2 and 3, then the community members 910, such as the teacher, mentor, or other person, will retrieve and import the data into statistical software, database software, and/or data mining software and perform combinations 970, FIG. 3, with the data using statistical analysis software, database software, and/or data mining software employed by one with ordinary skill in the art to analyze the data.

To share some advantages, the community of practice 900, FIG. 3, has an opportunity to conduct scientific research 940F, 940Fb1, 940Fb2, and 940Fb3, FIGS. 33, 42, 43, and 44, to gain an understanding into how the multitude of learners achieve occupational performance through the lens of various contemporary cognitive theories. Contemporary cognitive theories facilitate the development of knowledge, insight to spawn new learning approaches, and adaption for smarter contexts for learning among members of the community of practice. The method is iterative, continuously influencing, challenging, and redefining the occupational performance of its community members. Referring to FIG. 3, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct performance measurement research 940G. As illustrated in detail in 940Ga, FIG. 45, the example of conduct performance measurement research, adapted stages of skill acquisition scoring rubric, 940Ga includes: assessments 820, learner formative assessment scores data 170Fg, occupational performance data field, scored "2" 170Fg1, "1" 170Fg2, "3" 170Fg3, "1" 170Fg4, "2" 170Fg5, "1" 170Fg6, "4" 170Fg7, "3" 170Fg8, "2" 170Fg9, mentor formative assessment scores data 170Fh, occupational performance data field, scored "2" 170Fh1, "2" 170Fh2, "3" 170Fh3, "NA" 170Fh4, "1" 170Fh5, "1" 170Fh6, "4" 170Fh7, "2" 170Fh8, and "2" 170Fh9. FIG. 45 illustrates in greater detail how the assessments 820 section of the performance record 700A as embodied in FIG. 30 displays a learner's formative assessments scores. The mentor or teacher can establish a scoring rubric of his or her choice. The Likert scale with numeric scores 1 through 5, or a version of the Dreyfus scale with level of skill acquisition number scores 1 through 5, or another scoring rubric with at least some evidence of validity and reliability may be used. The following example illustrates one scoring rubric for assessments 820, FIG. 45.

In Mind over Machine, H. L. Dreyfus and Stuart E. Dreyfus share "Five Stages of Skill Acquisition" based upon their extensive research with airplane pilots, chess players, automobile drivers, and adult learners of a second language (Copyright © 1986). B. A. Wright has modified, abridged, and adapted the Dreyfus' stages of skill acquisition into the following rubric for scoring formative and summative assessments (Copyright © 2010) as illustrated in the current embodiment of the performance record 700A, FIG. 30, and as illustrated in detail in 820A, FIG. 45. As previously stated, any scoring rubric which is rooted in some body of evidence, and has some validity and reliability in another field is contemplated and may be adapted as a scoring rubric for scoring assessments herein.

| Dreyfus Scores for Skill Acquisition: | |
|---|---|
| "1" = | Novice |
| "2" = | Advanced Beginner |
| "3" = | Competent |
| "4" = | Proficient |
| "5" = | Expert |
| "NA" = | Not Assessed, Experienced or Observed |

Stage 1: Novice
    Indicia of Novice Skills (Score=1 on the Assessment)
    Learns to recognize various objective facts and features relevant to the skill.
    Acquires rules for determining actions based upon facts and features.
    Perceives relevant elements of the situation as clearly and objectively defined.
    Recognizes relevant elements without reference to the overall situation in which they occur, called "context-free" elements.
    Applies relevant rules to context-free elements regardless of what else is happening, called "context-free" rules.
    Manipulates unambiguously defined context-free elements by precise rules, called "information processing."
    Ignores context when applying rules.
    Does not understand that in certain situations, the rule should be violated.
    Does not interpret a situation as a whole.
    Recognizes context-free features and applies objective procedures.

Recognizes learned components and applies learned rules, and consequently, feels little responsibility for the outcome of hi/her acts.

Stage 2: Advanced Beginner

Indicia of Advanced Beginner Skills (Score=2 on the Assessment)

Acquires experience in coping with real situations.

Considers more context-free facts.

Learns to use more sophisticated rules.

Recognizes meaningful elements in concrete situations through considerable practical experience.

Identifying objective, context-free features no longer dominates perceptions.

Perceives similarities to prior examples or situations.

Perceives new elements as "situational" rather than context-free.

Responds with rules for performance or behavior that incorporate both new situational components and context-free components.

Perceiving and responding to the situational experience seems immeasurably more important than any form of verbal description.

Follows formal procedures or sequential directions without observing and weighing what is most important.

Exhibits difficulty identifying and prioritizing what is most important.

Recognizes learned components and applies learned rules, and consequently, feels little responsibility for the outcome of his/her acts.

Stage 3: Competence

Indicia of Competent Skills (Score=3 on the Assessment)

Recognizing numerous situational elements along with context-free elements present in real-world circumstances becomes overwhelming.

Recognizes the need to identify and prioritize what is most important.

Develops a plan to organize the situation, then examines only a smaller set of factors that are most important based upon the chosen plan.

Screens out elements determined to be irrelevant to decision-making and responding.

Adopts a hierarchical procedure of decision-making.

Sees a situation as a set of facts where the importance of some facts may depend on the presence of other facts.

Learns that when a situation has a particular constellation of elements, a certain conclusion should be drawn, decision made, or expectation investigated.

Exhibits more skill and less analytical reasoning.

Assesses the urgency of competing needs and plans work accordingly.

Monitors the plan to identify new situational elements, assesses the presence or absence of certain factors, and modifies the plan when indicated.

Determines whether new situational elements become important or should be ignored.

Pays attention to only a few of the immense number of factors impinging on the overall situation to decide the hierarchy of action.

Choosing an organizing plan is no simple matter for the competent performer.

Combines and assigns nonobjective and necessary elements when wrestling with the question of the choice of a plan, and consequently, feels responsible for and emotionally involved in the product of his/her choice.

Understands and decides in a detached manner, but finds himself/herself intensely involved in what occurs thereafter.

Feels deeply satisfied with successful outcomes.

Remembers poor outcomes and associated feelings.

Vividly remembers successfully chosen plans and remembers the situation from the perspective of the plan.

Stage 4: Proficiency

Indicia of Proficient Skills (Score=4 on the Assessment)

Deeply involved in his/her task and experiences it from some specific perspective because of recent events.

Perceives certain features as salient or standing out while other features recede into the background or are ignored.

Perceives changes gradually as events modify the salient features, plans and expectations, and reorders the relative importance or saliency of features.

Displays rapid, fluid, involved behavior that bears no similarity to the slow, detached reasoning of the problem-solving process.

Choosing is engaged rather than detached and deliberate.

Recalls experiences to similar situations in the past and memories trigger plans similar to those that worked in the past.

Recalls experiences to similar situations in the past and anticipates events similar to those that occurred in the past.

Possesses an intuitive ability to use patterns without decomposing them into component features, called "holistic similarity recognition."

Intuitively organizes and understands tasks where intuition is the product of deep situational involvement and recognition of similarity.

Intuitively organizes his/her actions by assessing elements defined as important through prior experience along with combining rules to produce decisions about how best to manipulate the environment to achieve the desired outcome.

Stage 5: Expertise

Indicia of Expert Skills (Score=5 on the Assessment)

Knows what to do based upon mature and practiced understanding.

Totally engages in his/her environment and does not see problems in some detached way or work at solving them.

Present in the moment and does not worry about the future and devising plans.

Rapid automatic response.

So engrossed in the present experience as an "involved participant" that he/she uses tools or media to connect to the environment.

Loses awareness of his/her separateness from the tools, media or activity manipulated in the environment and connects to a world of opportunities, threats, strengths, weaknesses, hopes and fears.

Displays rapid, fluid, involved behavior that bears no similarity to the slow, detached reasoning of the problem-solving process.

Associates particular features of a pattern in a given situation with a condition stored in memory and triggers a decision.

Performs mostly in an ongoing and non-reflective manner doing what normally works.

When time permits and outcomes are crucial, experts will deliberate before acting.

This deliberation is qualitatively different from detached, calculative problem-solving, the expert's deliberation involves critical reflection on one's intuitions.

Responds to "holistic recognition of similarities" produced through deep situational understanding of past experiences, relates current situations to prior similar situations, and associates the related decision, action or tactic simultaneously.

Performs so fluidly that the situation defies complete verbal description.

To conduct performance measurement research 940Ga, FIG. 45, using the machine 135, FIGS. 2 and 3, the teacher, mentor, or other person will retrieve data from the plurality of occupational performance data fields, import the data into statistical software, and perform combinations 970, FIG. 3, with the data using statistical analysis software employed by one with ordinary skill in the art to analyze the data.

To share some advantages, teachers, mentors, and other persons can conduct performance measurement research, as examples illustrate in FIG. 45, for individual learners and learners in the aggregate, across all or selected competency skills, and time periods, and examine data and their implications for improving occupational performance. The method creates an opportunity to conduct performance measurement research 940G, FIG. 33, so that equitable, effective, valid, and reliable scoring rubric may be developed and/or tested. The data capture occupational performance improvement in authentic environments over time in sharp contrast to standardized testing measures or examinations in testing environments on a given day. The conduct performance measurement research 940G, FIG. 33, creates opportunities, referring to FIG. 3, for community members 910 such as teachers, mentors, and others to lead community activities 940 within the community of practice 900 around developing, testing, implementing, and improving the community's ability to conduct performance measurement research 940G, FIGS. 33 and 45.

Continuing with FIG. 33, in the present embodiment, community activities 940Z include examine self-regulation of professions 940H. As illustrated in detail in 940Ha, FIG. 46, hypothetical data for illustrative purposes of an example of examine self-regulation of professions, comparison study of mid-level practitioners and new graduates, 940Ha includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Assume the hypothetical data represents a medical surgical specialty. Many surgical specialties require a board re-certification for medical practitioners, commonly after ten years of practicing medicine. Now also assume that the surgical specialty has adopted use of the system and method of the present embodiment for its practicing surgeons as part of their professional practice standards and board re-certification. Referring to FIG. 46, assume the hypothetical data "P" represents practitioners of this medical surgical specialty who have four to ten years experience, and each "P" represents the aggregate performance of the cohort for years 2006, 2007, 2008, and 2009, respectively. Referring to FIG. 46, assume the hypothetical data "N" represents practitioners of this medical surgical specialty who have zero years of experience in 2006; that is, they are newly minted practitioners of this medical surgical specialty. Each "N" represents the aggregate performance of the cohort of 2006 graduates for years 2006, 2007, 2008, and 2009. Assume the hypothetical data lead to a conclusion that the new practitioners are performing significantly below the practitioners with four or more years of professional experience, and that this discrepancy is resulting in a significantly higher percentage of medical errors that harm patients. The data raise questions regarding self-regulation for this medical surgical specialty about whether the new practitioners should have more supervision during the first few years of practice, should have a longer surgical residency, should raise the requirement for more practice performing this particular surgical procedure during residency training, or should explore improving other aspects of the curriculum, or some combination of these options.

To examine self-regulation of professions 940Ha, FIG. 46, using the machine 135, FIGS. 2 and 3, the community members 910, such as the teacher, mentor, or other person, will retrieve and import the data into statistical software, database software, and/or data mining software and perform combinations 970, FIG. 3, with the data using statistical analysis software, database software, and/or data mining software employed by one with ordinary skill in the art to analyze the data.

To share some advantages, the community of practice 900, FIG. 3, has an opportunity to examine self-regulation of professions like the example illustrates in 940Ha, FIG. 46, to gain an understanding of how a multitude of professions can identify and address improvement of occupational performance for its members during formal education program years as well as throughout professional practice. Referring to FIG. 3, community members 910 can engage in community activities 940 as part of the community of practice 900 to gain new insights and explore the impact various self-regulatory issues have on their respective professions through the multitude of combinations 970 to improve occupational performance 102 for the benefit of the community of practice 900.

Continuing with FIG. 33, in the present embodiment, community activities 940Z include assess evidence based multimedia: tools, media, activities, curriculum 940I. As illustrated in detail in 940Ia, FIG. 47, hypothetical data for illustrative purposes of an example of assess evidence based multimedia: tools, media, activities, curriculum, randomized controlled trial, 940Ia includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Continue with the hypothetical situation involving the medical surgical specialty identified immediately above. Assume the hypothetical community of practice of medical surgical specialists decide to improve the curriculum and conduct a controlled randomized trial at several medical residency programs and longitudinally follow the cohort for four years. Referring to FIG. 47, assume the hypothetical data "P" represents practitioners of this medical surgical specialty who have four to ten years experience, and each "P" represents the aggregate performance of the cohort for years 2011, 2012, 2013, and 2014, respectively. Referring to FIG. 47, assume the hypothetical data "C" represents the control group of practitioners of this medical surgical specialty who have zero years of experience in 2011; that is, they are newly minted practitioners of this medical surgical specialty. The control group had no change in the curriculum or any other significant change in their residency program during the study. Each "C" represents the aggregate performance of the cohort of 2011 graduates for years 2011, 2012, 2013, and 2014. Referring to FIG. 47, assume the hypothetical data "T" represents the test group of practitioners of this medical surgical specialty who have zero years of experience in 2011; that is, they are newly minted practitioners of this medical surgical specialty. The test group received the new evidence based curriculum, but had no other significant changes in their residency program during the study. Each "T" represents the aggregate performance of the cohort of 2011 graduates for years 2011, 2012, 2013, and 2014. Assume the hypothetical data leads to a conclusion that the new practitioners who received the new evidence based curriculum performed significantly better than the control group. The significant improvement resulted in a significantly lower number of medical errors. The medical surgical specialty can now consider how to disseminate this information and address curriculum changes to the residency program. The medical surgical specialty can also consider continuing education training for those new practitioners who were in the "C" control group of the study, and therefore, did not receive the improved curriculum along with other new practitioners who were not participants in the study.

To assess evidence based multimedia: tools, media, activities, curriculum 940Ia, FIG. 47, using the machine 135, FIGS. 2 and 3, the community members 910, such as the teacher, mentor, or other person, will retrieve and import the data into statistical software, database software, and/or data mining software and perform combinations 970, FIG. 3, with the data using statistical analysis software, database software, and/or data mining software employed by one with ordinary skill in the art to analyze the data.

To share some advantages, the community of practice 900, FIG. 3, has an opportunity to assess evidence based multimedia: tools, media, activities, curriculum 940Ia, FIG. 47, to evaluate whether specific tools, media, activities, and curriculum significantly improve occupational performance when compared against other tools, media, activities, and curriculum. Referring to FIG. 3, community members 910 can engage in community activities 940 as part of the community of practice 900 to evaluate the comparative effects of specific tools, media, activities, and curriculum through the multitude of combinations 970 to improve occupational performance 102 for the benefit of the community of practice 900. The improved evidence based multimedia can improve the occupational performance of learners during their formal education program as well as learners during their professional practice years through continuing education programs.

Continuing with FIG. 33, in the present embodiment, community activities 940Z include explore and implement new applications to improve occupational performance 940J. Referring to FIG. 3, community members 910 can engage in community activities 940 as part of the community of practice 900 which is dynamic and oriented towards formulating new combinations of data to iteratively and continuously explore and improve occupational performance 102 for the benefit of the community of practice 900.

An Article of Manufacture

Figure 4:
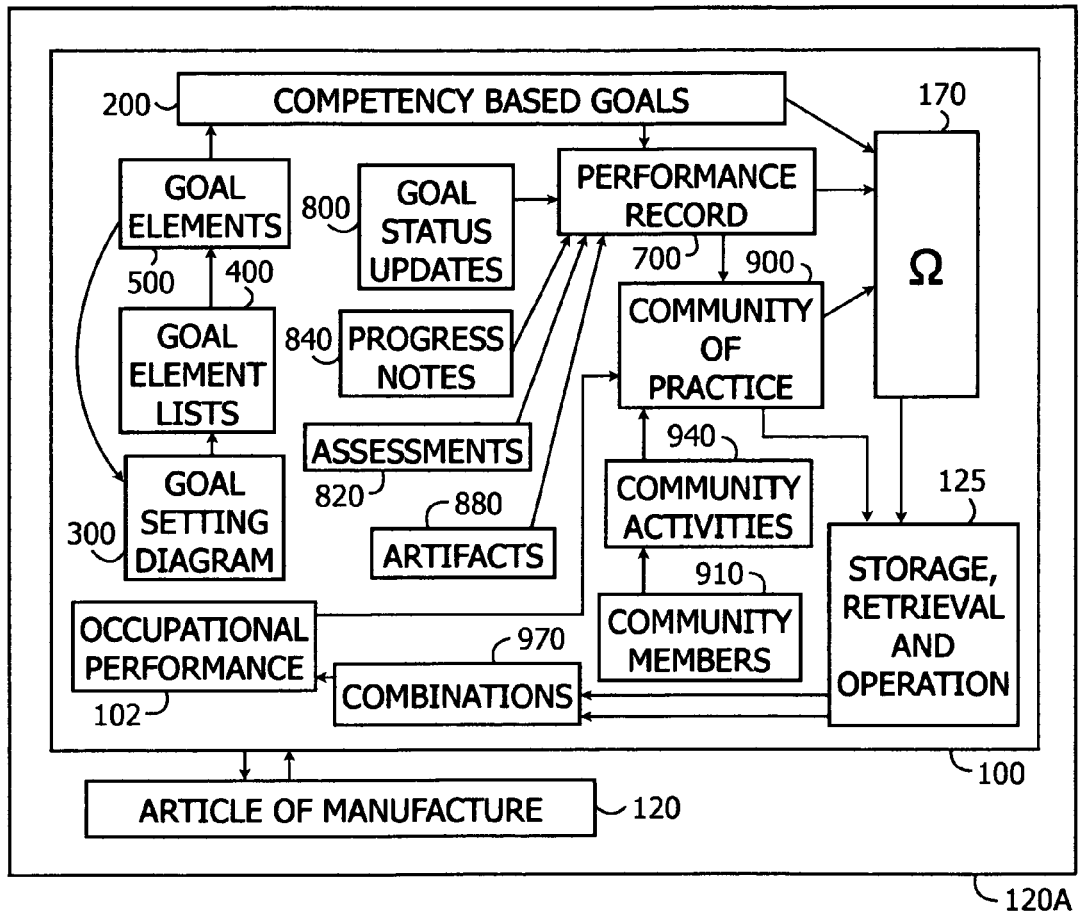
FIG. 4 illustrates one embodiment of an article of manufacture of an occupational performance system.

As an alternative mode, FIG. 4 illustrates one embodiment of an article of manufacture of an occupational performance system. Referring to FIG. 4, the article of manufacture 120 and 120A for providing the occupational performance system 100 to improve an occupational performance 102 comprising: first, a goal setting diagram 300 including a plurality of goal element lists 400 respectively containing a plurality of goal elements 500 to compile a plurality of competency based goals 200; and second, a performance record 700 including the competency based goals 200, a plurality of goal status updates 800, a plurality of progress notes 840, a plurality of assessments 820, and a plurality of artifacts 880; and third, a plurality of community activities 940 for a plurality of community members 910 to share in a community of practice 900 including sharing the performance record 700, engaging in community activities 940, and performing a multitude of a storage, retrieval, and operation 125 of a multitude of combinations 970 using a plurality of occupational performance data fields 170 selected from the competency based goals 200, performance record 700, and community of practice 900 to improve occupational performance 102 of the community of practice 900 within the occupational performance system 100 of the article of manufacture 120, 120A. One with ordinary skill in the art may make any multitude of manual articles or automated articles, embodying the article of manufacture 120, 120A.

As illustrated in FIG. 4, the article of manufacture provides the occupational performance system and method for achieving occupational performance involves setting competency based goals, recording performance in the performance record, and interacting in the community of practice. Each of which will now be discussed, in turn.

First, as illustrated in FIG. 4, setting competency based goals 200 involves making the goal setting diagram 300, the plurality of goal element lists 400, and the plurality of goal elements 500 to enable the learner to set competency based goals 200. As illustrated in FIG. 49, in the present embodiment, the goal setting diagram 300A includes a subject "I" 300Aa, a space or prompt for a "learner's name" 300Ab, a verb "will" 300Ac, a prompt to select a performance standard goal element 500B, a preposition "to" 300Ad, a prompt to select a competency goal element 500A, a prompt to select a measurement goal element 500D, a prompt to select a preposition "using" or "through" 300Ae, a prompt to select a tools, media, activities, curriculum goal element 500C, a preposition "because" 300Af, and a prompt to select a motivator goal element 500E. One with ordinary skill in the art will understand how to prompt the learner to select various goal elements, for example, by prompting "What competency skill would you like to work on?" or "How will you measure your success?" or "What is motivating you to achieve success?" Goal element prompts 500A through 500E, as illustrated in FIG. 49, sequentially prompt the learner to browse the plurality of goal element lists 400A through 400E, as illustrated in FIGS. 5 through 25, as presently illustrated in detail in 400Aa through 400Aq, 400B, 400C, 400D, 400E, to sequentially select the plurality of goal elements 500A through 500E, as presently illustrated in detail in 500AaA through 500AqH, 500Aaa through 500Aqh, 500BA through 500BK, 500Ba through 500Bk, 500CA through 500CP, 500Ca through 500Cp, 500DA through 500DP, 500Da through 500Dp, and 500EA through 500EP, 500Ea through 500Ep, FIGS. 5 through 25. In FIGS. 5 through 25, each goal element has a unique and consistent binary match of a code number and a text phrase. For example, referring to FIG. 5, performance standard goal element "PS.G1.1" 500BA is the code number and "develop questions to initiate research" 500Ba is the text phrase forming the unique and consistent binary match. The code numbers are for outcomes research and scientific research purposes. The text phrases will be viewable to learners, whereas the code numbers will be hidden. The goal elements listed in FIG. 5 through 25 are illustrative, and represent a partial list, of goal elements 500A through 500E to demonstrate to one with ordinary skill in the art how to make goal element lists 400A through 400E. Goal elements are derived from research of one with ordinary skill in the art of various literature and theories drawn from neuroscience, psychology, sociology, philosophy, occupational therapy, education, and self-regulated professions. The goal element lists 400A through 400E as illustrated in FIGS. 5 through 25, and the goal elements 500A through 500E as illustrated in FIGS. 5 through 25 are merely illustrative and represent how one with ordinary skill in the art can make complete lists of goal element lists and goal elements which may be updated and modified over time.

Competency based goals 200, as illustrated in FIG. 4, are depicted in detail as examples 200Z1, 200Z2, 200Z3, and 200Z4 illustrated in FIGS. 26 through 29. For example, the following competency based goals can be set across a wide age span and broad scope of learning: As illustrated in FIG. 26, "I, [audiology learner's name], will discover patterns in information to understand the vocational effects of hearing impairment with 90% accuracy through journal club because it interests me." 200Za; "I, [clinical and translational research learner's name], will assess the benefits of proposed solutions to develop protocols utilizing management of information using computer technology with moderate assistance through mentor meetings because I want to succeed." 200Zb; "I, [dentistry learner's name], will revise communications to improve clarity to order appropriate laboratory, radiographic, and other diagnostic tests as indicated, including biopsy of suspicious oral lesions with 100% accuracy through simulated skills training because I want to master it." 200Zc; "I, [dietetic learner's name], will conduct research to evaluate ideas to explain the impact of a public policy position on dietetics practice with minimal assistance through self-directed learning because I enjoy it." 200Zd; and, "I, [K-12 math learner's name], will discover patterns in information to describe important features of a data set with 90% accuracy using the Johnny Appleseed Survey because I want to beat my best score." 200Ze can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 27, "I, [K-12 science learner's name], will reason inductively from a set of specific facts to describe how friction affects the amount of force needed to do work over different surfaces with moderate assistance through observation because I want to know how it works." 200a "I, [K-12 health education learner's name], will develop questions to initiate research to assess key nutrients and their specific functions and influences on body processes (e.g. disease, prevention) correctly 7 times out of 10 using self-directed learning because it interests me." 200Zg; "I, [engineering learner's name], will exchange ideas while recognizing the perspectives of others to understand orbital mechanics applications in astronautical engineering with moderate assistance through seminars because I want to know how it works." 200Zh; and, "I, [law learner's name], will evaluate relationships in ideas to understand the process for recognizing ethical dilemmas with minimal assistance through journal club because I want to feel better about myself." 200Zi can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 28, "I, [medical resident learner's name], will develop a plan of action to accomplish a goal to prioritize and stabilize multiple patients simultaneously with supervision through simulated skills training because I want to succeed." 200Zj; "I, [nurse practitioner learner's name], will develop questions to initiate research to perform a comprehensive assessment of mental health needs of a community with minimal assistance through a team building activity because I want to see the result." 200Zk; "I, [occupational therapy learner's name], will revise communications to improve clarity to articulate a clear and logical rationale for the intervention process correctly 7 times out of 10 through mentor meetings because I enjoy it." 200Zl; "I, [optometry learner's name], will reason inductively from a set of specific facts to understand the basic optical principles of low vision rehabilitation devices with 75% accuracy through case studies because it interests me." 200Zm; "I, [pharmacy learner's name], will discover patterns in information to manage medication use systems to participate in the development of health policy with moderate assistance through observation because I want to know how it works." 200Zn can be set using the goal setting diagram as illustrated in FIG. 49, the goal element lists 400A through 400E as illustrated in FIGS. 5 through 25, and the goal elements 500A through 500E as illustrated in FIGS. 5 through 25.

As illustrated in FIG. 29, "I, [physical therapy learner's name], will deliver a visual presentation for a variety of purposes and audiences to explain the rationale for selected interventions to achieve patient goals as identified in the plan of care with 100% accuracy through an interdisciplinary meeting because I want to beat my best score." 200Zo; "I, [speech-language pathology learner's name], will evaluate relationships in ideas to integrate information about swallowing disorder anatomy and physiology correctly 9 times out of 10 through simulated skills training because I want to know the cause." 200Zp; and, "I, [teacher learner's name], will develop a plan of action to accomplish a goal to present the subject matter in multiple, effective ways which are purposefully selected to engage every student in learning with minimal assistance using case studies because it makes me feel good." 200Zq can be set using the goal setting diagram as illustrated in FIG. 49, the goal element lists 400A through 400E as illustrated in FIGS. 5 through 25, and the goal elements 500A through 500E as illustrated in FIGS. 5 through 25.

The competency based goals, 200Z1, 200Z2, 20013, and 200Z4 as illustrated in FIGS. 26 through 29, are depicted as examples to demonstrate the competency based goals a multitude of learners can set using the goal setting diagram to sequentially browse the plurality of goal element lists to sequentially select the plurality of goal elements. As mentioned above, the goal element lists 400A through 400E as illustrated in FIGS. 5 through 25, and the goal elements 500A through 500E as illustrated in FIGS. 5 through 25 are merely illustrative and as such represent just a sample of competency based goals that learners can actually set using the article of manufacture in FIG. 4.

If setting competency based goals is a manual article of manufacture 120, 120A, FIG. 4, the learner uses the goal setting diagram, FIG. 49, and selects the goal elements from the goal element lists in the following order: first, competency 500A; second, performance standard 500B; third, tools, media, activities, curriculum 500C; fourth, measurement 500D; and, fifth, motivator 500E, with a manual instruction sheet with prompts like "What competency skill would you like to work on?" in sequential order, and places each phrase into the goal setting diagram to set competency based goals. If setting competency based goals is an automated article of manufacture 120, 120A, FIG. 4, the learner uses the goal setting diagram, FIG. 49, and receives automatic prompts like "What competency skill would you like to work on?" in sequential order: first, competency 500A; second, performance standard 500B; third, tools, media, activities, curriculum 500C; fourth, measurement 500D; and, fifth, motivator 500E, and places each phrase into the goal setting diagram to set competency based goals, and each goal element is automatically placed into the correct field of the goal setting diagram and displayed to the learner as the goal is being set.

To share some advantages, setting competency based goals 200 as illustrated in FIG. 4, using the goal setting diagram 300A as illustrated in FIG. 49, the goal element lists 400A through 400E as illustrated in FIGS. 5 through 25, and the goal elements 500A through 500E as illustrated in FIGS. 5 through 25 include the following: Each goal element supports occupational performance achievement based upon research of evidence in the field; having the learner include each goal element in setting his/her competency based goals increases the likelihood of achieving goals; providing the learner with text phrases supports successful goal setting and teaches one how to set effective goals; self-set goals by learners are perceived as more relevant and important which increases the likelihood of achievement; the goals are individualized to the learner's needs and interests which facilitates achievement and enables teachers and mentors to tailor and individualize the learning process; defines the purpose of what the learner is learning and shapes the execution of action to learn; enables goal setting for any learner who is participating in any competency based, often called standards based, learning including, but not limited to: audiology, clinical and translational research, dentistry, dietetics, kindergarten through 12th grade public education, engineering, law, medicine, nurse practitioner, occupational therapy, optometry, pharmacy, physical therapy, speech-language pathology, and teachers; enables outcomes based research across a wide age span and broad scope of education; and finally, enables scientific research across a wide age span and broad scope of education. A limitation of the method is that it does not apply to non-competency based education such as a masters of business administration, a bachelor of arts in history, or a doctorate in philosophy. If, however, such education programs establish competency based performance skills for the learning that is to occur, as opposed to content based education, then the method applies.

Second, as illustrated in FIG. 4, recording performance in the performance record 700 involves making the performance record 700 including competency based goals 200, goal status updates 800, progress notes 840, assessments 820, and artifacts 880. As illustrated in FIG. 30, in the present embodiment, the performance record 700 is a spreadsheet including the following: Competency based goals 200 with occupational performance data fields for "goal number data" 170Fe, "competency based goal 200Z data" 170Ff, "500A data" 170Fk, "500B data" 170Fl, "500C data" 170Fm, "500D data" 170Fn, and "500E data" 170Fo. The goal number data 170Fe occupational performance field will prompt the learner to categorize the goal as a short-term goal or a long-term goal, record this response and assign a goal number based upon the number of goals the learner has written related to that competency goal element 500A from FIGS. 9 through 25. The competency based goal 200Z data 170Ff occupational performance data field imports the competency based goal 200Z data, like the examples given in 200Z1, 200Z2, 200Z3, and 200Z4, FIGS. 26 through 29. For example "I, [audiology learner's name], will discover patterns in information to understand the vocational effects of hearing impairment with 90% accuracy through journal club because it interests me." 200Za from FIG. 26 which the learner set by using the goal setting diagram 300A illustrated in FIG. 49. Returning to FIG. 30, the 500A data 170Fk occupational performance data field captures the 500A unique and consistent binary match of the code number and text phrase, as illustrated in FIGS. 9 through 25. For example, using the audiology learner's goal immediately above, the 500A data 170Fk occupational performance data field captures the code number "CS.ASHAa. 2.3.2" 500AaB from FIG. 9, and the text phrase "understand the vocational effects of hearing impairment" 500Aab from FIG. 9. Referring to FIG. 30, the 500B data 170Fl occupational performance data field captures the 500B unique and consistent binary match of the code number and text phrase, as illustrated in FIG. 5. For example, using the audiology learner's goal immediately above, the 500B data 170Fl occupational performance data field captures the code number "PS.G1.28" 500BC from FIG. 5, and the text phrase "discover patterns in information" 500Bc from FIG. 5. Referring to FIG. 30, the 500C data 170Fm occupational performance data field captures the 500C unique and consistent binary match of the code number and text phrase, as illustrated in FIG. 6. For example, using the audiology learner's goal immediately above, the 500C data 170Fm occupational performance data field captures the code number "K.HC.1.4" 500CE from FIG. 6, and the text phrase "journal club" 500Ce from FIG. 6. Referring to FIG. 30, the 500D data 170Fn occupational performance data field captures the 500D unique and consistent binary match of the code number and text phrase, as illustrated in FIG. 7. For example, using the audiology learner's goal immediately above, the 500D data 170Fn occupational performance data field captures the code number "M.1.4" 500DE from FIG. 7, and the text phrase "with 90% accuracy" 500De from FIG. 7. Referring to FIG. 30, the 500E data 170Fo occupational performance data field captures the 500E unique and consistent binary match of the code number and text phrase, as illustrated in FIG. 8. For example, using the audiology learner's goal immediately above, the 500E data 170Fo occupational performance data field captures the code number "MV.1.2" 500EC from FIG. 8, and the text phrase "it interests me" 500Ec from FIG. 8.

If the performance record, FIG. 30, is the manual article of manufacture 120, 120A, FIG. 4, the learner will enter each competency based goal into respective competency based goal 200Z data 170Ff occupational performance data fields. The performance record is formated to aid the learner in placing the competency based goals in the correct fields. The learner will then indicate whether the competency based goal is a short-term goal or long-term goal and number the goal in the goal number data 170Fe occupational data performance field. If the performance record is the automated article of manufacture 120, 120A, FIG. 4, the learner's competency based goals will be automatically placed in the correct competency based goal 200Z data 170Ff occupational performance data fields which are mapped to the correct section of the formated performance record by the competency 500A goal element. The learner then receives a prompt, asking whether the goal is a short-term goal or long-term goal, answers the prompt, and the goal is automatically numbered. If the performance record is manual, the teacher or mentor or other person will enter the correct codes and text phrases for 500A data 170Fk, 500B data 170Fl, 500C data 170Fm, 500D data 170Fn, and 500E 170Fo data. If the performance record is automated, the correct codes and text phrases for 500A data 170Fk, 500B data 170Fl, 500C data 170Fm, 500D data 170Fn, and 500E 170Fo data will be automatically populated to the appropriate occupational performance data fields.

To share some advantages, capturing the 500A through 500E, FIG. 5 through 25, code number and text phrase in the spreadsheet is designed to facilitate quantitative, qualitative, and mixed method outcomes research and scientific research. Importing the competency based goal 200Z data 170Ff allows the learner and mentor or teacher to quickly identify areas under which the learner has set and has not set competency based goals across the whole scope of competencies. This creates visual feedback for the learner and mentor or teacher to immediately identify areas where competencies are not being addressed, and the impetus to set competency based goals in other areas. Importing the competency based goal also creates a permanent record of the nature of the learner's experience and achievement. Additionally, the competency based goals are an important part of assessments which is discussed in detail below.

Continuing with FIG. 30, in the present embodiment, the performance record 700 is the spreadsheet which also includes goal status updates 800 with occupational performance data fields for "date goal set data" 170Fa, "date goal progress made data" 170Fb, "date goal unmet or modified data" 170Fc, and "date goal met data" 170Fd. The goal status updates 800 occupational performance data fields 170Fa through 170Fd are formatted as mm/dd/yyyy dates.

If the performance record is the manual article of manufacture 120, 120A, FIG. 4, the learner will enter the goal status updates 800 for goal set data 170Fa, date goal progress made data 170Fb, date goal unmet or modified data 170Fc, and date goal met data 170Fd by reviewing all competency based goals on the performance record and manually entering the correct dates. If the performance record is the automated article of manufacture 120, 120A, FIG. 4, the learner will be prompted to enter the goal status updates 800 for each and every goal on the performance record, and enter the correct dates for goal set data 170Fa, date goal progress made data 170Fb, date goal unmet or modified data 170Fc, and date goal met data 170Fd.

To share some advantages, tracking progress by recording goal status updates helps the learner to focus on goal directed behavior and achievement of goals, helps the mentor or teacher to identify ways to support the learner's achievement and provide effective and specific feedback, helps to recognize and celebrate achievement which improves self-efficacy and is designed to drive further achievement. Additionally, the goal status updates data are useful for outcomes research and scientific research.

Continuing with FIG. 30, in the present embodiment, the performance record 700 is the spreadsheet which also includes progress notes 800, and related "progress notes 840A data" 170Fq. As illustrated in detail in FIG. 31, the example of progress notes 840A includes the following: salient impressions 840AA, salient impressions data 170Aa, happenings 840AB, happenings data 170Ab, introspection 840AC, introspection data 170Ac, next steps 840AD, next steps data 170Ad, empowerment 840AE, empowerment data 170Ae. Salient impressions 840AA includes a prompt to stimulate the learner's thinking which presently asks, "Can you describe your subjective reactions to your experience this week? What did you experience as important, remarkable, or striking in nature? Did you have any strong emotional reactions to an experience this week? If so, describe your reaction and the impression it left upon you. What will you remember most about what you experienced this week?" Salient impressions data 170Aa is a text box which allows the learner to enter free form text. Happenings 840AB includes a prompt to stimulate the learner's thinking which presently asks, "What events took place this week? What were the facts and circumstances surrounding those events? Can you describe the context in which the events occurred? What was unique or different about the event? How will this event help you to understand what you do next time under a somewhat different set of facts and circumstances? In what way was this event similar or different than your other experiences? To what degree was the experience similar or different?" Happenings data 170Ab is a text box which allows the learner to enter free form text. Introspection 840AC includes a prompt to stimulate the learner's thinking which presently asks, "What did you learn this week? What did you learn from what you observed, or when you performed a task, or when you discussed your observations or performance with your mentor, teacher, peers, or others? What did you learn from what you researched, read, analyzed, and wrote? What did you learn by noticing what/how others performed, avoided performing, or failed to perform properly? Are you working towards meeting your short-term goals? Did you meet a short-term goal? Do you need to modify a short-term goal because something has changed? Do you need to discontinue or discharge a goal because it has become irrelevant, impossible, or impractical to meet? Do you need to set a new short-term goal? Do you want to continue working on the same short-term goal, but in the context of a new assignment? Consider these questions related to your long-term goals." Introspection data 170Ac is a text box which allows the learner to enter free form text. Next steps 840AD includes a prompt to stimulate the learner's thinking which presently asks, "What are the preparatory actions that you need to take to achieve your current short-term and long-term goals? What does your list of 'Things to Do' include for the next week or two? Are there any systems or procedures that you need to identify, have access to, or understand to meet your goals? What can you do to ensure that time, effort, and resources are allocated effectively to enable you to complete your work?" Next steps data 170Ad is a text box which allows the learner to enter free form text. Empowerment 840AE includes a prompt to stimulate the learner's thinking which presently asks, "What do you now possess the capacity or authority to do? About what experience can you now claim, 'I did it!'? How did you experience a small measure of success this week? What kind of personal achievement do you have to celebrate?" Empowerment data 170Ae is a text box which allows the learner to enter free form text.

If the performance record is the manual article of manufacture 120, 120A, FIG. 4, the learner will have a progress note template with the 840AA, 840AB, 840AC, 840AD, and 840AE prompts to stimulate the learner's thinking, and a formated progress note listing salient impressions 840AA, happenings 840AB, introspection 840AC, next steps 840AD, and empowerment 840AE as headers, each with space for the learner to enter free form text 170Aa, 170Ab, 170Ac, 170Ad, and 170Ae data, respectively. If the performance record is the automated article of manufacture 120, 120A, FIG. 4, the learner will have the progress note formated with the headers salient impressions 840AA, happenings 840AB, introspection 840AC, next steps 840AD, and empowerment 840AE as headers, each with space for the learner to enter free form text 170Aa, 170Ab, 170Ac, 170Ad, and 170Ae data, respectively. If the learner needs to review the prompts to stimulate thinking, he or she will hover over the relevant header and the relevant prompt will appear, and then disappear as the learner move the cursor to enter free form text.

To share some advantages, the progress notes facilitate organization, planning, reflection and execution of occupational performance and build self-efficacy for the learner. The progress notes allow the teacher, mentor and others to have a window into the experience and mental thought processes of the learner, many experiences of which may occur when the teacher, mentor, and others are not in a position to observe the learning and achievement that is occurring. The progress notes can serve as a springboard for group discussion. The progress notes also produce useful data for outcomes research and scientific research.

Continuing with FIG. 30, in the present embodiment, the performance record 700 is the spreadsheet which also includes assessments 820 with occupational performance data fields for "learner formative assessment scores data" 170Fg, "mentor formative assessment scores data" 170Fh, "learner summative assessment scores data" 170Fi, and "mentor summative assessment scores data" 170Fj. The mentor or teacher can establish a scoring rubric of his or her choice. A Likert scale with numeric scores 1 through 5, or a version of the Dreyfus scale with level of skill acquisition number scores 1 through 5, or another scoring rubric with at least some evidence of validity and reliability may be used. Additional mentor formative and summative assessment occupational performance data fields may be added if the learner would like to have more than one mentor or teacher participate in assessments.

If the performance record is the manual article of manufacture 120, 120A, FIG. 4, the learner will enter a numeric score in the appropriate formative or summative assessment occupational performance data fields, following instructions for the scoring rubric chosen by the teacher, mentor, or other, along with instructions for completion deadlines and meeting with respective teachers or mentors to compare scores and discuss feedback. Any mentors or teachers involved with respective learners will also enter a numeric score in the appropriate formative or summative assessment occupational performance data fields, following the scoring rubric and instructions. If the performance record is the automated article of manufacture 120, 120A, FIG. 4, the learner will enter a numeric score in the appropriate formative or summative assessment occupational performance data fields, following instructions for the scoring rubric chosen by the teacher, mentor, or other, along with instructions for completion deadlines and meeting with respective teachers or mentors to compare scores and discuss feedback. The learner will receive a prompt if any data fields are left blank and the learner will not be allowed to enter a score not listed on the instruction sheet, such as a "1.5" if the scoring rubric instructs to only use whole numbers. The learner will receive automatic reminders to complete the assessment before the deadline, and if necessary, continued reminders to complete the assessment if the deadline passes. Any mentors or teachers involved with respective learners will also enter a numeric score in the appropriate formative or summative assessment occupational performance data fields, following the scoring rubric and instructions. The mentor or teacher will receive a prompt if any data fields are left blank and the mentor or teacher will not be allowed to enter a score not listed on the instruction sheet, such as a "1.5" if the scoring rubric instructs to only use whole numbers. The mentor or teacher will receive automatic reminders to complete the assessment before the deadline, and if necessary, continued reminders to complete the assessment if the deadline passes.

To share some advantages, the formative and summative assessment scores reflect occupational performance in authentic environments observed over a period of time. The formative and summative assessments inherently afford weighting to the competency skills by listing the learner's specific competency based goals 200 in lieu of the endless need to create behavioral anchors or qualifiers around performance skills which is problematic, or confounding, or unsustainable. The formative and summative assessments allow the learner to self-score his or her own occupational performance along with his or her mentor or teacher. Accurate self-assessment is very important for members of self-regulated professions who must decide whether they possess minimum competency to perform a specific task safely and independently, or pose risk to their patients or clients. Accurate self-assessment is also very important for determining what future goals any learner should consider for himself or herself. A learner must accurately grasp his or her current occupational performance abilities to effectively set future goals as a life-long learner. The formative and summative assessment encourages the learner and mentor or teacher to exchange dialogue and share feedback about the learner's performance with a specific, objective approach.

Continuing with FIG. 30, in the present embodiment, the performance record 700 is the spreadsheet which also includes artifacts 880, and related "artifacts 880Z data" 170Fp. As illustrated in detail in FIG. 32, the example of artifacts 880Z includes the following: "my presentations" 880ZA, "my reports and publications" 880ZB, "my tests, evaluations, and assessments" 880ZC, "my personhood" 880ZD, "my awards and recognition" 880ZE, "my vocational interests" 880ZF, "my career opportunities" 880ZG, "my resume" 880ZH, "my letters of recommendation" 880ZI, "my contacts" 880ZJ, "my continuing education" 880ZK, and "my licenses, certification, and special training" 880ZL. My presentations 880ZA, for example, may include any written presentations, speeches, or audiovisual presentations the learner gives. My reports and publications 880ZB, for example, may include book reports, term papers, poems, short stories, newspaper editorials or articles, doctoral thesis, journal articles, books, chapters, and the like, that the learner produces. My test, evaluations, and assessments 880ZC, for example, may include standardized assessment scores, any tests or quizzes, mid-term and final exams, oral exam results, simulated skills training results, standardized examination results (SAT, ACT, LSAT, GRE, GMAT, etc.), board scores, annual performance evaluations, physical/functional capacity evaluations, vision tests, driving tests, drug screens, criminal background checks, and so forth of the learner. My personhood 880ZD, for example, may include results of items illustrated in FIG. 35 which will be discussed in detail below, such as an Interest Inventory 940Bb, a Role Checklist 940Bc, a Myers-Briggs type indicator 940Bd, a Social Style profile 940Be, and a Flower Exercise 940Bf, as well as other personhood items such as familial cultural or historical items and so forth that are significant to the learner. My awards and recognition 880ZE, for example, may include trophies, scholarship awards, metals, ribbons, certificates of achievement, plaques, leadership positions, and so forth of the learner. My vocational interests 880ZF, for example, may include results of items illustrated in FIG. 44 which will be discussed in detail below, such as explore vocations data as well as vocational interest items from career days, bring your child to work days, career guides, and so forth. My career opportunities 880ZG, for example, may include job ads, job leads, job postings, career guides, professional program literature, and so forth that interest the learner and for which the learner may be qualified or holds as a dream job. My resume 880ZH, for example, may include all historical resumes or curriculum vitae of the learner. My letters of recommendation 880ZI, for example, may include any letters of recommendation, letters of commendation, letters of reference, letters of support and so forth of the learner. My contacts 880ZJ, for example, may include any contact information of any persons or entities that may assist the learner with vocational exploration, vocational readiness, vocational opportunities, vocational counseling, vocational mentoring, and so forth that the learner collects. My continuing education 880ZK, for example, may include any continuing education certificates, attendance records, brochures about future courses, workshops or seminars and so forth of the learner. My licenses, certification, and special training 880ZL, for example, may include professional licenses, board certifications, letters of reciprocity, visitor status, specialized training certificates, documentation related to good standing or adverse actions, reprimands, removal, or re-installment of license or certification and so forth of the learner.

If artifacts is the manual article of manufacture 120, 120A, FIG. 4, the learner will collect all artifacts in a designated artifacts folder. If artifacts is the automated article of manufacture 120, 120A, FIG. 4, the learner will collect all artifacts in a designated electronic folder.

To share some advantages, learners must be taught how to prepare for work force readiness. Artifacts 880Z constantly reminds learners to think in terms of how their occupational performance impacts their vocational opportunities. Artifacts 880Z drives vocational exploration, vocational planning, and vocational attainment. Competency goal elements 500A, as illustrated in FIGS. 9 through 25, of many programs from K-12 through professional programs specifically include competency requirements related to vocational exploration, planning, and attainment. The learner can produce or collect various artifacts 880Z and store them in the performance record 700 section for artifacts to show achievement of self-set competency based goals related to vocations in artifacts 880Z. Learners, especially those who have limited role models, can start to envision themselves pursuing various vocations and generate feedback and solicit guidance from mentors, teachers, peers, and others. Artifacts 880Z helps organize learners and helps them manage the task of continuously collecting artifacts related to vocations. Any learner who has submitted a bar application, updated an academic curriculum vitae, or submitted a college application, or applied for a competitive job, or run for a leadership position understands the daunting task of collecting relevant artifacts of one's achievements and the benefits of organization and planning.

Third, as illustrated in FIG. 4, interacting in the community of practice 900 involves making the plurality of community activities 940 for the plurality of community members 910 to engage in, and sharing aspects of the performance record 700, and performing a multitude of a storage, retrieval, and operation 125 of the multitude of combinations 970 of research approaches using the occupational performance data fields 170 to improve occupational performance 102 of the community of practice 900. The method in the article 120, 120A, FIG. 4, is iterative and continuous. As illustrated in FIG. 48, in the present embodiment, the community members 910Z include the following: learners 910Za, teachers 910Zb, mentors 910Zc, other persons 910Zd, parents, guardians 910Ze, researchers 910Zf, education programs and institutions 910Zg, professional associations 910Zh, regulatory and licensing agencies 910Zi, accreditation agencies 910Zj, corporations and other employers 910Zk, government agencies 910Zl, and other stakeholders 910Zm. As illustrated in FIG. 33, in the present embodiment, the community activities 940Z include the following: storytelling by analogy to share experiences 940A, participate in personhood activities 940B, explore vocations 940C, share artifacts 940D, conduct outcomes research 940E, conduct scientific research 940F, conduct performance measurement research 940G, examine self-regulation of professions 940H, assess evidence based multimedia: tools, media, activities, curriculum 940I, explore and implement new applications to improve occupational performance 940J.

Continuing with FIG. 33, in the present embodiment, community activities 940Z include storytelling by analogy to share experiences 940A. As illustrated in detail in FIGS. 34 and 50, the example of storytelling by analogy to share experiences 940A1 and 940A2 includes the following: sounding the horn 940Aa, sounding the horn data 170Ga, playing leap frog in the night 940Ab, playing leap from in the night data 170Gb, burning just one flashlight 940Ac, burning just one flashlight data 170Gc, modified leap frog: walking together 940Ad, modified leap frog: walking together data 170Gd, running together on white gravel 940Ae, running together on white gravel data 170Ge, dew-covered spider webs 940Af, dew-covered spider webs data 170Gf, wolves howling in the distance 940Ag, wolves howling in the distance data 170Gg, questioning the compass's reliability 940Ah, questioning the compass's reliability data 170Gh, lessons learned from your handbook 940Ai, lessons learned from your handbook data 170Gi, blazing "x's" on trees 940Aj, blazing "x's" on trees data 170Gj, finding your fresh water stream 940Ak, finding your fresh water stream data 170Gk, growing accustomed to the night 940Al, growing accustomed to the night data 170G1, sharing stories back at base camp 940Am, and sharing stories back at base camp data 170Gm. The following allegory, Finding Your Way: The Lessons of Experience, from Preserving the Social Contract, B. A. Wright (2009), accompanies 940A:

The guide master grouped us in pairs, with one novice and one experienced trail-blazer per team. She told us to gather two canteens of water, two energy snacks, two flash lights with new batteries but no back-up batteries allowed, a Swiss Army knife, and one compass. Additionally, the guide master supplied each of us with a "rape horn," instructing us to use it only in the event of a serious emergency. Upon sounding your "rape horn," you must know that SWAT Rangers will be immediately dispatched via helicopter to extract you from the woods, she explained. Just after dusk, each team is dropped in a different location deep in the woods of Ozark Mountain country. The guide master handed my team the following instructions on an index card: "Travel due northeast until you meet a white gravel road. Take the white gravel road due southeast until it forks. At the fork set your compass due southwest and travel until you reach the stream. Traveling near the bank, head up stream until you reach the base camp. When your team reaches the base camp, you have succeeded"

The time is now 8:00 p.m., it is pitch dark, the moon is almost full, the stars are shining bright against the clear sky, the temperature is about fifty degrees, and the leaves have begun to fall from the trees. While orienteering at night, in pairs of two, the most effective method for staying on course is playing "leap-frog." Leap frog is a method where one member of the team sets the compass, in this case due northeast, then holds the flashlight under the compass, and points the light in the same direction as the needle on the compass. The light will inevitably shine on a tree since the woods are so dense. One member of the team will leap ahead to reach the target tree, while the other team member remains behind shining the light on the target tree. Only after the first member reaches the target tree by blazing ahead alone, will the light-shedding member leap to catch up.

As you begin this process, you both realize that there are other decisions you must make. Even the experienced member of your team has only been orienteering in the daytime in a team of four, so the challenges presented in this situation are somewhat different than prior experience. You must decide whether the trail-blazer should burn the second flashlight as he or she forges ahead, and when the light-shedder is catching up. You start wondering how long your journey will take, how long your flashlights will burn, and realize that you were not told how long you would be in the deep woods. A bit of fear of the unknown sets in as you realize that you don't know how long it will take to succeed in finding the base camp. Together, you decide to conserve your resources and burn just one flashlight at a time. You know this is the right decision, but as you implement this decision, you realize it has its drawbacks as well. The trail-blazer is forging through the thickness of the brush, fallen leaves and branches, with nothing to light the path, only a beam shining on the target tree. Leaping ahead in the darkness requires courage, a keen alertness, and an agile posture over the unsteady terrain. Staying behind as light-shedder bears its own unique experience—technical accuracy in finding a good target, determining how far ahead that target should be, waiting patiently as your partner reaches the target, and the growing sense of loneliness as your only human contact slips away into the darkness.

While you both know that playing leap frog is the most effective method for accurately staying on course, it is very slow-going and is starting to take its physical and emotional toll on you as the night wears on. Together, you decide to modify the method. You agree to set the compass, shine the light, and walk together toward the target tree. This feels better. The loneliness and fear of the night start to subside as you find friendship while traveling together. The light-shiner realizes that maintaining the beam on the target tree is much more difficult while navigating over the rugged terrain and talking. You find yourselves heading in the general direction in which you shined the light and checking your compass more frequently because maintaining the target it more elusive while walking. Finally, one of you expresses concern about not hitting the white gravel road yet and questions whether traveling together might be throwing you off course. Together, you agree to resume the playing leap frog.

Together, you reach the white gravel road at 11:30 p.m. and you're ecstatic. You did it together! You quickly check your compass to see which direction is southeast. Fabulous! You head straight down the gravel road. You are walking briskly now, no need to check the compass until you hit the fork in the road. Just the physical space around your body created by the road, pushing the trees back into the woods, allow you to breathe easier. The rhythm of your pace, the speed of your progress, and the joy of your success, are all celebrated together.

Suddenly, you reach the fork in the road, and the path you are directed to take is neither left nor right, but rather due southwest. Yes, it is time to set your compass and head back into the woods. You swell up with emotion as the thickness of woods seems to invade your space. Together; methodically, you start playing leap frog again. It is not long before your first flashlight grows dim, too dim to reach the target tree, so you begin to burn the second flashlight. Again, trail-blazer and light-shedder are working in tandem to achieve the goal. As the light-shedder aims for the next target, the beam shines brilliantly on an enormous spider web. It must be four feet wide. The amazingly intricate web is covered with drops of dew, sparkling in your light. A large fury spider sits dead-center in his web. You usually don't like spiders, but strangely enough, you're happy to see something besides your partner, the moon, and the endless sea of trees. Even though the web is blocking your path toward your next target tree, you decide not to destroy something so beautiful. Together, you realize that it is okay sometimes to be thrown a little off course.

Fatigue is setting in. The time is now 1:18 a.m. Wolves begin howling in the distance. It is almost impossible to pinpoint the direction of the threat because their howl is bouncing off the mountainside. You are glad you have your rape horn. You feel for it against your chest, reassured that it still hangs around your neck, even though you've felt it bumping against your chest with every step since your journey began. You don't want to be the team that calls in the Rangers, so you vow not to sound the alarm unless the threat becomes imminent.

The night is wearing on, and it is now 2:37 a.m. You never thought the guide master would leave you in the woods so long. The goal of finding the base camp starts to feel unattainable. Your senses are getting dull, the sounds of the night are impinging on your emotions, and the darkness of the night instills a sense of anguish. Together, you both start questioning the reliability of your compass. Surely, we should have reached the stream by now. You begin thinking through lessons learned in your orienteering handbook. First, you remember that the compass never lies. The compass is a reliable instrument, gaining its direction from the unwavering pull of the North Pole. This theory is sound It will be questioned by those blazing trails, but this theory remains well-settled Second, you remember the anecdotal story about people getting lost in the woods, traveling in circles, in their attempt to follow the moon, and realize the futility of relying on the moving target of the moon to direct your path. Third, you learned that the eastern hillside, as a general rule, has denser underbrush than the western hillside. As you compare the two for the first time, one hillside does seem denser than the other. This information, along with your reliable compass, provides reassurance that you are traveling in the right direction of your ultimate goal.

As you continue playing leap frog through the dark, you see a sign of an expert who has gone before you. A large "X" is blazed into a tree. This is an unmistakable sign, carved by the guide master, to renew your sense of hope and conviction that you are heading the right direction. Someday, when you have the expertise, you will confidently use your Swiss Army knife to blaze the trail and instill hope in other travelers. The time is now 3:24 a.m. Even though you are physically weary, the "X" brightened your emotions and gives you the energy to press on.

Now, you can finally hear it. The dancing sounds of fresh water rolling over rocks in the distance. With your second flashlight now growing dim, together you decide to turn it off and walk side by side in the darkness letting the sound of the stream serve as your guide. In no time, it seems, you reach the stream. You are overjoyed! This is worth celebrating! You are laughing, and crying, jumping up and down, and absolutely confident you are going to achieve your goal.

Together; you walk upstream along the bank. You are talking, reflecting on the events of the night, and sharing the glory of knowing that you did it together. Suddenly, you realize how accustomed you've grown to the darkness of the night and the thickness of the woods. The shadows of the moon and sounds of the wolves no longer play on your emotions. You have experienced all of it. And, the fear of the unknown is gone.

As the terrain becomes a steeper uphill climb, you and your partner occasionally find yourself placing your hand on a rock or branch to maintain control. Almost simultaneously, you gasp and cry out to each other as you see the glow of the base camp in the distance. You are scrambling uphill faster now. As you reach the site, the camp is lit by make-shift luminaries from cut open milk jugs filled with candles all aglow. There is your guide master, sitting atop a large bolder, and two other teams to greet you. You exchange stories about your experiences and wait for the other three teams to arrive. The guide master leads the ceremony where everyone receives their award in commemoration of their success. Congratulations, you did it!

If storytelling by analogy to share experiences 940A, 940A1 and 940A2, FIGS. 33, 34 and 50, is the manual article of manufacture 120, 120A, FIG. 4, then the learner will enter free form text into a journal or text document under the 170Ga through 170Gm occupational performance data field sharing how the learner's own experience is analogous 940Aa through 940Am, FIGS. 34 and 50. The learner will share his or her experience with other members of the community of practice 900 including other community members 910, FIG.

4, such as learners, teachers, mentors, and others. The manual article of manufacture 120, 120A, FIG. 4 will store all data in retrievable form. If storytelling by analogy to share experiences 940A, 940A1 and 940A2, FIGS. 33, 34 and 50, is the automated article of manufacture 120, 120A, FIG. 4, then the learner will enter free form text into a chat room discussion board under the appropriate discussion string's 170Ga through 170Gm occupational performance data field sharing how the learner's own experience is analogous 940Aa through 940Am, FIGS. 34 and 50. The learner will share his or her experience with other members of the community of practice including community members 910, FIG. 4, such as other learners, teachers, mentors, and others through the automated discussion board. The chat room discussion board will be limited to a subset of the community of practice for active participation purposes, determined by the teacher or mentor. The automated chat room discussion board will list 940Aa through 940Am, FIGS. 34 and 50, as discussion strings under which learners can enter free form text in 170Ga through 170Gm occupational performance data fields to share how their experiences are analogous to the experiences in the story listed above. The chat room discussion board will have query functions for the teacher, mentor, or others to query the data, such as: the number of entries per learner per week, the number of learners making entries under various categories, the number of learners making entries under various categories on a per week basis over time, and so forth.

To share some advantages, storytelling creates a fluid approach for members of the community of practice to internalize a story and create a script of their unique learning experience. Symbolic representations, that is 940Aa through 940Am, FIGS. 34 and 50, facilitate experiential learning through enabling the learners to link their unique experience to symbols and share personal experiences with other members of the community of practice as part of the process of developing tacit knowledge. Storytelling allows teachers, mentors, and others to identify learners with significant psychosocial or even mental health problems that may require intervention. Storytelling allows teachers, mentors, and others to identify curriculum or resource needs of the learners, in real-time, and implement improvements to impact learning. Traditional approaches including end of course surveys fail to capture curriculum and resource needs in time to impact learning and often may fail to capture the learning needs at all if the survey sensitivity is weak or the learner limits his or her feedback. Storytelling allows learners to share experiences from their whole lives which impact learning; the interplay of familial relationships, the dynamics of competing life roles, financial issues, health issues, etc., are more readily shared and their impact felt as an integrated part of the learners' story of being on a path to acquire competency based skills. Storytelling lends itself to outcomes based research and scientific research to improve achievement of occupational performance. The storytelling by analogy to share experiences 940A creates opportunities, referring to FIG. 4, for community members 910 such as teachers, mentors, and others to lead community activities 940 within the community of practice 900 around storytelling by analogy to share experiences 940A, FIGS. 33, 34 and 50.

Continuing with FIG. 33, in the present embodiment, community activities 940Z include participate in personhood activities 940B. As illustrated in detail in FIG. 35, the example of participate in personhood activities 940B includes: a demographic survey 940Ba, a competency skill importance survey 940Bg, a competency skill relevance survey 940Bh, a competency skill interest survey 940Bi; and the following optional items: Interest Inventory 940Bb, Role Checklist 940Bc, Myers-Briggs type indicator 940Bd, Social Styles profile 940Be, the Flower Exercise 940Bf.

If participate in personhood activities 940B, FIGS. 33 and 35, is the manual article 120, 120A, FIG. 4, then the learner will complete the demographic survey 940Ba with demographic questions created by one with ordinary skill in the art. The learner will complete the competency skill importance survey 940Bg and competency skill relevance survey 940Bh which lists the competency 500A elements for the learner's competencies, like the competency text phrases listed in FIGS. 9 through 25 and the Likert scale, with instructions for the learner to score his or her perceived importance and relevance of each competency on the one through five point Likert scale. The learner will complete the competency skill interest survey 940Bi by ranking his or her perceived top ten most interesting competency skills as well as his or her perceived top ten least interesting competency skills form a list of the competency 500A elements for the learner's competencies, like the competency text phrases listed in FIGS. 9 through 25. If the teacher, mentor or other person has decided to have the learners complete any or all of the optional items of the personhood activities; namely, Interest Inventory 940Bb, Role Checklist 940Bc, Myers-Briggs type indicator 940Bd, Social Styles profile 940Be, the Flower Exercise 940Bf, then the learner will follow the instructions attached to each component to complete the personhood activities. The manual article 120, 120A, FIG. 4 will store all data in retrievable form. If participate in personhood activities 940B, FIGS. 33 and 35, is the automated article 120, 120A, FIG. 4, then the learner will complete the demographic survey 940Ba with demographic questions created by one with ordinary skill in the art. The automated article 120, 120A, FIG. 4 will notify the learner if any fields are incomplete, request that the learner complete the survey, and store all data in retrievable form. The learner will complete the competency skill importance survey 940Bg and competency skill relevance survey 940Bh which lists the competency 500A elements for the learner's competencies, like the competency text phrases listed in FIGS. 9 through 25 and the Likert scale, with instructions for the learner to score his or her perceived importance and relevance of each competency on the one through five point Likert scale. The automated article 120, 120A, FIG. 4 will prevent the learner from circling more than one number on the five point scale and prevent the learner from marking the survey form halfway between two points on the five point Likert scale. The automated article 120, 120A, FIG. 4, will notify the learner if any fields are incomplete, request that the learner complete the survey, and store all data in retrievable form. The learner will complete the competency skill interest survey 940Bi by ranking his or her perceived top ten most interesting competency skills as well as his or her perceived top ten least interesting competency skills from a list of the competency 500A elements for the learner's competencies, like the competency text phrases listed in FIGS. 9 through 25. As the learner selects his or her most and least interesting competency skills one by one, the automated article 120, 120A, FIG. 4 will create a rank ordered list at the top of the electronic survey form. If the learner wishes to delete or change the rank order of a competency skill, the delete, drag, and drop functions of the automated article 120, 120A, FIG. 4, will allow the learner to modify his or her list. The automated article 120, 120A, FIG. 4 will notify the learner if any fields are incomplete, request that the learner complete the survey, and store all data in retrievable form. If the teacher, mentor or other person has decided to have the learners complete any or all of the optional items of the personhood activities; namely, Interest Inventory 940Bb, Role Checklist 940Bc, Myers- Briggs type indicator 940Bd, Social Styles profile 940Be, the Flower Exercise 940Bf, then the learner will follow the instructions attached to each component to complete the personhood activities. The learner will complete each optional survey as instructed, in an automated format. The automated article 120, 120A, FIG. 4, will notify the learner if any fields are incomplete, request that the learner complete the survey, and store all data in retrievable form.

To share some advantages, participate in personhood activities 940B allows the learner to identify competency skills he or she perceives as important and relevant. The learner's perception of importance and relevance in goal setting is correlated with achievement. If the learner lacks perceived importance and relevance of some competency skills, then teachers and mentors can work to align the learner's perceptions with the requirements of the program, course or degree that enumerates the competency skills, or at least provide consultation to the learner about the learner's likely potential satisfaction or persistence in occupational performance of skills which her or she finds unimportant or irrelevant. Conversely, teachers, mentors and others persons involved in a program, course, or degree may rightly question the rational for inclusion of a particular competency skill if a significant number of learners rate the competency skill as either unimportant or irrelevant. Diversity and disparity issues in education are important considerations, yet currently there are few methods to consider such issues, their impact on education, and recommendations to address reform. The participate in personhood activities 940B data can be used for outcomes research and scientific research to address diversity and disparity issues. The Interest Inventory 940Bb, Role Checklist 940Bc, Myers-Brigs type indicator 940Bd, Social Style profile 940Be, the Flower Exercise 940Bf, and competency skill interest survey 940Bi data can be used to identify and suggest possible vocational interests, and is discussed in greater detail below. The participate in personhood activities 940B creates opportunities, referring to FIG. 4, for community members 910 such as teachers, mentors, and others to lead community activities 940 within the community of practice 900 around personhood activities 940B, FIGS. 33 and 35.

Continuing with FIG. 33, in the present embodiment, community activities 940Z include explore vocations 940C. As illustrated in detail in FIG. 36, the example of explore vocations 940C includes: the plurality of community members, for example, a K-12 math student 910Ae, a clinical and translational research fellow 910Ab, and a practicing engineer 910Ah; the multitude of combinations of each community member respectively, for example, 940Bb+940Bc+940Bd+940Be+940Bf+940Bi+170Fg+170Fh+170Fi+170Fj, 970De of the K-12 math student 910Ae, 940Bb+940Bc+940Bd+940Be+940Bf+940Bi+170Fg+170Fh+170Fi+170Fj, 970Db of the clinical and translational research fellow 910Ab, and, 940Bb+940Bc+940Bd+940Be+940Bf+940Bi+170Fg+170Fh+170Fi+170Fj, 970Dh of the practicing engineer 910Ah, are combined as combinations for exploring vocations 970D, and generate explore vocations data for K-12 math student 170De, explore vocations data for clinical and translational research fellow 170Db, and explore vocations data for practicing engineer 170Dh, occupational performance data fields for exploring vocations.

To further illustrate how exploring vocations works, referring to FIG. 36, assume the following hypothetical facts. The combinations for exploring vocations 970D searches to correlate and match occupational performance data fields across the plurality of community members 910. Assume the K-12 math student 910Ae expresses interest math, sports, and constructing things in the interest inventory 940Bb, Myers-Briggs type indicator 940Bd of "INTP" (I=Introvert, N=Intuitive, T=Thinker, P=Perceiver), Social Style profile 940Be of "Analytical-Analytical," and competency skill interest survey 940Bi that identifies 500A type, FIG. 49, hypothetical competency goal elements in math related to levers, force, statistics, probability testing, and generating hypotheses as most interesting. Now assume the K-12 math student 910Ae combinations 970De find matches with the clinical and translational research fellow 910Ab combinations 970Db, and the practicing engineer 910Ah combinations 970Dh through combinations for exploring vocations 970D. Each community member receives communication, via a letter or email, to share the community members 910 common interests through the explore vocations data 170De, 170Db, and 170Dh.

If explore vocations 940C, FIG. 36, is the manual article 120, 120A, FIG. 4, then the learner will complete the surveys and submit them. The manual article 120, 120A, FIG. 4, will store data in retrievable form. If explore vocations 940C, FIG. 36, is the automated article 120, 120A, FIG. 4, then the learner will complete the surveys and the automated article 120, 120A, FIG. 4, will store the data in retrievable form. The learner will receive a prompt if any data fields are left blank or if the learner enters a response that is inconsistent with survey instructions to ensure data collection is complete and accurate. For both the manual and automated article 120, 120A, FIG. 4, the teacher, mentor, or other person will perform combinations 970, FIG. 4, with the data using database software employed by one with ordinary skill in the art to match community members with common interests to explore vocations. The teacher, mentor, or other person will notify the community members via mail or email of the match and provide the explore vocations data, such as 170De, 170Db, and 170Dh, referring to FIG. 36, to each community member 910, such as 910Ae, 910Ab, 910Ah.

To share some advantages, to illustrate by example, the K-12 math student 910Ae has an opportunity to explore vocations of the clinical and translational research fellow 910Ab who hypothetically is a physical therapy doctoral student studying the differences in orthopedic knee injuries in boys and girls based upon body posture when they kick the soccer ball. And, the K-12 math student 910Ae has an opportunity to explore vocations of the practicing engineer 910Ah who hypothetically designs bicycle helmets for a leading manufacturer and is studying the rotational force effects of helmets having long, aerodynamic extensions at the back of the helmet versus a low profile rigid helmet to determine whether the low profile helmet reduces the risk of brain injury if rotational force is involved in a bicycle crash. These three community members 910 have mutual common interests and the clinical and translational research fellow 910Ab and practicing engineer 910Ah have both also expressed interest in mentoring young people, increasing awareness of their respective professional fields, and sharing information about career outlook information regarding job growth, salaries, etc. The K-12 math student benefits by learning about careers to which he or she has an interest and might not otherwise learn about, and makes connections with mentors and role models when he or she might otherwise have none. At an early age, the K-12 math student 910Ae internalizes the need to perform well and persist in math courses and, importantly, begins to try on different career hats. The K-12 500A competencies as well as 500A competencies for many other professional programs, FIGS. 9 through 25, include exploring vocations as explicit competency skills. The clinical and translational research fellow 910Ab and practicing engineer 910Ah have an opportunity to participate in self-regulation of their professions through promoting the professions and recruiting potential new members, provide community service as role models, possibly satisfy continuing education credit requirements, use outreach as part of their role as a chair or board member of a nonprofit organization, and so forth. The explore vocations 940C creates opportunities, referring to FIG. 4, for community members 910 such as teachers, mentors, and others to foster relationships and other community activities 940 within the community of practice 900 around explore vocations 940C, FIGS. 33 and 36.

Continuing with FIG. 33, in the present embodiment, community activities 940Z include share artifacts 940D. Share artifacts 940D creates an opportunity for artifacts 880Z, FIG. 32, from performance records 700A, FIG. 30 to be shared by community members 910, as community activities 940, FIG. 4.

If share artifacts 940D, FIG. 33, is the manual article 120, 120A, FIG. 4, then the learner will share his or her artifacts through speeches, group dialogue, question and answer sessions, print media, such as posters, brochures, hand-outs, packets, and so forth. The manual article 120, 120A, FIG. 4 will store data in retrievable form. If share artifacts 940D, FIG. 33, is the automated article 120, 120A, FIG. 4, then the learner may share his or her artifacts through any of the approaches stated immediately above, and additionally, using presentation software, voice and video chat, podcasts, smart boards, and any other interactive multimedia available. The automated article 120, 120A, FIG. 4 will store data in retrievable form.

To share some advantages, the community of practice 900, FIG. 4, creates opportunities for community members 910 to share artifacts 940D that individual members create related achieving their competency based goals 200, FIG. 4. Visual, written, and audiovisual presentation of artifacts 880, FIG. 30, is a way to share artifacts 940D, FIG. 33, in preparation for an actual presentation or speech the community member 910 may give related to his or her work. Sharing artifacts 940D gives the community member an opportunity to gain valuable feedback from other community members before sharing the presentation, speech, publication, etc. more widely. Presenting and sharing information helps build the community of practice 900, FIG. 4. Presenting, critiquing, analyzing and sharing constructive feedback to others are in themselves competency 500A, FIGS. 9 through 25, skills for many learners' education standards. Exploring careers and job seeking skills are also in themselves competency 500A, FIG. 9 through 25, skills for many learners' education standards. Sharing challenges can create support, increase persistence, and aid in problem-solving issues related to knowledge development or other issues confronting professions. Sharing success engenders a sense of empowerment, recognition, and good will among community members 910, FIG. 4.

Continuing with FIG. 33, in the present embodiment, community activities 940Z include conduct outcomes research 940E. As illustrated in detail in 940E1, FIG. 37, hypothetical data for illustrative purposes in the example of conduct outcomes research 940E1 includes: combinations 970E1 of goal number data 170Fe and date goal met data 170Fd correlation with competency skill relevance data 940Bh displayed in a graph. The teacher, mentor, or other person can select the multitude of combinations of data to examine various alignment issues in education. Here, the hypothetical data display alignment of goal achievement with competency skill relevance 940E1; specifically, a positive correlation of the learner's perceived level of competency skill relevance from survey data with which goals the learner has met.

Continuing with FIG. 33, in the present embodiment, community activities 940Z include conduct outcomes research 940E. As illustrated in detail in 940E2, FIG. 38, hypothetical data for illustrative purposes in the example of conduct outcomes research 940E2 includes: combinations 970E2 of demographic survey 940Ba and competency 500A correlation with combinations 970E1 goal number data 170Fe and date goal met data 170Fd displayed in a graph. The teacher, mentor, or other person can select the multitude of combinations of data to examine various attainment issues in education. Here, the hypothetical data display attainment of competencies based upon demographics 940E2; specifically, disparities in goals met among whites, blacks, and hispanics for various competencies. With this level of granularity in the data, the community of practice 900, FIG. 4, can begin to uncover and examine why, hypothetically, an african american learner performs higher than his or her peers on counting currency and time-telling versus a caucasian learner performs higher on word problems and naming geometric shapes, and why african american, caucasian, and hispanic learners all perform about the same on generating hypotheses.

Continuing with FIG. 33, in the present embodiment, community activities 940Z include conduct outcomes research 940E. As illustrated in detail in 940E3, FIG. 39, hypothetical data for illustrative purposes in the example of conduct outcomes research 940E3 includes: combinations 970E3 of demographic survey 940Ba and competency skill importance survey 940Bg correlation with combinations 970E1 of goal number data 170Fe and date goal met data 170Fd displayed in a graph. The teacher, mentor, or other person can select the multitude of combinations of data to examine various persistence issues in education. Here, the hypothetical data display persistence of goal achievement related to competency skill importance and demographics 940E3; specifically, disparities in goals met among whites, blacks, and hispanics based upon whether the learner perceived the competency skill as important. With this level of granularity in the data, the community of practice 900, FIG. 4, can begin to uncover and examine why, hypothetically, an african american learner perceives math facts for subtraction as important versus describing attributes of shapes as unimportant and how this perception may impact persistence in achieving competency skills, and why a hispanic learner perceives describing attributes of shapes as more important than expressing equations and how this perception may impact persistence in achieving competency skills.

If conduct outcomes research 940E1, 940E2, and 940E3, FIGS. 37, 38, and 39, is the manual article 120, 120A, FIG. 4, then the teacher, mentor, or other person will enter data and perform combinations 970, FIG. 4, with the data using statistical analysis software employed by one with ordinary skill in the art to analyze the data. If conduct outcomes research 940E1, 940E2, and 940E3, FIGS. 37, 38, and 39, is the automated article 120, 120A, FIG. 4, then the teacher, mentor, or other person will retrieve data from the plurality of occupational performance data fields, import the data into statistical software, and perform combinations 970, FIG. 4, with the data using statistical analysis software employed by one with ordinary skill in the art to analyze the data.

To share some advantages, teachers, mentors, and other persons can conduct outcomes research, as examples illustrate in FIGS. 37, 38, 39, for individual learners and learners in the aggregate, across selected competency skills, and time periods, and examine data and their implications for improving occupational performance. The data give the community of practice 900, FIG. 4, a multitude of options for conducting qualitative, quantitative and mixed method outcomes research to identify areas of success, areas of concern, and areas of serendipity, and so forth. The data capture occupational performance improvement in authentic environments over time in sharp contrast to standardized testing measures or examinations in testing environments on a given day. The conduct outcomes research 940E creates opportunities, referring to FIG. 4, for community members 910 such as teachers, mentors, and others to engage in community activities 940 within the community of practice 900 around conduct outcomes research 940E, 940E1, 940E2, 940E3, FIGS. 33, 37, 38, and 39.

Continuing with FIG. 33, in the present embodiment, community activities 940Z include conduct scientific research 940F. As illustrated in detail in 940Fa, FIG. 40, the example of conduct scientific research 940Fa includes: progress note data 170A including salient impressions data 170Aa, happenings data 170Ab, introspection data 170Ac, next steps data 170Ad, and empowerment data 170Ae performing the multitude of combinations 970 to re-categorize the occupational performance data fields as progress note brain function data including self-efficacy data 170Ba, goal commitment data 170Bb, goal relevance data 170Bc, goal importance data 170Bd, self-appraisal data 170Be, organization data 170Bf, emotional imprint data 170Bg, goal-setting behavior data 170Bh, share experiences data 170Bi, sensory experiences data 170Bj, success data 170Bk, and determination data 170Bl. One with ordinary skill in the art may choose any number of approaches to re-categorize the progress note. For example, to perform combinations 970 to re-categorize the data if the article is the manual article 120, 120A, FIG. 4, using various colored highlighters or markers for each 170B progress note brain function data occupational performance data field directly on the free form text of 170A progress note data is one approach. Referring to FIG. 4, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fa conduct scientific research, qualitative study of progress note and brain function. As another example, to perform combinations 970 to re-categorize the data if the article is the automated article 120, 120A, FIG. 4, using various electronic paintbrushes or highlighters for each 170B progress note brain function data occupational performance data field either directly on the free form text of 170A progress note data or to copy/paste the free form text 170A progress note data directly into 170B occupational performance data fields are two approaches. Again, referring to FIG. 4, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fa conduct scientific research, qualitative study of progress note and brain function.

If conduct scientific research 940Fa, FIG. 40, is the manual article 120, 120A, FIG. 4, then the community members 910, such as the teacher, mentor, or other person, will enter data and perform combinations 970, FIG. 4, with the data using statistical analysis software, database software, and/or data mining software employed by one with ordinary skill in the art to analyze the data. If conduct outcomes research 940Fa, FIG. 40, is the automated article 120, 120A, FIG. 4, then the community members 910, such as the teacher, mentor, or other person, will retrieve data from the plurality of occupational performance data fields, import the data into statistical software, database software, and/or data mining software and perform combinations 970, FIG. 4, with the data using statistical analysis software, database software, and/or data mining software employed by one with ordinary skill in the art to analyze the data.

To share some advantages, the community of practice 900, FIG. 4, has an opportunity to conduct scientific research 940Fa, FIG. 40, to gain an understanding into how the multitude of learners achieve goal-directed occupational performance in authentic environment. Referring to FIG. 4, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fc, FIG. 41, the example of conduct scientific research 940Fc includes: storytelling by analogy to share experiences occupational performance data field 170G data performing the multitude of combinations 970 to re-categorize the role of story telling occupational performance data fields 170C as experiential data 170Ca, memory recall data 170Cb, projection data 170Cc, hypothetical data 170Cd, prospective data 170Ce, relational data 170Cf, gender-based data 170Cg, observational data 170Ch, cultural data 170Ci, faith-based data 170Cj, traditions data 170Ck, forbidden, proscribed data 170Cl, and coping data 170Cm. One with ordinary skill in the art may choose any number of approaches to re-categorize the storytelling by analogy to share experiences occupational performance data field 170G data. For example, to perform combinations 970 to re-categorize the data if the article is the manual article 120, 120A, FIG. 4, using various colored highlighters or markers for each 170G storytelling by analogy to share experiences data occupational performance data field directly on the free form text of 170G data is one approach. Referring to FIG. 4, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fc conduct scientific research, qualitative study of the role of storytelling in skill acquisition. As another example, to perform combinations 970 to re-categorize the data if the article is the automated article 120, 120A, FIG. 4, using various electronic paintbrushes or highlighters for each 170G storytelling by analogy to share experiences data occupational performance data field either directly on the free form text of 170G data or to copy/paste the free form text 170G data directly into 170C occupational performance data fields are two approaches. Again, referring to FIG. 4, community members 910 as part of the community of practice 900 perform combinations 970 to allow analysis and improvement of occupational performance 102 for the benefit of the community of practice 900. To perform combinations 970, statistical software, database software, and/or data mining software is used to accomplish the community activity, 940Fc conduct scientific research, qualitative study of the role of storytelling in skill acquisition.

If conduct scientific research 940Fc, FIG. 41, is the manual article 120, 120A, FIG. 4, then the community members 910, such as the teacher, mentor, or other person, will enter data and perform combinations 970, FIG. 4, with the data using statistical analysis software, database software, and/or data mining software employed by one with ordinary skill in the art to analyze the data. If conduct outcomes research 940Fc, FIG. 41, is the automated article 120, 120A, FIG. 4, then the community members 910, such as the teacher, mentor, or other person, will retrieve data from the plurality of occupational performance data fields, import the data into statistical software, database software, and/or data mining software and perform combinations 970, FIG. 4, with the data using statistical analysis software, database software, and/or data mining software employed by one with ordinary skill in the art to analyze the data.

To share some advantages, the community of practice 900, FIG. 4, has an opportunity to conduct scientific research 940Fc, FIG. 41, to gain an understanding into how the multitude of learners internalize occupational performance experiences as stories and shared their learned experiences in authentic environment. Lived experience, encoded as stories, builds tacit knowledge and moves the learner from novice towards expert performance. Storytelling facilitates the transmission of knowledge among members of the community of practice and continuously influences and reshapes the occupational performance of its community members. Referring to FIG. 4, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct scientific research 940F. As illustrated in detail in 940Fb1, 940Fb2, and 940Fb3, FIGS. 42, 43 and 44, the example of conduct scientific research 940Fb1, 940Fb2, and 940Fb3 includes: "500E+170Ea" combination 970Aa yields motivation data about occupational performance 170Za, "500E+170Ea+170Ej+170Eb" combination 970Ab yields cultural competency data about occupational performance 170Zb, "500E+170Ea+170Ej+170Ec" combination 970Ac yields diversity data about occupational performance 170Zc, "500E+170Ea+170Ej+170Ed" combination 970Ad yields disparities data about occupational performance 170Zd, "500B+170En" combination 970Ae yields levels of cognitive functioning data about occupational performance 170Ze, "500B+170En+500A" combination 970Af yields performance standards relation to brain function and competency skills during occupational performance 170Zf, "500B+170En+500C" combinations 970Ag yields performance standards relation to brain function and tools, media, and activities during occupational performance 170Zg, "500B+170En+500E" combination 970Ah yields performance standards relation to brain function and motivation during occupational performance 170Zh, "500B+170En+500D" combination 970Ai yields performance standards relation to brain function and accuracy or measure of independence during occupational performance 170Zi, "170Ej+500B+500C+170Ee" combination 970Aj yields situated cognition data about occupational performance 170Zj, "500A+170Ek+170Ej+500B+500C+170Ee+170Ef" combination 970Ak yields communities of practice data about occupational performance 170Zk, "500A+170Ek+170Ej+500B+500C+170Ee+170Ef+170Eg" combination 970Al yields historical-cultural approach data about occupational performance 170Zl, "500A+170Ek+170Ej+500B+500C+170Ee+170Ef+170Eg+170Eh" combination 970Am yields distributed cognition data about occupational performance 170Zm, "500D+500C+170El" combination 970An yields FLOW, psychology of optimal performance data about occupational performance 170Zn, "170Ej+500C+170Eo" combination 970Ao yields ecological psychology data about occupational performance 170Zo, and "500A+500D+500C+170Ep" combination 970Ap yields talent development data about occupational performance 170Zp. One with ordinary skill in the art may choose any number of approaches to perform combinations 970Aa through 970Ap, 940Fb1, 940Fb2, and 940Fb3, FIGS. 42, 43, and 44, of the plurality of occupational performance data field data. For example, to perform combinations 970 if the article 120, 120A, FIG. 4, is the manual article, entering the data into statistical software, database software, and/or data mining software, and then manipulating and analyzing the multitude of 970A combinations is used to accomplish the community activity, 940Fb conduct scientific research, mixed method study of contemporary cognitive theories and occupational performance. Referring to FIG. 4, community members 910 as part of the community of practice 900 perform combinations 970 to allow analysis and improvement of occupational performance 102 for the benefit of the community of practice 900. As another example, to perform combinations 970 if the article is the automated article 120, 120A, FIG. 4, retrieving and importing the stored and retrievable data into statistical software, database software, and/or data mining software is used to accomplish the community activity, 940Fb conduct scientific research, mixed method study of contemporary cognitive theories and occupational performance. Again, referring to FIG. 4, community members 910 as part of the community of practice 900 perform combinations 970 to allow analysis and improvement of occupational performance 102 for the benefit of the community of practice 900.

If conduct scientific research 940Fb1, 940Fb2, and 940Fb3, FIGS. 42, 43, and 44, is the manual article 120, 120A, FIG. 4, then the community members 910, such as the teacher, mentor, or other person, will enter data and perform combinations 970, FIG. 4, with the data using statistical analysis software, database software, and/or data mining software employed by one with ordinary skill in the art to analyze the data. If conduct outcomes research 940Fb1, 940Fb2, and 940Fb3, FIGS. 42, 43, and 44, is the automated article 120, 120A, FIG. 4, then the community members 910, such as the teacher, mentor, or other person, will retrieve and import the data into statistical software, database software, and/or data mining software and perform combinations 970, FIG. 4, with the data using statistical analysis software, database software, and/or data mining software employed by one with ordinary skill in the art to analyze the data.

To share some advantages, the community of practice 900, FIG. 4, has an opportunity to conduct scientific research 940F, 940Fb1, 940Fb2, and 940Fb3, FIGS. 33, 42, 43, and 44, to gain an understanding into how the multitude of learners achieve occupational performance through the lens of various contemporary cognitive theories. Contemporary cognitive theories facilitate the development of knowledge, insight to spawn new learning approaches, and adaption for smarter contexts for learning among members of the community of practice. The method is iterative, continuously influencing, challenging, and redefining the occupational performance of its community members. Referring to FIG. 4, community members 910 can engage in community activities 940 as part of the community of practice 900 to gain new insights and explore the impact various learning experiences have on different learners through the multitude of combinations 970 to improve occupational performance 102 for the benefit of the community of practice 900.

Continuing with FIG. 33, in the present embodiment, community activities 940Z include conduct performance measurement research 940G. As illustrated in detail in 940Ga, FIG. 45, the example of conduct performance measurement research, adapted stages of skill acquisition scoring rubric, 940Ga includes: assessments 820, learner formative assessment scores data 170Fg, occupational performance data field, scored "2" 170Fg1, "1" 170Fg2, "3" 170Fg3, "1" 170Fg4, "2" 170Fg5, "1" 170Fg6, "4" 170Fg7, "3" 170Fg8, "2" 170Fg9, mentor formative assessment scores data 170Fh, occupational performance data field, scored "2" 170Fh1, "2" 170Fh2, "3" 170Fh3, "NA" 170Fh4, "1" 170Fh5, "1" 170Fh6, "4" 170Fh7, "2" 170Fh8, and "2" 170Fh9. FIG. 45 illustrates in greater detail how the assessments 820 section of the performance record 700A as embodied in FIG. 30 displays the learner's formative assessments scores. The mentor or teacher can establish a scoring rubric of his or her choice. The Likert scale with numeric scores 1 through 5, or a version of the Dreyfus scale with level of skill acquisition number scores 1 through 5, or another scoring rubric with at least some evidence of validity and reliability may be used. The following example illustrates one scoring rubric for assessments 820, FIG. 45.

In Mind over Machine, H. L. Dreyfus and Stuart E. Dreyfus share "Five Stages of Skill Acquisition" based upon their extensive research with airplane pilots, chess players, automobile drivers, and adult learners of a second language (Copyright © 1986). B. A. Wright has modified, abridged, and adapted the Dreyfus' stages of skill acquisition into the following rubric for scoring formative and summative assessments (Copyright © 2010) as illustrated in the current embodiment of the performance record 700A, FIG. 30, and as illustrated in detail in 820A, FIG. 45. As previously stated, any scoring rubric which is rooted in some body of evidence, and has some validity and reliability in another field is contemplated and may be adapted as a scoring rubric for scoring assessments herein.

| Dreyfus Scores for Skill Acquisition: | |
|---|---|
| "1" = | Novice |
| "2" = | Advanced Beginner |
| "3" = | Competent |
| "4" = | Proficient |
| "5" = | Expert |
| "NA" = | Not Assessed, Experienced or Observed |

Stage 1: Novice
  Indicia of Novice Skills (Score=1 on the Assessment)
    Learns to recognize various objective facts and features relevant to the skill.
    Acquires rules for determining actions based upon facts and features.
    Perceives relevant elements of the situation as clearly and objectively defined.
    Recognizes relevant elements without reference to the overall situation in which they occur, called "context-free" elements.
    Applies relevant rules to context-free elements regardless of what else is happening, called "context-free" rules.
    Manipulates unambiguously defined context-free elements by precise rules, called "information processing."
    Ignores context when applying rules.
    Does not understand that in certain situations, the rule should be violated.
    Does not interpret a situation as a whole.
    Recognizes context-free features and applies objective procedures.
    Recognizes learned components and applies learned rules, and consequently, feels little responsibility for the outcome of hi/her acts.

Stage 2: Advanced Beginner
  Indicia of Advanced Beginner Skills (Score=2 on the Assessment)
    Acquires experience in coping with real situations.
    Considers more context-free facts.
    Learns to use more sophisticated rules.
    Recognizes meaningful elements in concrete situations through considerable practical experience.
    Identifying objective, context-free features no longer dominates perceptions.
    Perceives similarities to prior examples or situations.
    Perceives new elements as "situational" rather than context-free.
    Responds with rules for performance or behavior that incorporate both new situational components and context-free components.
    Perceiving and responding to the situational experience seems immeasurably more important than any form of verbal description.
    Follows formal procedures or sequential directions without observing and weighing what is most important.
    Exhibits difficulty identifying and prioritizing what is most important.
    Recognizes learned components and applies learned rules, and consequently, feels little responsibility for the outcome of his/her acts.

Stage 3: Competence
  Indicia of Competent Skills (Score=3 on the Assessment)
    Recognizing numerous situational elements along with context-free elements present in real-world circumstances becomes overwhelming.
    Recognizes the need to identify and prioritize what is most important.
    Develops a plan to organize the situation, then examines only a smaller set of factors that are most important based upon the chosen plan.
    Screens out elements determined to be irrelevant to decision-making and responding.
    Adopts a hierarchical procedure of decision-making.
    Sees a situation as a set of facts where the importance of some facts may depend on the presence of other facts.
    Learns that when a situation has a particular constellation of elements, a certain conclusion should be drawn, decision made, or expectation investigated.
    Exhibits more skill and less analytical reasoning.
    Assesses the urgency of competing needs and plans work accordingly.
    Monitors the plan to identify new situational elements, assesses the presence or absence of certain factors, and modifies the plan when indicated.
    Determines whether new situational elements become important or should be ignored.
    Pays attention to only a few of the immense number of factors impinging on the overall situation to decide the hierarchy of action.
    Choosing an organizing plan is no simple matter for the competent performer.
    Combines and assigns nonobjective and necessary elements when wrestling with the question of the choice of a plan, and consequently, feels responsible for and emotionally involved in the product of his/her choice.

Understands and decides in a detached manner, but finds himself/herself intensely involved in what occurs thereafter.

Feels deeply satisfied with successful outcomes.

Remembers poor outcomes and associated feelings.

Vividly remembers successfully chosen plans and remembers the situation from the perspective of the plan.

Stage 4: Proficiency

Indicia of Proficient Skills (Score=4 on the Assessment)

Deeply involved in his/her task and experiences it from some specific perspective because of recent events.

Perceives certain features as salient or standing out while other features recede into the background or are ignored.

Perceives changes gradually as events modify the salient features, plans and expectations, and reorders the relative importance or saliency of features.

Displays rapid, fluid, involved behavior that bears no similarity to the slow, detached reasoning of the problem-solving process.

Choosing is engaged rather than detached and deliberate.

Recalls experiences to similar situations in the past and memories trigger plans similar to those that worked in the past.

Recalls experiences to similar situations in the past and anticipates events similar to those that occurred in the past.

Possesses an intuitive ability to use patterns without decomposing them into component features, called "holistic similarity recognition."

Intuitively organizes and understands tasks where intuition is the product of deep situational involvement and recognition of similarity.

Intuitively organizes his/her actions by assessing elements defined as important through prior experience along with combining rules to produce decisions about how best to manipulate the environment to achieve the desired outcome.

Stage 5: Expertise

Indicia of Expert Skills (Score=5 on the Assessment)

Knows what to do based upon mature and practiced understanding.

Totally engages in his/her environment and does not see problems in some detached way or work at solving them.

Present in the moment and does not worry about the future and devising plans.

Rapid automatic response.

So engrossed in the present experience as an "involved participant" that he/she uses tools or media to connect to the environment.

Loses awareness of his/her separateness from the tools, media or activity manipulated in the environment and connects to a world of opportunities, threats, strengths, weaknesses, hopes and fears.

Displays rapid, fluid, involved behavior that bears no similarity to the slow, detached reasoning of the problem-solving process.

Associates particular features of a pattern in a given situation with a condition stored in memory and triggers a decision.

Performs mostly in an ongoing and non-reflective manner doing what normally works.

When time permits and outcomes are crucial, experts will deliberate before acting.

This deliberation is qualitatively different from detached, calculative problem-solving, the expert's deliberation involves critical reflection on one's intuitions.

Responds to "holistic recognition of similarities" produced through deep situational understanding of past experiences, relates current situations to prior similar situations, and associates the related decision, action or tactic simultaneously.

Performs so fluidly that the situation defies complete verbal description.

If conduct performance measurement research 940Ga, FIG. 45, is the manual article 120, 120A, FIG. 4, then the teacher, mentor, or other person will enter data and perform combinations 970, FIG. 4, with the data using statistical analysis software employed by one with ordinary skill in the art to analyze the data. If conduct performance measurement research 940Ga, FIG. 45, is the automated article 120, 120A, FIG. 4, then the teacher, mentor, or other person will retrieve data from the plurality of occupational performance data fields, import the data into statistical software, and perform combinations 970, FIG. 4, with the data using statistical analysis software employed by one with ordinary skill in the art to analyze the data.

To share some advantages, teachers, mentors, and other persons can conduct performance measurement research, as examples illustrate in FIG. 45, for individual learners and learners in the aggregate, across all or selected competency skills, and time periods, and examine data and their implications for improving occupational performance. The article 120, 120A, FIG. 4, creates an opportunity to conduct performance measurement research 940G, FIG. 33, so that equitable, effective, valid, and reliable scoring rubric may be developed and/or tested. The data capture occupational performance improvement in authentic environments over time in sharp contrast to standardized testing measures or examinations in testing environments on a given day. The conduct performance measurement research 940G, FIG. 33, creates opportunities, referring to FIG. 4, for community members 910 such as teachers, mentors, and others to lead community activities 940 within the community of practice 900 around developing, testing, implementing, and improving the community's ability to conduct performance measurement research 940G, FIGS. 33 and 45.

Continuing with FIG. 33, in the present embodiment, community activities 940Z include examine self-regulation of professions 940H. As illustrated in detail in 940Ha, FIG. 46, hypothetical data for illustrative purposes of an example of examine self-regulation of professions, comparison study of mid-level practitioners and new graduates, 940Ha includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Assume the hypothetical data represents a medical surgical specialty. Many surgical specialties require a board re-certification for medical practitioners, commonly after ten years of practicing medicine. Now also assume that the surgical specialty has adopted use of the system and method in the article 120, 120A, FIG. 4, of the present embodiment for its practicing surgeons as part of their professional practice standards and board re-certification. Referring to FIG. 46, assume the hypothetical data "P" represents practitioners of this medical surgical specialty who have four to ten years experience, and each "P" represents the aggregate performance of the cohort for years 2006, 2007, 2008, and 2009, respectively. Referring to FIG. 46, assume the hypothetical data "N" represents practitioners of this medical surgical specialty who have zero years of experience in 2006; that is, they are newly minted practitioners of this medical surgical specialty. Each "N"

represents the aggregate performance of the cohort of 2006 graduates for years 2006, 2007, 2008, and 2009. Assume the hypothetical data lead to a conclusion that the new practitioners are performing significantly below the practitioners with four or more years of professional experience, and that this discrepancy is resulting in a significantly higher percentage of medical errors that harm patients. The data raise questions regarding self-regulation for this medical surgical specialty about whether the new practitioners should have more supervision during the first few years of practice, should have a longer surgical residency, should raise the requirement for more practice performing this particular surgical procedure during residency training, or should explore improving other aspects of the curriculum, or some combination of these options.

If examine self-regulation of professions 940Ha, FIG. 46, is the manual article 120, 120A, FIG. 4, then the community members 910, such as the teacher, mentor, or other person, will enter data and perform combinations 970, FIG. 4, with the data using statistical analysis software, database software, and/or data mining software employed by one with ordinary skill in the art to analyze the data. If examine self-regulation of professions 940Ha, FIG. 46, is the automated article 120, 120A, FIG. 4, then the community members 910, such as the teacher, mentor, or other person, will retrieve and import the data into statistical software, database software, and/or data mining software and perform combinations 970, FIG. 4, with the data using statistical analysis software, database software, and/or data mining software employed by one with ordinary skill in the art to analyze the data.

To share some advantages, the community of practice 900, FIG. 4, has an opportunity to examine self-regulation of professions like the example illustrates in 940Ha, FIG. 46, to gain an understanding of how a multitude of professions can identify and address improvement of occupational performance for its members during formal education program years as well as throughout professional practice. Referring to FIG. 4, community members 910 can engage in community activities 940 as part of the community of practice 900 to gain new insights and explore the impact various self-regulatory issues have on their respective professions through the multitude of combinations 970 to improve occupational performance 102 for the benefit of the community of practice 900.

Continuing with FIG. 33, in the present embodiment, community activities 940Z include assess evidence based multimedia: tools, media, activities, curriculum 940I. As illustrated in detail in 940Ia, FIG. 47, hypothetical data for illustrative purposes of an example of assess evidence based multimedia: tools, media, activities, curriculum, randomized controlled trial, 940Ia includes: combinations 970F of 500A data 170Fk, 500D data 170Fn, 500C data 170Fm, learner summative assessment scores data 170Fi, and mentor summative assessment scores data 170Fj correlation of combinations 970E1 goal number data 170Fe and date goal met data 170Fd displayed in a graph. Continue with the hypothetical situation involving the medical surgical specialty identified immediately above. Assume the hypothetical community of practice of medical surgical specialists decide to improve the curriculum and conduct a controlled randomized trial at several medical residency programs and longitudinally follow the cohort for four years. Referring to FIG. 47, assume the hypothetical data "P" represents practitioners of this medical surgical specialty who have four to ten years experience, and each "P" represents the aggregate performance of the cohort for years 2011, 2012, 2013, and 2014, respectively. Referring to FIG. 47, assume the hypothetical data "C" represents the control group of practitioners of this medical surgical specialty who have zero years of experience in 2011; that is, they are newly minted practitioners of this medical surgical specialty. The control group had no change in the curriculum or any other significant change in their residency program during the study. Each "C" represents the aggregate performance of the cohort of 2011 graduates for years 2011, 2012, 2013, and 2014. Referring to FIG. 47, assume the hypothetical data "T" represents the test group of practitioners of this medical surgical specialty who have zero years of experience in 2011; that is, they are newly minted practitioners of this medical surgical specialty. The test group received the new evidence based curriculum, but had no other significant changes in their residency program during the study. Each "T" represents the aggregate performance of the cohort of 2011 graduates for years 2011, 2012, 2013, and 2014. Assume the hypothetical data leads to a conclusion that the new practitioners who received the new evidence based curriculum performed significantly better than the control group. The significant improvement resulted in a significantly lower number of medical errors. The medical surgical specialty can now consider how to disseminate this information and address curriculum changes to the residency program. The medical surgical specialty can also consider continuing education training for those new practitioners who were in the "C" control group of the study, and therefore, did not receive the improved curriculum along with other new practitioners who were not participants in the study.

If assess evidence based multimedia: tools, media, activities, curriculum 940Ia, FIG. 47, is the manual article 120, 120A, FIG. 4, then the community members 910, such as the teacher, mentor, or other person, will enter data and perform combinations 970, FIG. 4, with the data using statistical analysis software, database software, and/or data mining software employed by one with ordinary skill in the art to analyze the data. If assess evidence based multimedia: tools, media, activities, curriculum 940Ia, FIG. 47, is the automated article 120, 120A, FIG. 4, then the community members 910, such as the teacher, mentor, or other person, will retrieve and import the data into statistical software, database software, and/or data mining software and perform combinations 970, FIG. 4, with the data using statistical analysis software, database software, and/or data mining software employed by one with ordinary skill in the art to analyze the data.

To share some advantages, the community of practice 900, FIG. 4, has an opportunity to assess evidence based multimedia: tools, media, activities, curriculum 940Ia, FIG. 47, to evaluate whether specific tools, media, activities, and curriculum significantly improve occupational performance when compared against other tools, media, activities, and curriculum. Referring to FIG. 4, community members 910 can engage in community activities 940 as part of the community of practice 900 to evaluate the comparative effects of specific tools, media, activities, and curriculum through the multitude of combinations 970 to improve occupational performance 102 for the benefit of the community of practice 900. The improved evidence based multimedia can improve the occupational performance of learners during their formal education program as well as learners during their professional practice years through continuing education programs.

Continuing with FIG. 33, in the present embodiment, community activities 940Z include explore and implement new applications to improve occupational performance 940J. Referring to FIG. 4, community members 910 can engage in community activities 940 as part of the community of practice 900 which is dynamic and oriented towards formulating new combinations of data to iteratively and continuously explore and improve occupational performance 102 for the benefit of the community of practice 900.

CONCLUSIONS, RAMIFICATIONS, AND SCOPE

While my above description contains many specificities, these should not be construed as limitations on the scope, but rather as an exemplification of one or more embodiments thereof. Many other variations are possible. While the present embodiments have been described with many advantages to highlight the utility and benefits of the invention, the advantages shared herein represent a non-exhaustive list of the advantages of the subject invention. For example:

An advantage of the invention is to provide a learning model to drive a learner's achievement of education and workforce competency based skills through facilitating learner to mentor and learner to learner relationships, and supporting a community of practice.

An advantage of the invention is to provide a learning model for educators, administrators, and other stakeholders to conduct meaningful outcomes research in education and work force performance.

An advantage of the invention is to provide a learning model for investigators, and stakeholders to conduct meaningful scientific research in education and work force performance.

Another advantage of the invention is to provide a learning model to support the creation, assessment, and improvement of evidence based curriculum, tools, activities, and multimedia.

Another advantage of the invention is to provide a learning model to support vocational exploration, development, social networking, and decision making.

Another advantage of the invention is provide a learning model to raise to floor of public school education so that no child is left behind, and each in turn, has the liberty to pursue an occupation that brings him or her happiness and contributes to the public good.

Another advantage of the invention is to provide a learning model to reduce the medical error rate through improving the competency skills of the health care work force.

Another advantage of the invention is to provide a learning model to more effectively assess occupational performance for re-accreditation in the various occupations, for faculty and tenure appointment in the various occupations, and for promotion and compensation in the various occupations.

Another advantage of the invention is to provide a learning model to spur the emergence, development, and advancement of self-regulated professions.

Another advantage of the invention is to provide a learning model to capture and transmit the intellectual capital of corporations and organizations to its newest members which otherwise face the loss of their most valuable resource through the inevitable aging and retirement of their most precious resource, namely, their human resource.

Another advantage of the invention is to provide a learning model for humans to effectively engage in weight loss, fitness, well-being, and healthy living. For example, the K-12 competencies for 500Ag, and goal element list 400Ag for health education apply to adults, as life-long learners, who want to improve their occupational performance for weight loss, fitness, well-being, and healthy living including avoidance of violent relationships and substance abuse. To be sure, once competency skills have been articulated by a self-regulatory body, they can be applied to other populations of learners who may benefit by their adoption and implementation. This maxim is not limited to the K-12 example regarding applicability of health education competencies to other populations of learners, rather the maxim is construed broadly.

Another advantage of the invention is to provide a learning model to create a watershed of opportunities for educators, industrial psychologists, organizational psychologists, educational psychologists, sociologists, occupational therapists, neurologists, neurosurgeons, diversity and cultural competency specialists, and other stakeholders to transcend current methodologies for improving occupational performance.

Another advantage of the invention is to provide a learning model to retrain a multitude of displaced workers from "jobs that are never coming back" in manufacturing, and so forth, to ancillary careers in clinical and translational medicine, human subject research coordination, education research coordination, clean energy, green technology, fraud and abuse auditing, bank auditing, and other growth areas. Once stakeholders in the private sector, education, government, and others convene and enumerate competency skills for such careers, the occupational performance system and method serves as a platform for emerging professions to build capacity, develop communities of practice, self-regulate, allow transparent accountability, and benchmark improvement. Similarly, stakeholders may assume a meaningful role in developing competencies skills for programs such as a masters of business administration and so forth, for many undergraduate degrees which are currently content rather than content driven, and for jobs that may be on the path toward self-regulation and currently function as apprenticeships or trades. Again, once a self-regulatory body establishes competency skills, the learning model applies.

Another advantage of the invention is to provide a learning model to efficiently and effectively meet the longitudinal capacity demands anticipated by the U.S. Department of Labor for identified high growth occupations.

Another object of the invention is to provide a learning model for the United States of America to redefine itself from a once agrarian and then once industrial-manufacturing nation into the occupational performance nation by becoming the "World's exporter of applied knowledge" to enable other nations to teach occupations to their people. The learning model, deployable as a machine, creates capacity to share an American education with the world.

Accordingly, the scope should be determined not by the embodiments illustrated, but by the appended claims and their legal equivalents.

| DRAWING REFERENCES | |
|---|---|
| References: | |
| 120 | article of manufacture |
| 120A | one embodiment of an article of manufacture |
| 880 | artifacts |
| 880Z | one embodiment of a plurality of artifacts |
| 880ZA | one embodiment of a plurality of artifacts, "my presentations" |
| 880ZB | one embodiment of a plurality of artifacts, "my reports and publications" |

-continued

DRAWING REFERENCES

| | |
|---|---|
| 880ZC | one embodiment of a plurality of artifacts, "my tests, evaluations, and assessments" |
| 880ZD | one embodiment of a plurality of artifacts, "my personhood" |
| 880ZE | one embodiment of a plurality of artifacts, "my awards and recognition" |
| 880ZF | one embodiment of a plurality of artifacts, "my vocational interests" |
| 880ZG | one embodiment of a plurality of artifacts, "my career opportunities" |
| 880ZH | one embodiment of a plurality of artifacts, "my resume" |
| 880ZI | one embodiment of a plurality of artifacts, "my letters of recommendation" |
| 880ZJ | one embodiment of a plurality of artifacts, "my contacts" |
| 880ZK | one embodiment of a plurality of artifacts, "my continuing education" |
| 880ZL | one embodiment of a plurality of artifacts, "my licenses, certifications, and special training" |
| 820 | assessments |
| 970 | combinations |
| 970Aa | combinations, "500E + 170Ea" |
| 970Ab | combinations, "500E + 170Ea + 170Ej + 170Eb" |
| 970Ac | combinations, "500E + 170Ea + 170Ej + 170Ec" |
| 970Ad | combinations, "500E + 170Ea + 170Ej + 170Ed" |
| 970Ae | combinations, "500B + 170En" |
| 970Af | combinations, "500B + 170En + 500A" |
| 970Ag | combinations, "500B + 170En + 500C" |
| 970Ah | combinations, "500B + 170En + 500E" |
| 970Ai | combinations, "500B + 170En + 500D" |
| 970Aj | combinations, "170Ej + 500B + 500C + 170Ee" |
| 970Ak | combinations, "500A + 170Ek + 170Ej + 500B + 500C + 170Ee + 170Ef" |
| 970Al | combinations, "500A + 170Ek + 170Ej + 500B + 500C + 170Ee + 170Ef + 170Eg" |
| 970Am | combinations, "500A + 170Ek + 170Ej + 500B + 500C + 170Ee + 170Ef + 170Eg + 170Eh" |
| 970An | combinations, "500D + 500C + 170El" |
| 970Ao | combinations, "170Ej + 500C + 170Eo" |
| 970Ap | combinations, "500A + 500D + 500C + 170Ep" |
| 970D | one embodiment of a plurality of combinations, "combinations for exploring vocations" |
| 970Db | combinations, "940Bb + 940Bc + 940Bd + 940Be + 940Bf + 940Bi + 170Fg + 170Fh + 170Fi + 170Fj for clinical and translational research fellow" |
| 970De | combinations, "940Bb + 940Bc + 940Bd + 940Be + 940Bf + 940Bi + 170Fg +170Fh + 170Fi + 170Fj for K-12 math student" |
| 970Dh | combinations, "940Bb + 940Bc + 940Bd + 940Be + 940Bf + 940Bi + 170Fg + 170Fh + 170Fi + 170Fj for practicing engineer" |
| 970E1 | combinations, "170Fe + 170Fd" |
| 970E2 | combinations, "940Ba + 500A" |
| 970E3 | combinations, "940Ba + 940Bg" |
| 970F | combinations, "170Fk + 170Fn + 170Fm + 170Fi + 170Fj" |
| 940 | community activities |
| 940Z | one embodiment of a plurality of community activities |
| 940A1 | one embodiment of a plurality of community activities, "storytelling by analogy to share experiences" |
| 940A2 | one embodiment of a plurality of community activities, "storytelling by analogy to share experiences" continued |
| 940Aa | community activities, "sounding the horn" |
| 940Ab | community activities, "playing leap frog in the night" |
| 940Ac | community activities, "burning just one flashlight" |
| 940Ad | community activities, "modified leap frog: walking together" |
| 940Ae | community activities, "running together on white gravel" |
| 940Af | community activities, "dew-covered spider webs" |
| 940Ag | community activities, "wolves howling in the distance" |
| 940Ah | community activities, "questioning the compass's reliability" |
| 940Ai | community activities, "lessons learned from your handbook" |
| 940Aj | community activities, "blazing "X's" on trees" |
| 940Ak | community activities, "finding your fresh water stream" |
| 940Al | community activities, "growing accustomed to the night" |
| 940Am | community activities, "sharing stories back at base camp" |
| 940B | one embodiment of a plurality of community activities, "participate in personhood activities" |
| 940Ba | community activities, "demographic survey" |
| 940Bb | community activities, "Interest Inventory" |
| 940Bc | community activities, "Role Checklist" |
| 940Bd | community activities, "Myers-Briggs Type Indicator" |
| 940Be | community activities, "Social Style Profile" |
| 940Bf | community activities, "The Flower Exercise" |
| 940Bg | community activities, "competency skill importance survey" |
| 940Bh | community activities, "competency skill relevance survey" |
| 940Bi | community activities, "competency skill interest survey" |
| 940C | one embodiment of a plurality of community activities, "explore vocations" |
| 940D | one embodiment of a plurality of community activities, "share artifacts" |
| 940E1 | one embodiment of a plurality of community activities, "conduct outcomes research, alignment of goal achievement with competency skill relevance" |
| 940E2 | one embodiment of a plurality of community activities, "conduct outcomes research, attainment of competencies based upon demographics" |
| 940E3 | one embodiment of a plurality of community activities, "conduct outcomes research, persistence of goal achievement related to competency skill importance and demographics" |
| 940F | one embodiment of a plurality of community activities, "conduct scientific research" |
| 940Fa | one embodiment of a plurality of community activities, "conduct scientific research, qualitative study of progress notes and brain function " |
| 940Fb | one embodiment of a plurality of community activities, "conduct scientific research, mixed method study of contemporary cognitive theories and occupational performance" |
| 940Fc | one embodiment of a plurality of community activities, "conduct scientific research, qualitative study of the role of storytelling in skill acquisition" |
| 940G | one embodiment of a plurality of community activities, "conduct performance measurement research" |
| 940Ga | one embodiment of a plurality of community activities, "conduct performance measurement research, adapted stages of skill acquisition scoring rubric" |
| 940H | one embodiment of a plurality of community activities, "examine self-regulation of professions" |
| 940Ha | one embodiment of a plurality of community activities, "examine self-regulation of professions, comparison study of mid-level practitioners and new graduates" |
| 940I | one embodiment of a plurality of community activities, "assess evidence based multimedia: tools, media, activities, curriculum" |
| 940Ia | one embodiment of a plurality of community activities, "assess evidence based multimedia: tools, media, activities, curriculum, randomized controlled trial" |
| 940J | one embodiment of a plurality of community activities, "explore and implement new applications to improve occupational performance" |
| 910 | community members |
| 910Z | one embodiment of a plurality of community members |
| 910Za | community members, "learners" |
| 910Zb | community members, "teachers" |
| 910Zc | community members, "mentors" |
| 910Zd | community members, "other persons" |
| 910Ze | community members, "parents, guardians" |
| 910Zf | community members, "researchers" |
| 910Zg | community members, "education programs and institutions" |
| 910Zh | community members, "professional associations" |
| 910Zi | community members, "regulatory and licensing agencies" |
| 910Zj | community members, "accreditation agencies" |
| 910Zk | community members, "corporations and other employers" |
| 910Zl | community members, "government agencies" |
| 910Zm | community members, "other stakeholders" |
| 910Ab | one embodiment of a plurality of community members, "clinical and translational research fellow" |
| 910Ae | one embodiment of a plurality of community members, "K-12 math student" |
| 910Ah | one embodiment of a plurality of community members, "practicing engineer" |
| 900 | community of practice |
| 200 | competency based goals |
| 200Z1 | one embodiment of a plurality of competency based goals, "competency based goals, page one" |
| 200Z2 | one embodiment of a plurality of competency based goals, "competency based goals, page two continued" |
| 200Z3 | one embodiment of a plurality of competency based goals, "competency based goals, page three continued" |

-continued

| | DRAWING REFERENCES |
|---|---|
| 200Z4 | one embodiment of a plurality of competency based goals, "competency based goals, page four continued" |
| 200Za | one embodiment of a plurality of competency based goals, "I, [audiology learner's name], will discover patterns in information to understand the vocational effects of hearing impairment with 90% accuracy through journal club because it interests me." |
| 200Zb | one embodiment of a plurality of competency based goals, "I, [clinical and translational research learner's name], will assess the benefits of proposed solutions to develop protocols utilizing management of information using computer technology with moderate assistance through mentor meetings because I want to succeed." |
| 200Zc | one embodiment of a plurality of competency based goals, "I, [dentistry learner's name], will revise communications to improve clarity to order appropriate laboratory, radiographic, and other tests as indicated, including biopsy of suspicious oral lesions with 100% accuracy through simulated skills training because I want to master it." |
| 200Zd | one embodiment of a plurality of competency based goals, "I, [dietetic learner's name], will conduct research to evaluate ideas to explain the impact of a public policy position on dietetics practice with minimal assistance through self-directed learning because I enjoy it." |
| 200Ze | one embodiment of a plurality of competency based goals, "I, [K-12 math learner's name], will discover patterns in information to describe important features of a data set with 90% accuracy using the Johnny Appleseed Survey because I want to beat my best score." |
| 200Zf | one embodiment of a plurality of competency based goals, "I, [K-12 science learner's name], will reason inductively from a set of specific facts to describe how friction affects the amount of force needed to do work over different surfaces with moderate assistance through observation because I want to know how it works." |
| 200Zg | one embodiment of a plurality of competency based goals, "I, [K-12 health education learner's name], will develop questions to initiate research to assess key nutrients and their specific functions and influences on body processes (e.g. disease, prevention) correctly 7 times out of 10 using self-directed learning because it interests me." |
| 200Zh | one embodiment of a plurality of competency based goals, "I, [engineering learner's name], will exchange ideas while recognizing the perspectives of others to understand orbital mechanics applications in astronautical engineering with moderate assistance through seminars because I want to know how it works." |
| 200Zi | one embodiment of a plurality of competency based goals, "I, [law learner's name], will evaluate relationships in ideas to understand the process for recognizing ethical dilemmas with minimal assistance through journal club because I want to feel better about myself." |
| 200Zj | one embodiment of a plurality of competency based goals, "I, [medical resident learner's name], will develop a plan of action to accomplish a goal to prioritize and stabilize multiple patients simultaneously with supervision through simulated skills training because I want to succeed." |
| 200Zk | one embodiment of a plurality of competency based goals, "I, [nurse practitioner learner's name], will develop questions to initiate research to perform a comprehensive assessment of mental health needs of a community with minimal assistance through a team building activity because I want to see the result." |
| 200Zl | one embodiment of a plurality of competency based goals, "I, [occupational therapy learner's name], will revise communications to improve clarity to articulate a clear and logical rationale for the intervention process correctly 7 times out of 10 through mentor meetings because I enjoy it." |
| 200Zm | one embodiment of a plurality of competency based goals, "I, [optometry learner's name], will reason inductively from a set of specific facts to understand the basic optical principles of low vision rehabilitation devices with 75% accuracy through case studies because it interests me." |
| 200Zn | one embodiment of a plurality of competency based goals, "I, [pharmacy learner's name], will discover patterns in information to manage medication use systems to participate in the development of health policy with moderate assistance through observation because I want to know how it works." |
| 200Zo | one embodiment of a plurality of competency based goals, "I, [physical therapy learner's name], will deliver a visual presentation for a variety of purposes and audiences to explain the rationale for selected interventions to achieve patient goals as identified in the plan of care with 100% accuracy through an interdisciplinary meeting because I want to beat my best score." |
| 200Zp | one embodiment of a plurality of competency based goals, "I, [speech-language pathology learner's name], will evaluate relationships in ideas to integrate information about swallowing disorder anatomy and physiology correctly 9 times out of 10 through simulated skills training because I want to know the cause." |
| 200Zq | one embodiment of a plurality of competency based goals, "I, [teacher learner's name], will develop a plan of action to accomplish a goal to present the subject matter in multiple, effective ways which are purposefully selected to engage every student in learning with minimal assistance using case studies because it makes me feel good." |
| 140 | computing device means |
| 130 | computing operations |
| 146 | display |
| 500 | goal elements |
| 500A | one embodiment of a plurality of goal elements, "competency" |
| 500AaA | competency, "CS.ASHAa.1.1.1" |
| 500Aaa | competency, "demonstrate communication skills for effective clinical interactions" |
| 500AaB | competency, "CS.ASHAa.2.3.2" |
| 500Aab | competency, "understand the vocational effects of hearing impairment" |
| 500AaC | competency, "CS.ASHAa.2.4.3" |
| 500Aac | competency, "understand the pathophysiology of the auditory system" |
| 500AaD | competency, "CS.ASHAa.3.4.1" |
| 500Aad | competency, "screen individuals for hearing impairment" |
| 500AaE | competency, "CS.ASHAa.3.6.1" |
| 500Aae | competency, "administer conservation programs designed to reduce the effects of noise exposure" |
| 500AaF | competency, "CS.ASHAa.4.8.1" |
| 500Aaf | competency, "perform electrodiagnostic test procedures" |
| 500AaG | competency, "CS.ASHAa.4.15.2" |
| 500Aag | competency, "maintain records in a manner consistent with professional standards" |
| 500AaH | competency, "CS.ASHAa.5.5.1" |
| 500Aah | competency, "develop culturally sensitive management strategies" |
| 500AaI | competency, "CS.ASHAa.5.11.4" |
| 500Aai | competency, "summarize treatment outcomes" |
| 500AbA | competency, "CS.NIH.1.3" |
| 500Aba | competency, "define the data that formulate research hypotheses" |
| 500AbB | competency, "CS.NIH.2.7" |
| 500Abb | competency, "identify gaps in knowledge within a research problem" |
| 500AbC | competency, "CS.NIH.3.4" |
| 500Abc | competency, "design a research study protocol" |
| 500AbD | competency, "CS.NIH.5.2" |
| 500Abd | competency, "evaluate the reliability and validity of measures" |
| 500AbE | competency, "CS.NIH.6.8" |
| 500Abe | competency, "collaborate with biostatisticians in the design, conduct, and analysis of clinical and translational research" |
| 500AbF | competency, "CS.NIH.7.2" |
| 500Abf | competency, " develop protocols utilizing management of information using computer technology" |
| 500AbG | competency, "CS.NIH.8.2" |
| 500Abg | competency, "critique a clinical or translational research proposal for risks to human subjects" |
| 500AbH | competency, "CS.NIH.12.5" |
| 500Abh | competency, "foster innovation and creativity" |
| 500AcA | competency, "CS.ADEAp.1.2" |
| 500Aca | competency, "understand how diagnosis of systemic diseases and conditions can be affected by oral diseases" |
| 500AcB | competency, "CS.ADEAp.2.5.3" |
| 500Acb | competency, "assess the patient's ability to understand and comply with treatment recommendations" |
| 500AcC | competency, "CS.ADEAp.3.10.1" |
| 500Acc | competency, "value the dentist as part of the health care team" |
| 500AcD | competency, "CS.ADEAi.1.5" |

DRAWING REFERENCES

| | |
|---|---|
| 500Acd | competency, "understand principles of molecular biology" |
| 500AcE | competency, "CS.ADEAi.2.9" |
| 500Ace | competency, "order appropriate laboratory, radiographic, and other diagnostic tests as indicated, including biopsy of suspicious oral lesions" |
| 500AcF | competency, "CS.ADEAg.1.1.5" |
| 500Acf | competency, "understand principles of genetic transmission of phenomena of imprinting and anticipation" |
| 500AcG | competency, "CS.ADEAg.3.10" |
| 500Acg | competency, "understand the need to reduce public fear and misinformation about genetics" |
| 500AdA | competency, "CS.ADAdp.1.1.1.2" |
| 500Ada | competency, "interpret professional literature to make ethical evidence-based practice decisions" |
| 500AdB | competency, "CS.ADAdp.2.3.1.3" |
| 500Adb | competency, "apply established guidelines to a professional practice scenario" |
| 500AdC | competency, "CS.ADAdp.3.2.1.1" |
| 500Adc | competency, "apply knowledge of the role of the environment to develop interventions to affect change in diverse individuals and groups" |
| 500AdD | competency, "CS.ADAdp.4.3.1" |
| 500Add | competency, "explain the impact of a public policy position on dietetics practice" |
| 500AdE | competency, "CS.ADAdi.1.3.2" |
| 500Ade | competency, "justify products using appropriate evidence or data" |
| 500AdF | competency, "CS.ADAdi.1.4.1" |
| 500Adf | competency, "evaluate emerging research for application in dietetics practice" |
| 500AdG | competency, "CS.ADAdi.2.4.2" |
| 500Adg | competency, "use effective counseling skills to facilitate behavior change" |
| 500AdH | competency, "CS.ADAdi.4.1" |
| 500Adh | competency, "use organizational processes and tools to manage human resources" |
| 500AeA | competency, "CS.DESE2m.4.2.1" |
| 500Aea | competency, "describe how simple growing patterns are generated" |
| 500AeB | competency, "CS.DESE2m.8.1.2" |
| 500Aeb | competency, "describe attributes and parts of two-dimensional shapes" |
| 500AeC | competency, "CS.DESE2m.12.3.1" |
| 500Aec | competency, "tell time to the nearest one fourth (quarter) hour" |
| 500AeD | competency, "CS.DESE4m.15.1.1" |
| 500Aed | competency, "describe important features of a data set" |
| 500AeE | competency, "CS.DESE7m.3.4.1" |
| 500Aee | competency, "estimate the results of all operations on rational numbers" |
| 500AeF | competency, "CS.DESE8m.4.4.1" |
| 500Aef | competency, "identify functions as linear or nonlinear from tables, graphs, and equations" |
| 500AeG | competency, "CS.DESE7m.13.3.3" |
| 500Aeg | competency, "solve problems involving volume of a rectangular prism, triangular prism, and cylinder" |
| 500AeH | competency, "CS.DESE8m.13.3.1" |
| 500Aeh | competency, "select, create and use appropriate graphical representations of data" |
| 500AeI | competency, "CS.DESE6m.17.1.1" |
| 500Aei | competency, "use a model to illustrate the possible outcomes of an event" |
| 500AfA | competency, "CS.DESE5s.4.4.1" |
| 500Afa | competency, "describe how friction affects the amount of force needed to do work over different surfaces" |
| 500AfB | competency, "CS.DESE2s.7.4.1" |
| 500Afb | competency, "identify similarities and differences among animal parents and their offspring" |
| 500AfC | competency, "CS.DESEks.1.6.1.1.4" |
| 500Afc | competency, "pose questions about events in the environment" |
| 500AfD | competency, "CS.DESE8s.20.1.2.2" |
| 500Afd | competency, "describe chemical properties of pure substances using appropriate senses and tools" |
| 500AfE | competency, "CS.DESE8s.25.1.1" |
| 500Afe | competency, "describe how the cell membrane helps regulate the transfer of materials in and out of the cell" |
| 500AfF | competency, "CS.DESE6s.27.2.3.2" |
| 500Aff | competency, "predict the possible effects of the changes in the types of organisms in an ecosystem on the populations of other organisms within that ecosystem" |
| 500AfG | competency, "CS.DESE7s.35.1.4.3" |
| 500Afg | competency, "make suggestions for reasonable extensions of an experiment" |
| 500AgA | competency, "CS.DESE7he.1.5.1" |
| 500Aga | competency, "analyze how aerobic exercise impacts an individual physically, mentally, and emotionally" |
| 500AgB | competency, "CS.DESE3he.1.6.2" |
| 500Agb | competency, "identify the cause and effect of lifestyle choices on the respiratory system (e.g. inactivity, tobacco)" |
| 500AgC | competency, "CS.DESE5he.2.1.1" |
| 500Agc | competency, "identify how family, friends, and culture can influence personal health practices and decisions" |
| 500AgD | competency, "CS.DESE9-12he.4.3.1" |
| 500Agd | competency, "assess key nutrients and their specific functions and influences on body processes (e.g. disease, prevention) |
| 500AgE | competency, "CS.DESE9-12he.4.3.1" |
| 500Age | competency, "apply concepts using food labels to meet dietary needs for a healthy lifestyle" |
| 500AgF | competency, "CS.DESE6he.9.3.3" |
| 500Agf | competency, "present different opinions and arguments about the effects of tobacco, alcohol, and other drugs on individuals, family, and society" |
| 500AhA | competency, "CS.ABETe.1.3.1" |
| 500Aha | competency, "demonstrate ability to design a system to meet desired needs within realistic constraints" |
| 500AhB | competency, "CS.ABETe.1.11.3" |
| 500Ahb | competency, "demonstrate ability to use modern engineering tools necessary for engineering practice" |
| 500AhC | competency, "CS.ABETe.2.2.1" |
| 500Ahc | competency, "understand orbital mechanisms applications in astronautical engineering" |
| 500AhD | competency, "CS.ABETe.4.5.2.1" |
| 500Ahd | competency, "understand history leading to architectural design to enhance communication with other design professionals executing building projects" |
| 500AhE | competency, "CS.ABETcp.1.2.2" |
| 500Ahe | competency, "demonstrate ability to identify and define the computing requirements appropriate to solve a problem" |
| 500AhF | competency, "CS.ABETcp.2.2.2" |
| 500Ahf | competency, "demonstrate ability to apply development principles in the construction of software systems of varying complexity" |
| 500AiA | competency, "CS.ABA.2.2.1" |
| 500Aia | competency, "understand concepts for formulating relevant legal theories" |
| 500AiB | competency, "CS.ABA.2.5.2.2" |
| 500Aib | competency, "demonstrate skills to synthesize legal arguments" |
| 500AiC | competency, "CS.ABA.4.2.2" |
| 500Aic | competency, "demonstrate skills to plan a factual investigation" |
| 500AiD | competency, "CS.ABA.5.1.1" |
| 500Aid | competency, "understand concepts to assess the perspective of the recipient of communication" |
| 500AiE | competency, "CS.ABA.6.5.2.1" |
| 500Aie | competency, "demonstrate skills to ascertain the client's decision" |
| 500AiF | competency, "CS.ABA.7.2.1" |
| 500Aif | competency, "understand concepts for conducting a negotiation session" |
| 500AiG | competency, "CS.ABA.10.3.1" |
| 500Aig | competency, "understand the process for recognizing ethical dilemmas" |
| 500AiH | competency, "CS.ABA.11.1" |
| 500Aih | competency, "show commitment to maintaining a level of competence in my field of practice" |
| 500AiI | competency, "CS.ABA.13.2" |
| 500Aii | competency, "show commitment in training and preparing new lawyers to practice" |
| 500AjA | competency, "CS.ACGMEai.1.3.1" |
| 500Aja | competency, "provide continuing care to patients with asthma" |
| 500AjB | competency, "CS.ACGMEcr.1.1.1" |
| 500Ajb | competency, "learn to perform diagnostic colonoscopy" |
| 500AjC | competency, "CS.ACGMEer.1.10.3" |
| 500Ajc | competency, "perform emergency stabilization procedures" |

-continued

DRAWING REFERENCES

| | |
|---|---|
| 500AjD | competency, "CS.ACGMEmg.3.7" |
| 500Ajd | competency, "use information technology to optimize learning" |
| 500AjE | competency, "CS.ACGMEns.1.4" |
| 500Aje | competency, "prioritize and stabilize multiple patients simultaneously" |
| 500AjF | competency, "CS.ACGMEesn.5.5" |
| 500Ajf | competency, "demonstrate respect for patient privacy and autonomy" |
| 500AjG | competency, "CS.ACGMEps.1.1.7" |
| 500Ajg | competency, "assist in plastic surgery of the lower extremities" |
| 500AjH | competency, "CS.ACGMEro.1.4" |
| 500Ajh | competency, "treat pediatric patients with solid tumors" |
| 500AjI | competency, "CS.ACGMEd.3.6" |
| 500Aji | competency, "locate, appraise, and assimilate evidence from scientific studies related to patient's health problems" |
| 500AkA | competency, "CS.NONPF.1.12" |
| 500Aka | competency, "differentiate among normal, variations of normal, and abnormal findings" |
| 500AkB | competency, "CS.NONPFa.1.1.13.1" |
| 500Akb | competency, "assess and evaluate vague or ill-defined symptoms in adolescents" |
| 500AkC | competency, "CS.NONPFp.1.1.4.2.2" |
| 500Akc | competency, "analyze how prenatal factors affect the child's growth and development" |
| 500AkD | competency, "CS.NONPFw.1.1.7.1" |
| 500Akd | competency, "assess for evidence of domestic violence" |
| 500AkE | competency, "CS.NONPFg.1.1.10.2" |
| 500Ake | competency, "assess sexual well-being in older adults" |
| 500AkF | competency, "CS.NONPFc.1.1.2.2" |
| 500Akf | competency, "obtain and document a health history for critically ill patients" |
| 500AkG | competency, "CS.NONPFc.1.2.7.1" |
| 500Akg | competency, "diagnose complications of complex acute illness considering multi-system health problems" |
| 500AkH | competency, "CS.NONPFm.1.1.7" |
| 500Akh | competency, "perform a comprehensive assessment of mental health needs of a community" |
| 500AlA | competency, "CS.AOTAt.3.4.1" |
| 500Ala | competency, "assess client factors that support and hinder occupational performance" |
| 500AlB | competency, "CS.AOTAt.4.1" |
| 500Alb | competency, "articulate a clear and logical rationale for the intervention process" |
| 500AlC | competency, "CS.AOTAt.4.9" |
| 500Alc | competency, "document the client's response to services in a manner that demonstrates the efficacy of interventions" |
| 500AlD | competency, "CS.AOTAt.7.3" |
| 500Ald | competency, "respond constructively to feedback" |
| 500AlE | competency, "CS.AOTAa.1.3" |
| 500Ale | competency, "use sound judgment in regard to safety of self and others during all fieldwork-related activities" |
| 500AlF | competency, "CS.AOTAa.2.3.1" |
| 500Alf | competency, "make informed practice decisions based on published research" |
| 500AlG | competency, "CS.AOTAa.3.4.1" |
| 500Alg | competency, "report results accurately in a clear, concise manner that reflects the client's status" |
| 500AmA | competency, "CS.ASCO.2.5.1" |
| 500Ama | competency, "be able to recognize personal limitations regarding optimal patient care" |
| 500AmB | competency, "CS.ASCO.3.4.1" |
| 500Amb | competency, "understand the structures and processes contributing to the development of refractive error of the visual system" |
| 500AmC | competency, "CS.ASCO.4.2" |
| 500Amc | competency, "order and interpret frequently needed laboratory and diagnostic procedures" |
| 500AmD | competency, "CS.ASCOlv.4.1" |
| 500Amd | competency, "recognize psychological factors that may affect adjustment to vision loss" |
| 500AmE | competency, "CS.ASCOlv.11.1" |
| 500Ame | competency, "understand the basic optical principles of low vision rehabilitation devices" |
| 500AmF | competency, "CS.ASCOg.2.8.1" |
| 500Amf | competency, "understand the indications for genetic testing" |
| 500AmG | competency, "CS.ASCOg.3.8" |
| 500Amg | competency, "obtain informed consent for genetic testing" |
| 500AnA | competency, "CS.ACPE.1.1.3" |
| 500Ana | competency, "monitor pharmacy care plans that are patient-specific" |
| 500AnB | competency, "CS.ACPE.1.2.2" |
| 500Anb | competency, "manage marketing a successful patient-centered practice" |
| 500AnC | competency, "CS.ACPE.2.1.1.4" |
| 500Anc | competency, "develop population-specific, evidence-based disease management programs and protocols based upon risk reduction strategies" |
| 500AnD | competencies, "CS.ACPE.4.1.2.2" |
| 500And | competencies, "manage medication use systems to participate in the development of health policy" |
| 500AnE | competency, "CS.ACPE.6.1.1.2" |
| 500Ane | competency, "communicate with physicians, nurses, and other health care providers to engender a team approach to patient care" |
| 500AnF | competency, "CS.ACPE.8.1" |
| 500Anf | competency, "demonstrate expertise in informatics" |
| 500AnG | competency, "CS.ACPE.9.1.1" |
| 500Ang | competency, "carry out duties in accordance with legal guidelines" |
| 500AoA | competency, "CS.APTAt.2.3.1" |
| 500Aoa | competency, "perform posture tests" |
| 500AoB | competency, "CS.APTAt.3.3.3" |
| 500Aob | competency, "verbalize possible alternatives when interpreting the examination findings" |
| 500AoC | competency, "CS.APTAt.6.2.1" |
| 500Aoc | competency, "identify who needs to collaborate in the plan of care" |
| 500AoD | competency, "CS.APTAt.10.3.1.2" |
| 500Aod | competency, "participate in a quality improvement program of peers" |
| 500AoE | competency, "CS.APTAt.13.1.6" |
| 500Aoe | competency, "share expertise related to accessing evidence with colleagues" |
| 500AoF | competency, "CS.APTAa.1.5" |
| 500Aof | competency, "explain the rationale for selected interventions to achieve patient goals as identified in the plan of care" |
| 500AoG | competency, "CS.APTAa.2.3.3" |
| 500Aog | competency, "position or drape to protect patient modesty" |
| 500AoH | competency, "CS.APTAa.4.1.3" |
| 500Aoh | competency, "identify possible progressions that will continue to advance the patient's response" |
| 500ApA | competency, "CS.ASHAs.3.2.2" |
| 500Apa | competency, "demonstrate understanding of hearing disorder characteristics" |
| 500ApB | competency, "CS.ASHAs.3.4.3" |
| 500Apb | competency, "integrate information about swallowing disorder anatomy and physiology" |
| 500ApC | competency, "CS.ASHAs.4.2.2" |
| 500Apc | competency, "demonstrate understanding of methods of assessment for communication disorders" |
| 500ApD | competency, "CS.ASHAs.5.3.1" |
| 500Apd | competency, "demonstrate the ability to interpret standards of ethical conduct in applying the ASHA Code of Ethics" |
| 500ApE | competency, "CS.ASHAs.6.2.1" |
| 500Ape | competency, "demonstrate integration of research principles into evidence-based clinical practice" |
| 500ApF | competency, "CS.ASHAs.7.1.5" |
| 500Apf | competency, "demonstrate knowledge of professional issues involving reimbursement procedures" |
| 500ApG | competency, "CS.ASHAs.11.2.2" |
| 500Apg | competency, "implement intervention plans" |
| 500AqA | competency, "CS.DESEt.1.2.3" |
| 500Aqa | competency, "present the subject matter in multiple, effective ways which are purposefully selected to engage every student in learning" |
| 500AqB | competency, "CS.DESEt.2.3.1" |
| 500Aqb | competency, "encourage student responsibility through establishment of clear expectations |
| 500AqC | competency, "CS.DESEt.3.1.3.1" |
| 500Aqc | competency, "create a caring, positive environment" |
| 500AqD | competency, "CS.DESEt.4.4.3.1" |
| 500Aqd | competency, "teach students to set personal learning goals" |
| 500AqE | competency, "CS.DESEt.6.1.4.2" |
| 500Aqe | competency, "mentor colleagues to help them create a more positive learning environment" |

DRAWING REFERENCES

| | |
|---|---|
| 500AqF | competency, "CS.DESEt.6.3.2" |
| 500Aqf | competency, "offer students opportunities to practice decision-making" |
| 500AqG | competency, "CS.DESEt.7.4.2.1" |
| 500Aqg | competency, "facilitate safe, freedom of learner expression in speaking" |
| 500AqH | competency, "CS.DESEt.8.9.2.2" |
| 500Aqh | competency, "participate in grade level data analyses processes" |
| 500B | one embodiment of a plurality of goal elements, "performance standard" |
| 500BA | goal elements, "PS.G1.1" |
| 500Ba | goal elements, "develop questions to initiate research" |
| 500BB | goal elements, "PS.G1.7" |
| 500Bb | goal elements, "conduct research to evaluate ideas" |
| 500BC | goal elements, "PS.G1.28" |
| 500Bc | goal elements, "discover patterns in information" |
| 500BD | goal elements, "PS.G1.38" |
| 500Bd | goal elements, "evaluate relationships in ideas" |
| 500BE | goal elements, "PS.G2.6" |
| 500Be | goal elements, "deliver a visual presentation for a variety of purposes and audiences" |
| 500BF | goal elements, "PS.G2.10" |
| 500Bf | goal elements, "revise communications to improve clarity" |
| 500BG | goal elements, "PS.G2.13" |
| 500Bg | goal elements, "exchange ideas while recognizing the perspectives of others" |
| 500BH | goal elements, "PS.G3.14" |
| 500Bh | goal elements, "reason inductively from a set of specific facts" |
| 500BI | goal elements, "PS.G3.20" |
| 500Bi | goal elements, "assess the benefits of proposed solutions" |
| 500BJ | goal elements, "PS.G4.14" |
| 500Bj | goal elements, "practice honesty and integrity in my academic work" |
| 500BK | goal elements, "PS.G4.20" |
| 500Bk | goal elements, "develop a plan of action to accomplish a goal" |
| 500C | one embodiment of a plurality of goal elements, "tools, media, activities, curriculum" |
| 500CA | goal elements, "K.x" |
| 500Ca | goal elements, "Fill in the blank: ____" |
| 500CB | goal elements, "K.HC.1.1" |
| 500Cb | goal elements, "case study" |
| 500CC | goal elements, "K.HC.1.2" |
| 500Cc | goal elements, "self-directed learning" |
| 500CD | goal elements, "K.HC.1.3" |
| 500Cd | goal elements, "simulated skills training" |
| 500CE | goal elements, "K.HC.1.4" |
| 500Ce | goal elements, "journal club" |
| 500CF | goal elements, "K.HC.1.5" |
| 500Cf | goal elements, "team-building activity" |
| 500CG | goal elements, "K.HC.1.6" |
| 500Cg | goal elements, "interdisciplinary meeting" |
| 500CH | goal elements, "K.HC.1.7" |
| 500Ch | goal elements, "mentor meeting" |
| 500CI | goal elements, "K.HC.1.8" |
| 500Ci | goal elements, "seminar" |
| 500CJ | goal elements, "K.HC.1.9" |
| 500Cj | goal elements, "observation" |
| 500CK | goal elements, "K.DESE.2.1" |
| 500Ck | goal elements, "the Johnny Appleseed Survey" |
| 500CL | goal elements, "K.DESE.2.2" |
| 500Cl | goal elements, "the Predicting Motion Parade" |
| 500CM | goal elements, "K.DESE.2.3" |
| 500Cm | goal elements, "the Profitable Pumpkin Stand Project" |
| 500CN | goal elements, "K.OT.3.1" |
| 500Cn | goal elements, "adaptive feeding equipment" |
| 500CO | goal elements, "K.OT.3.2" |
| 500Co | goal elements, "sensory testing" |
| 500CP | goal elements, "K.OT.3.3" |
| 500Cp | goal elements, "object categorization activities" |
| 500D | one embodiment of a plurality of goal elements, "measurement" |
| 500DA | goal elements, "M.x" |
| 500Da | goal elements, "Fill in the blank: ____" |
| 500DB | goal elements, "M.1.1" |
| 500Db | goal elements, "with 25% accuracy" |
| 500DC | goal elements, "M.1.2" |
| 500Dc | goal elements, "with 50% accuracy" |
| 500DD | goal elements, "M.1.3" |
| 500Dd | goal elements, "with 75% accuracy" |
| 500DE | goal elements, "M.1.4" |
| 500De | goal elements, "with 90% accuracy" |
| 500DF | goal elements, "M.1.5" |
| 500Df | goal elements, "with 100% accuracy" |
| 500DG | goal elements, "M.2.1" |
| 500Dg | goal elements, "correctly 3 times out of 10" |
| 500DH | goal elements, "M.2.2" |
| 500Dh | goal elements, "correctly 5 times out of 10" |
| 500DI | goal elements, "M.2.3" |
| 500Di | goal elements, "correctly 7 times out of 10" |
| 500DJ | goal elements, "M.2.4" |
| 500Dj | goal elements, "correctly 9 out of 10 times" |
| 500DK | goal elements, "M.2.5" |
| 500Dk | goal elements, "correctly 10 out of 10 times" |
| 500DL | goal elements, "M.3.1" |
| 500Dl | goal elements, "with maximum assistance" |
| 500DM | goal elements, "M.3.2" |
| 500Dm | goal elements, "with moderate assistance" |
| 500DN | goal elements, "M.3.3" |
| 500Dn | goal elements, "with minimal assistance" |
| 500DO | goal elements, "M.3.4" |
| 500Do | goal elements, "with supervision" |
| 500DP | goal elements, "M.3.5" |
| 500Dp | goal elements, "independently" |
| 500E | one embodiment of a plurality of goal elements, "motivator" |
| 500EA | goal elements, "MV.x" |
| 500Ea | goal elements, "Fill in the blank: ____" |
| 500EB | goal elements, "MV.1.1" |
| 500Eb | goal elements, "I want to be a team player" |
| 500EC | goal elements, "MV.1.2" |
| 500Ec | goal elements, "it interests me" |
| 500ED | goal elements, "MV.1.3" |
| 500Ed | goal elements, "I enjoy it" |
| 500EE | goal elements, "MV.1.4" |
| 500Ee | goal elements, "I want to succeed" |
| 500EF | goal elements, "MV.1.5" |
| 500Ef | goal elements, "I want to master it" |
| 500EG | goal elements, "MV.1.6" |
| 500Eg | goal elements, "it makes me feel good" |
| 500EH | goal elements, "MV.1.7" |
| 500Eh | goal elements, "I want to feel better about myself" |
| 500EI | goal elements, "MV.1.8" |
| 500Ei | goal elements, "I want to know how it works" |
| 500EJ | goal elements, "MV.1.9" |
| 500Ej | goal elements, "I want to beat my best score" |
| 500EK | goal elements, "MV.1.10" |
| 500Ek | goal elements, "I want to solve it" |
| 500EL | goal elements, "MV.1.11" |
| 500El | goal elements, "I wonder what will happen" |
| 500EM | goal elements, "MV.1.12" |
| 500Em | goal elements, "I want my family to be proud of me" |
| 500EN | goal elements, "MV.1.13" |
| 500En | goal elements, "I want to see the result" |
| 500EO | goal elements, "MV.1.14" |
| 500Eo | goal elements, "I want to know the cause" |
| 500EP | goal elements, "MV.1.15" |
| 500Ep | goal elements, "I want to win" |
| 400 | goal element lists |
| 400Aa | one embodiment of a plurality of goal element lists, "competency library, audiology" |
| 400Ab | one embodiment of a plurality of goal element lists, "competency library, clinical and translational research" |
| 400Ac | one embodiment of a plurality of goal element lists, "competency library, dentistry" |
| 400Ad | one embodiment of a plurality of goal element lists, "competency library, dietetics" |
| 400Ae | one embodiment of a plurality of goal element lists, "competency library, education K-12, math" |
| 400Af | one embodiment of a plurality of goal element lists, "competency library, education K-12, science" |
| 400Ag | one embodiment of a plurality of goal element lists, "competency library, education K-12, health education" |
| 400Ah | one embodiment of a plurality of goal element lists, "competency library, engineering" |
| 400Ai | one embodiment of a plurality of goal element lists, "competency library, law" |

DRAWING REFERENCES

| | |
|---|---|
| 400Aj | one embodiment of a plurality of goal element lists, "competency library, medicine" |
| 400Ak | one embodiment of a plurality of goal element lists, "competency library, nurse practitioner" |
| 400Al | one embodiment of a plurality of goal element lists, "competency library, occupational therapy" |
| 400Am | one embodiment of a plurality of goal element lists, "competency library, optometry" |
| 400An | one embodiment of a plurality of goal element lists, "competency library, pharmacy" |
| 400Ao | one embodiment of a plurality of goal element lists, "competency library, physical therapy" |
| 400Ap | one embodiment of a plurality of goal element lists, "competency library, speech-language pathology" |
| 400Aq | one embodiment of a plurality of goal element lists, "competency library, teacher" |
| 400B | one embodiment of a plurality of goal element lists, "performance standard library" |
| 400C | one embodiment of a plurality of goal element lists, "tools, media, activities, curriculum library" |
| 400D | one embodiment of a plurality of goal element lists, "measurement library" |
| 400E | one embodiment of a plurality of goal element lists, "motivator library" |
| 300 | goal setting diagram |
| 300A | one embodiment of a goal setting diagram |
| 300Aa | goal setting diagram, subject "I" |
| 300Ab | goal setting diagram, appositive "learner's name" |
| 300Ac | goal setting diagram, verb "will" |
| 300Ad | goal setting diagram, preposition one "to" |
| 300Ae | goal setting diagram, preposition two "using/through" |
| 300Af | goal setting diagram, preposition three "because" |
| 800 | goal status updates |
| 110 | hardware platform |
| 135 | machine |
| 102 | occupational performance |
| 170 | occupational performance data fields or the symbol "Ω" means occupational performance data fields |
| 170A | occupational performance data fields, "progress note data" |
| 170Aa | occupational performance data fields, "Salient impressions data" |
| 170Ab | occupational performance data fields, "Happenings data" |
| 170Ac | occupational performance data fields, "Introspection data" |
| 170Ad | occupational performance data fields, "Next Steps data" |
| 170Ae | occupational performance data fields, "Empowerment data" |
| 170B | occupational performance data fields, "progress note brain function data" |
| 170Ba | occupational performance data fields, "self-efficacy data" |
| 170Bb | occupational performance data fields, "goal commitment data" |
| 170Bc | occupational performance data fields, "goal relevance data" |
| 170Bd | occupational performance data fields, "goal importance data" |
| 170Be | occupational performance data fields, "self appraisal data" |
| 170Bf | occupational performance data fields, "organization data" |
| 170Bg | occupational performance data fields, "emotional imprint data" |
| 170Bh | occupational performance data fields, "goal-setting behavior data" |
| 170Bi | occupational performance data fields, "share experiences data" |
| 170Bj | occupational performance data fields, "sensory experiences data" |
| 170Bk | occupational performance data fields, "success data" |
| 170Bl | occupational performance data fields, "determination data" |
| 170C | occupational performance data fields, "role of storytelling data" |
| 170Ca | occupational performance data fields, "experiential data" |
| 170Cb | occupational performance data fields, "memory recall data" |
| 170Cc | occupational performance data fields, "projection data" |
| 170Cd | occupational performance data fields, "hypothetical data" |
| 170Ce | occupational performance data fields, "prospective data" |
| 170Cf | occupational performance data fields, "relational data" |
| 170Cg | occupational performance data fields, "gender-based data" |
| 170Ch | occupational performance data fields, "observational data" |
| 170Ci | occupational performance data fields, "cultural data" |
| 170Cj | occupational performance data fields, "faith-based data" |
| 170Ck | occupational performance data fields, "traditions data" |
| 170Cl | occupational performance data fields, "forbidden, proscribed data" |
| 170Cm | occupational performance data fields, "coping data" |
| 170Db | occupational performance data fields, "explore vocations data for clinical and translational research fellow" |
| 170De | occupational performance data fields, "explore vocations data for K-12 math student" |
| 170Dh | occupational performance data fields, "explore vocations data for practicing engineer" |
| 170Ea | occupational performance data fields, "intrinsic, extrinsic motivation data" |
| 170Eb | occupational performance data fields, "cultural competence data" |
| 170Ec | occupational performance data fields, "diversity data" |
| 170Ed | occupational performance data fields, "disparity data" |
| 170Ee | occupational performance data fields, "situated cognition data" |
| 170Ef | occupational performance data fields, "communities of practice data" |
| 170Eg | occupational performance data fields, "historical-cultural approach data" |
| 170Eh | occupational performance data fields, "distributed cognition data" |
| 170Ej | occupational performance data fields, "personhood data" |
| 170Ek | occupational performance data field, "self-regulation data" |
| 170El | occupational performance data field, "flow-optimum performance data" |
| 170En | occupational performance data field, "brain function data" |
| 170Eo | occupational performance data field, "ecological psychology data" |
| 170Ep | occupational performance data field, "talent development data" |
| 170Fa | occupational performance data field, "date goal set data" |
| 170Fb | occupational performance data field, "date goal progress made data" |
| 170Fc | occupational performance data field, "data goal unmet or modified data" |
| 170Fd | occupational performance data field, "date goal met data" |
| 170Fe | occupational performance data field, "goal number data" |
| 170Ff | occupational performance data field, "competency based goal 200Z data" |
| 170F | goccupational performance data field, "learner formative assessment scores data" |
| 170Fh | occupational performance data field, "mentor formative assessment scores data" |
| 170Fi | occupational performance data field, "learner summative assessment scores data" |
| 170Fj | occupational performance data field, "mentor summative assessment scores data" |
| 170Fk | occupational performance data field, "500A data" |
| 170Fl | occupational performance data field, "500B data" |
| 170Fm | occupational performance data field, "500C data" |
| 170Fn | occupational performance data field, "500D data" |
| 170Fo | occupational performance data field, "500E data" |
| 170Fp | occupational performance data field, "artifacts 880Z data" |
| 170Fq | occupational performance data field, "progress notes 840A data" |
| 170G | occupational performance data field, "storytelling by analogy to share experiences data" |
| 170Ga | occupational performance data field, "sounding the horn data" |
| 170Gb | occupational performance data field, "playing leap frog in the night data" |
| 170Gc | occupational performance data field, "burning just one flashlight data" |
| 170Gd | occupational performance data field, "modified leap frog: walking together data" |
| 170Ge | occupational performance data field, "running together on white gravel data" |
| 170Gf | occupational performance data field, "dew-covered spider webs data" |
| 170Gg | occupational performance data field, "wolves howling in the distance data" |
| 170Gh | occupational performance data field, "questioning the compass's reliability data" |
| 170Gi | occupational performance data field, "lessons learned from your handbook data" |
| 170Gj | occupational performance data field, "blazing "x's" on trees data" |
| 170Gk | occupational performance data field, "finding your fresh water stream data" |

-continued

| | DRAWING REFERENCES |
|---|---|
| 170Gl | occupational performance data field, "growing accustomed to the night data" |
| 170Gm | occupational performance data field, "sharing stories back at base camp data" |
| 170Za | occupational performance data field, "motivation data about occupational performance" |
| 170Zb | occupational performance data field, "cultural competency data about occupational performance" |
| 170Zc | occupational performance data field, "diversity data about occupational performance" |
| 170Zd | occupational performance data field, "disparities data about occupational performance" |
| 170Ze | occupational performance data field, "levels of cognitive functioning data about occupational performance" |
| 170Zf | occupational performance data field, "performance standards relation to brain function and competency skills during occupational performance" |
| 170Zg | occupational performance data field, "performance standards relation to brain function and tools, media, and activities during occupational performance" |
| 170Zh | occupational performance data field, "performance standards relation to brain function and motivation during occupational performance" |
| 170Zi | occupational performance data field, "performance standards relation to brain function and accuracy or measure of independence during occupational performance" |
| 170Zj | occupational performance data field, "situated cognition data about occupational performance" |
| 170Zk | occupational performance data field, "communities of practice data about occupational performance" |
| 170Zl | occupational performance data field, "historical-cultural approach data about occupational performance" |
| 170Zm | occupational performance data field, "distributed cognition data about occupational performance" |
| 170Zn | occupational performance data field, "FLOW, psychology of optimal performance data about occupational performance" |
| 170Zo | occupational performance data field, "ecological psychology data about occupational performance" |
| 170Zp | occupational performance data field, "talent development data about occupational performance" |
| 100 | one embodiment of an occupational performance system |
| 100A | one embodiment of an occupational performance system, "high-level presentation of an occupational performance system" |
| 700 | performance record |
| 700A | one embodiment of a performance record |
| 840 | progress notes |
| 840A | one embodiment of a plurality of progress notes |
| 840AA | progress notes, "Salient impressions" |
| 840AB | progress notes, "Happenings" |
| 840AC | progress notes, "Introspection" |
| 840AD | progress notes, "Next steps" |
| 840AE | progress notes, "Empowerment" |
| 125 | storage, retrieval, and operation |
| 160 | user addresses |
| 150 | users |

I claim:

1. A system for assisting a user in achieving occupational performance and for distributing learning experience user data relating to the occupational performance to a group of users, comprising:
   one or more processors;
   one or more memory devices operatively coupled to the one or more processors;
   one or more input means operatively coupled to the one or more processors;
   one or more display means operatively coupled to the one or more processors; and
   software instructions stored on the one or more memory devices and executed by the one or more processors, comprising:
   instructions for generating a display to the user enabling the user to identify their competency goals relating to their occupational performance, including instructions for providing the user with a goal setting diagram of goal elements and instructions enabling the user to develop a competency goal by sequentially browsing five different goal element lists and sequentially selecting goal elements from each of the browsed goal element lists, and instructions requiring the user to select five goal elements, at least one element of each of the following goal elements lists:
      a competency goal element list so that the user selects a competency identifying a skill or behavior from a plurality of competencies presented to the user in the competency goal element list;
      a performance standard goal element list so that the user selects a process to assist the user in achieving the selected competency from a plurality of performance standards presented to the user in the performance standard goal element list;
      a component goal element list so that the user selects at least one of tools, media, activities, and curriculum presented to the user in the component goal element list for use in implementing the selected performance standard for achieving the selected competency;
      a measurement goal element list so that the user selects a criteria for the user in implementing the selected performance standard for achieving the selected competency using the selected component wherein the selected criteria is selected from a plurality of measurements presented to the user in the measurement goal element list; and
      a motivator goal element list so that the user selects a reason for achieving the selected competency from a plurality of motivators presented to the user in the motivator goal element list;
   instructions enabling the user to record data of the user's performance regarding their identified competency goal;
   instructions associating the user with a user group with at least one other user of the system wherein users are associated with the user group according to competency goal of the user;
   instructions for enabling the user to interact with at least one other user of the associated user group, including:
      instructions enabling the user to share the recorded data with the other user in the user group,
      instructions enabling the user to access recorded data shared by the other user in the user group, and
      instructions enabling the user and at least one other user to assess the user based on the user's occupational performance using a scoring rubric.

2. The system of claim 1 wherein the associating instructions include instructions grouping the user with a user group according to a type of the selected competency goal of the user and according to at least one of the following relating to the user:
   vocation;
   health condition;
   well-being interests;
   objectives;
   medical disease;
   educational pursuits;
   work pursuits;
   life roles; and
   life interests.

3. The system of claim 2 wherein the instructions for enabling the user to interact with at least one other user of the associated user group further includes instructions enabling the user to link one of their experiences relating to the five goal elements to a symbol for sharing with at least one other user.

4. The system of claim 2 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

5. The system of claim 2 wherein the instructions for enabling the user to interact with at least one other user of the associated user group further includes instructions enabling the user to link an artifact of the user to a symbol for sharing with at least one other user.

6. The system of claim 1 wherein the instructions for enabling the user to interact with at least one other user of the associated user group further includes instructions enabling the user to link one of their experiences relating to the five goal elements to a symbol for sharing with at least one other user.

7. The system of claim 1 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

8. The system of claim 1 wherein the instructions for enabling the user to interact with at least one other user of the associated user group further includes instructions enabling the user to link an artifact of the user to a symbol for sharing with at least one other user.

9. The system of claim 1 wherein the selected competency goal of the user is associated with qualitative data of the user during an occupational performance of the user, and including at least one of the following:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

10. The system of claim 9 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

11. The system of claim 1 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

12. The system of claim 1 wherein the recorded data of the user's performance regarding their identified competency goal comprises a structured data set which is (1) indicative of the occupational performance of the user, (2) indicative of the competency goal and shared artifacts between the user and another user related to the competency goal, and (3) based on an assessment by another user of the associated user group of the user's occupational performance; and further comprising an interface for accessing the structured data set to evaluate the structured data set by at least one of outcome research tools and scientific research tools.

13. The system of claim 12 further comprising instructions for evaluating the competency goal elements with the structured data to indicate the user's occupational performance and instructions enabling the user and at least one other user's to share a story by analogy which relates to at least one of the five goal elements of the user.

14. The system of claim 1 further comprising instructions enabling the user and at least one other user's to share a story by analogy which relates to at least one of the five goal elements of the user.

15. The system of claim 14 wherein the associating instructions include instructions grouping the user with a user group according to a type of the selected competency goal of the user and according to at least one of the following relating to the user:
   vocation;
   health condition;
   well-being interests;
   objectives;
   medical disease;
   educational pursuits;
   work pursuits;
   life roles; and
   life interests.

16. The system of claim 15 wherein the instructions for enabling the user to interact with at least one other user of the associated user group further includes instructions enabling the user to link one of their experiences relating to the five goal elements to a symbol for sharing with at least one other user.

17. The system of claim 15 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

18. The system of claim 15 wherein the instructions for enabling the user to interact with at least one other user of the associated user group further includes instructions enabling the user to link an artifact of the user to a symbol for sharing with at least one other user.

19. The system of claim 14 wherein the instructions for enabling the user to interact with at least one other user of the associated user group further includes instructions enabling the user to link one of their experiences relating to the five goal elements to a symbol for sharing with at least one other user.

20. The system of claim 14 wherein the instructions for enabling the user to interact with at least one other user of the associated user group further includes instructions enabling the user to link one of the following to a symbol for sharing with at least one other user:
- salient impressions data to stimulate the user's thinking;
- happenings data relating to recent events experienced by the user;
- introspection data to stimulate the user's thinking;
- next steps data to stimulate the user's thinking; and
- empowerment data to stimulate the user's thinking.

21. The system of claim 14 wherein the instructions for enabling the user to interact with at least one other user of the associated user group further includes instructions enabling the user to link an artifact of the user to a symbol for sharing with at least one other user.

22. The system of claim 14 wherein the selected competency goal of the user is associated with qualitative function data of the user during an occupational performance of the user, and including at least one of the following:
- salient impressions data to stimulate the user's thinking;
- happenings data relating to recent events experienced by the user;
- introspection data to stimulate the user's thinking;
- next steps data to stimulate the user's thinking; and
- empowerment data to stimulate the user's thinking.

23. The system of claim 22 wherein the user is presented with the following components for selection and use by the user:
- web applications;
- personal sensor devices;
- products or services;
- publicly available content;
- purchasable content;
- screens; assessments; surveys, or quizzes; and
- diagnostic tests.

24. The system of claim 23:
- wherein the associating instructions include instructions grouping the user with a user group according to a type of the selected competency goal of the user and according to at least one of the following relating to the user:
  - vocation;
  - health condition;
  - well-being interests;
  - objectives;
  - medical disease;
  - educational pursuits;
  - work pursuits;
  - life roles; and
  - life interests; and
- wherein at least one of the following:
  - wherein the instructions for enabling the user to interact with at least one other user of the associated user group further includes instructions enabling the user to link one of their experiences relating to the five goal elements to a symbol for sharing with at least one other user;
  - wherein the instructions for enabling the user to interact with at least one other user of the associated user group further includes instructions enabling the user to link one of the following to a symbol for sharing with at least one other user:
    - salient impressions data to stimulate the user's thinking;
    - happenings data relating to recent events experienced by the user;
    - introspection data to stimulate the user's thinking;
    - next steps data to stimulate the user's thinking; and
    - empowerment data to stimulate the user's thinking; and
  - wherein the instructions for enabling the user to interact with at least one other user of the associated user group further includes instructions enabling the user to link an artifact of the user to a symbol for sharing with at least one other user.

25. The system of claim 14 wherein the user is presented with the following components for selection and use by the user:
- web applications;
- personal sensor devices;
- products or services;
- publicly available content;
- purchasable content;
- screens; assessments; surveys, or quizzes; and
- diagnostic tests.

26. A non-transitory computer readable medium including executable instructions stored on the medium and executable by a computer to assist a user in achieving occupational performance and to distribute learning experience user data relating to the occupational performance to a group of users, said executable instructions comprising:
- instructions for generating a display to the user enabling a user to identify their competency goals relating to their occupational performance, including instructions for providing the user with a goal setting diagram of goal elements and instructions enabling the user to develop a competency goal by sequentially browsing five different goal element lists and sequentially selecting goal elements from each of the browsed goal element lists, and instructions requiring the user to select five goal elements, at least one element of each of the following goal elements lists:
  - a competency goal element list so that the user selects a competency identifying a skill or behavior from a plurality of competencies presented to the user in the competency goal element list;
  - a performance standard goal element list so that the user selects a process to assist the user in achieving the selected competency from a plurality of performance standards presented to the user in the performance standard goal element list;
  - a component goal element list so that the user selects at least one of tools, media, activities, and curriculum presented to the user in the component goal element list for use in implementing the selected performance standard for achieving the selected competency;
  - a measurement goal element list so that the user selects a criteria for the user in implementing the selected performance standard for achieving the selected competency using the selected component wherein the selected criteria is selected from a plurality of measurements presented to the user in the measurement goal element list; and
  - a motivator goal element list so that the user selects a reason for achieving the selected competency from a plurality of motivators presented to the user in the motivator goal element list;
- instructions enabling the user to record data of the user's performance regarding their identified competency goal;
- instructions associating the user with a user group with at least one other user of the system wherein users are associated with the user group according to competency goal of the user;

instructions for enabling the user to interact with at least one other user of the associated user group, including:
 instructions enabling the user to share the recorded data with the other user in the user group,
 instructions enabling the user to access recorded data shared by the other user in the user group, and
 instructions enabling the user and at least one other user to assess the user based on the user's occupational performance using a scoring rubric.

27. The medium of claim 26 wherein the associating instructions include instructions grouping the user with a user group according to a type of the selected competency goal of the user and according to at least one of the following relating to the user:
 vocation;
 health condition;
 well-being interests;
 objectives;
 medical disease;
 educational pursuits;
 work pursuits;
 life roles; and
 life interests.

28. The medium of claim 27 wherein the instructions for enabling the user to interact with at least one other user of the associated user group further includes instructions enabling the user to link one of their experiences relating to the five goal elements to a symbol for sharing with at least one other user.

29. The medium of claim 27 wherein the instructions for enabling the user to interact with at least one other user of the associated user group further includes instructions enabling the user to link one of the following to a symbol for sharing with at least one other user:
 salient impressions data to stimulate the user's thinking;
 happenings data relating to recent events experienced by the user;
 introspection data to stimulate the user's thinking;
 next steps data to stimulate the user's thinking; and
 empowerment data to stimulate the user's thinking.

30. The medium of claim 27 wherein the instructions for enabling the user to interact with at least one other user of the associated user group further includes instructions enabling the user to link an artifact of the user to a symbol for sharing with at least one other user.

31. The medium of claim 26 wherein the instructions for enabling the user to interact with at least one other user of the associated user group further includes instructions enabling the user to link one of their experiences relating to the five goal elements to a symbol for sharing with at least one other user.

32. The medium of claim 26 wherein the instructions for enabling the user to interact with at least one other user of the associated user group further includes instructions enabling the user to link one of the following to a symbol for sharing with at least one other user:
 salient impressions data to stimulate the user's thinking;
 happenings data relating to recent events experienced by the user;
 introspection data to stimulate the user's thinking;
 next steps data to stimulate the user's thinking; and
 empowerment data to stimulate the user's thinking.

33. The medium of claim 26 wherein the instructions for enabling the user to interact with at least one other user of the associated user group further includes instructions enabling the user to link an artifact of the user to a symbol for sharing with at least one other user.

34. The medium of claim 26 wherein the selected competency goal of the user is associated with qualitative data of the user during an occupational performance of the user, and including at least one of the following:
 salient impressions data to stimulate the user's thinking;
 happenings data relating to recent events experienced by the user;
 introspection data to stimulate the user's thinking;
 next steps data to stimulate the user's thinking; and
 empowerment data to stimulate the user's thinking.

35. The medium of claim 34 wherein the user is presented with the following components for selection and use by the user:
 web applications;
 personal sensor devices;
 products or services;
 publicly available content;
 purchasable content;
 screens; assessments; surveys, or quizzes; and
 diagnostic tests.

36. The medium of claim 26 wherein the user is presented with the following components for selection and use by the user:
 web applications;
 personal sensor devices;
 products or services;
 publicly available content;
 purchasable content;
 screens; assessments; surveys, or quizzes; and
 diagnostic tests.

37. The medium of claim 26 wherein the recorded data of the user's performance regarding their identified competency goal comprises a structured data set which is (1) indicative of the occupational performance of the user, (2) indicative of the competency goal and shared artifacts between the user and another user related to the competency goal, and (3) based on an assessment by another user of the associated user group of the user's occupational performance; and further comprising an interface for accessing the structured data set to evaluate the structured data set by at least one of outcome research tools and scientific research tools.

38. The medium of claim 37 further comprising instructions for evaluating the competency goal elements with the structured data to indicate the user's occupational performance and instructions enabling the user and at least one other user's to share a story by analogy which relates to at least one of the five goal elements of the user.

39. The medium of claim 26 further comprising instructions enabling the user and at least one other user's to share a story by analogy which relates to at least one of the five goal elements of the user.

40. The medium of claim 39 wherein the associating instructions include instructions grouping the user with a user group according to a type of the selected competency goal of the user and according to at least one of the following relating to the user:
 vocation;
 health condition;
 well-being interests;
 objectives;
 medical disease;
 educational pursuits;
 work pursuits;
 life roles; and
 life interests.

41. The medium of claim 40 wherein the instructions for enabling the user to interact with at least one other user of the associated user group further includes instructions enabling the user to link one of their experiences relating to the five goal elements to a symbol for sharing with at least one other user.

42. The medium of claim 40 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

43. The medium of claim 40 wherein the instructions for enabling the user to interact with at least one other user of the associated user group further includes instructions enabling the user to link an artifact of the user to a symbol for sharing with at least one other user.

44. The medium of claim 39 wherein the instructions for enabling the user to interact with at least one other user of the associated user group further includes instructions enabling the user to link one of their experiences relating to the five goal elements to a symbol for sharing with at least one other user.

45. The medium of claim 39 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

46. The medium of claim 39 wherein the instructions for enabling the user to interact with at least one other user of the associated user group further includes instructions enabling the user to link an artifact of the user to a symbol for sharing with at least one other user.

47. The medium of claim 39 wherein the selected competency goal of the user is associated with qualitative function data of the user during an occupational performance of the user, and including at least one of the following:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

48. The medium of claim 47 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

49. The medium of claim 48:
   wherein the associating instructions include instructions grouping the user with a user group according to a type of the selected competency goal of the user and according to at least one of the following relating to the user:
      vocation;
      health condition;
      well-being interests;
      objectives;
      medical disease;
      educational pursuits;
      work pursuits;
      life roles; and
      life interests; and
   wherein at least one of the following:
      wherein the instructions for enabling the user to interact with at least one other user of the associated user group further includes instructions enabling the user to link one of their experiences relating to the five goal elements to a symbol for sharing with at least one other user;
      wherein the instructions for enabling the user to interact with at least one other user of the associated user group further includes instructions enabling the user to link one of the following to a symbol for sharing with at least one other user:
         salient impressions data to stimulate the user's thinking;
         happenings data relating to recent events experienced by the user;
         introspection data to stimulate the user's thinking;
         next steps data to stimulate the user's thinking; and
         empowerment data to stimulate the user's thinking; and
      wherein the instructions for enabling the user to interact with at least one other user of the associated user group further includes instructions enabling the user to link an artifact of the user to a symbol for sharing with at least one other user.

50. The medium of claim 39 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

51. A computerized method of computer instructions stored on a non-transitory medium and executable by a processor for assisting a user in achieving occupational performance and for distributing learning experience user data relating to the occupational performance to a plurality of users, comprising:
   generating a display to the user enabling a user to identify their competency goals relating to their occupational performance, including providing the user with a goal setting diagram of goal elements and enabling the user to develop a competency goal by sequentially browsing five different goal element lists and sequentially selecting goal elements from each of the browsed goal element lists, and instructions requiring the user to select five goal elements, at least one element of each of the following goal elements lists:
      a competency goal element list so that the user selects a competency identifying a skill or behavior from a plurality of competencies presented to the user in the competency goal element list;
      a performance standard goal element list so that the user selects a process to assist the user in achieving the selected competency from a plurality of performance standards presented to the user in the performance standard goal element list;

a component goal element list so that the user selects at least one of tools, media, activities, and curriculum presented to the user in the component goal element list for use in implementing the selected performance standard for achieving the selected competency;

a measurement goal element list so that the user selects a criteria for the user in implementing the selected performance standard for achieving the selected competency using the selected component wherein the selected criteria is selected from a plurality of measurements presented to the user in the measurement goal element list; and a motivator goal element list so that the user selects a reason for achieving the selected competency from a plurality of motivators presented to the user in the motivator goal element list;

enabling the user to record data of the user's performance regarding their identified competency goal;

associating the user with a user group with at least one other user of the system wherein users are associated with the user group according to competency goal of the user;

enabling the user to interact with at least one other user of the associated user group, including:
  enabling the user to share the recorded data with the other user in the user group,
  enabling the user to access recorded data shared by the other user in the user group, and
  enabling the user and at least one other user to assess the user based on the user's occupational performance using a scoring rubric.

52. The method of claim 51 wherein the associating instructions include instructions grouping the user with a user group according to a type of the selected competency goal of the user and according to at least one of the following relating to the user:
  vocation;
  health condition;
  well-being interests;
  objectives;
  medical disease;
  educational pursuits;
  work pursuits;
  life roles; and
  life interests.

53. The method of claim 52 wherein the instructions for enabling the user to interact with at least one other user of the associated user group further includes instructions enabling the user to link one of their experiences relating to the five goal elements to a symbol for sharing with at least one other user.

54. The method of claim 52 wherein the instructions for enabling the user to interact with at least one other user of the associated user group further includes instructions enabling the user to link one of the following to a symbol for sharing with at least one other user:
  salient impressions data to stimulate the user's thinking;
  happenings data relating to recent events experienced by the user;
  introspection data to stimulate the user's thinking;
  next steps data to stimulate the user's thinking; and
  empowerment data to stimulate the user's thinking.

55. The method of claim 52 wherein the instructions for enabling the user to interact with at least one other user of the associated user group further includes instructions enabling the user to link an artifact of the user to a symbol for sharing with at least one other user.

56. The method of claim 52 wherein the instructions for enabling the user to interact with at least one other user of the associated user group further includes instructions enabling the user to link one of their experiences relating to the five goal elements to a symbol for sharing with at least one other user.

57. The method of claim 51 wherein the instructions for enabling the user to interact with at least one other user of the associated user group further includes instructions enabling the user to link one of the following to a symbol for sharing with at least one other user:
  salient impressions data to stimulate the user's thinking;
  happenings data relating to recent events experienced by the user;
  introspection data to stimulate the user's thinking;
  next steps data to stimulate the user's thinking; and
  empowerment data to stimulate the user's thinking.

58. The method of claim 51 wherein the instructions for enabling the user to interact with at least one other user of the associated user group further includes instructions enabling the user to link an artifact of the user to a symbol for sharing with at least one other user.

59. The method of claim 51 wherein the selected competency goal of the user is associated with qualitative data of the user during an occupational performance of the user, and including at least one of the following:
  salient impressions data to stimulate the user's thinking;
  happenings data relating to recent events experienced by the user;
  introspection data to stimulate the user's thinking;
  next steps data to stimulate the user's thinking; and
  empowerment data to stimulate the user's thinking.

60. The method of claim 59 wherein the user is presented with the following components for selection and use by the user:
  web applications;
  personal sensor devices;
  products or services;
  publicly available content;
  purchasable content;
  screens; assessments; surveys, or quizzes; and
  diagnostic tests.

61. The method of claim 51 wherein the user is presented with the following components for selection and use by the user:
  web applications;
  personal sensor devices;
  products or services;
  publicly available content;
  purchasable content;
  screens; assessments; surveys, or quizzes; and
  diagnostic tests.

62. The method of claim 51 wherein the recorded data of the user's performance regarding their identified competency goal comprises a structured data set which is (1) indicative of the occupational performance of the user, (2) indicative of the competency goal and shared artifacts between the user and another user related to the competency goal, and (3) based on an assessment by another user of the associated user group of the user's occupational performance; and further comprising an interface for accessing the structured data set to evaluate the structured data set by at least one of outcome research tools and scientific research tools.

63. The method of claim 62 further comprising instructions for evaluating the competency goal elements with the structured data to indicate the user's occupational performance and instructions enabling the user and at least one other user's to share a story by analogy which relates to at least one of the five goal elements of the user.

64. The method of claim 51 further comprising instructions enabling the user and at least one other user's to share a story by analogy which relates to at least one of the five goal elements of the user.

65. The method of claim 64 wherein the associating instructions include instructions grouping the user with a user group according to a type of the selected competency goal of the user and according to at least one of the following relating to the user:
- vocation;
- health condition;
- well-being interests;
- objectives;
- medical disease;
- educational pursuits;
- work pursuits;
- life roles; and
- life interests.

66. The method of claim 65 wherein the instructions for enabling the user to interact with at least one other user of the associated user group further includes instructions enabling the user to link one of their experiences relating to the five goal elements to a symbol for sharing with at least one other user.

67. The method of claim 65 wherein the instructions for enabling the user to interact with at least one other user of the associated user group further includes instructions enabling the user to link one of the following to a symbol for sharing with at least one other user:
- salient impressions data to stimulate the user's thinking;
- happenings data relating to recent events experienced by the user;
- introspection data to stimulate the user's thinking;
- next steps data to stimulate the user's thinking; and
- empowerment data to stimulate the user's thinking.

68. The method of claim 65 wherein the instructions for enabling the user to interact with at least one other user of the associated user group further includes instructions enabling the user to link an artifact of the user to a symbol for sharing with at least one other user.

69. The method of claim 64 wherein the instructions for enabling the user to interact with at least one other user of the associated user group further includes instructions enabling the user to link one of their experiences relating to the five goal elements to a symbol for sharing with at least one other user.

70. The method of claim 64 wherein the instructions for enabling the user to interact with at least one other user of the associated user group further includes instructions enabling the user to link one of the following to a symbol for sharing with at least one other user:
- salient impressions data to stimulate the user's thinking;
- happenings data relating to recent events experienced by the user;
- introspection data to stimulate the user's thinking;
- next steps data to stimulate the user's thinking; and
- empowerment data to stimulate the user's thinking.

71. The method of claim 64 wherein the instructions for enabling the user to interact with at least one other user of the associated user group further includes instructions enabling the user to link an artifact of the user to a symbol for sharing with at least one other user.

72. The method of claim 64 wherein the selected competency goal of the user is associated with qualitative function data of the user during an occupational performance of the user, and including at least one of the following:
- salient impressions data to stimulate the user's thinking;
- happenings data relating to recent events experienced by the user;
- introspection data to stimulate the user's thinking;
- next steps data to stimulate the user's thinking; and
- empowerment data to stimulate the user's thinking.

73. The method of claim 72 wherein the user is presented with the following components for selection and use by the user:
- web applications;
- personal sensor devices;
- products or services;
- publicly available content;
- purchasable content;
- screens; assessments; surveys, or quizzes; and
- diagnostic tests.

74. The method of claim 73:
wherein the associating instructions include instructions grouping the user with a user group according to a type of the selected competency goal of the user and according to at least one of the following relating to the user:
- vocation;
- health condition;
- well-being interests;
- objectives;
- medical disease;
- educational pursuits;
- work pursuits;
- life roles; and
- life interests; and wherein at least one of the following:
  wherein the instructions for enabling the user to interact with at least one other user of the associated user group further includes instructions enabling the user to link one of their experiences relating to the five goal elements to a symbol for sharing with at least one other user;
  wherein the instructions for enabling the user to interact with at least one other user of the associated user group further includes instructions enabling the user to link one of the following to a symbol for sharing with at least one other user:
  - salient impressions data to stimulate the user's thinking;
  - happenings data relating to recent events experienced by the user;
  - introspection data to stimulate the user's thinking;
  - next steps data to stimulate the user's thinking; and
  - empowerment data to stimulate the user's thinking; and
  wherein the instructions for enabling the user to interact with at least one other user of the associated user group further includes instructions enabling the user to link an artifact of the user to a symbol for sharing with at least one other user.

75. The method of claim 64 wherein the user is presented with the following components for selection and use by the user:

web applications;
personal sensor devices;
products or services;
publicly available content;
purchasable content;
screens; assessments; surveys, or quizzes; and
diagnostic tests.

76. A system for assisting a user in achieving occupational performance and for distributing learning experience user data relating to the occupational performance to a group of users, comprising:
one or more processors;
one or more memory devices operatively coupled to the one or more processors;
one or more input means operatively coupled to the one or more processors;
one or more display means operatively coupled to the one or more processors; and
software instructions stored on the one or more memory devices and executed by the one or more processors, comprising:
instructions for generating a display to the user enabling a user to identify their competency goals relating to their occupational performance, including instructions for providing the user with a goal setting diagram of goal elements and instructions enabling the user to develop a competency goal by sequentially browsing five different goal element lists and sequentially selecting goal elements from each of the browsed goal element lists, and instructions requiring the user to select five goal elements, at least one element of each of the following goal elements lists:
a competency goal element list so that the user selects a competency identifying a skill or behavior from a plurality of competencies presented to the user in the competency goal element list;
a performance standard goal element list so that the user selects a process to assist the user in achieving the selected competency from a plurality of performance standards presented to the user in the performance standard goal element list;
a component goal element list so that the user selects at least one of tools, media, activities, and curriculum presented to the user in the component goal element list for use in implementing the selected performance standard for achieving the selected competency;
a measurement goal element list so that the user selects a criteria for the user in implementing the selected performance standard for achieving the selected competency using the selected component wherein the selected criteria is selected from a plurality of measurements presented to the user in the measurement goal element list; and
a motivator goal element list so that the user selects a reason for achieving the selected competency from a plurality of motivators presented to the user in the motivator goal element list;
instructions enabling the user to record data of the user's performance regarding their identified competency goal;
instructions associating the user with a user group with at least one other user of the system wherein users are associated with the user group according to competency goal of the user;
instructions for enabling the user to interact with at least one other user of the associated user group, including:
instructions enabling the user to share the recorded data with the other user in the user group, and
instructions enabling the user to access recorded data shared by the other user in the user group,
wherein the recorded data of the user's performance regarding their identified competency goal comprises a structured data set which is (1) indicative of the occupational performance of the user, (2) indicative of the competency goal and shared artifacts between the user and another user related to the competency goal, and (3) based on an assessment by another user of the associated user group of the user's occupational performance using a scoring rubric.

77. The system of claim 76 wherein the associating instructions include instructions grouping the user with a user group according to a type of the selected competency goal of the user and according to at least one of the following relating to the user:
vocation;
health condition;
well-being interests;
objectives;
medical disease;
educational pursuits;
work pursuits;
life roles; and
life interests.

78. The system of claim 77 wherein the instructions for enabling the user to interact with at least one other user of the associated user group further includes instructions enabling the user to link one of their experiences relating to the five goal elements to a symbol for sharing with at least one other user.

79. The system of claim 77 wherein the instructions for enabling the user to interact with at least one other user of the associated user group further includes instructions enabling the user to link one of the following to a symbol for sharing with at least one other user:
salient impressions data to stimulate the user's thinking;
happenings data relating to recent events experienced by the user;
introspection data to stimulate the user's thinking;
next steps data to stimulate the user's thinking; and
empowerment data to stimulate the user's thinking.

80. The system of claim 77 wherein the instructions for enabling the user to interact with at least one other user of the associated user group further includes instructions enabling the user to link an artifact of the user to a symbol for sharing with at least one other user.

81. The system of claim 76 wherein the instructions for enabling the user to interact with at least one other user of the associated user group further includes instructions enabling the user to link one of their experiences relating to the five goal elements to a symbol for sharing with at least one other user.

82. The system of claim 76 wherein the instructions for enabling the user to interact with at least one other user of the associated user group further includes instructions enabling the user to link one of the following to a symbol for sharing with at least one other user:
salient impressions data to stimulate the user's thinking;
happenings data relating to recent events experienced by the user;
introspection data to stimulate the user's thinking;
next steps data to stimulate the user's thinking; and
empowerment data to stimulate the user's thinking.

83. The system of claim 76 wherein the instructions for enabling the user to interact with at least one other user of the associated user group further includes instructions enabling the user to link an artifact of the user to a symbol for sharing with at least one other user.

84. The system of claim 76 wherein the selected competency goal of the user is associated with qualitative data of the user during an occupational performance of the user, and including at least one of the following:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

85. The system of claim 84 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

86. The system of claim 76 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

87. The system of claim 76 further comprising instructions enabling the user and at least one other user's to share a story by analogy which relates to at least one of the five goal elements of the user.

88. The system of claim 87 wherein the associating instructions include instructions grouping the user with a user group according to a type of the selected competency goal of the user and according to at least one of the following relating to the user:
   vocation;
   health condition;
   well-being interests;
   objectives;
   medical disease;
   educational pursuits;
   work pursuits;
   life roles; and
   life interests.

89. The system of claim 88 wherein the instructions for enabling the user to interact with at least one other user of the associated user group further includes instructions enabling the user to link one of their experiences relating to the five goal elements to a symbol for sharing with at least one other user.

90. The system of claim 88 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

91. The system of claim 88 wherein the instructions for enabling the user to interact with at least one other user of the associated user group further includes instructions enabling the user to link an artifact of the user to a symbol for sharing with at least one other user.

92. The system of claim 87 wherein the instructions for enabling the user to interact with at least one other user of the associated user group further includes instructions enabling the user to link one of their experiences relating to the five goal elements to a symbol for sharing with at least one other user.

93. The system of claim 87 wherein the instructions for enabling the user to interact with at least one other user of the associated user group further includes instructions enabling the user to link one of the following to a symbol for sharing with at least one other user:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

94. The system of claim 87 wherein the instructions for enabling the user to interact with at least one other user of the associated user group further includes instructions enabling the user to link an artifact of the user to a symbol for sharing with at least one other user.

95. The system of claim 87 wherein the selected competency goal of the user is associated with qualitative function data of the user during an occupational performance of the user, and including at least one of the following:
   salient impressions data to stimulate the user's thinking;
   happenings data relating to recent events experienced by the user;
   introspection data to stimulate the user's thinking;
   next steps data to stimulate the user's thinking; and
   empowerment data to stimulate the user's thinking.

96. The system of claim 95 wherein the user is presented with the following components for selection and use by the user:
   web applications;
   personal sensor devices;
   products or services;
   publicly available content;
   purchasable content;
   screens; assessments; surveys, or quizzes; and
   diagnostic tests.

97. The system of claim 96:
   wherein the associating instructions include instructions grouping the user with a user group according to a type of the selected competency goal of the user and according to at least one of the following relating to the user:
      vocation;
      health condition;
      well-being interests;
      objectives;
      medical disease;
      educational pursuits;
      work pursuits;
      life roles; and
      life interests; and
   wherein at least one of the following:
      wherein the instructions for enabling the user to interact with at least one other user of the associated user group further includes instructions enabling the user to link one of their experiences relating to the five goal elements to a symbol for sharing with at least one other user;

wherein the instructions for enabling the user to interact with at least one other user of the associated user group further includes instructions enabling the user to link one of the following to a symbol for sharing with at least one other user:

salient impressions data to stimulate the user's thinking;

happenings data relating to recent events experienced by the user;

introspection data to stimulate the user's thinking;

next steps data to stimulate the user's thinking; and empowerment data to stimulate the user's thinking; and wherein the instructions for enabling the user to interact with at least one other user of the associated user group further includes instructions enabling the user to link an artifact of the user to a symbol for sharing with at least one other user.

98. The system of claim 87 wherein the user is presented with the following components for selection and use by the user:

web applications;
personal sensor devices;
products or services;
publicly available content;
purchasable content;
screens; assessments; surveys, or quizzes; and
diagnostic tests.

* * * * *

UNITED STATES PATENT AND TRADEMARK OFFICE
CERTIFICATE OF CORRECTION

PATENT NO. : 8,628,331 B1
APPLICATION NO. : 12/798531
DATED : January 14, 2014
INVENTOR(S) : Beth Ann Wright It is certified that error appears in the above-identified patent and that said Letters Patent is hereby corrected as shown below:

In the Claims

Column 118, Line 4: "52" should read -- 51 --.

Signed and Sealed this
Fifteenth Day of July, 2014

Michelle K. Lee
*Deputy Director of the United States Patent and Trademark Office*